United States Patent
Bigdelu et al.

(10) Patent No.: US 12,026,155 B2
(45) Date of Patent: Jul. 2, 2024

(54) EXECUTING ONE QUERY BASED ON RESULTS OF ANOTHER QUERY

(71) Applicant: Splunk Inc., San Francisco, CA (US)

(72) Inventors: Nasim Bigdelu, North Vancouver (CA); Hema Krishnamurthy Mohan, San Mateo, CA (US); Amin Moshgabadi, San Francisco, CA (US); Clark Eugene Mullen, San Mateo, CA (US); Siri Singamneni, Sunnyvale, CA (US); Daniel Streit, Berkeley, CA (US)

(73) Assignee: Splunk Inc., San Francisco, CA (US)

(*) Notice: Subject to any disclaimer, the term of this patent is extended or adjusted under 35 U.S.C. 154(b) by 0 days.

(21) Appl. No.: 17/686,239

(22) Filed: Mar. 3, 2022

(65) Prior Publication Data

US 2022/0188306 A1    Jun. 16, 2022

Related U.S. Application Data

(63) Continuation of application No. 16/513,532, filed on Jul. 16, 2019, now Pat. No. 11,269,871.

(51) Int. Cl.
    G06F 16/24    (2019.01)
    G06F 16/242   (2019.01)
    G06F 16/25    (2019.01)

(52) U.S. Cl.
    CPC ...... *G06F 16/2428* (2019.01); *G06F 16/2425* (2019.01); *G06F 16/252* (2019.01)

(58) Field of Classification Search
    CPC . G06F 16/2428; G06F 16/2425; G06F 16/252
    See application file for complete search history.

(56) References Cited

U.S. PATENT DOCUMENTS

| | | |
|---|---|---|
| 6,473,503 B1 | 10/2002 | Karau et al. |
| 6,707,476 B1 | 3/2004 | Hochstedler |
| 7,822,707 B1 | 10/2010 | Yehuda et al. |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — David E Choi
(74) *Attorney, Agent, or Firm* — Knobbe, Martens, Olson & Bear, LLP

(57) ABSTRACT

Systems and methods are disclosed for performing multiple queries in a single graphical user interface (GUI) displayed in a client browser. The client browser causes the display of a first user interface field in a first area of the GUI, where the first user interface field can be used to enter or edit a first query. The client browser also causes first query results generated by a data intake and query system executing the first query to be displayed in the first area. The client browser further causes the display of a second user interface field in a second area of the GUI, where the second user interface field can be used to enter or edit a second query. The client browser also causes second query results generated by the data intake and query system executing the second query to be displayed in the second area.

20 Claims, 50 Drawing Sheets

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,166,071 B1 | 4/2012 | Korablev et al. |
| 8,364,460 B2 | 1/2013 | Ostermeyer et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 9,576,007 B1 | 2/2017 | Sivathanu et al. |
| 9,641,334 B2 | 5/2017 | Faitelson et al. |
| 9,667,676 B1 | 5/2017 | Lo et al. |
| 9,916,367 B2 | 3/2018 | Lin et al. |
| 10,120,914 B2 | 11/2018 | Vogt |
| 10,127,258 B2 | 11/2018 | Lamas et al. |
| 10,409,440 B2 | 9/2019 | Blinn et al. |
| 10,452,650 B1 | 10/2019 | Monaharan et al. |
| 10,509,794 B2 | 12/2019 | Filippi et al. |
| 10,776,366 B1 | 9/2020 | Astretsov et al. |
| 10,909,130 B1 | 2/2021 | Scott et al. |
| 11,113,294 B1 | 9/2021 | Bourbie et al. |
| 11,216,511 B1 | 1/2022 | Bigdelu et al. |
| 11,263,268 B1 | 3/2022 | Bourbie et al. |
| 11,269,871 B1 | 3/2022 | Bigdelu et al. |
| 11,386,158 B1 | 7/2022 | Bourbie et al. |
| 11,500,952 B1 | 11/2022 | Gupta et al. |
| 11,604,789 B1 | 3/2023 | Cannon et al. |
| 11,604,799 B1 | 3/2023 | Bigdelu et al. |
| 11,620,300 B2 | 4/2023 | Burnett et al. |
| 11,620,303 B1 | 4/2023 | Roy et al. |
| 11,636,128 B1 | 4/2023 | Bigdelu et al. |
| 11,644,955 B1 | 5/2023 | Singamneni et al. |
| 11,676,345 B1 | 6/2023 | Bhushan et al. |
| 11,727,016 B1 | 8/2023 | Agarwal et al. |
| 2001/0055017 A1 | 12/2001 | Ording |
| 2002/0169764 A1 | 11/2002 | Kincaid et al. |
| 2003/0058280 A1 | 3/2003 | Molinari et al. |
| 2004/0030682 A1 | 2/2004 | Porter et al. |
| 2005/0004911 A1 | 1/2005 | Goldberg et al. |
| 2005/0015361 A1 | 1/2005 | Payton et al. |
| 2005/0015368 A1 | 1/2005 | Payton et al. |
| 2005/0076305 A1 | 4/2005 | Hintermeister et al. |
| 2006/0004707 A1 | 1/2006 | Dettinger |
| 2006/0064674 A1 | 3/2006 | Olson, Jr. et al. |
| 2006/0218479 A1 | 9/2006 | Torres |
| 2007/0022125 A1 | 1/2007 | Salam et al. |
| 2007/0043702 A1 | 2/2007 | Lakshminarayanan et al. |
| 2007/0088723 A1 | 4/2007 | Fish |
| 2007/0118491 A1 | 5/2007 | Baum et al. |
| 2007/0174188 A1 | 7/2007 | Fish |
| 2007/0282797 A1 | 12/2007 | Wang et al. |
| 2008/0025616 A1 | 1/2008 | Bryll |
| 2008/0114730 A1 | 5/2008 | Larimore et al. |
| 2008/0195649 A1 | 8/2008 | Lefebvre |
| 2008/0215546 A1 | 9/2008 | Baum et al. |
| 2008/0243784 A1 | 10/2008 | Stading |
| 2008/0243807 A1 | 10/2008 | Caucas et al. |
| 2009/0019020 A1 | 1/2009 | Dhillon et al. |
| 2009/0228464 A1 | 9/2009 | Jones et al. |
| 2009/0276421 A1 | 11/2009 | Qiu |
| 2009/0319518 A1 | 12/2009 | Koudas et al. |
| 2009/0327240 A1 | 12/2009 | Meehan et al. |
| 2010/0049692 A1 | 2/2010 | Astito et al. |
| 2010/0135582 A1 | 6/2010 | Gokturk et al. |
| 2010/0299458 A1 | 11/2010 | Marking et al. |
| 2010/0306590 A1 | 12/2010 | Anand et al. |
| 2011/0066629 A1 | 3/2011 | Escalante et al. |
| 2011/0078055 A1 | 3/2011 | Faribault et al. |
| 2011/0126232 A1 | 5/2011 | Lee et al. |
| 2011/0179024 A1 | 7/2011 | Stiver et al. |
| 2012/0005044 A1 | 1/2012 | Coleman |
| 2012/0023429 A1 | 1/2012 | Medhi |
| 2012/0110474 A1 | 5/2012 | Chen et al. |
| 2012/0221553 A1 | 8/2012 | Wittmer et al. |
| 2012/0246165 A1 | 9/2012 | Batraski et al. |
| 2012/0246173 A1 | 9/2012 | Wittmer et al. |
| 2012/0254805 A1* | 10/2012 | Pic .......... H04L 41/22 715/834 |
| 2012/0271741 A1 | 10/2012 | Leonard |
| 2012/0284713 A1 | 11/2012 | Ostermeyer et al. |
| 2013/0073542 A1 | 3/2013 | Zhang et al. |
| 2013/0080460 A1 | 3/2013 | Tomko et al. |
| 2013/0086107 A1 | 4/2013 | Genochio et al. |
| 2013/0124542 A1 | 5/2013 | Lee et al. |
| 2013/0159832 A1 | 6/2013 | Ingargiola et al. |
| 2013/0238747 A1 | 9/2013 | Albouze et al. |
| 2013/0290291 A1 | 10/2013 | Loffbourrow et al. |
| 2013/0304760 A1 | 11/2013 | Torii |
| 2013/0326620 A1 | 12/2013 | Merza et al. |
| 2014/0019909 A1 | 1/2014 | Leonard et al. |
| 2014/0074887 A1 | 3/2014 | Neels et al. |
| 2014/0082013 A1 | 3/2014 | Wolf et al. |
| 2014/0188862 A1 | 7/2014 | Campbell et al. |
| 2014/0214976 A1 | 7/2014 | Zhou et al. |
| 2014/0222798 A1 | 8/2014 | Want et al. |
| 2014/0281868 A1 | 9/2014 | Vogel et al. |
| 2014/0324825 A1 | 10/2014 | Gopinath et al. |
| 2014/0344304 A1 | 11/2014 | Topatan et al. |
| 2015/0120745 A1 | 4/2015 | James |
| 2015/0212663 A1 | 7/2015 | Papale et al. |
| 2015/0213127 A1 | 7/2015 | Chang et al. |
| 2015/0254369 A1 | 9/2015 | Hou et al. |
| 2015/0302051 A1 | 10/2015 | Baumgartner et al. |
| 2015/0309689 A1 | 10/2015 | Jin et al. |
| 2016/0004736 A1 | 1/2016 | Tsuchida et al. |
| 2016/0004741 A1 | 1/2016 | Johnson et al. |
| 2016/0012045 A1 | 1/2016 | Franceschini et al. |
| 2016/0062555 A1 | 3/2016 | Ward et al. |
| 2016/0085785 A1 | 3/2016 | Hoffmann |
| 2016/0092485 A1 | 3/2016 | Lamas et al. |
| 2016/0103592 A1 | 4/2016 | Prophete et al. |
| 2016/0103883 A1 | 4/2016 | Ramani et al. |
| 2016/0119388 A1 | 4/2016 | Sitrick et al. |
| 2016/0210300 A1 | 7/2016 | Plakhov et al. |
| 2016/0224532 A1 | 8/2016 | Miller et al. |
| 2016/0246840 A1 | 8/2016 | Masiero et al. |
| 2016/0292285 A1 | 10/2016 | Lee et al. |
| 2016/0373423 A1 | 12/2016 | Naibo |
| 2017/0052654 A1 | 2/2017 | Cervelli et al. |
| 2017/0140011 A1 | 5/2017 | Kuefer et al. |
| 2017/0228711 A1 | 8/2017 | Chawla et al. |
| 2017/0235799 A1 | 8/2017 | Miller et al. |
| 2017/0262754 A1 | 9/2017 | Mizuno et al. |
| 2017/0308610 A1 | 10/2017 | Mullins et al. |
| 2017/0315677 A1 | 11/2017 | Rice et al. |
| 2017/0351951 A1 | 12/2017 | Santos et al. |
| 2017/0352380 A1 | 12/2017 | Douombouya et al. |
| 2017/0364506 A1 | 12/2017 | Stern et al. |
| 2018/0004364 A1 | 1/2018 | Wu |
| 2018/0024701 A1 | 1/2018 | Sanches et al. |
| 2018/0025041 A1 | 1/2018 | Gray et al. |
| 2018/0039399 A1 | 2/2018 | Kaltegaertner et al. |
| 2018/0124031 A1 | 5/2018 | Krishnaprasad et al. |
| 2018/0157767 A1* | 6/2018 | Balyan .......... G06F 16/90328 |
| 2018/0165310 A1 | 6/2018 | Coll et al. |
| 2018/0173390 A1 | 6/2018 | Dunne et al. |
| 2018/0173477 A1 | 7/2018 | Porwal et al. |
| 2018/0232394 A1 | 8/2018 | Danziger et al. |
| 2018/0246983 A1 | 8/2018 | Rathod |
| 2018/0285445 A1 | 10/2018 | Lu |
| 2018/0314745 A1 | 11/2018 | Flilippi et al. |
| 2018/0322169 A1 | 11/2018 | Kaufman et al. |
| 2018/0357320 A1 | 12/2018 | Li et al. |
| 2019/0034528 A1 | 1/2019 | Lintz |
| 2019/0065567 A1 | 2/2019 | Griffith et al. |
| 2019/0073610 A1 | 3/2019 | Rousselot |
| 2019/0098106 A1 | 3/2019 | Mungel et al. |
| 2019/0146970 A1 | 5/2019 | Chameih et al. |
| 2019/0163756 A1* | 5/2019 | Bull .......... G06F 16/285 |
| 2019/0303409 A1 | 10/2019 | Nishino et al. |
| 2019/0342380 A1 | 11/2019 | Thota et al. |
| 2020/0050612 A1 | 2/2020 | Bhattacharjee et al. |
| 2020/0089794 A1* | 3/2020 | Frantz .......... G06F 16/26 |
| 2020/0110842 A1 | 4/2020 | Teo et al. |
| 2020/0134683 A1 | 4/2020 | Boren et al. |

(56) References Cited

U.S. PATENT DOCUMENTS

| | | | |
|---|---|---|---|
| 2020/0167433 A1* | 5/2020 | Karayev | G06N 3/08 |
| 2020/0257680 A1 | 8/2020 | Danyi et al. | |
| 2020/0387390 A1 | 12/2020 | Pat Ulzii et al. | |
| 2022/0138606 A1 | 5/2022 | Pasour et al. | |
| 2022/0197926 A1 | 6/2022 | Passey et al. | |
| 2022/0309248 A1 | 9/2022 | Liu et al. | |
| 2022/0309411 A1 | 9/2022 | Ramaswamy et al. | |
| 2023/0031327 A1 | 2/2023 | Bourbie | |
| 2023/0185818 A1 | 6/2023 | Oattes et al. | |

OTHER PUBLICATIONS

Carraso, David, "Exploring Splunk," published by CITO Research, New York, NY, Apr. 2012.
Chitu, Alex, Google Tests New Site Search Box (2014).
SLAML 10 Reports, Workshop On Managing Systems via Log Analysis and Machine Learning Techniques. ; login: Feb. 2011—Conference Reports—vol. 36, No. 1, pp. 104-110.
Splunk Enterprise Overview 8.0.0—splunk > turn data into doing—copyright 2020 Splunk Inc.—in 17 pages—retrieved May 20, 2020.
Splunk Cloud User Manual 8.0.2004—splunk> turn data in doing—copyright 2020 Splunk Inc.—in 66 pages—retrieved May 20, 2020.
Splunk Quick Reference Guide, updated 2019, available online at https://www.splunk.com/pdfs/solution-guides/splunk-quick-reference-guide.pdf, retrieved May 20, 2020.
U.S. Appl. No. 16/513,573, filed Jul. 16, 2019.
U.S. Appl. No. 16/513,584, filed Jul. 16, 2019.
U.S. Appl. No. 16/513,571, filed Jul. 16, 2019.
U.S. Appl. No. 16/513,565, filed Jul. 16, 2019.
U.S. Appl. No. 16/513,556, filed Jul. 16, 2019.
U.S. Appl. No. 16/513,544, filed Jul. 16, 2019.
U.S. Appl. No. 16/657,988, filed Oct. 18, 2019.
Hoque, et al., "Applying Pragmatic Principles for Interaction with Visual Analytics," IEEE Transactions on Visualization and Computer Graphics, vol. 24, No. 1, Jan. 2018.
Zhang, et al., "Coupling Browse and Search in Highly Interactive User Interfaces: A Study of the Relation Browser," Published in UNC.Edu; 2004.
U.S. Appl. No. 17/444,152, filed Jul. 30, 2021.
U.S. Appl. No. 17/589,558, filed Jan. 31, 2022.
U.S. Appl. No. 17/589,677, filed Jan. 31, 2022.
U.S. Appl. No. 17/589,796, filed Jan. 31, 2022.
U.S. Appl. No. 17/652,888, filed Feb. 28, 2022.
U.S. Appl. No. 17/816,337, filed Jul. 29, 2022.
U.S. Appl. No. 17/816,357, filed Jul. 29, 2022.
U.S. Appl. No. 17/816,359, filed Jul. 29, 2022.
U.S. Appl. No. 17/816,361, filed Jul. 29, 2022.
U.S. Appl. No. 18/051,440, filed Oct. 31, 2022.
U.S. Appl. No. 18/051,458, filed Oct. 31, 2022.
U.S. Appl. No. 18/162,503, filed Jan. 31, 2023.
U.S. Appl. No. 18/144,094, filed May 5, 2023.

\* cited by examiner

| Time 1135 | Host 1136 | Source 1137 | Source Type 1138 | Event 1139 |
|---|---|---|---|---|
| 10/10/2000 1:55 p.m. | www1 | access.log | access_combined | 127.0.0.1 - frank [10/Oct/2000:13:55:36-0700] "GET/apache.gif HTTP/1.0" 200 2326 0.0947<br>1140  1141  1142<br>1143   1144  1145  1146 |
| 10/10/2000 1:56 p.m. | www2 | access.log | access_combined | 127.0.0.1 - bob [10/Oct/2000:13:56:36-0700] "GET/mickey_mouse.gif HTTP/1.0" 200 2980 0.0899 |
| 10/10/2000 1:57 p.m. | www2 | access.log | access_combined | 127.0.0.1 - carlos [10/Oct/2000:13:57:36-0700] "GET/donald_duck.gif HTTP/1.0" 200 2900 0.0857 |
| 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

FIG. 11C

| Row | Time | | Host | Source | Source Type | Event |
|---|---|---|---|---|---|---|
| 55000 | 10/10/2016 | 1:55 p.m. | www1 | access.log | access_combined | 127.0.0.1 - frank [10/Oct/2016:13:55:36 -0700] "GET /apache.gif HTTP/1.0" 200 2326 0.0947  _1331_ |
| 55001 | 10/10/2016 | 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 | 1:57 p.m. | www2 | access.log | access_combined | 127.0.0.1 - eliza [10/Oct/2016:13:57:36 -0700] "GET /donald_duck.gif HTTP/1.0" 200 2900 0.0857  _1332_ |
| 55003 | 10/10/2016 | 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 | 1:59 p.m. | www1 | access.log | access_combined | 127.0.0.3 - virgil [10/Oct/2016:13:59:36 -0700] "GET /donald_duck.gif HTTP/1.0" 200 2900 0.0887  _1333_ |
| 55005 | 10/10/2016 | 2:00 p.m. | www1 | access.log | access_combined | 127.0.0.1 - matt [10/Oct/2016:14:00:36 -0700] "GET /goofy.gif HTTP/1.0" 200 2920 0.0987 |
| 55006 | 10/10/2016 | 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 | 2:02 p.m. | www1 | access.log | access_combined | 127.0.0.1 - jack [10/Oct/2016:14:02:36 -0700] "GET /muppets.gif HTTP/1.0" 200 5000 0.0667  _1334_ |

1323

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

1322

| Event Reference Value | Field Name | Field Value | User ID |
|---|---|---|---|
| 55000 | clientip | 127.0.0.1 | frank |
| 55005 | clientip | 127.0.0.1 | matt |

Original Search:
Search "error" | stats count BY host ← 1402

Sent to peers:
Search "error" | prestats count BY host ← 1404

Executed by search head:
Aggregate the prestats results received from peers ← 1406

FIG. 22

Workbook [add tags]

Add description:
[SPL] [Tr] [▦] [♫]

Last edited a few seconds ago by user_x

[Share ⌄]

> Search Tree View

MY DATASETS

| LOGS k8s_stage 2202A | LOGS k8s_service 2202B | LOGS k8s_prime 2202C | LOGS k8s_gstage 2202D |
| LOGS k8s_control 2202E | LOGS scp_sli 2202F | LOGS k8s_prod 2202G | LOGS k8s_play 2202H |
| LOGS Main 2202I | LOGS test 2202J | METRICS metrics 2202K | METRICS k8_metrics 2202L |

| FAVORITE VIEWS | Created | Last Modified |
|---|---|---|
| from k8s_control \| stats count() by verb | 8 days ago | 2 days ago 2202M |
| from k8s_stage \| stats count() by error | 7 days ago | 3 days ago 2202N |

Sidebar: Home, Workbooks, Browse (TBR), Analyze, Dashboards, Manage data

EXECUTING ONE QUERY BASED ON RESULTS OF ANOTHER QUERY

RELATED APPLICATIONS

This application is a continuation of U.S. patent application Ser. No. 16/513,532, entitled "DISPLAYING MULTIPLE EDITABLE QUERIES IN A GRAPHICAL USER INTERFACE" and filed on Jul. 16, 2019, which is incorporated by reference herein in its entirety. Any and all applications for which a foreign or domestic priority claim is identified in the Application Data Sheet as filed with the present application are incorporated by reference under 37 CFR 1.57 and made a part of this specification. This application also incorporates by reference the following U.S. application Ser. No. 16/512,899, filed Jul. 16, 2019, entitled "Authenticating a User to Access a Data Intake and Query System," Ser. Nos. 16/264,019, 16/147,350, 15/967,581, 15/665,159, and 15/276,717, in their entirety. In addition, the present application is being filed on Jul. 16, 2019 concurrently with the applications listed in the table below, each of which is incorporated herein by reference in its entirety for all purposes:

| Appl. No. | Patent Application Title | Filing Date |
| --- | --- | --- |
| 16/513,545 | RECOMMENDING QUERY PARAMETERS BASED ON TENANT INFORMATION | Jul. 16, 2019 |
| 16/513,584 | RECOMMENDING QUERY PARAMETERS BASED ON THE RESULTS OF AUTOMATICALLY GENERATED QUERIES | Jul. 16, 2019 |
| 16/513,573 | RECOMMENDING QUERY TEMPLATES DURING QUERY FORMATION | Jul. 16, 2019 |
| 16/513,532 | DISPLAYING MULTIPLE EDITABLE QUERIES IN A GRAPHICAL USER INTERFACE | Jul. 16, 2019 |
| 16/513,571 | GENERATING AND EXECUTING A SECOND QUERY BASED ON A FIRST QUERY DISPLAYED IN A GRAPHICAL USER INTERFACE | Jul. 16, 2019 |
| 16/513,565 | EXECUTING A CHILD QUERY BASED ON RESULTS OF A PARENT QUERY | Jul. 16, 2019 |
| 16/513,556 | PERFORMING PANEL-RELATED ACTIONS BASED ON USER INTERACTION WITH A GRAPHICAL USER INTERFACE | Jul. 16, 2019 |
| 16/513,619 | DISPLAYING QUERY RESULTS FROM A PREVIOUS QUERY WHEN ACCESSING A PANEL | Jul. 16, 2019 |
| 16/513,544 | GENERATING AND EXECUTING A QUERY BASED ON USER INTERACTIONS WITH A GRAPHICAL USER INTERFACE | Jul. 16, 2019 |

FIELD

At least one embodiment of the present disclosure pertains to one or more tools for facilitating searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

The present disclosure is illustrated by way of example, and not limitation, in the figures of the accompanying drawings, in which like reference numerals indicate similar elements.

FIG. 11C provides a visual representation of the manner in which a pipelined search language or query operates, in accordance with example embodiments.

FIG. 13C illustrates an example of creating and using an inverted index, in accordance with example embodiments.

FIG. 22 is an interface diagram illustrating an embodiment of a user interface that includes display objects associated with different datasets of a tenant.

FIGS. 29A-29C are interface diagrams illustrating embodiments of a graphical user interface for providing query recommendations.

DETAILED DESCRIPTION

Figure 1:
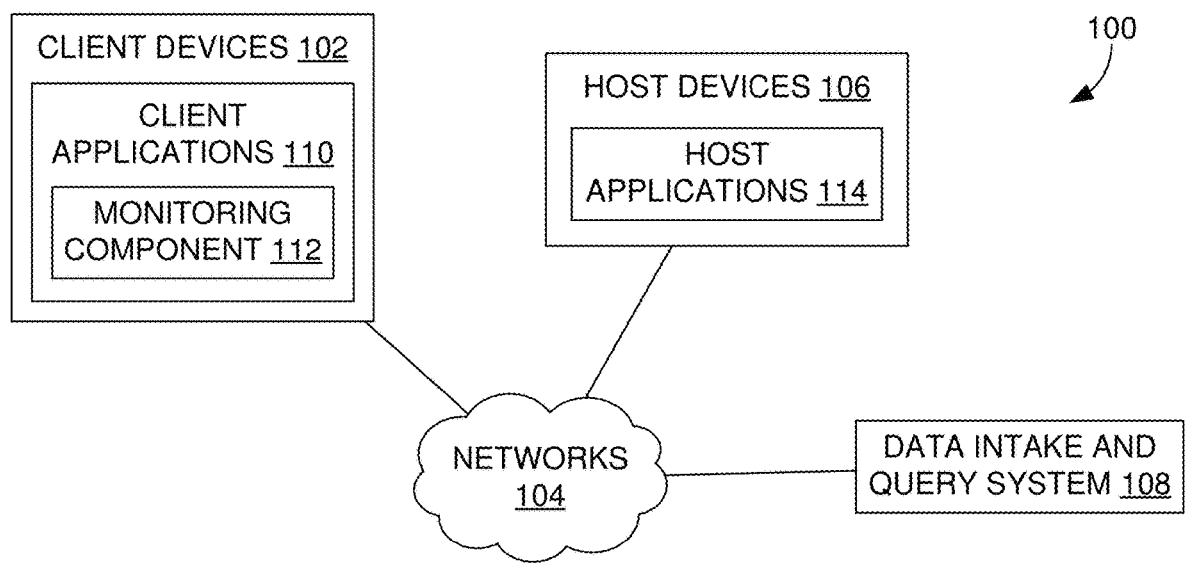
FIG. 1 is a block diagram of an example networked computer environment, in accordance with example embodiments.

Embodiments are described herein according to the following outline:
  1.0. General Overview
  2.0. Operating Environment
    2.1. Host Devices
    2.2. Client Devices
    2.3. Client Device Applications
    2.4. Data Intake and Query System Overview
  3.0. Data Intake and Query System Architecture
    3.1 Gateway
    3.2. Intake System
      3.2.1 Forwarder
      3.2.2 Data Retrieval Subsystem
      3.2.3 Ingestion Buffer
      3.2.4 Streaming Data Processors
    3.3. Indexing System
      3.3.1. Indexing System Manager
      3.3.2. Indexing Nodes
        3.3.2.1 Ingest Manager
        3.3.2.2 Partition Manager
        3.3.2.3 Indexer and Data Store
      3.3.3. Bucket Manager
    3.4 Query System
      3.4.1. Query System Manager
      3.4.2. Search Head
        3.4.2.1 Search Master
        3.4.2.2 Search Manager 3.4.3. Search Nodes
3.4.4. Cache Manager
3.4.5. Resource Monitor and Catalog
3.5. Common Storage
3.6. Data Store Catalog
3.7. Query Acceleration Data Store
3.8. Metadata Catalog
   3.8.1. Dataset Association Records
   3.8.2. Dataset Configuration Records
   3.8.3. Rule Configuration Records
      3.8.4. Annotations3.8.4.1. Generating Annotations
         3.8.4.1.1. System Annotations Based on System Use
            3.8.4.1.1.1. Query Parsing
            3.8.4.1.1.2. Query Execution
            3.8.4.1.1.3. User Monitoring
            3.8.4.1.1.4. Application Monitoring
         3.8.4.1.2. System Annotations Based on Metadata Catalog Changes
      3.8.4.2. Example Annotations
         3.8.4.2.1. Field Annotations
         3.8.4.2.2. Inter-Field Relationship Annotations
         3.8.4.2.3. Inter-Dataset Relationship Annotations
         3.8.4.2.4. Dataset properties Annotations
         3.8.4.2.5. Normalization Annotations
         3.8.4.2.6. Unit Annotations
         3.8.4.2.7. Alarm Threshold Annotations
         3.8.4.2.8. Data Category Annotations
         3.8.4.2.9. User/Group Annotations
         3.8.4.2.10. Application Annotations
4.0. Data Intake and Query System Functions
   4.1. Intake
      4.1.1 Publication to Intake Topic(s)
      4.1.2 Transmission to Streaming Data Processors
      4.1.3 Messages Processing
      4.1.4 Transmission to Subscribers
      4.1.5 Data Resiliency and Security
   4.2. Indexing
   4.3. Querying
      4.3.1. Example Metadata Catalog Processing
   4.4. Data Ingestion, Indexing, and Storage Flow
      4.4.1. Input
      4.4.2. Parsing
      4.4.3. Indexing
   4.5. Query Processing Flow
   4.6. Pipelined Search Language
   4.7. Field Extraction
   4.8. Data Models
   4.9. Acceleration Techniques
      4.9.1. Aggregation Technique
      4.9.2. Keyword Index
      4.9.3. High Performance Analytics Store
         4.9.3.1 Extracting Event Data Using Posting
      4.9.4. Accelerating Report Generation
   4.10. Security Features
   4.11. Data Center Monitoring
   4.12. IT Service Monitoring
   4.13. Other Architectures
5.0. Query Interface System
   5.1. Workbook Features
   5.2. Viewing Multiple, Unrelated Queries
   5.3. Viewing Multiple, Related Queries
   5.4. Panels Derived from the Investigation Assistant
   5.5. Workbook Tree View
   5.6. Automatically Saving a Workbook
   5.7. Panels Derived from Interactions with a Display Object
   5.8. Workbook Routines
      5.8.1. Performing an Action on a Panel
      5.8.2. Displaying Query Results Associated with a Previous Query
      5.8.3. Concurrently Displaying Query Results from Different Queries
      5.8.4. Generating Query Results for an Investigation Assistant View
      5.8.5. Executing a Child Query
      5.8.6. Generating Panels Based on Interactions with a Display Object
6.0. Query Recommendations
   6.1. Personalized Query Recommendations
   6.2. Building Personalized Recommendations
   6.3. Query Templates
   6.4. Data Discovery During Query Formation
7.0. Terminology
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events.

One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 19A).

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

2.0. Operating Environment

FIG. 1 is a block diagram of an example networked computer environment 100, in accordance with example embodiments. It will be understood that FIG. 1 represents one example of a networked computer system and other embodiments may use different arrangements.

The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, the environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer, and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Intake And Query System Overview

The data intake and query system 108 can process and store data received data from the data sources client devices 102 or host devices 106, and execute queries on the data in response to requests received from one or more computing devices. In some cases, the data intake and query system 108 can generate events from the received data and store the events in buckets in a common storage system. In response to received queries, the data intake and query system can assign one or more search nodes to search the buckets in the common storage.

In certain embodiments, the data intake and query system 108 can include various components that enable it to provide stateless services or enable it to recover from an unavailable or unresponsive component without data loss in a time efficient manner. For example, the data intake and query system 108 can store contextual information about its various components in a distributed way such that if one of the components becomes unresponsive or unavailable, the data intake and query system 108 can replace the unavailable component with a different component and provide the replacement component with the contextual information. In this way, the data intake and query system 108 can quickly recover from an unresponsive or unavailable component while reducing or eliminating the loss of data that was being processed by the unavailable component.

In some embodiments, the data intake and query system 108 can store the contextual information in a metadata catalog, as described herein. In certain embodiments, the contextual information can correspond to information that the data intake and query system 108 has determined or learned based on use. In some cases, the contextual information can be stored as annotations (manual annotations and/or system annotations), as described herein.

2.5 On-Premise and Shared Computing Resource Environments

In some environments, a user of a data intake and query system 108 may install and configure, on computing devices owned and operated by the user, one or more software applications that implement some or all of the components of the data intake and query system 108. For example, with reference to FIG. 2, a user may install a software application on server computers owned by the user and configure each server to operate as one or more components of the intake system 210, indexing system 212, query system 214, common storage 216, data store catalog 220, or query acceleration data store 222, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In certain embodiments, one or more of the components of the data intake and query system 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., intake system 210, indexing system 212, query system 214, common storage 216, data store catalog 220, or query acceleration data store 222, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a remote distributed computing system, the underlying hardware (non-limiting examples: processors, hard drives, solid-state memory, RAM, etc.) on which the components of the data intake and query system 108 execute can be shared by multiple customers or tenants as part of a shared computing resource environment. In addition, when implemented in a shared computing resource environment as a cloud-based service, various components of the system 108 can be implemented using containerization or operating-system-level virtualization, or other virtualization technique. For example, one or more components of the intake system 210, indexing system 212, or query system 214 can be implemented as separate software containers or container instances. Each container instance can have certain resources (e.g., memory, processor, etc.) of an underlying host computing system (e.g., server, microprocessor, etc.) assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the data intake and query system 108 in a remote distributed system, shared computing resource environment, or as a cloud-based service can provide a number of benefits. In some cases, implementing the data intake and query system 108 in a remote distributed system, shared computing resource environment, or as a cloud-based service can make it easier to install, maintain, and update the components of the data intake and query system 108. For example, rather than accessing designated hardware at a particular location to install or provide a component of the data intake and query system 108, a component can be remotely instantiated or updated as desired. Similarly, implementing the data intake and query system 108 in a remote distributed system, shared computing resource environment, or as a cloud-based service can make it easier to meet dynamic demand. For example, if the data intake and query system 108 experiences significant load at indexing or search, additional compute resources can be deployed to process the additional data or queries. In an "on-premises" environment, this type of flexibility and scalability may not be possible or feasible.

In addition, by implementing the data intake and query system 108 in a remote distributed system, shared computing resource environment, or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the data intake and query system 108 and/or to other systems unrelated to the data intake and query system 108.

As mentioned, in an on-premises environment, data from one instance of a data intake and query system 108 is logically and physically separated from the data of another instance of a data intake and query system by virtue of each instance having its own designated hardware. As such, data from different customers of the data intake and query system is logically and physically separated from each other.

In a shared computing resource environment, one instance of a data intake and query system can be configured to process the data from one customer or tenant or from multiple customers or tenants. Even in cases where a separate instance of a data intake and query system is used for each customer, the underlying hardware on which the instances of the data intake and query system 108 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the data intake and query system 108 can maintain logical separation between tenant data. For example, the data intake and query system can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the data intake and query system 108 can maintain the mutual exclusivity and/or independence between tenant data even as the tenant data is being processed, stored, and searched by the same underlying hardware. In certain cases, to maintain the mutual exclusivity and/or independence between the data of different tenants, the data intake and query system can use tenant identifiers to uniquely identify data associated with different tenants.

In a shared computing resource environment, some components of the data intake and query system can be instantiated and designated for individual tenants and other components can be shared by multiple tenants. In certain embodiments, a separate intake system 210, indexing system 212, and query system 214 can be instantiated for each tenant, whereas the common storage 216, data store catalog 220, metadata catalog 221, and/or acceleration data store 222, can be shared by multiple tenants. In some such embodiments, the common storage 216, data store catalog 220, metadata catalog 221, and/or acceleration data store 222, can maintain separate directories for the different tenants to ensure their mutual exclusivity and/or independence from each other. Similarly, in some such embodiments, the data intake and query system 108 can use different host computing systems or different isolated execution environments to process the data from the different tenants as part of the intake system 210, indexing system 212, and/or query system 214.

In some embodiments, individual components of the intake system 210, indexing system 212, and/or query system 214 may be instantiated for each tenant or shared by multiple tenants. For example, individual forwarders 302 and an output ingestion buffer 310 may be instantiated and designated for individual tenants, while the data retrieval subsystem 304, intake ingestion buffer 306, and/or streaming data processor 308, may be shared by multiple tenants. In certain embodiments, the data retrieval subsystem 304, intake ingestion buffer 306, streaming data processor 308, and output ingestion buffer 310 may be shared by multiple tenants.

In certain embodiments, an indexing system can be instantiated and designated for a particular tenant or shared by multiple tenants. As a non-limiting example, in certain cases, the embodiment of the indexing system 212 shown in FIG. 4A may be allocated for each tenant of the data intake and query system 108. As another non-limiting example, in some cases, the components of the embodiment of the indexing system 212 shown in FIG. 4B can be shared by multiple tenants.

In some embodiments where a separate indexing system 212 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 212 is shared by multiple tenants, different resources can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 212, such as an ingest manager 406, partition manager 408, and/or indexing node 404, can concurrently process data from the different tenants.

In some embodiments, one instance of query system 214 may be shared by multiple tenants. In some such cases, the same search head 504 can be used to process/execute queries for different tenants and/or the same search nodes 506 can be used to execute query for different tenants. Further, in some such cases, different tenants can be allocated different amounts of compute resources. For example, Tenant A may be assigned more search heads 504 or search nodes 506 based on demand or based on a service level arrangement than another tenant. However, once a search is completed the search head and/or nodes assigned to Tenant A may be assigned to Tenant B, deactivated, or their resource may be re-allocated to other components of the data intake and query system, etc.

In some cases, by sharing more components with different tenants, the functioning of the data intake and query system 108 can be improved. For example, by sharing components across tenants, the data intake and query system can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the data intake and query system can use fewer resources overall while providing improved processing time for the tenants that are using the compute resources. For example, if tenant A is not using any search nodes 506 and tenant B has many searches running, the data intake and query system 214 can use search nodes that would have been reserved for tenant A to service tenant B. In this way, the data intake and query system can decrease the number of compute resources used/reserved, while improving the search time for tenant B and improving compute resource utilization.

3.0. Data Intake and Query System Architecture

Figure 2:
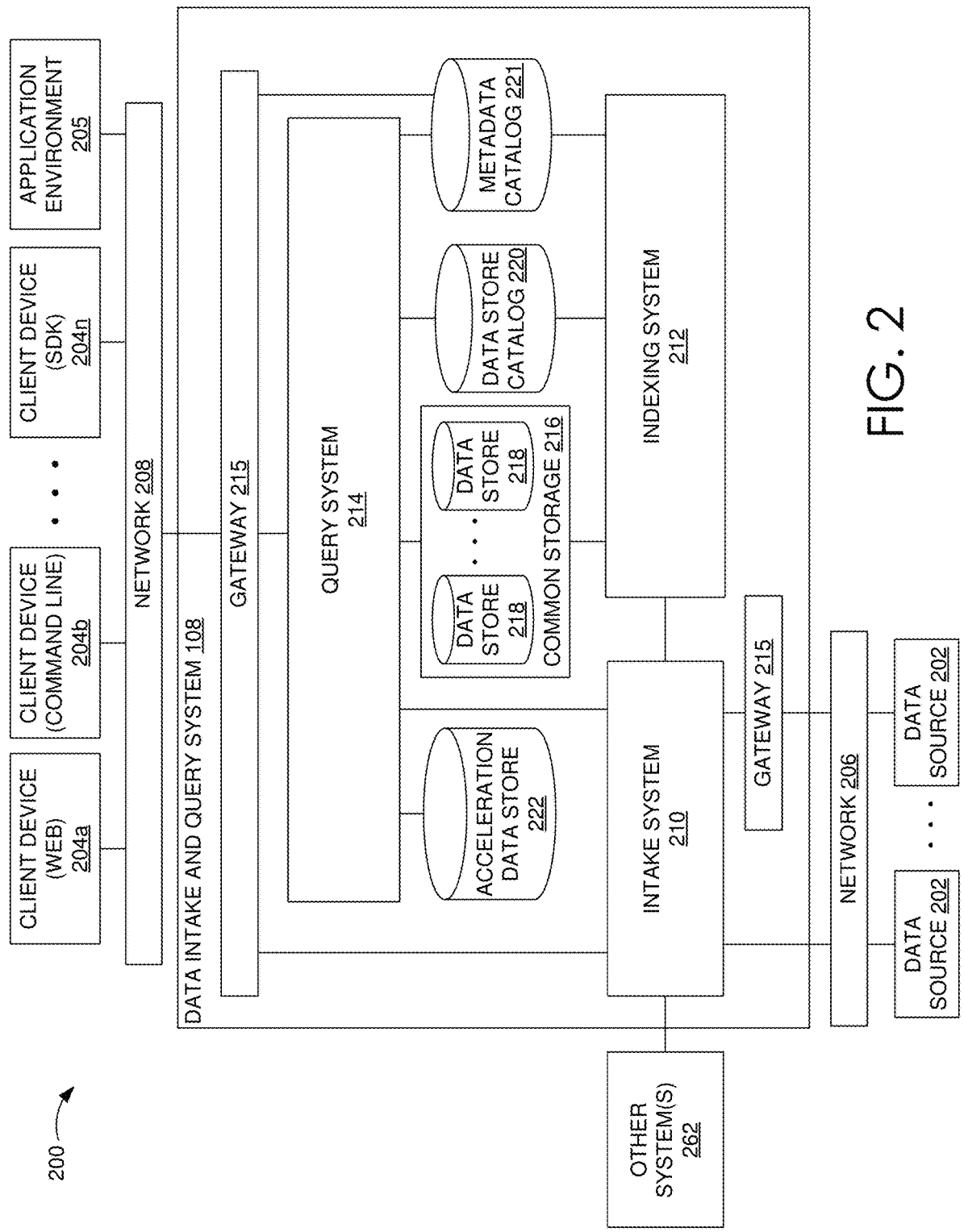
FIG. 2 is a block diagram of an example data intake and query system, in accordance with example embodiments.

FIG. 2 is a block diagram of an embodiment of a data processing environment 200. In the illustrated embodiment, the environment 200 includes data sources 202, client devices 204*a*, 204*b* . . . 204*n* (generically referred to as client device(s) 204), and an application environment 205, in communication with a data intake and query system 108 via networks 206, 208, respectively. The networks 206, 208 may be the same network, may correspond to the network 104, or may be different networks. Further, the networks 206, 208 may be implemented as one or more LANs, WANs, cellular networks, intranetworks, and/or internetworks using any of wired, wireless, terrestrial microwave, satellite links, etc., and may include the Internet.

Each data source 202 broadly represents a distinct source of data that can be consumed by the data intake and query system 108. Examples of data sources 202 include, without limitation, data files, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), performance metrics, cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

As illustrated in FIG. 2, in some embodiments, the data sources 202 can communicate with the data to the intake system 210 via the network 206 without passing through the gateway 215. As a non-limiting example, if the intake system 210 receives the data from a data source 202 via a forwarder 302 (described in greater detail below), the intake system 210 may receive the data via the network 206 without going through the gateway 215. In certain embodiments, the data sources 202 can communicate the data to the intake system 210 via the network 206 using the gateway 215. As another non-limiting example, if the intake system 210 receives the data from a data source 202 via a HTTP intake point 322 (described in greater detail below), it may receive the data via the gateway 215. Accordingly, it will be understood that a variety of methods can be used to receive data from the data sources 202 via the network 206 or via the network 206 and the gateway 215.

The client devices 204 can be implemented using one or more computing devices in communication with the data intake and query system 108, and represent some of the different ways in which computing devices can submit queries to the data intake and query system 108. For example, the client device 204*a* is illustrated as communicating over an Internet (Web) protocol with the data intake and query system 108, the client device 204*b* is illustrated as communicating with the data intake and query system 108 via a command line interface, and the client device 204*n* is illustrated as communicating with the data intake and query system 108 via a software developer kit (SDK). However, it will be understood that the client devices 204 can communicate with, and submit queries to, the data intake and query system 108 in a variety of ways. For example, the client devices 204 can use one or more executable applications or programs from the application environment 205 to interface with the data intake and query system 108. The application environment 205 can include tools, software modules (e.g., computer executable instructions to perform a particular function), etc., to enable application developers to create computer executable applications to interface with the data intake and query system 108. For example, application developers can identify particular data that is of particular relevance to them. The application developers can use the application environment 205 to build a particular application to interface with the data intake and query system 108 to obtain the relevant data that they seek, process the relevant data, and display it in a manner that is consumable or easily understood by a user. The applications developed using the application environment 205 can include their own backend services, middleware logic, front-end user interface, etc., and can provide facilities for ingesting use case specific data and interacting with that data.

In certain embodiments, the developed applications can be executed by a computing device or in an isolated execution environment of an isolated execution environment system, such as Kubernetes, AWS, Microsoft Azure, Google Cloud, etc. In addition, some embodiments, the application environments 205 can provide one or more isolated execution environments in which to execute the developed applications. In some cases, the applications are executed in an isolated execution environment or a processing device unrelated to the application environment 205.

As a non-limiting example, an application developed using the application environment 205 can include a custom web-user interface that may or may not leverage one or more UI components provided by the application environment 205. The application could include middle-ware business logic, on a middle-ware platform of the developer's choice. Furthermore, as mentioned the applications implemented using the application environment 205 can be instantiated and execute in a different isolated execution environment or different isolated execution environment system than the data intake and query system 108. As a non-limiting example, in embodiments where the data intake and query system 108 is implemented using a Kubernetes cluster, the applications developed using the application environment 205 can execute in a different Kubernetes cluster (or other isolated execution environment system) and interact with the data intake and query system 108 via the gateway 215.

The data intake and query system 108 can process and store data received data from the data sources 202 and execute queries on the data in response to requests received from the client devices 204. In the illustrated embodiment, the data intake and query system 108 includes a gateway 209, an intake system 210, an indexing system 212, a query system 214, common storage 216 including one or more data stores 218, a data store catalog 220, a metadata catalog 221, and a query acceleration data store 222. Although certain communication pathways are illustrated in FIG. 2, it will be understood that, in certain embodiments, any component of the data intake and query system 108 can interact with any other component of the data intake and query system 108. For example, the gateway 215 can interact with one or more components of the indexing system 212 and/or one or more components of the intake system 210 can communicate with the metadata catalog 221. Thus, data and/or commands can be communicated in a variety of ways within the data intake and query system 108.

As will be described in greater detail herein, the gateway 215 can provide an interface between one or more components of the data intake and query system 108 and other systems or computing devices, such as, but not limited to, client devices 204, the application environment 205, one or more data sources 202, and/or other systems 262. In some embodiments, the gateway 215 can be implemented using an application programming interface (API). In certain embodiments, the gateway 215 can be implemented using a representational state transfer API (REST API).

As mentioned, the data intake and query system 108 can receive data from different sources 202. In some cases, the data sources 202 can be associated with different tenants or customers. Further, each tenant may be associated with one or more indexes, hosts, sources, sourcetypes, or users. For example, company ABC, Inc. can correspond to one tenant and company XYZ, Inc. can correspond to a different tenant. While the two companies may be unrelated, each company may have a main index and test index (also referred to herein as a main partition or test partition) associated with it, as well as one or more data sources or systems (e.g., billing system, CRM system, etc.). The data intake and query system 108 can concurrently receive and process the data from the various systems and sources of ABC, Inc. and XYZ, Inc.

In certain cases, although the data from different tenants can be processed together or concurrently, the data intake and query system 108 can take steps to avoid combining or co-mingling data from the different tenants. For example, the data intake and query system 108 can assign a tenant identifier for each tenant and maintain a separation between the data using the tenant identifier. In some cases, the tenant identifier can be assigned to the data at the data sources 202, or can be assigned to the data by the data intake and query system 108 at ingest.

As will be described in greater detail herein, at least with reference to FIGS. 3A and 3B, the intake system 210 can receive data from the data sources 202, perform one or more preliminary processing operations on the data, and communicate the data to the indexing system 212, query system 214, or to other systems 262 (which may include, for example, data processing systems, telemetry systems, real-time analytics systems, data stores, databases, etc., any of which may be operated by an operator of the data intake and query system 108 or a third party).

The intake system 210 can receive data from the data sources 202 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The intake system 210 can process the data based on the form in which it is received. In some cases, the intake system 210 can utilize one or more rules to process data and to make the data available to downstream systems (e.g., the indexing system 212, query system 214, etc.). Illustratively, the intake system 210 can enrich the received data. For example, the intake system may add one or more fields to the data received from the data sources 202, such as fields denoting the host, source, sourcetype, index, or tenant associated with the incoming data. In certain embodiments, the intake system 210 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system can be communicated or made available to the indexing system 212, the query system 214, and/or to other systems 262. In some embodiments, the intake system 210 communicates or makes available streams of data using one or more shards or partitions. For example, the indexing system 212 may read or receive data from one shard and another system may receive data from another shard. As another example, multiple systems may receive data from the same shard or partition.

As used herein, a partition can refer to a logical division of data. In some cases, the logical division of data may refer to a portion of a data stream, such as a shard from the intake system 210. In certain cases, the logical division of data can refer to an index or other portion of data stored in the data store 412 or common storage 216, such as different directories or file structures used to store data or buckets. Accordingly, it will be understood that the logical division of data referenced by the term partition will be understood based on the context of its use.

As will be described in greater detail herein, at least with reference to FIGS. 4A and 4B, the indexing system 212 can process the data and store it, for example, in common storage 216. As part of processing the data, the indexing system can identify timestamps associated with the data, organize the data into buckets or time series buckets, convert editable buckets to non-editable buckets, store copies of the buckets in common storage 216, merge buckets, generate indexes of the data, etc. In addition, the indexing system 212 can update the data store catalog 220 with information related to the buckets (pre-merged or merged) or data that is stored in common storage 216, and can communicate with the intake system 210 about the status of the data storage.

As will be described in greater detail herein, at least with reference to FIG. 5, the query system 214 can receive queries that identify a set of data to be processed and a manner of processing the set of data from one or more client devices 204, process the queries to identify the set of data, and execute the query on the set of data. In some cases, as part of executing the query, the query system 214 can use the data store catalog 220 to identify the set of data to be processed or its location in common storage 216 and/or can retrieve data from common storage 216 or the query acceleration data store 222. In addition, in some embodiments, the query system 214 can store some or all of the query results in the query acceleration data store 222.

As mentioned and as will be described in greater detail below, the common storage 216 can be made up of one or more data stores 218 storing data that has been processed by the indexing system 212. The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape, etc.). Further, as data is received at the common storage 216 it can be automatically replicated multiple times according to a replication factor to different data stores across the same and/or different geographic locations. In some embodiments, the common storage 216 can correspond to cloud storage, such as Amazon Simple Storage Service (S3) or Elastic Block Storage (EBS), Google Cloud Storage, Microsoft Azure Storage, etc.

In some embodiments, indexing system 212 can read to and write from the common storage 216. For example, the indexing system 212 can copy buckets of data from its local or shared data stores to the common storage 216. In certain embodiments, the query system 214 can read from, but cannot write to, the common storage 216. For example, the query system 214 can read the buckets of data stored in common storage 216 by the indexing system 212, but may not be able to copy buckets or other data to the common storage 216. In some embodiments, the intake system 210 does not have access to the common storage 216. However, in some embodiments, one or more components of the intake system 210 can write data to the common storage 216 that can be read by the indexing system 212.

As described herein, in some embodiments, data in the data intake and query system 108 (e.g., in the data stores of the indexers of the indexing system 212, common storage 216, or search nodes of the query system 214) can be stored in one or more time series buckets. Each bucket can include raw machine data associated with a time stamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The data store catalog 220 can store information about the data stored in common storage 216, such as, but not limited to an identifier for a set of data or buckets, a location of the set of data, tenants or indexes associated with the set of data, timing information about the data, etc. For example, in embodiments where the data in common storage 216 is stored as buckets, the data store catalog 220 can include a bucket identifier for the buckets in common storage 216, a location of or path to the bucket in common storage 216, a time range of the data in the bucket (e.g., range of time between the first-in-time event of the bucket and the last-in-time event of the bucket), a tenant identifier identifying a customer or computing device associated with the bucket, and/or an index (also referred to herein as a partition) associated with the bucket, etc. In certain embodiments, the data intake and query system 108 includes multiple data store catalogs 220. For example, in some embodiments, the data intake and query system 108 can include a data store catalog 220 for each tenant (or group of tenants), each partition of each tenant (or group of indexes), etc. In some cases, the data intake and query system 108 can include a single data store catalog 220 that includes information about buckets associated with multiple or all of the tenants associated with the data intake and query system 108.

The indexing system 212 can update the data store catalog 220 as the indexing system 212 stores data in common storage 216. Furthermore, the indexing system 212 or other computing device associated with the data store catalog 220 can update the data store catalog 220 as the information in the common storage 216 changes (e.g., as buckets in common storage 216 are merged, deleted, etc.). In addition, as described herein, the query system 214 can use the data store catalog 220 to identify data to be searched or data that satisfies at least a portion of a query. In some embodiments, the query system 214 makes requests to and receives data from the data store catalog 220 using an application programming interface ("API").

As will be described in greater detail herein, at least with reference to FIGS. 6 and 22-27, the metadata catalog 221 can store information about datasets used or supported by the data intake and query system 108 and/or one or more rules that indicate which data in a dataset to process and how to process the data from the dataset. The information about the datasets can include configuration information, such as, but not limited to the type of the dataset, access and authorization information for the dataset, location information for the dataset, physical and logical names or other identifiers for the dataset, etc. The rules can indicate how different data of a dataset is to be processed and/or how to extract fields or field values from different data of a dataset.

The metadata catalog 221 can also include one or more dataset association records. The dataset association records can indicate how to refer to a particular dataset (e.g., a name or other identifier for the dataset) and/or identify associations or relationships between the particular dataset and one or more rules or other datasets. In some embodiments, a dataset association record can be similar to a namespace in that it can indicate a scope of one or more datasets and the manner in which to reference the one or more datasets. As a non-limiting example, one dataset association record can identify four datasets: a "main" index dataset, a "test" index dataset, a "username" collection dataset, and a "username" lookup dataset. The dataset association record can also identify one or more rules for one or more of the datasets. For example, one rule can indicate that for data with the sourcetype "foo" from the "main" index dataset (or all datasets of the dataset association record), multiple actions are to take place, such as, extracting a field value for a "UID" field, and using the "username" lookup dataset to identify a username associated with the extracted "UID" field value. The actions of the rule can provide specific guidance as to how to extract the field value for the "UID" field from the sourcetype "foo" data in the "main" index dataset and how to perform the lookup of the username.

As described herein, the query system 214 can use the metadata catalog 221 to, among other things, interpret dataset identifiers in a query, verify/authenticate a user's permissions and/or authorizations for different datasets, identify additional processing as part of the query, identify one or more datasets from which to retrieve data as part of the query (also referred to herein as source datasets), determine how to extract data from datasets, identify configurations/definitions/dependencies to be used by search nodes to execute the query, etc.

In certain embodiments, the query system 214 can use the metadata catalog 221 to provide a stateless search service. For example, the query system 214 can use the metadata catalog 221 to dynamically determine the dataset configurations and rule configurations to be used to execute a query (also referred to herein as the query configuration parameters) and communicate the query configuration parameters to one or more search heads 504. If the query system 214 determines that an assigned search head 504 becomes unavailable, the query system 214 can communicate the dynamically determined query configuration parameters (and query to be executed) to another search head 504 without data loss and/or with minimal or reduced time loss.

In some embodiments, the metadata catalog 221 can be implemented using a database system, such as, but not limited to, a relational database system (non-limiting commercial examples: DynamoDB, Aurora DB, etc.). In certain embodiments, the database system can include entries for the different datasets, rules, and/or dataset association records. Moreover, as described herein, the metadata catalog 221 can be modified over time as information is learned about the datasets associated with or managed by the data intake and query system 108. For example, the entries in the database system can include manual or system annotations, as described herein.

The query acceleration data store 222 can store the results or partial results of queries, or otherwise be used to accelerate queries. For example, if a user submits a query that has no end date, the query system 214 can store an initial set of results in the query acceleration data store 222. As additional query results are determined based on additional data, the additional results can be combined with the initial set of results, and so on. In this way, the query system 214 can avoid re-searching all of the data that may be responsive to the query and instead search the data that has not already been searched.

3.1. Gateway and Authentication Flow

As described herein, the gateway 215 can provide an interface between one or more components of the data intake and query system 108 (non-limiting examples: one or more components of the intake system 210, one or more components of the indexing system 212, one or more components of the query system 214, common storage 216, the data store catalog 220, the metadata catalog 221 and/or the acceleration data store 222), and other systems or computing devices, such as, but not limited to, client devices 204, the application environment 205, one or more data sources 202, and/or other systems 262 (not illustrated). In some cases, one or more components of the data intake and query system 108 can include their own API. In such embodiments, the gateway 215 can communicate with the API of a component of the data intake and query system 108. Accordingly, the gateway 215 can translate requests received from an external device into a command understood by the API of the specific component of the data intake and query system 108. In this way, the gateway 215 can provide an interface between external devices and the API of the devices of the data intake and query system 108. In some implementations, components of the query system or other components may not be reachable through the gateway, or may be separately access-controlled. For example, in some implementations, the resource catalog(s) 418, 508 and the resource monitor(s) 420, 510 may be inaccessible from outside the gateway, and may be accessed by internal components.

In some embodiments, the gateway 215 can be implemented using an API, such as the REST API. In some such embodiments, the client devices 204 can communicate via one or more commands, such as GET, PUT, etc. However, it will be understood that the gateway 215 can be implemented in a variety of ways to enable the external devices and/or systems to interface with one or more components of the data intake and query system 108.

In certain embodiments, a client device 204 can provide control parameters to the data intake and query system 108 via the gateway 215. As a non-limiting example, using the gateway 215, a client device 204 can provide instructions to the metadata catalog 221, the intake system 210, indexing system 212, and/or the query system 214. For example, using the gateway 215, a client device 204 can instruct the metadata catalog 221 to add/modify/delete a dataset association record, dataset, rule, configuration, and/or action, etc. As another example, using the gateway 215, a client device 204 can provide a query to the query system 214 and receive results. As yet another example, using the gateway 215, a client device 204 can provide processing instructions to the intake system 210. As yet another example, using the gateway 215, one or more data sources 202 can provide data to the intake system 210. In some embodiments, one or more components of the intake system 210 can receive data from a data source 202 via the gateway 215. For example, in some embodiments, data received by the HTTP intake point 322 and/or custom intake points 332 (described in greater detail below) of the intake system 210 can be received via the gateway 215.

As mentioned, upon receipt of a request or command from an external device, the gateway 215 can determine the component of the data intake and query system 108 (or service) to handle the request. In some embodiments, the request or command can include an identifier for the component associated with the request or command In certain embodiments, the gateway 215 can determine the component to handle the request based on the type of request or services requested by the command. For example, if the request or command relates to (or includes) a query, the gateway 215 can determine that the command is to be sent to a component of the query system 214. As another example, if the request or command includes data, such as raw machine data, metrics, or metadata, the gateway 215 can determine that the request or command is to be sent to a component of the intake system 210 (non-limiting examples: HTTP intake point 322 or other push-based publisher 320, custom intake point 332A or other pull-based publisher 330, etc.) or indexing system 212 (non-limiting example: indexing node 404, etc.). As yet another example, if the gateway 215 determines that the request or command relates to the modification of a dataset or rule, it can communicate the command or request to the metadata catalog 221.

Furthermore, in some cases, the gateway 215 can translate the request or command received from the external device into a command that can be interpreted by the component of the data intake and query system 108. For example, the request or command received by the gateway 215 may not be interpretable or understood by the component of the data intake and query system 108 that is to process the command or request. Moreover, as mentioned, in certain embodiments, one or more components of the data intake and query system 108 can use an API to interact with other components of the data intake and query system 108. Accordingly, the gateway 215 can generate a command for the component of the data intake and query system 108 that is to process the command or request based on the received command or request and the information about the API of the component of the data intake and query system 108 (or the component itself).

In some cases, the gateway 215 can expose a subset of components and/or a limited number of features of the components of the data intake and query system 108 to the external devices. For example, for the query system 214, the gateway 215, may expose the ability to submit queries but may not expose the ability to configure certain components of the query system 214, such as the resource catalog 510, resource monitor 508, and/or cache manager 516 (described in greater detail below). However, it will be understood that the gateway 215 can be configured to expose fewer or more components and/or fewer or more functions for the different components as desired. By limiting the components or commands for the components of the data intake and query system, the gateway 215 can provide improved security for the data intake and query system 108.

In addition to limiting the components or functions made available to external systems, the gateway 215 can provide authentication and/or authorization functionality. For example, with each request or command received by a client device and/or data source 202, the gateway 215 can authenticate the computing device from which the requester command was received and/or determine whether the requester has sufficient permissions or authorizations to make the request. In this way, the gateway 215 can provide additional security for the data intake and query system 108.

In some cases, the system 108 receives the request via an API. For example, a user can request access by entering a command that issues an API call to the system 108. In some cases, the API call or request can include the user's login information, such as a username and password, biometric data, or other credential, etc. In certain embodiments, the user's computer can make the API call based on a user accessing a particular URL or IP address, or entering login credentials on a webpage or login page.

In certain embodiments, the system 108 can authenticate the user by providing the credentials to an external authentication system that authenticates the user, etc. Based on a match of the received credentials with credentials of a known user, the system 108 can authenticate the user. In some cases, as part of authenticating the user the system 108 can determine the permissions of the users, such as, the datasets, or components of the system 108 that the user can access. In some cases, users can have different permissions to different components of the system. For example, one user may have access to the intake system 210, indexing system 212, and query system 214, and another user may only have access to the query system 214. As another example, one user may be identified as an administrator and have permissions to access and/or modify configuration files, etc., and another user may only have read-only permissions in order to execute queries and receive results of the queries.

After a user is authenticated, the system 108 may receive a request for a component of the data intake and query system 108. For example, the request may include a command to execute a query, modify/add/delete data in the metadata catalog 221 (e.g., dataset, rule, dataset association record, dataset configuration record, rule configuration record, data source, tenant information, user information, etc.), modify user permissions, process data, or modify a processing flow of data, etc. In some embodiments, the request for access and the request for the component can be part of the same API call or same request. For example, a request may include the login credentials of a user and a command for the component, etc.

Based on the authentication of the user, the system 108 can communicate the request to the component. In certain embodiments, the system 108 can modify the received request. For example, the component to receive the request may have its own API that uses different syntax or commands than the API of the system 108. In some such cases, the system 108 can modify the request for the component so that the component can properly understand the request and execute the action associated with the request. Furthermore, the component may require additional information that is not available to the user. In some such cases, the system 108 can include the additional information to the component.

In certain embodiments, a request may involve multiple components of the data intake and query system 108. In some cases, the components can perform the action concurrently or sequentially. For example some actions may require that different steps be performed sequentially and others may allow for steps to be performed concurrently. In either case, the different components of the system can perform relevant actions based on the authentication by the system 108 and/or an authentication by the individual components, etc. In some embodiments, the component(s) can authenticate the user before performing the action. In some such embodiments, the component(s) can authenticate the user in a manner similar to that done by the system 108.

3.2. Intake System

As detailed below, data may be ingested at the data intake and query system 108 through an intake system 210 configured to conduct preliminary processing on the data, and make the data available to downstream systems or components, such as the indexing system 212, query system 214, third party systems, etc.

Figure 3A:
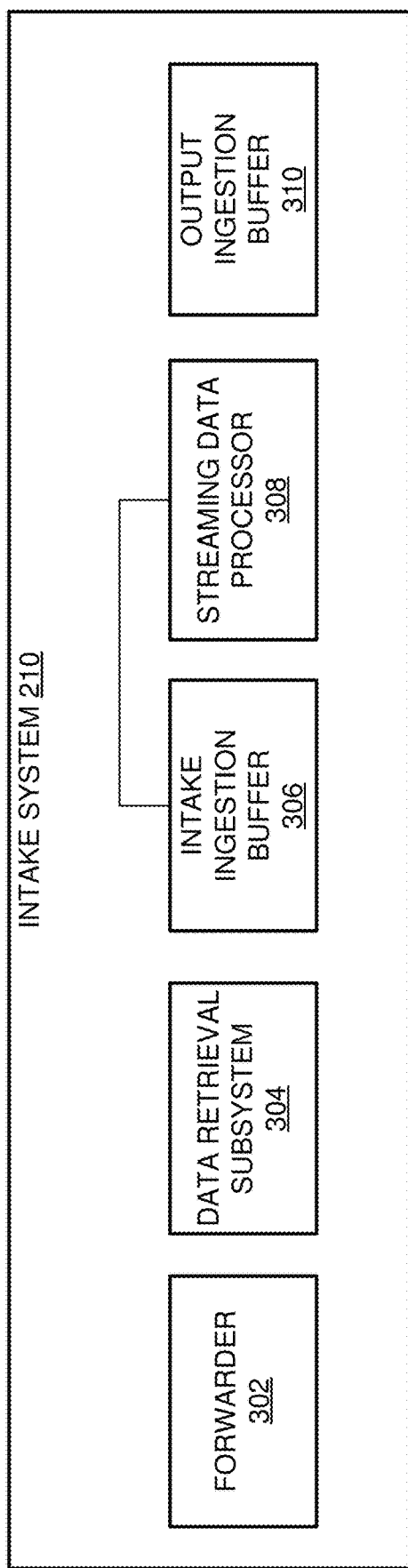
FIG. 3A is a block diagram of one embodiment an intake system.

One example configuration of an intake system 210 is shown in FIG. 3A. As shown in FIG. 3A, the intake system 210 includes a forwarder 302, a data retrieval subsystem 304, an intake ingestion buffer 306, a streaming data processor 308, and an output ingestion buffer 310. As described in detail below, the components of the intake system 210 may be configured to process data according to a streaming data model, such that data ingested into the data intake and query system 108 is processed rapidly (e.g., within seconds or minutes of initial reception at the intake system 210) and made available to downstream systems or components. The initial processing of the intake system 210 may include search or analysis of the data ingested into the intake system 210. For example, the initial processing can transform data ingested into the intake system 210 sufficiently, for example, for the data to be searched by a query system 214, thus enabling "real-time" searching for data on the data intake and query system 108 (e.g., without requiring indexing of the data). Various additional and alternative uses for data processed by the intake system 210 are described below.

Although shown as separate components, the forwarder 302, data retrieval subsystem 304, intake ingestion buffer 306, streaming data processors 308, and output ingestion buffer 310, in various embodiments, may reside on the same machine or be distributed across multiple machines in any combination. In one embodiment, any or all of the components of the intake system can be implemented using one or more computing devices as distinct computing devices or as one or more container instances or virtual machines across one or more computing devices. It will be appreciated by those skilled in the art that the intake system 210 may have more of fewer components than are illustrated in FIGS. 3A and 3B. In addition, the intake system 210 could include various web services and/or peer-to-peer network configurations or inter container communication network provided by an associated container instantiation or orchestration platform. Thus, the intake system 210 of FIGS. 3A and 3B should be taken as illustrative. For example, in some embodiments, components of the intake system 210, such as the ingestion buffers 306 and 310 and/or the streaming data processors 308, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. Accordingly, the hosted computing environment can include any proprietary or open source extensible computing technology, such as Apache Flink or Apache Spark, to enable fast or on-demand horizontal compute capacity scaling of the streaming data processor 308.

In some embodiments, some or all of the elements of the intake system 210 (e.g., forwarder 302, data retrieval subsystem 304, intake ingestion buffer 306, streaming data processors 308, and output ingestion buffer 310, etc.) may reside on one or more computing devices, such as servers, which may be communicatively coupled with each other and with the data sources 202, query system 214, indexing system 212, or other components. In other embodiments, some or all of the elements of the intake system 210 may be implemented as worker nodes as disclosed in U.S. patent application Ser. Nos. 15/665,159, 15/665,148, 15/665,187, 15/665,248, 15/665,197, 15/665,279, 15/665,302, and 15/665,339, each of which is incorporated by reference herein in its entirety (hereinafter referred to as "the Incorporated Applications").

As noted above, the intake system 210 can function to conduct preliminary processing of data ingested at the data intake and query system 108. As such, the intake system 210 illustratively includes a forwarder 302 that obtains data from a data source 202 and transmits the data to a data retrieval subsystem 304. The data retrieval subsystem 304 may be configured to convert or otherwise format data provided by the forwarder 302 into an appropriate format for inclusion at the intake ingestion buffer and transmit the message to the intake ingestion buffer 306 for processing. Thereafter, a streaming data processor 308 may obtain data from the intake ingestion buffer 306, process the data according to one or more rules, and republish the data to either the intake ingestion buffer 306 (e.g., for additional processing) or to the output ingestion buffer 310, such that the data is made available to downstream components or systems. In this manner, the intake system 210 may repeatedly or iteratively process data according to any of a variety of rules, such that the data is formatted for use on the data intake and query system 108 or any other system. As discussed below, the intake system 210 may be configured to conduct such processing rapidly (e.g., in "real-time" with little or no perceptible delay), while ensuring resiliency of the data.

3.2.1. Forwarder

The forwarder 302 can include or be executed on a computing device configured to obtain data from a data source 202 and transmit the data to the data retrieval subsystem 304. In some implementations, the forwarder 302 can be installed on a computing device associated with the data source 202 or directly on the data source 202. While a single forwarder 302 is illustratively shown in FIG. 3A, the intake system 210 may include a number of different forwarders 302. Each forwarder 302 may illustratively be associated with a different data source 202. A forwarder 302 initially may receive the data as a raw data stream generated by the data source 202. For example, a forwarder 302 may receive a data stream from a log file generated by an application server, from a stream of network data from a network device, or from any other source of data. In some embodiments, a forwarder 302 receives the raw data and may segment the data stream into "blocks", possibly of a uniform data size, to facilitate subsequent processing steps. The forwarder 302 may additionally or alternatively modify data received, prior to forwarding the data to the data retrieval subsystem 304. Illustratively, the forwarder 302 may "tag" metadata for each data block, such as by specifying a source, source type, or host associated with the data, or by appending one or more timestamp or time ranges to each data block.

In some embodiments, a forwarder 302 may comprise a service accessible to data sources 202 via a network 206. For example, one type of forwarder 302 may be capable of consuming vast amounts of real-time data from a potentially large number of data sources 202. The forwarder 302 may, for example, comprise a computing device which implements multiple data pipelines or "queues" to handle forwarding of network data to data retrieval subsystems 304.

3.2.2. Data Retrieval Subsystem

The data retrieval subsystem 304 illustratively corresponds to a computing device which obtains data (e.g., from the forwarder 302), and transforms the data into a format suitable for publication on the intake ingestion buffer 306. Illustratively, where the forwarder 302 segments input data into discrete blocks, the data retrieval subsystem 304 may generate a message for each block, and publish the message to the intake ingestion buffer 306. Generation of a message for each block may include, for example, formatting the data of the message in accordance with the requirements of a streaming data system implementing the intake ingestion buffer 306, the requirements of which may vary according to the streaming data system. In one embodiment, the intake ingestion buffer 306 formats messages according to the protocol buffers method of serializing structured data. Thus, the intake ingestion buffer 306 may be configured to convert data from an input format into a protocol buffer format. Where a forwarder 302 does not segment input data into discrete blocks, the data retrieval subsystem 304 may itself segment the data. Similarly, the data retrieval subsystem 304 may append metadata to the input data, such as a source, source type, or host associated with the data.

Generation of the message may include "tagging" the message with various information, which may be included as metadata for the data provided by the forwarder 302, and determining a "topic" for the message, under which the message should be published to the intake ingestion buffer 306. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

In one embodiment, the data retrieval subsystem 304 may obtain a set of topic rules (e.g., provided by a user of the data intake and query system 108 or based on automatic inspection or identification of the various upstream and downstream components of the data intake and query system 108) that determine a topic for a message as a function of the received data or metadata regarding the received data. For example, the topic of a message may be determined as a function of the data source 202 from which the data stems. After generation of a message based on input data, the data retrieval subsystem can publish the message to the intake ingestion buffer 306 under the determined topic.

While the data retrieval subsystem 304 is depicted in FIG. 3A as obtaining data from the forwarder 302, the data retrieval subsystem 304 may additionally or alternatively obtain data from other sources, such as from the data source 202 and/or via the gateway 209. In some instances, the data retrieval subsystem 304 may be implemented as a plurality of intake points, each functioning to obtain data from one or more corresponding data sources (e.g., the forwarder 302, data sources 202, or any other data source), generate messages corresponding to the data, determine topics to which the messages should be published, and to publish the messages to one or more topics of the intake ingestion buffer 306.

Figure 3B:
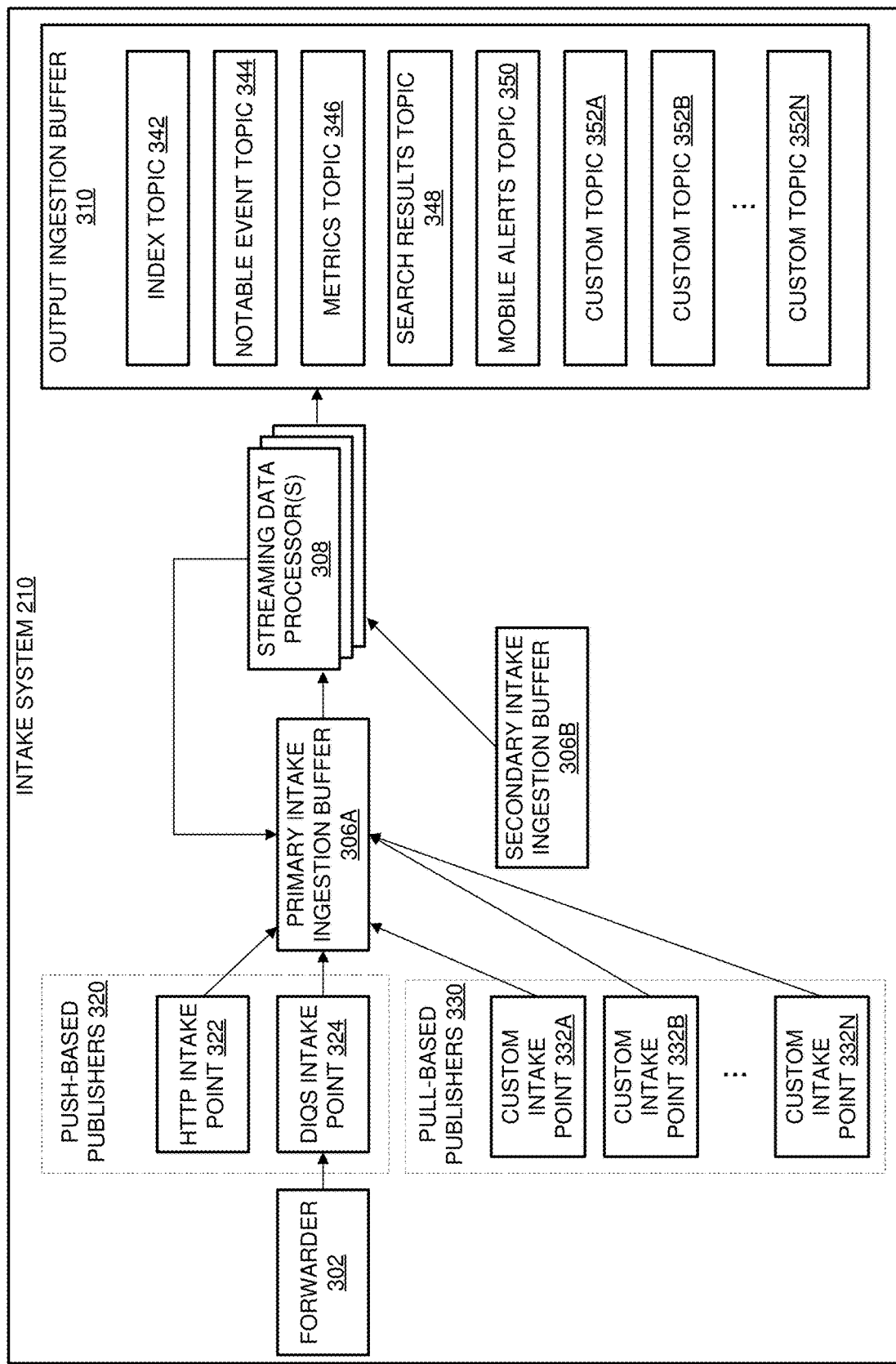
FIG. 3B is a block diagram of another embodiment of an intake system.

One illustrative set of intake points implementing the data retrieval subsystem 304 is shown in FIG. 3B. Specifically, as shown in FIG. 3B, the data retrieval subsystem 304 of FIG. 3A may be implemented as a set of push-based publishers 320 or a set of pull-based publishers 330. The illustrative push-based publishers 320 operate on a "push" model, such that messages are generated at the push-based publishers 320 and transmitted to an intake ingestion buffer 306 (shown in FIG. 3B as primary and secondary intake ingestion buffers 306A and 306B, which are discussed in more detail below). As will be appreciated by one skilled in the art, "push" data transmission models generally correspond to models in which a data source determines when data should be transmitted to a data target. A variety of mechanisms exist to provide "push" functionality, including "true push" mechanisms (e.g., where a data source independently initiates transmission of information) and "emulated push" mechanisms, such as "long polling" (a mechanism whereby a data target initiates a connection with a data source, but allows the data source to determine within a timeframe when data is to be transmitted to the data source).

As shown in FIG. 3B, the push-based publishers 320 illustratively include an HTTP intake point 322 and a data intake and query system (DIQS) intake point 324. The HTTP intake point 322 can include a computing device configured to obtain HTTP-based data (e.g., as JavaScript Object Notation, or JSON messages) to format the HTTP-based data as a message, to determine a topic for the message (e.g., based on fields within the HTTP-based data), and to publish the message to the primary intake ingestion buffer 306A. Similarly, the DIQS intake point 324 can be configured to obtain data from a forwarder 302, to format the forwarder data as a message, to determine a topic for the message, and to publish the message to the primary intake ingestion buffer 306A. In this manner, the DIQS intake point 324 can function in a similar manner to the operations described with respect to the data retrieval subsystem 304 of FIG. 3A.

In addition to the push-based publishers 320, one or more pull-based publishers 330 may be used to implement the data retrieval subsystem 304. The pull-based publishers 330 may function on a "pull" model, whereby a data target (e.g., the primary intake ingestion buffer 306A) functions to continuously or periodically (e.g., each n seconds) query the pull-based publishers 330 for new messages to be placed on the primary intake ingestion buffer 306A. In some instances, development of pull-based systems may require less coordination of functionality between a pull-based publisher 330 and the primary intake ingestion buffer 306A. Thus, for example, pull-based publishers 330 may be more readily developed by third parties (e.g., other than a developer of the data intake a query system 108), and enable the data intake and query system 108 to ingest data associated with third party data sources 202. Accordingly, FIG. 3B includes a set of custom intake points 332A through 332N, each of which functions to obtain data from a third-party data source 202, format the data as a message for inclusion in the primary intake ingestion buffer 306A, determine a topic for the message, and make the message available to the primary intake ingestion buffer 306A in response to a request (a "pull") for such messages.

While the pull-based publishers 330 are illustratively described as developed by third parties, push-based publishers 320 may also in some instances be developed by third parties. Additionally or alternatively, pull-based publishers may be developed by the developer of the data intake and query system 108. To facilitate integration of systems potentially developed by disparate entities, the primary intake ingestion buffer 306A may provide an API through which an intake point may publish messages to the primary intake ingestion buffer 306A. Illustratively, the API may enable an intake point to "push" messages to the primary intake ingestion buffer 306A, or request that the primary intake ingestion buffer 306A "pull" messages from the intake point. Similarly, the streaming data processors 308 may provide an API through which ingestions buffers may register with the streaming data processors 308 to facilitate pre-processing of messages on the ingestion buffers, and the output ingestion buffer 310 may provide an API through which the streaming data processors 308 may publish messages or through which downstream devices or systems may subscribe to topics on the output ingestion buffer 310. Furthermore, any one or more of the intake points 322 through 332N may provide an API through which data sources 202 may submit data to the intake points. Thus, any one or more of the components of FIGS. 3A and 3B may be made available via APIs to enable integration of systems potentially provided by disparate parties.

The specific configuration of publishers 320 and 330 shown in FIG. 3B is intended to be illustrative in nature. For example, the specific number and configuration of intake points may vary according to embodiments of the present application. In some instances, one or more components of the intake system 210 may be omitted. For example, a data source 202 may in some embodiments publish messages to an intake ingestion buffer 306, and thus an intake point 332 may be unnecessary. Other configurations of the intake system 210 are possible.

3.2.3. Ingestion Buffer(s)

The intake system 210 is illustratively configured to ensure message resiliency, such that data is persisted in the event of failures within the intake system 210. Specifically, the intake system 210 may utilize one or more ingestion buffers, which operate to resiliently maintain data received at the intake system 210 until the data is acknowledged by downstream systems or components. In one embodiment, resiliency is provided at the intake system 210 by use of ingestion buffers that operate according to a publish-subscribe ("pub-sub") message model. In accordance with the pub-sub model, data ingested into the data intake and query system 108 may be atomized as "messages," each of which is categorized into one or more "topics." An ingestion buffer can maintain a queue for each such topic, and enable devices to "subscribe" to a given topic. As messages are published to the topic, the ingestion buffer can function to transmit the messages to each subscriber, and ensure message resiliency until at least each subscriber has acknowledged receipt of the message (e.g., at which point the ingestion buffer may delete the message). In this manner, the ingestion buffer may function as a "broker" within the pub-sub model. A variety of techniques to ensure resiliency at a pub-sub broker are known in the art, and thus will not be described in detail herein. In one embodiment, an ingestion buffer is implemented by a streaming data source. As noted above, examples of streaming data sources include (but are not limited to) Amazon's Simple Queue Service ("SQS") or Kinesis™ services, devices executing Apache Kafka™ software, or devices implementing the Message Queue Telemetry Transport (MQTT) protocol. Any one or more of these example streaming data sources may be utilized to implement an ingestion buffer in accordance with embodiments of the present disclosure.

With reference to FIG. 3A, the intake system 210 may include at least two logical ingestion buffers: an intake ingestion buffer 306 and an output ingestion buffer 310. As noted above, the intake ingestion buffer 306 can be configured to receive messages from the data retrieval subsystem 304 and resiliently store the message. The intake ingestion buffer 306 can further be configured to transmit the message to the streaming data processors 308 for processing. As further described below, the streaming data processors 308 can be configured with one or more data transformation rules to transform the messages, and republish the messages to one or both of the intake ingestion buffer 306 and the output ingestion buffer 310. The output ingestion buffer 310, in turn, may make the messages available to various subscribers to the output ingestion buffer 310, which subscribers may include the query system 214, the indexing system 212, or other third-party devices (e.g., client devices 102, host devices 106, etc.).

Both the input ingestion buffer 306 and output ingestion buffer 310 may be implemented on a streaming data source, as noted above. In one embodiment, the intake ingestion buffer 306 operates to maintain source-oriented topics, such as topics for each data source 202 from which data is obtained, while the output ingestion buffer operates to maintain content-oriented topics, such as topics to which the data of an individual message pertains. As discussed in more detail below, the streaming data processors 308 can be configured to transform messages from the intake ingestion buffer 306 (e.g., arranged according to source-oriented topics) and publish the transformed messages to the output ingestion buffer 310 (e.g., arranged according to content-oriented topics). In some instances, the streaming data processors 308 may additionally or alternatively republish transformed messages to the intake ingestion buffer 306, enabling iterative or repeated processing of the data within the message by the streaming data processors 308.

While shown in FIG. 3A as distinct, these ingestion buffers 306 and 310 may be implemented as a common ingestion buffer. However, use of distinct ingestion buffers may be beneficial, for example, where a geographic region in which data is received differs from a region in which the data is desired. For example, use of distinct ingestion buffers may beneficially allow the intake ingestion buffer 306 to operate in a first geographic region associated with a first set of data privacy restrictions, while the output ingestion buffer 310 operates in a second geographic region associated with a second set of data privacy restrictions. In this manner, the intake system 210 can be configured to comply with all relevant data privacy restrictions, ensuring privacy of data processed at the data intake and query system 108.

Moreover, either or both of the ingestion buffers 306 and 310 may be implemented across multiple distinct devices, as either a single or multiple ingestion buffers. Illustratively, as shown in FIG. 3B, the intake system 210 may include both a primary intake ingestion buffer 306A and a secondary intake ingestion buffer 306B. The primary intake ingestion buffer 306A is illustratively configured to obtain messages from the data retrieval subsystem 304 (e.g., implemented as a set of intake points 322 through 332N). The secondary intake ingestion buffer 306B is illustratively configured to provide an additional set of messages (e.g., from other data sources 202). In one embodiment, the primary intake ingestion buffer 306A is provided by an administrator or developer of the data intake and query system 108, while the secondary intake ingestion buffer 306B is a user-supplied ingestion buffer (e.g., implemented externally to the data intake and query system 108).

As noted above, an intake ingestion buffer 306 may in some embodiments categorize messages according to source-oriented topics (e.g., denoting a data source 202 from which the message was obtained). In other embodiments, an intake ingestion buffer 306 may in some embodiments categorize messages according to intake-oriented topics (e.g., denoting the intake point from which the message was obtained). The number and variety of such topics may vary, and thus are not shown in FIG. 3B. In one embodiment, the intake ingestion buffer 306 maintains only a single topic (e.g., all data to be ingested at the data intake and query system 108).

The output ingestion buffer 310 may in one embodiment categorize messages according to content-centric topics (e.g., determined based on the content of a message). Additionally or alternatively, the output ingestion buffer 310 may categorize messages according to consumer-centric topics (e.g., topics intended to store messages for consumption by a downstream device or system). An illustrative number of topics are shown in FIG. 3B, as topics 342 through 352N. Each topic may correspond to a queue of messages (e.g., in accordance with the pub-sub model) relevant to the corresponding topic. As described in more detail below, the streaming data processors 308 may be configured to process messages from the intake ingestion buffer 306 and determine which topics of the topics 342 through 352N into which to place the messages. For example, the index topic 342 may be intended to store messages, or data records, holding data that should be consumed and processed by the indexing system 212. The notable event topic 344 may be intended to store messages holding data that indicates a notable event at a data source 202 (e.g., the occurrence of an error or other notable event). The metrics topic 346 may be intended to store messages holding metrics data for data sources 202. The search results topic 348 may be intended to store messages holding data responsive to a search query. The mobile alerts topic 350 may be intended to store messages holding data for which an end user has requested alerts on a mobile device. A variety of custom topics 352A through 352N may be intended to hold data relevant to end-user-created topics.

As will be described below, by application of message transformation rules at the streaming data processors 308, the intake system 210 may divide and categorize messages from the intake ingestion buffer 306, partitioning or sharding the messages into output topics relevant to a specific downstream consumer. In this manner, specific portions of data input to the data intake and query system 108 may be "divided out" and handled separately, enabling different types of data to be handled differently, and potentially at different speeds. Illustratively, the index topic 342 may be configured to include all or substantially all data included in the intake ingestion buffer 306. Given the volume of data, there may be a significant delay (e.g., minutes or hours) before a downstream consumer (e.g., the indexing system 212) processes a message in the index topic 342. Thus, for example, searching data processed by the indexing system 212 may incur significant delay.

Conversely, the search results topic 348 may be configured to hold only messages corresponding to data relevant to a current query. Illustratively, on receiving a query from a client device 204, the query system 214 may transmit to the intake system 210 a rule that detects, within messages from the intake ingestion buffer 306A, data potentially relevant to the query. The streaming data processors 308 may republish these messages within the search results topic 348, and the query system 214 may subscribe to the search results topic 348 in order to obtain the data within the messages. In this manner, the query system 214 can "bypass" the indexing system 212 and avoid delay that may be caused by that system, thus enabling faster (and potentially real time) display of search results.

While shown in FIGS. 3A and 3B as a single output ingestion buffer 310, the intake system 210 may in some instances utilize multiple output ingestion buffers 310.

As described herein, in some embodiments, components of the intake system 210 can be reserved for a particular tenant or shared by multiple tenants. In some such embodiments, a separate output ingestion buffer 310 can be instantiated for each tenant or used by multiple tenants. In embodiments, where an output ingestion buffer 310 is assigned to a particular tenant, the output ingestion buffer 310 process data from only one tenant. In some such embodiments, the output ingestion buffer 310 may not receive or process data from any other tenants.

In certain embodiments, the output ingestion buffer 310 can be shared by multiple tenants. In some such embodiments, a partition or shard of the output ingestion buffer can 310 include data records associated with different tenants. For example, a first shard can include data records associated with Tenant A and Tenant B. As another example, the first shard may only include data from Tenant A and a second shard may only include data from Tenant B. In either case, the output ingestion buffer 310 can concurrently process data from different tenants. In some such embodiments, the output ingestion buffer 310 can provide the data from different tenants to the same or different components of the indexing system 212. For example, as described herein, the indexing system 212, or certain components thereof, can be reserved for a particular tenant or shared across multiple tenants. Accordingly, the output ingestion buffer 310 may provide the data to an indexing system 212 of a particular tenant or an indexing system 212 that is shared by multiple tenants.

3.2.4. Streaming Data Processors

As noted above, the streaming data processors 308 may apply one or more rules to process messages from the intake ingestion buffer 306A into messages on the output ingestion buffer 310. These rules may be specified, for example, by an end user of the data intake and query system 108 or may be automatically generated by the data intake and query system 108 (e.g., in response to a user query).

Illustratively, each rule may correspond to a set of selection criteria indicating messages to which the rule applies, as well as one or more processing sub-rules indicating an action to be taken by the streaming data processors 308 with respect to the message. The selection criteria may include any number or combination of criteria based on the data included within a message or metadata of the message (e.g., a topic to which the message is published). In one embodiment, the selection criteria are formatted in the same manner or similarly to extraction rules, discussed in more detail below. For example, selection criteria may include regular expressions that derive one or more values or a sub-portion of text from the portion of machine data in each message to produce a value for the field for that message. When a message is located within the intake ingestion buffer 306 that matches the selection criteria, the streaming data processors 308 may apply the processing rules to the message. Processing sub-rules may indicate, for example, a topic of the output ingestion buffer 310 into which the message should be placed. Processing sub-rules may further indicate transformations, such as field or unit normalization operations, to be performed on the message. Illustratively, a transformation may include modifying data within the message, such as altering a format in which the data is conveyed (e.g., converting millisecond timestamps values to microsecond timestamp values, converting imperial units to metric units, etc.), or supplementing the data with additional information (e.g., appending an error descriptor to an error code). In some instances, the streaming data processors 308 may be in communication with one or more external data stores (the locations of which may be specified within a rule) that provide information used to supplement or enrich messages processed at the streaming data processors 308. For example, a specific rule may include selection criteria identifying an error code within a message of the primary ingestion buffer 306A, and specifying that when the error code is detected within a message, that the streaming data processors 308 should conduct a lookup in an external data source (e.g., a database) to retrieve the human-readable descriptor for that error code, and inject the descriptor into the message. In this manner, rules may be used to process, transform, or enrich messages.

The streaming data processors 308 may include a set of computing devices configured to process messages from the intake ingestion buffer 306 at a speed commensurate with a rate at which messages are placed into the intake ingestion buffer 306. In one embodiment, the number of streaming data processors 308 used to process messages may vary based on a number of messages on the intake ingestion buffer 306 awaiting processing. Thus, as additional messages are queued into the intake ingestion buffer 306, the number of streaming data processors 308 may be increased to ensure that such messages are rapidly processed. In some instances, the streaming data processors 308 may be extensible on a per topic basis. Thus, individual devices implementing the streaming data processors 308 may subscribe to different topics on the intake ingestion buffer 306, and the number of devices subscribed to an individual topic may vary according to a rate of publication of messages to that topic (e.g., as measured by a backlog of messages in the topic). In this way, the intake system 210 can support ingestion of massive amounts of data from numerous data sources 202.

In some embodiments, an intake system 210 may comprise a service accessible to client devices 102 and host devices 106 via a network 104. For example, one type of forwarder 302 may be capable of consuming vast amounts of real-time data from a potentially large number of client devices 102 and/or host devices 106. The forwarder may, for example, comprise a computing device which implements multiple data pipelines or "queues" to handle forwarding of network data to indexers. A forwarder 302 may also perform many of the functions that are performed by an indexer. For example, a forwarder 302 may perform keyword extractions on raw data or parse raw data to create events. A forwarder 302 may generate time stamps for events. Additionally or alternatively, a forwarder 302 may perform routing of events to indexers. Data store 208 may contain events derived from machine data from a variety of sources all pertaining to the same component in an IT environment, and this data may be produced by the machine in question or by other components in the IT environment.

3.3. Indexing System

Figure 4A:
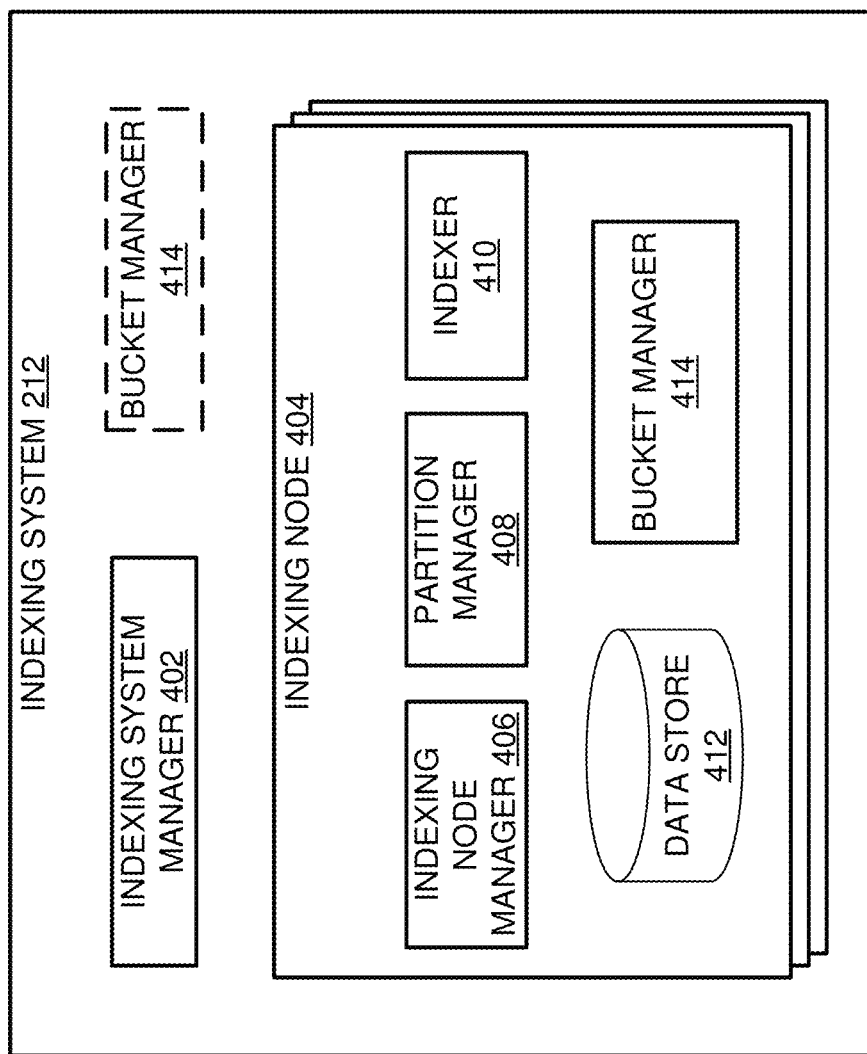
FIG. 4A is a block diagram illustrating an embodiment of an indexing system of the data intake and query system.
Figure 4B:
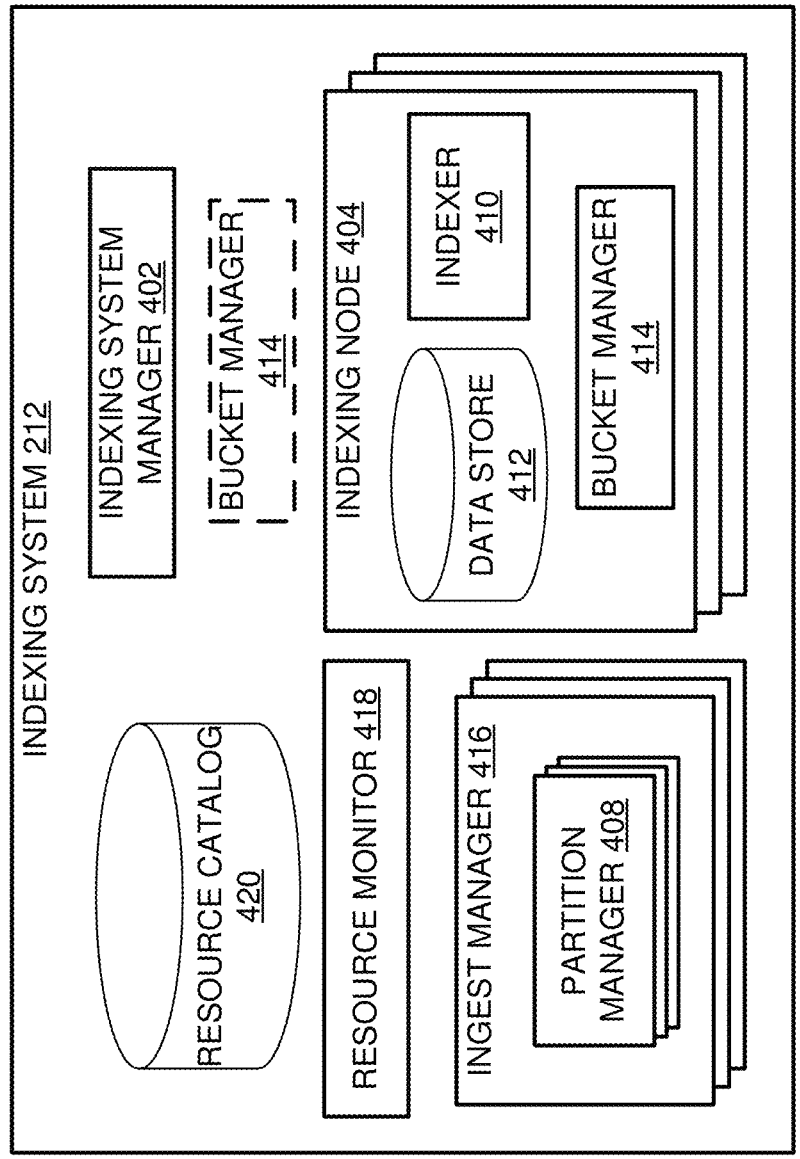
FIG. 4B is a block diagram illustrating an embodiment of an indexing system of the data intake and query system.

FIGS. 4A and 4B are block diagrams illustrating embodiment of an indexing system 212. As described herein, in some embodiments, an indexing system 212 can be instantiated for each distinct tenant. For example, in some cases, the embodiment of the indexing system 212 illustrated in FIG. 4A can be configured for a single tenant. In some such cases, each tenant can be assigned a separate indexing system manager 402, bucket manager 414, and indexing node(s) 404, including separate ingest manager(s) 406, partition managers 408, indexers 410, and data stores 412, etc. In such embodiments, the indexing node(s) 404, ingest manager(s) 406, and partition managers 408 may only process data associated with one tenant.

In certain embodiments, one or more components of the indexing system can be shared between multiple tenants. For example, in certain cases, the embodiment of the indexing system 212 illustrated in FIG. 4B can be configured for use by tenants. In some such cases, an ingest manager 406, partition manager 408, and/or indexing node 404 may concurrently receive and process data from multiple tenants. In addition, in the illustrated embodiment of FIG. 4B, the indexing system 212 can include a resource monitor 418 and a resource catalog 420.

It will be understood that the indexing system 212 can include fewer or more components. For example, in some embodiments, the common storage 216, the bucket manager 414, or the data store catalog 220 can form part of the indexing system 212, etc. In addition, although illustrated as part of the indexing system 212, it will be understood that the resource monitor 418 and the resource catalog 420 can, in some embodiments, be separate or independent of the indexing system 212. For example, in certain embodiments, the indexing system 212 and/or query system 214 can communicate with the resource monitor 418 and resource catalog 420 similar to the way in which the indexing system 212 and query system 214 can communicate with the data store catalog 220 and/or metadata catalog 221.

As detailed herein, the ingestion buffer 310 communicates one or more data streams to the indexing system 212 using multiple shards or partitions. The data from a particular partition can be referred to as, or include, one or more data records. In some cases, the data records from a particular partition correspond to data associated with different tenants, users, etc. In certain embodiments, the data records can include data to be processed by the indexing system 212 to generate one or more events or location information of the data to be processed by the indexing system 212 to generate one or more events. For example, the data records can include a file identifier and a pointer to the location of a file that includes the data to be processed by the indexing system 212 to generate one or more events. In some embodiments, the data records can include a tenant identifier that identifies the tenant associated with the file or data to be processed.

The indexing system 212 can receive, process, and store data corresponding to the shards or partitions. For example, the indexing system 212 can generate events that include a portion of machine data associated with a timestamp and store the events in buckets based on one or more of the timestamps, tenants, indexes, etc., associated with the data. Moreover, the indexing system 212 can include various components that enable it to provide a stateless indexing service, or indexing service that is able to rapidly recover without data loss if one or more components of the indexing system 212 become unresponsive or unavailable.

As described herein, each of the components of the indexing system 212 can be implemented using one or more computing devices as distinct computing devices or as one or more container instances or virtual machines across one or more computing devices. For example, in some embodiments, one or more the indexing system managers 402, the bucket managers 414, the resource catalog 420, the resource monitors 418, the ingest managers 406, and/or the indexing nodes 404 can be implemented as distinct computing devices with separate hardware, memory, and processors. In certain embodiments, one or more indexing system managers 402, bucket managers 414, resource catalogs 420, resource monitors 418, ingest managers 406, and/or indexing nodes 404 can be implemented on the same or across different computing devices as distinct container instances, with each container having access to a subset of the resources of a host computing device (e.g., a subset of the memory or processing time of the processors of the host computing device), but sharing a similar operating system. In some cases, the components can be implemented as distinct virtual machines across one or more computing devices, where each virtual machine can have its own unshared operating system but shares the underlying hardware with other virtual machines on the same host computing device.

3.3.1 Indexing System Manager

The indexing system manager 402 can monitor and manage the indexing nodes 404, and can be implemented as a distinct computing device, virtual machine, container, container of a pod, or a process or thread associated with a container. For example, the indexing system manager 402 can determine whether to generate an additional indexing node 404 based on a utilization rate or availability of the indexing nodes 404. In certain embodiments, the indexing system 212 can include one indexing system manager 402 to manage all indexing nodes 404 of the indexing system 212. In some embodiments, the indexing system 212 can include multiple indexing system managers 402 to manage the indexing nodes 404 of the indexing system 212. For example, an indexing system manager 402 can be instantiated for each computing device (or group of computing devices) configured as a host computing device for multiple indexing nodes 404.

The indexing system manager 402 can handle resource management, creation/destruction of indexing nodes 404, high availability, load balancing, application upgrades/rollbacks, logging and monitoring, storage, networking, service discovery, and performance and scalability, and otherwise handle containerization management of the containers of the indexing system 212. In certain embodiments, the indexing system manager 402 can be implemented using Kubernetes or Swarm.

In some cases, the indexing system manager 402 can monitor the available resources of a host computing device and request additional resources in a shared resource environment, based on workload of the indexing nodes 404 or create, destroy, or reassign indexing nodes 404 based on workload. Further, in some cases, the indexing system manager 402 system can assign indexing nodes 404 to handle data streams based on workload, system resources, etc. For example, in certain embodiments, the indexing system manager 402 can monitor or communicate with the resource catalog 420 to identify workload of one or more of the indexing nodes 404.

In some embodiments, such as where ingest manager(s) 406 are instantiated in a different isolated execution environment, container, or pod from the indexing nodes 404 (a non-limiting example is illustrated in FIG. 4B), the indexing system manager 402 can also perform any one or any combination of the aforementioned functions with respect to the ingest manager(s) 406. In some such embodiments, the indexing system 212 can include one indexing system manager 402 to manage the indexing nodes 404 and a second indexing system manager 402 to manage the ingest managers 406. However, it will be understood that in some cases a single indexing system manager 402 can manage the indexing nodes 404 and the ingest manager(s) 406 as desired.

3.3.2. Ingest Manager

One or more ingest managers 406 can receive the one or more data streams from the partitions (or shards). Each ingest manager 406 can be implemented as a distinct computing device, virtual machine, container, container of a pod, or a process or thread associated with a container. For example, in the illustrated embodiment of FIG. 4A, the ingest manager 406 is shown as part of an indexing node 404, such as a container of an indexing node pod. As another example, in the illustrated embodiment of FIG. 4A, the ingest manager 406 is shown as being separate from the indexing nodes 404, such as a container or pod that is separate from the indexing node container or pod.

Depending on the architecture of the indexing system 212, the functions of the ingest manager can vary. For example, when implemented as part of an indexing node, the ingest manager 406 can be used to distribute the data of one tenant between the indexing nodes 404 of that tenant. In such embodiments, the ingest manager can manage the processing of the data of the data stream(s) of a tenant by the indexing nodes 404 of that tenant. In some such embodiments, each indexing node 404 can include one or more ingest managers 406.

When instantiated separately from the indexing node 404, such as in a shared computing resource environment, the ingest manager(s) 406 can be used to distribute data associated with different tenants to different indexing nodes 404. In addition, in some such embodiments, the ingest manager(s) 406 be scaled separately or independently from the indexing nodes 404. For example, in some cases, the ingest manager 406 can have a 1:1 correspondence to indexing nodes 404. In other cases, the ingest managers 406 can have a one-to-many or many-to-one correspondence to indexing nodes 404. As will be described herein, in some cases, when instantiated separately from the indexing nodes, the ingest manager (or partition managers 408) can concurrently process data from multiple tenants and communicate the data from multiple tenants to different indexing nodes 404, each of which can concurrently process data from different tenants.

In certain embodiments, an ingest manager 406 can generate one or more partition managers 408 to manage the partitions or streams of data received from the intake system 210. For example, the ingest manager 406 can generate or assign a separate partition manager 408 for each partition or shard received from an output ingestion buffer 310. As another example, the ingest manager 406 can generate or assign a single partition manager 408 for multiple partitions.

In certain embodiments, data records can include a location marker. For example, the ingest manager 406 or partition manager 408 can receive (and/or store) the location markers in addition to or as part of the data records received from the ingestion buffer 310. Accordingly, the ingest manager 406 can track the location of the data in the ingestion buffer 310 that the ingest manager 406 (for example, a partition manager 408) has received from the ingestion buffer 310. In some embodiments, the ingest manager 406 stores the read pointers or location marker in one or more data stores, such as but not limited to, common storage 216, DynamoDB, S3, or another type of storage system, shared storage system, or networked storage system, etc. As the indexing nodes 404 are assigned to process data records, or as an indexing node 404 processes a data record, and the markers are updated by the intake system 210, the ingest manager 406 can be updated to reflect the changes to the read pointers or location markers. In this way, if a partition manager 408 becomes unresponsive or unavailable, the ingest manager 406 can assign a different partition manager 408 to manage the data stream without losing context of what data is to be read from the intake system 210. Accordingly, in some embodiments, by using the ingestion buffer 310 and tracking the location of the location markers in the shards of the ingestion buffer, the indexing system 212 can aid in providing a stateless indexing service.

In some embodiments, such as where the ingest manager 406 is implemented as part of an indexing node 404, the ingest manager 406 can be implemented as a background process, or daemon, in the indexing node 404 and the partition managers 408 can be implemented as threads, copies, or forks of the background process. In some cases, an ingest manager 406 can copy itself, or fork, to create a partition manager 408 or cause a template process to copy itself, or fork, to create each new partition manager 408, etc. This may be done for multithreading efficiency or for other reasons related to containerization and efficiency of managing indexers 410. In certain embodiments, the ingest manager 406 generates a new process for each partition manager 408. In some cases, by generating a new process for each partition manager 408, the ingest manager 406 can support multiple language implementations and be language agnostic. For example, the ingest manager 406 can generate a process for a partition manager 408 in python and create a second process for a partition manager 408 in golang, etc.

3.3.3. Partition Manager

A partition manager 408 can manage the distribution of the data records received from one or more partitions or shards of the ingestion buffer 310 to the indexing nodes 404. As mentioned, the ingest manager 406 can generate or assign one or more partition managers 408 for each partition or shard, or can assign a single partition manager 408 for more than one partition or shard. A partition manager 408 can be implemented as a distinct computing device, virtual machine, container, container of a pod, or a process or thread associated with a container. In some cases, the partition manager 408 can be implemented as part of the indexing node 404 (non-limiting example shown in FIG. 4A), as a sub-component of the ingest manager 406 (non-limiting example shown in FIG. 4B), or as a separate component of the indexing system 212.

In some cases, managing the distribution of data records can include, but is not limited to, communicating one or more data records, or portions thereof, to an indexing node 404 (for example, to an indexer 410) for processing, monitoring the indexing node 404, monitoring the size of data being processed by the indexing node 404, instructing the indexing node 404 to move the data to common storage 216, or reporting the storage of the data to the intake system 210.

A partition manager 408 can receive data records from one or more partition(s) and can distribute the data records to one or more indexing nodes 404. In certain embodiments, such as the embodiment shown in FIG. 4A, the partition manager 408 can assign data records to one or more indexing nodes 404 based on their availability.

In some embodiments, such as the embodiment shown in FIG. 4B, the partition manager 408 can communicate a data record to an indexing node 404 for processing based on a data identifier associated with the data record. In certain embodiments, the data records received from a partition of the intake system can be associated with different data identifiers (non-limiting examples: tenant identifier, data source identifier, sourcetype identifier, etc.). For example, the data records received from the ingestion buffer 310 can be associated with different tenants. In some cases, using the data identifier, the partition manager 408 can determine which indexing node 404 is to process a particular data record. For example, based on a tenant identifier, the partition manager 408 can communicate data records associated with the same tenant to the same indexing node 404 (or group of indexing nodes 404). Accordingly, a particular partition manager 408 can process data records from different tenants, data sources, or with different sourcetypes.

In some embodiments, the partition manager 408 can determine which indexing node 404 to process the data based on an indexing node assignment. In certain embodiments, the partition manager 408 can determine the indexing node assignment itself or receive the indexing node assignment from another component of the data intake and query system 108 or indexing system 212, such as the resource catalog 420 or resource monitor 418.

In some cases, the partition manager 408 can selectively and dynamically distribute data records associated with different tenants to different indexing nodes 404 for processing. Furthermore, in certain embodiments, the partition manager 408 and/or ingest manager 406 can track which indexing node 404 is assigned to process which data record. In this way, if an indexing node 404 fails or becomes unresponsive, the partition manager 408 can know which data records are to be reassigned to other indexing nodes 404. In some embodiments, the partition manager 408 receives data from a pub-sub messaging system, such as the ingestion buffer 310. As described herein, the ingestion buffer 310 can have one or more streams of data and one or more shards or partitions associated with each stream of data. Each stream of data can be separated into shards and/or other partitions or types of organization of data. In certain cases, each shard can include data from multiple tenants, indexes, etc. For example, one shard can include records from Tenants A, B, and C, and a second shard can include records from Tenants B, C, and D.

In some cases, each shard can correspond to data associated with a particular tenant, index, source, sourcetype, etc. Accordingly, in some embodiments, the indexing system 212 can include a partition manager 408 for individual tenants, indexes, sources, sourcetypes, etc. In some cases, based on the tenant identifier associated with a particular data record, the indexing system 212 can manage and process the data differently. For example, the indexing system 212 can assign more indexing nodes 404 to process data from one tenant than another tenant, or store buckets associated with one tenant or index more frequently to common storage 216 than buckets associated with a different tenant or index, etc.

In certain embodiments, each shard can include data associated with multiple tenants, indexes, sources, or sourcetypes. In some such embodiments, the partition manager 408 assigned to a particular shard can concurrently process data associated with multiple tenants, indexes, sources, or sourcetypes.

In some embodiments, a partition manager 408 receives data from one or more of the shards or partitions of the ingestion buffer 310. The partition manager 408 can forward one or more data records from the shards/partitions to indexing nodes 404 for processing. In some cases, the amount or size of the data record(s) coming through a partition may exceed the partition's (or ingestion buffer's 310) throughput. For example, 4 MB/s of data records may be sent to an ingestion buffer 310 for a particular partition, but the ingestion buffer 310 may be able to process only 2 MB/s of data per partition. Accordingly, in some embodiments, one or more data records can include a reference to a location in storage where the indexing node 404 can retrieve data. For example, a reference pointer to the data to be processed can be placed in the ingestion buffer 310 rather than putting the data to be processed itself into the ingestion buffer 310. The reference pointer can reference a chunk of data or a file that is larger than the throughput of the ingestion buffer 310 for that partition. In this way, the data intake and query system 108 can increase the throughput of individual partitions of the ingestion buffer 310. In some embodiments, the partition manager 408 can obtain the reference pointer from the ingestion buffer 310 and retrieve data from the referenced storage for processing. In certain embodiments, the partition manager 408 forwards the data record with the reference pointer to the indexing node 404 and the indexing node 404 retrieves the data from the referenced storage location. In some cases, the referenced storage to which reference pointers in the ingestion buffer 310 point can correspond to the common storage 216 or other shared storage or local storage. In some implementations, the chunks of data to which the reference pointers refer may be directed to common storage 216 from intake system 210, e.g., streaming data processor 308 or ingestion buffer 310.

In certain embodiments, as an indexing node 404 processes the data record(s), stores the data in buckets, and generates indexes of the data, the partition manager(s) 408 can monitor the indexing node 404 (and/or the indexer(s) 410). For example, a partition manager 408 can monitor the size of the data on an indexer 410 (inclusive or exclusive of the data store 412). In some cases, the size of the data on an indexer 410 can correspond to the data that is actually received from the particular partition of the intake system 210 (or retrieved using the data received from the particular partition), as well as data generated by the indexer 410 based on the received data (e.g., inverted indexes, summaries, etc.), and may correspond to one or more buckets. For instance, the indexer 410 may have generated one or more buckets for each tenant and/or index associated with data being processed in the indexer 410. In some cases, such as when multiple indexers 410 process the data records from the same index, the aggregated size of the data on each of those indexers 410 can correspond to the data that is actually received from the particular partition of the intake system 210, as well as data generated by the indexers 410 based on the received data.

Based on a bucket roll-over policy, the partition manager 408 can instruct the indexer(s) 410 to convert editable groups of data or buckets to non-editable groups or buckets and/or copy the data associated with the partition to common storage 216. In some embodiments, the bucket roll-over policy can indicate that the data, which may have been indexed by the indexer(s) 410 and stored in the data store 412 in various buckets, is to be copied to common storage 216 based on a determination that the size of the data satisfies a threshold size. In some cases, the bucket roll-over policy can include different threshold sizes for different data associated with different data identifiers identifying different tenants, data sources, sourcetypes, hosts, users, partitions, partition managers, or the like. In some implementations, the bucket roll-over policy may be modified by other factors, such as an identity of a tenant associated with one or more indexing nodes 404, system resource usage, which could be based on the pod(s) or other container(s) that contain the indexing node(s) 404, or one of the physical hardware layers with which the indexing node(s) 404 are running, or any other appropriate factor for scaling and system performance of indexing nodes 404 or any other system component.

In certain embodiments, the bucket roll-over policy can indicate data is to be copied to common storage 216 based on a determination that the amount of data (or a subset thereof) of the indexing node 404 satisfies a threshold amount. Further, the bucket roll-over policy can indicate that the one or more partition managers 408 or an indexing node 404 are to communicate with each other or with the ingest manager 406 or the ingest manager 406 to monitor the amount of data on the indexer 410 assigned to the indexing node 404 and determine that the amount of data on the indexer 410 (or data store 412) satisfies a threshold amount. Accordingly, based on the bucket roll-over policy, one or more of the partition managers 408 or the ingest manager 406 or the ingest manager 406 can instruct the indexer 410 to convert editable buckets to non-editable buckets and/or store the data.

In certain embodiments, the bucket roll-over policy can indicate that buckets are to be converted to non-editable buckets and stored in common storage 216 based on a collective size of buckets satisfying a threshold size. In some cases, the bucket roll-over policy can use different threshold sizes for conversion and storage. For example, the bucket roll-over policy can use a first threshold size to indicate when editable buckets are to be converted to non-editable buckets (e.g., stop writing to the buckets) and a second threshold size to indicate when the data (or buckets) are to be stored in common storage 216. In certain cases, the bucket roll-over policy can indicate that the partition manager(s) 408 are to send a single command to the indexing node(s) 404 or the indexer(s) 410 that causes the indexer(s) 410 to convert editable buckets to non-editable buckets and store the buckets in common storage 216.

The bucket roll-over policy can use other criteria to determine when buckets are to be converted and stored to common storage 216. For example, the bucket roll-over policy can indicate that buckets are to be rolled over at predetermined or dynamic time intervals with or without regard to size, etc.

Any one or any combination of the aforementioned bucket roll-over policies can be used for different data. In some cases, the indexers 410 can use different bucket roll-over policies for buckets associated with different data identifiers. For example, the bucket roll-over policy for buckets associated with Tenant A can use one threshold for determining when to roll buckets over to common storage and the bucket roll-over policy for buckets associated with Tenant B can use a different threshold. Accordingly, it will be understood that the indexers 410 and/or partition manager 408 can concurrently use/apply different bucket roll-over policies to different buckets.

Based on an acknowledgement that the data associated with a tenant, data source, sourcetype, host, user, partition, partition manager, or the like, has been stored in common storage 216, the partition manager 408 can communicate to the intake system 210, either directly or through the ingest manager 406 that the data has been stored and/or that the location marker or read pointer can be moved or updated. In some cases, the partition manager 408 receives the acknowledgement that the data has been stored from common storage 216 and/or from the indexing node 404, such as from the indexer 410. In certain embodiments, which will be described in more detail herein, the intake system 210 does not receive a communication that the data stored in intake system 210 has been read and processed until after that data has been stored in common storage 216.

The acknowledgement that the data has been stored in common storage 216 can also include location information about the data within the common storage 216. For example, the acknowledgement can provide a link, map, or path to the copied data in the common storage 216. Using the information about the data stored in common storage 216, the partition manager 408 can update the data store catalog 220. For example, the partition manager 408 can update the data store catalog 220 with an identifier of the data (e.g., bucket identifier, tenant identifier, partition identifier, etc.), the location of the data in common storage 216, a time range associated with the data, etc. In this way, the data store catalog 220 can be kept up-to-date with the contents of the common storage 216.

Moreover, as additional data is received from the intake system 210, the partition manager 408 can continue to communicate the data to the indexing nodes 404, monitor the size or amount of data on an indexer 410, instruct an indexer 410 to copy the data to common storage 216, communicate the successful storage of the data to the intake system 210, and update the data store catalog 220.

As a non-limiting example, consider the scenario in which the intake system 210 communicates a plurality of data records from a particular partition to the indexing system 212. The intake system 210 can track which data it has sent and a location marker for the data in the intake system 210 (e.g., a marker that identifies data that has been sent to the indexing system 212 for processing).

As described herein, the intake system 210 can retain or persistently make available the sent data until the intake system 210 receives an acknowledgement from the indexing system 212 that the sent data has been processed, stored in persistent storage (e.g., common storage 216), or is safe to be deleted. In this way, if an indexing node 404, ingest manager 406, or partition manager 408 assigned to process the sent data becomes unresponsive or is lost, e.g., due to a hardware failure or a crash, the data that was sent to the unresponsive component will not be lost. Rather, a different indexing node 404, ingest manager 406, or partition manager 408, can obtain and process the data from the intake system 210.

In some embodiments, as the data records from a partition of the ingest buffer 310 may be processed by different indexing nodes 404, the intake system 210 can retain or persistently make available a data record until the intake system 210 receives an acknowledgement from the indexing system 212 that the data record and other data records sent prior to the data record from the same partition have been processed. For example, if data records 1-5 are sent (in that order) to a partition manager 408 and distributed to five indexing nodes 404, the intake system 210 can retain data record 5 until it receives an acknowledgement that data records 1-4 have been processed and relevant data is stored in common storage 216. The intake system 210 can retain data record 5 even if the corresponding indexing node 404 completes its processing of data record 5 before the other indexing nodes 404 complete the processing of data records 1-4.

As the indexing system 212 stores the data in common storage 216, it can report the storage to the intake system 210. In response, the intake system 210 can update its marker to identify different data that has been sent to the indexing system 212 for processing, but has not yet been stored. By moving the marker, the intake system 210 can indicate that the previously-identified data has been stored in common storage 216, can be deleted from the intake system 210 or, otherwise, can be allowed to be overwritten, lost, etc. In certain embodiments, the indexing system 212 can report the storage of a particular data record once it determines that any records received prior to it from the same partition have also been stored.

With reference to the example above, in some embodiments, the ingest manager 406 can track the marker used by the ingestion buffer 310, and the partition manager 408 can receive data records from the ingestion buffer 310 and forward one or more data records to an indexing node 404, for example to an indexer 410, for processing (or use the data in the ingestion buffer to obtain data from a referenced storage location and forward the obtained data to the indexer). The partition manager 408 can monitor the amount of data being processed and instruct the indexing node 404 to copy the data to common storage 216. Once the data is stored in common storage 216, the partition manager 408 can report the storage to the ingestion buffer 310, so that the ingestion buffer 310 can update its marker. In addition, the ingest manager 406 can update its records with the location of the updated marker. In this way, if partition manager 408 become unresponsive or fails, the ingest manager 406 can assign a different partition manager 408 to obtain the data from the data stream without losing the location information, or if the indexer 410 becomes unavailable or fails, the ingest manager 406 can assign a different indexer 410 to process and store the data.

In some cases, the partition manager 408 dynamically distributes data records to different indexing nodes based on an indexing node assignment. In some embodiments, the partition manager 408 receives an indexing node assignment from the resource monitor 418, or other component of the data intake and query system 108 to determine which indexing node 404 to forward a data record. In certain embodiments, the partition manager 408 can determine the indexing node assignment itself, or include or consult an indexing node assignment listing that stores recent indexing node assignments. The table or list can be stored as a lookup table or in a database, etc.

In certain embodiments, the partition manager 408 can consult the indexing node assignment listing to determine whether a data identifier (non-limiting example: tenant identifier) relating to a particular data record to be distributed to an indexing node is already associated with a particular indexing node 404 or group of indexing nodes 404. If it is, the partition manager 408 can communicate the particular data record to the particular indexing node 404. If it is not, the partition manager 408 can determine the indexing node assignment or request one from the resource monitor 418, or other component of the data intake and query system 108 to determine which indexing node 404 to forward a data record.

In some cases, the indexing node assignment listing can include an indication of the data identifiers associated with data records that have been assigned to an indexing node 404 over a certain period of time, such as the last 15, 30, 60, or 90 seconds. In some cases, the indexing node assignment listing is cleared or deleted periodically, such as every 15, 30, 60, or 90 seconds be updated. In this way, the indexing node assignment listing can store the more recent indexing node assignments.

In some cases, a different indexing node assignment listing can be stored on or associated with each different partition manager 408. For example, a particular partition manager 408 can manage its own indexing node assignment listing by cataloging the indexing node assignments, which in some embodiments, can be received from the resource catalog 420. As another example, the ingest manager 406 can manage some or all of the indexing node assignment listings of the partition managers 408. In some cases, an indexing node assignment listing can be associated with some or all of the partition managers 408. For example, the ingest manager 406 or the partition managers 408 can manage the indexing node assignment listing by cataloging the indexing node assignments for all of the partition managers 408 associated with the ingest manager 406.

3.3.4. Indexing Nodes

The indexing nodes 404 can include one or more components to implement various functions of the indexing system 212. For example, in the illustrated embodiment of FIG. 4A, the indexing node 404 includes one or more ingest managers 406, partition managers 408, indexers 410, data stores 412, and/or bucket managers 414. As another example, in the illustrated embodiment of FIG. 4B, the indexing node 404 includes an indexer 410, a data store 412, and a bucket manager 414. As described herein, the indexing nodes 404 can be implemented on separate computing devices or as containers or virtual machines in a virtualization environment.

In some embodiments, an indexing node 404, can be implemented as a distinct computing device, virtual machine, container, pod, or a process or thread associated with a container, or using multiple-related containers. In certain embodiments, such as in a Kubernetes deployment, each indexing node 404 can be implemented as a separate container or pod. For example, one or more of the components of the indexing node 404 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized indexing node 404 can refer to the indexing node 404 as being a single container or as one or more components of the indexing node 404 being implemented as different, related containers or virtual machines.

In certain embodiments, each indexing node 404 can include a monitoring module. In some cases, the monitoring modulate can communicate one or more of an indexing node identifier, metrics, status identifiers, network architecture data, or indexing node assignments to the resource monitor 418. For example, as described herein, the monitoring module can indicate a utilization rate of an indexing node 404, an amount of processing resources in use by an indexing node 404, an amount of memory used by an indexing node 404, an availability or responsiveness of an indexing node 404, etc.

3.3.4.1. Indexer And Data Store

As described herein, the indexer 410 can be the primary indexing execution engine, and can be implemented as a distinct computing device, container, container within a pod, etc. For example, the indexer(s) 410 can be tasked with parsing, processing, indexing, and storing the data received from the intake system 210 via the partition manager(s) 408. Specifically, in some embodiments, the indexer 410 can parse the incoming data to identify timestamps, generate events from the incoming data, group and save events into buckets, generate summaries or indexes (e.g., time series index, inverted index, keyword index, etc.) of the events in the buckets, and store the buckets in common storage 216.

As used herein, an index can refer to different data structures. In some cases, index can refer to a logical division of data similar to a partition. In certain cases, index can refer to a data structure, such as a file, that stores information about other data (non-limiting examples: a time series index, inverted index, keyword index). In addition, when used as a verb, index can refer to the processing and/or storing of data by the indexing system 212 and/or intake system 210. For example, in some cases, the indexing system 212 can index data associated with a particular index (non-limiting example: main index) to generate events and one or more indexes that include information about the generated events (non-limiting example: time series index). As part of the indexing, the generated events and indexes can be stored as part of or in association with the particular index. In some cases, one indexer 410 can be assigned to each partition manager 408 such that the single indexer 410 processes some or all of the data from its assigned partition manager 408. In certain embodiments, one indexer 410 can receive and process the data from multiple partition managers 408 in the indexing system. For example, with reference to FIG. 4A, one indexer 410 can receive and process the data from partition managers 408 on the same indexing node 404, on multiple indexing nodes 404, on the same ingest manager 406, or multiple ingest managers 406. As another example, with reference to FIG. 4B, an indexer 410 can receive and process data from multiple partition managers 408 and/or ingest managers 406. In some cases, multiple indexing nodes 404 or indexers 410 can be assigned to a single partition manager 408. In certain embodiments, the multiple indexing nodes 404 or indexers 410 can receive and process the data received from the single partition manager 408, as well as data from other partition managers 408.

In some embodiments, the indexer 410 can store the events and buckets in the data store 412 according to a bucket creation policy. The bucket creation policy can indicate how many buckets the indexer 410 is to generate for the data that it processes. In some cases, based on the bucket creation policy, the indexer 410 generates at least one bucket for each unique combination of a tenant and index (which may also be referred to as a partition) associated with the data that it processes. For example, if the indexer 410 receives data associated with three tenants A, B, C, then the indexer 410 can generate at least three buckets: at least one bucket for each of Tenant A, Tenant B, and Tenant C. As another example, if the indexer 410 receives data associated with index A of Tenant A from one partition or shard, and receives data associated with index A of Tenant A and index B of Tenant B from a second partition or shard, then the indexer 410 can generate at least two buckets: at least one bucket for Tenant A (including data corresponding to index A from partition 1 and partition 2) and Tenant B (including data corresponding to index B from partition 2).

In some cases, based on the bucket creation policy, the indexer 410 generates at least one bucket for each combination of tenant and index associated with the data that it processes. For example, if the indexer 410 receives data associated with three tenants A, B, C, each with two indexes X, Y, then the indexer 410 can generate at least six buckets: at least one bucket for each of Tenant A::Index X, Tenant A::Index Y, Tenant B::Index X, Tenant B::Index Y, Tenant C::Index X, and Tenant C::Index Y. Additional buckets may be generated for a tenant/index pair based on the amount of data received that is associated with the tenant/partition pair. It will be understood that the indexer 410 can generate buckets using a variety of policies. For example, the indexer 410 can generate one or more buckets for each tenant, partition, source, sourcetype, etc.

In some cases, if the indexer 410 receives data that it determines to be "old," e.g., based on a timestamp of the data or other temporal determination regarding the data, then it can generate a bucket for the "old" data. In some embodiments, the indexer 410 can determine that data is "old," if the data is associated with a timestamp that is earlier in time by a threshold amount than timestamps of other data in the corresponding bucket (e.g., depending on the bucket creation policy, data from the same partition and/or tenant) being processed by the indexer 410. For example, if the indexer 410 is processing data for the bucket for Tenant A::Index X having timestamps on 4/23 between 16:23:56 and 16:46:32 and receives data for the Tenant A::Index X bucket having a timestamp on 4/22 or on 4/23 at 08:05:32, then it can determine that the data with the earlier timestamps is "old" data and generate a new bucket for that data. In this way, the indexer 410 can avoid placing data in the same bucket that creates a time range that is significantly larger than the time range of other buckets, which can decrease the performance of the system as the bucket could be identified as relevant for a search more often than it otherwise would.

The threshold amount of time used to determine if received data is "old," can be predetermined or dynamically determined based on a number of factors, such as, but not limited to, time ranges of other buckets, amount of data being processed, timestamps of the data being processed, etc. For example, the indexer 410 can determine an average time range of buckets that it processes for different tenants and indexes. If incoming data would cause the time range of a bucket to be significantly larger (e.g., 25%, 50%, 75%, double, or other amount) than the average time range, then the indexer 410 can determine that the data is "old" data, and generate a separate bucket for it. By placing the "old" bucket in a separate bucket, the indexer 410 can reduce the instances in which the bucket is identified as storing data that may be relevant to a query. For example, by having a smaller time range, the query system 214 may identify the bucket less frequently as a relevant bucket then if the bucket had the large time range due to the "old" data. Additionally, in a process that will be described in more detail herein, time-restricted searches and search queries may be executed more quickly because there may be fewer buckets to search for a particular time range. In this manner, computational efficiency of searching large amounts of data can be improved. Although described with respect detecting "old" data, the indexer 410 can use similar techniques to determine that "new" data should be placed in a new bucket or that a time gap between data in a bucket and "new" data is larger than a threshold amount such that the "new" data should be stored in a separate bucket.

In some cases, based on a bucket roll-over policy, the indexer 410 periodically determines to convert editable groups of data or buckets to non-editable groups or buckets and/or copy the data associated with the partition or tenant identifier to common storage 216. For example, the bucket roll-over policy may indicate a time-based schedule so that the indexer 410 determines to copy and/or store the data every X number of seconds, or every X minute(s), and so forth.

In some embodiments, the bucket roll-over policy can indicate that the data, which may have been indexed by the indexer(s) 410 and stored in the data store 412 in various buckets, is to be copied to common storage 216 based on a determination that the size of the data satisfies a threshold size. In some cases, the bucket roll-over policy can include different threshold sizes for different data associated with different data identifiers identifying different tenants, data sources, sourcetypes, hosts, users, partitions, partition managers, or the like. The threshold amount can correspond to the amount of data being processed by the indexer 410 for any partition or any tenant identifier.

In some cases, the bucket roll-over policy may indicate that one or more buckets are to be rolled over based on a combination of a time-based schedule and size. For example, the bucket roll-over policy may indicate a time-based schedule in combination with a data threshold. For example, the indexer 410 can determine to copy the data to common storage 216 based on a determination that the amount of data stored on the indexer 410 satisfies a threshold amount or a determination that the data has not been copied in X number of seconds, X number of minutes, etc. Accordingly, in some embodiments, the indexer 410 can determine that the data is to be copied to common storage 216 without communication with the partition manager 408 or the ingest manager 416. In some implementations, the bucket roll-over policy may be modified by other factors, such as an identity of a tenant associated with one or more indexing nodes 404, system resource usage, which could be based on the pod(s) or other container(s) that contain the indexing node(s) 404, or one of the physical hardware layers with which the indexing node(s) 404 are running, or any other appropriate factor for scaling and system performance of indexing nodes 404 or any other system component.

In certain embodiments, the partition manager 408 can instruct the indexer 410 to copy the data to common storage 216 based on a bucket roll-over policy. For example, the partition manager 408 can monitor the size of the buckets and instruct the indexer 410 to copy the bucket to common storage 216. The threshold size can be predetermined or dynamically determined.

In certain embodiments, the partition manager 408 can monitor the size of multiple, or all, buckets associated with the indexes, indexing node(s) 404, or indexer(s) 410 being managed by the partition manager 408, and based on the collective size of the buckets satisfying a threshold size, instruct the indexer 410 to copy the buckets associated with the index to common storage 216. In certain cases, one or more partition managers 408, or ingest managers 406 can monitor the size of buckets across multiple, or all indexes, associated with one or more indexing nodes 404, and instruct the indexer(s) 410 to copy the buckets to common storage 216 based on the size of the buckets satisfying a threshold size.

As described herein, buckets in the data store 412 that are being edited by an indexer 410 can be referred to as hot buckets or editable buckets. For example, an indexer 410 can add data, events, and indexes to editable buckets in the data store 412, etc. Buckets in the data store 412 that are no longer edited by an indexer 410 can be referred to as warm buckets or non-editable buckets. In some embodiments, once an indexer 410 determines that a hot bucket is to be copied to common storage 216, it can convert the hot (editable) bucket to a warm (non-editable) bucket, and then move or copy the warm bucket to the common storage 216 based on a bucket roll-over policy. Once the warm bucket is moved or copied to common storage 216, an indexer 410 can notify a partition manager 408 that the data associated with the warm bucket has been processed and stored. As mentioned, a partition manager 408 can relay the information to the intake system 210. In addition, an indexer 410 can provide a partition manager 408 with information about the buckets stored in common storage 216, such as, but not limited to, location information, tenant identifier, index identifier, time range, etc. As described herein, a partition manager 408 can use this information to update the data store catalog 220. In certain embodiments, the indexer 410 can update the data store catalog 220. For example, the indexer 410 can update the data store catalog 220 based on the information it receives from the common storage 216 about the stored buckets.

3.3.4.2. Bucket Manager

The bucket manager 414 can manage the buckets stored in the data store 412, and can be implemented as a distinct computing device, virtual machine, container, container of a pod, or a process or thread associated with a container. In some cases, the bucket manager 414 can be implemented as part of the indexer 410, indexing node 404, the ingest manager 406, or as a separate component of the indexing system 212.

As described herein, the indexer 410 stores data in the data store 412 as one or more buckets associated with different tenants, indexes, etc. In some cases, the contents of the buckets are not searchable by the query system 214 until they are stored in common storage 216. For example, the query system 214 may be unable to identify data responsive to a query that is located in hot (editable) buckets in the data store 412 and/or the warm (non-editable) buckets in the data store 412 that have not been copied to common storage 216. Thus, query results may be incomplete or inaccurate, or slowed as the data in the buckets of the data store 412 are copied to common storage 216.

To decrease the delay between processing and/or indexing the data and making that data searchable, the indexing system 212 can use a bucket roll-over policy to determine when to convert hot buckets to warm buckets more frequently (or convert based on a smaller threshold size) and/or copy the warm buckets to common storage 216. While converting hot buckets to warm buckets more frequently or based on a smaller storage size can decrease the lag between processing the data and making it searchable, it can increase the storage size and overhead of buckets in common storage 216. For example, each bucket may have overhead associated with it, in terms of storage space required, processor power required, or other resource requirement. Thus, more buckets in common storage 216 can result in more storage used for overhead than for storing data, which can lead to increased storage size and costs. In addition, a larger number of buckets in common storage 216 can increase query times, as the opening of each bucket as part of a query can have certain processing overhead or time delay associated with it.

To decrease search times and reduce overhead and storage associated with the buckets (while maintaining a reduced delay between processing the data and making it searchable), the bucket manager 414 can monitor the buckets stored in the data store 412 and/or common storage 216 and merge buckets according to a bucket merge policy. For example, the bucket manager 414 can monitor and merge warm buckets stored in the data store 412 before, after, or concurrently with the indexer copying warm buckets to common storage 216.

The bucket merge policy can indicate which buckets are candidates for a merge or which bucket to merge (e.g., based on time ranges, size, tenant, index, or other identifiers), the number of buckets to merge, size or time range parameters for the merged buckets, and/or a frequency for creating the merged buckets. For example, the bucket merge policy can indicate that a certain number of buckets are to be merged, regardless of size of the buckets. As another non-limiting example, the bucket merge policy can indicate that multiple buckets are to be merged until a threshold bucket size is reached (e.g., 750 MB, or 1 GB, or more). As yet another non-limiting example, the bucket merge policy can indicate that buckets having a time range within a set period of time (e.g., 30 sec, 1 min., etc.) are to be merged, regardless of the number or size of the buckets being merged.

In addition, the bucket merge policy can indicate which buckets are to be merged or include additional criteria for merging buckets. For example, the bucket merge policy can indicate that only buckets having the same tenant identifier and/or index are to be merged, or set constraints on the size of the time range for a merged bucket (e.g., the time range of the merged bucket is not to exceed an average time range of buckets associated with the same source, tenant, partition, etc.). In certain embodiments, the bucket merge policy can indicate that buckets that are older than a threshold amount (e.g., one hour, one day, etc.) are candidates for a merge or that a bucket merge is to take place once an hour, once a day, etc. In certain embodiments, the bucket merge policy can indicate that buckets are to be merged based on a determination that the number or size of warm buckets in the data store 412 of the indexing node 404 satisfies a threshold number or size, or the number or size of warm buckets associated with the same tenant identifier and/or partition satisfies the threshold number or size. It will be understood, that the bucket manager 414 can use any one or any combination of the aforementioned or other criteria for the bucket merge policy to determine when, how, and which buckets to merge.

Once a group of buckets is merged into one or more merged buckets, the bucket manager 414 can copy or instruct the indexer 410 to copy the merged buckets to common storage 216. Based on a determination that the merged buckets are successfully copied to the common storage 216, the bucket manager 414 can delete the merged buckets and the buckets used to generate the merged buckets (also referred to herein as unmerged buckets or pre-merged buckets) from the data store 412 according to a bucket management policy.

In some cases, the bucket manager 414 can also remove or instruct the common storage 216 to remove corresponding pre-merged buckets from the common storage 216 according to the bucket management policy. The bucket management policy can indicate when the pre-merged buckets are to be deleted or designated as able to be overwritten from common storage 216 and/or in the data store 412.

In some cases, the bucket management policy can indicate that the pre-merged buckets are to be deleted immediately, once any queries relying on the pre-merged buckets are completed, after a predetermined amount of time, etc. Further, the bucket management policy can indicate different criteria for deleting data from common storage 216 and/or the data store 412.

In some cases, the pre-merged buckets may be in use or identified for use by one or more queries. Removing the pre-merged buckets from common storage 216 in the middle of a query may cause one or more failures in the query system 214 or result in query responses that are incomplete or erroneous. Accordingly, the bucket management policy, in some cases, can indicate to the common storage 216 that queries that arrive before a merged bucket is stored in common storage 216 are to use the corresponding pre-merged buckets and queries that arrive after the merged bucket is stored in common storage 216 are to use the merged bucket.

Further, the bucket management policy can indicate that once queries using the pre-merged buckets are completed, the buckets are to be removed from common storage 216. However, it will be understood that the bucket management policy can indicate removal of the buckets in a variety of ways. For example, per the bucket management policy, the common storage 216 can remove the buckets after on one or more hours, one day, one week, etc., with or without regard to queries that may be relying on the pre-merged buckets. In some embodiments, the bucket management policy can indicate that the pre-merged buckets are to be removed without regard to queries relying on the pre-merged buckets and that any queries relying on the pre-merged buckets are to be redirected to the merged bucket. It will be understood that the bucket manager 414 can use different bucket management policies for data associated with different data identifiers. For example, the bucket manager 414 can use one bucket management policy for data associated with a first tenant and use another bucket management policy for data associated with a second tenant. In this way, the bucket manager can concurrently use different bucket management policies for different data.

In addition to removing the pre-merged buckets and merged bucket from the data store 412 and removing or instructing common storage 216 to remove the pre-merged buckets from the data store(s) 218, the bucket manager 414 can update the data store catalog 220 or cause the indexer 410 or partition manager 408 to update the data store catalog 220 with the relevant changes. These changes can include removing reference to the pre-merged buckets in the data store catalog 220 and/or adding information about the merged bucket, including, but not limited to, a bucket, tenant, and/or partition identifier associated with the merged bucket, a time range of the merged bucket, location information of the merged bucket in common storage 216, etc. In this way, the data store catalog 220 can be kept up-to-date with the contents of the common storage 216.

3.3.5. Resource Catalog

The resource catalog 420 can store information relating to the indexing nodes 404 of the indexing system 212, such as, but not limited to, indexing node identifiers, metrics, status identifiers, network architecture data, or indexing node assignments. The resource catalog 420 can be maintained (for example, populated, updated, etc.) by the resource monitor 418. As mentioned, in some embodiments, the resource monitor 418 and resource catalog 420 can be separate or independent of the indexing system 212.

In some cases, the resource catalog 420 includes one or more indexing node identifiers. As mentioned, the indexing system 212 can include a plurality of indexing nodes 404. In some cases, the resource catalog 420 can include a different indexing node identifier for each indexing node 404 of the indexing system 212. In some cases, for example if the resource monitor 418 or the indexing system manager 402 generates a new indexing node 404, the resource monitor 418 can update the resource catalog 420 to include an indexing node identifier associated with the new indexing node 404. In some cases, for example, if an indexing node 404 is removed from the indexing system 212 or the indexing node 404 becomes unresponsive or unavailable, the resource monitor 418 can update the resource catalog 420 to remove an indexing node identifier associated with that indexing node 404. In this way, the resource catalog 420 can include up-to-date information relating to which indexing nodes 404 are instantiated in the indexing system 212.

In some cases, the resource catalog 420 includes one or more metrics associated with one or more of the indexing nodes 404 in the indexing system 212. For example, the metrics can include, but are not limited to, one or more performance metrics such as CPU-related performance metrics, memory-related performance metrics, availability performance metrics, or the like. For example, the resource catalog 420 can include information relating to a utilization rate of an indexing node 404, such as an indication of which indexing nodes 404, if any, are working at maximum capacity or at a utilization rate that satisfies utilization threshold, such that the indexing node 404 should not be used to process additional data for a time. As another example, the resource catalog 420 can include information relating to an availability or responsiveness of an indexing node 404, an amount of processing resources in use by an indexing node 404, or an amount of memory used by an indexing node 404.

In some cases, the information relating to the indexing nodes 404 includes one or more status identifiers associated with one or more of the indexing nodes 404 in the indexing system 212. For example, in some cases, a status identifier associated with one or more of the indexing nodes 404 can include information relating to an availability of an indexing node. For example, the information relating to the indexing nodes 404 can include an indication of whether an indexing node 404 is available or unavailable. In some instances, as described herein, this indication of availability can be based on a status update (or absence of a status update) from the indexing node 404. In some instances, an indexing node 404 is considered available if it is instantiated in the indexing system 212, provides periodic status updates to the resource monitor 418, and/or is responsive communications from the resource monitor 418. In some cases, an indexing node 404 is considered available if one or more metrics associated with the indexing node 404 satisfies a metrics threshold. For example, an indexing node 404 can considered available if a utilization rate of the indexing node 404 satisfies a utilization rate threshold. As another example, an indexing node 404 can considered available if an amount of memory used by or available to the indexing node 404 satisfies a memory threshold (non-limiting example: available memory >10% of total memory, etc.). As another example, an indexing node 404 can be considered available if an amount of available processing resources of the indexing node 404 satisfies a processing resources threshold (non-limiting example: CPU usage <90% of capacity, etc.). Similarly, in some cases, an indexing node 404 can be considered unavailable if one or more, or some or all, metrics associated with the indexing node 404 do not satisfy a metrics threshold.

In some cases, the information relating to the indexing nodes 404 includes information relating to a network architecture associated with one or more of the indexing nodes 404 in the indexing system 212. For example, information relating to a network architecture can include an indication of when, where, or on what host machine, an indexing node is instantiated. As another example, information relating to a network architecture can include an indication of a location of an indexing node 404, for example with reference to other indexing nodes 404. As another example, information relating to a network architecture can include an indication of computing resources shared with other indexing nodes 404, such as data stores, processors, I/O, etc.

In some cases, the information relating to the indexing nodes 404 includes information relating to one or more indexing node assignments. As described herein, an indexing node assignment can include an indication of a mapping between a particular indexing node 404 and an identifier (for example, a tenant identifier, a partition manager identifier, etc.) or between a particular node and a data record received from the intake system 210. In this way, an indexing node assignment can be utilized to determine to which indexing node 404 a partition manager 408 should send data to process. For example, an indexing node assignment can indicate that a particular partition manager 408 should send its data to one or more particular indexing nodes 404. As another example, an indexing node assignment can indicate that some or all data associated with a particular identifier (for example, data associated with a particular tenant identifier) should be forwarded to one or more a particular indexing node 404 for processing. In some cases, a processing device associated with the resource catalog 420 can determine an indexing node assignment and can store the indexing node assignment in the resource catalog 420. In some cases, an indexing node assignment, is not stored in the resource catalog 420. For example, each time the resource monitor 418 receives a request for an indexing node assignment from a partition manager 408, the resource monitor 418 can use information stored in the resource catalog 420 to determine the indexing node assignment, but the indexing node assignment may not be stored in the resource catalog 420. In this way, the indexing node assignments can be altered, for example if necessary based on information relating to the indexing nodes 404.

3.3.6 Resource Monitor

The resource monitor 418 can monitor indexing nodes 404, populate and maintain the resource catalog 420 with relevant information, receive requests for indexing node 404 availability or assignments, identify indexing nodes 404 that are available to process data, and/or communicate information relating to available indexing nodes (or indexing node assignments). The resource monitor 418 can be implemented as a distinct computing device, virtual machine, container, container of a pod, or a process or thread associated with a container.

The resource monitor 418 maintains the resource catalog 420. For example, the resource monitor 418 can communicate with or monitor the indexing nodes 404 to determine or identify information relating to the indexing nodes 404, such as indexing node identifiers, metrics, status identifiers, network architecture data, or indexing node assignments, that it can used to build or update the resource catalog 420. The resource monitor 418 can populate the resource catalog 420 and/or update it over time. For example, as information relating to the indexing nodes 404 changes for the different indexing nodes 404, the resource monitor 418 can update the resource catalog 420. In this way, the resource catalog 420 can retain an up-to-date database of indexing node information.

In some cases, the resource monitor 418 can maintain the resource catalog 420 by pinging the indexing nodes 404 for information or passively receiving it based on the indexing nodes 404 independently reporting the information. For instance, the resource monitor 418 can ping or receive information from the indexing nodes 404 at predetermined intervals of time, such as every 1, 2, 5, 10, 30, or 60 seconds. In addition or alternatively, the indexing nodes 404 can be configured to automatically send their data to the resource monitor 418 and/or the resource monitor 418 can ping a particular indexing node 404 after the passage of a predetermined period of time (for example, 1, 2, 5, 10, 30, or 60 seconds) since the resource monitor 418 requested and/or received data from that particular indexing node 404. In some cases, the resource monitor 418 can determine that an indexing node 404 is unavailable or failing based on the communications or absence of communications from the indexing node 404, and can update the resource catalog 420 accordingly.

The resource monitor 418 can identify available indexing nodes 404 and provide indexing node assignments for processing data records. In some embodiments, the resource monitor 418 can respond to requests from partition managers 408 for an indexing node to process one or more data records. As described herein, a partition manager 408 can receive data records from the ingestion buffer 310. For each data record (or for a group of data records), the partition manager 408 can request the resource monitor 418 for an indexing node 404 to process a particular data record or group of data records, such as data records from the same tenant. In some cases, the resource monitor can respond with an indexing node identifier that identifies an available indexing node for the partition manager 408 to send the data. In certain cases, the request can include a data identifier associated with the data to be processed, such as a tenant identifier. The resource monitor 418 can use the data identifier to determine which indexing node 404 is to process the data.

The resource monitor 418 can identify available indexing nodes using one or more of various techniques. For example, in some cases, the resource monitor 418 identifies an available indexing node 404 based on data in the resource catalog 420 such as, but not limited to, indexing node identifiers, metrics, status identifiers, network architecture data, or indexing node assignments. In some cases, the resource monitor 418 can determine that an indexing node 404 is available if data relating to that indexing node satisfies a certain threshold. For example, the resource monitor 418 can determine that an indexing node 404 is available if it is instantiated in the indexing system 212, has recently reported data to the resource monitor 418, and/or is responsive to communications from the resource monitor 418.

In some cases, the resource monitor 418 can determine that an indexing node 404 is available if one or more metrics associated with the indexing node 404 satisfies a metrics threshold. For example, the resource monitor 418 can determine that an indexing node 404 is available if a utilization rate of the indexing node 404 satisfies a utilization rate threshold and/or if an amount of available memory available to the indexing node 404 satisfies a memory threshold. As another example, the resource monitor 418 can determine that an indexing node 404 is available if an amount of available processing resources of the indexing node 404 satisfies a processing resources threshold. Similarly, in some cases, an indexing node 404 can be considered unavailable if one or more, or some or all, metrics associated with the indexing node 404 do not satisfy a metrics threshold.

In addition to identifying available indexing nodes 404, the resource monitor 418 can identify to which indexing node a particular data record or group of records is to be sent. The resource monitor 418 can map or assign a data record to an indexing node to using one or more techniques. In some embodiments, the resource monitor 418 can use an indexing node mapping policy to determine how to map, link, or associate an indexing node to a data record.

In some embodiments, the indexing node mapping policy can indicate that data records are to be assigned to indexing nodes randomly, based on an order (e.g., sequentially assign indexing nodes 404 as requests are received), based on previous assignments, based on a data identifier associated with the data records, etc.

As described herein, each data record transmitted by the ingestion buffer 310 can be associated with a data identifier that, for example, relates to a particular data source 202, tenant, index, or sourcetype. In some cases, the resource monitor 418 can use the data identifier associated with the data record to assign the data record to a particular indexing node 404. In the event, a partition manager 408 receives other data records associated with the same data identifier, it can communicate the other data records to the same indexing node 404 for processing.

In some embodiments, the resource catalog 420 can store an indexing node assignment listing that associates indexing nodes 404 with data identifiers. In some such embodiments, the indexing node mapping policy can indicate that the resource monitor 418 is to use the listing to determine whether a particular data identifier is associated with an indexing node 404. As a non-limiting example, if the resource monitor 418 receives a request from a partition manager 408 to map a data record associated with a data identifier to an indexing node, the resource monitor 418 can use the indexing node assignment listing to identify the indexing node that is to process the data record. In some such embodiments, the indexing node assignment listing can include multiple indexing nodes 404 associated with the data identifier and the resource monitor 418 can assign one of the indexing nodes 404 based on its determined availability (non-limiting example: metrics relating to that indexing node 404 satisfy one or more metrics thresholds). Accordingly, based on the data identifier and the determined availability of the indexing nodes, the resource monitor 418 can assign an indexing node 404 to process the data record.

As described herein, in some cases, partition managers 408 can also store an indexing node assignment listing. In certain embodiments, the indexing node assignment listing stored by the partition managers 408 can be the same as the indexing node assignment listing stored by the resource catalog 420. For example, the resource monitor 418 can generate the indexing node assignment listing for the resource catalog 420 and distribute the indexing node assignment listing to the instantiated partition managers 408. In some embodiments, the indexing node assignment listing stored by the partition managers 408 can be different from the indexing node assignment listing stored by the resource catalog 420. For example, the indexing node assignment listing stored by the resource catalog 420 can correspond to indexing node assignments across some or all partition managers 408, whereas the indexing node assignment listing for a particular partition manager 408 may only include the indexing node assignments for data that it (or a group of related partition managers 408) has processed.

As another example, in some embodiments, the indexing node mapping policy can indicate that the resource monitor 418 is to use a hash function or other function to map a data identifier (or data record) to a particular indexing node 404. In certain embodiments, the resource monitor 418 can hash the data identifier, and use the output of the hash to identify an available indexing node 404. For example, if there are three indexing nodes, the resource monitor 418 can assign the data record to one of the indexing nodes 404 based on a hash of a tenant identifier of the data. In this way, other data associated with the same tenant can be assigned to the same indexing nodes 404.

In certain embodiments, the indexing node mapping policy can indicate that the resource monitor 418 is to use a consistent hash to map the data identifier to an indexing node 404. As part of using a consistent hash, the resource monitor 418 can perform a hash on identifiers of the indexing nodes and map the hash values to a ring. The resource monitor 418 can then perform a hash on the data identifier (non-limiting example: tenant identifier). Based on the location of the resulting hash value on the ring, the resource monitor 418 can assign the data record to an indexing node. In certain cases, the resource monitor 418 can assign the data record based on the location of the hashed data identifier to the location of the hashed indexing node identifiers on the ring. For example, the resource monitor 418 can map the data identifier to the indexing node 404 whose hashed node identifier is closest to or next in line (in a particular direction) on the hash ring to the hashed data identifier. In some cases, the resource monitor 418 maps the data identifier to multiple indexing nodes 404, for example, by selecting two or more indexing nodes that have a position on the hash ring that is closest, or next in line, to the hash value of the data identifier when fitted on the hash ring. In some cases, the consistent hash function can be configured such that even with a different number of indexing nodes 404 being instantiated in the indexing system 212, the output of the hashing will consistently identify the same indexing node 404, or have an increased probability of identifying the same indexing node 404.

In some instances, the indexing node mapping policy can indicate that the resource monitor 418 is to map a data identifier to an indexing node 404 randomly, or in a simple sequence (e.g., a first indexing nodes 404 is mapped to a first data identifier, a second indexing node 404 is mapped to a second data identifier, etc.). In other instances, as discussed, the indexing node mapping policy can indicate that the resource monitor 418 is to map data identifiers to indexing nodes 404 based on previous mappings.

In certain embodiments, according to the indexing node mapping policy, indexing nodes 404 may be mapped to data identifiers based on overlaps of computing resources of the indexing nodes 404. For example, if a partition manager 408 is instantiated on the same host system as an indexing node 404, the resource monitor 418 can assign the data from the partition manager to the indexing node 404.

Accordingly, it will be understood that the resource monitor 418 can map any indexing node 404 to any data identifier, and that the indexing node mapping policy can indicate that the resource monitor 418 is to use any one or any combination of the above-described mechanisms to map data identifiers (or data records) to indexing nodes 404.

Based on the determined mapping of a data identifier to an indexing node 404, the resource monitor 418 can respond to a partition manager 408. The response can include an identifier for the assigned indexing node that is to process the data record or the data records associated with a particular data identifier. In certain embodiments, the response can include instructions that the identified indexing node 404 is to be used for a particular length of time, such as one minute, five minutes, etc.

3.4. Query System

Figure 5:
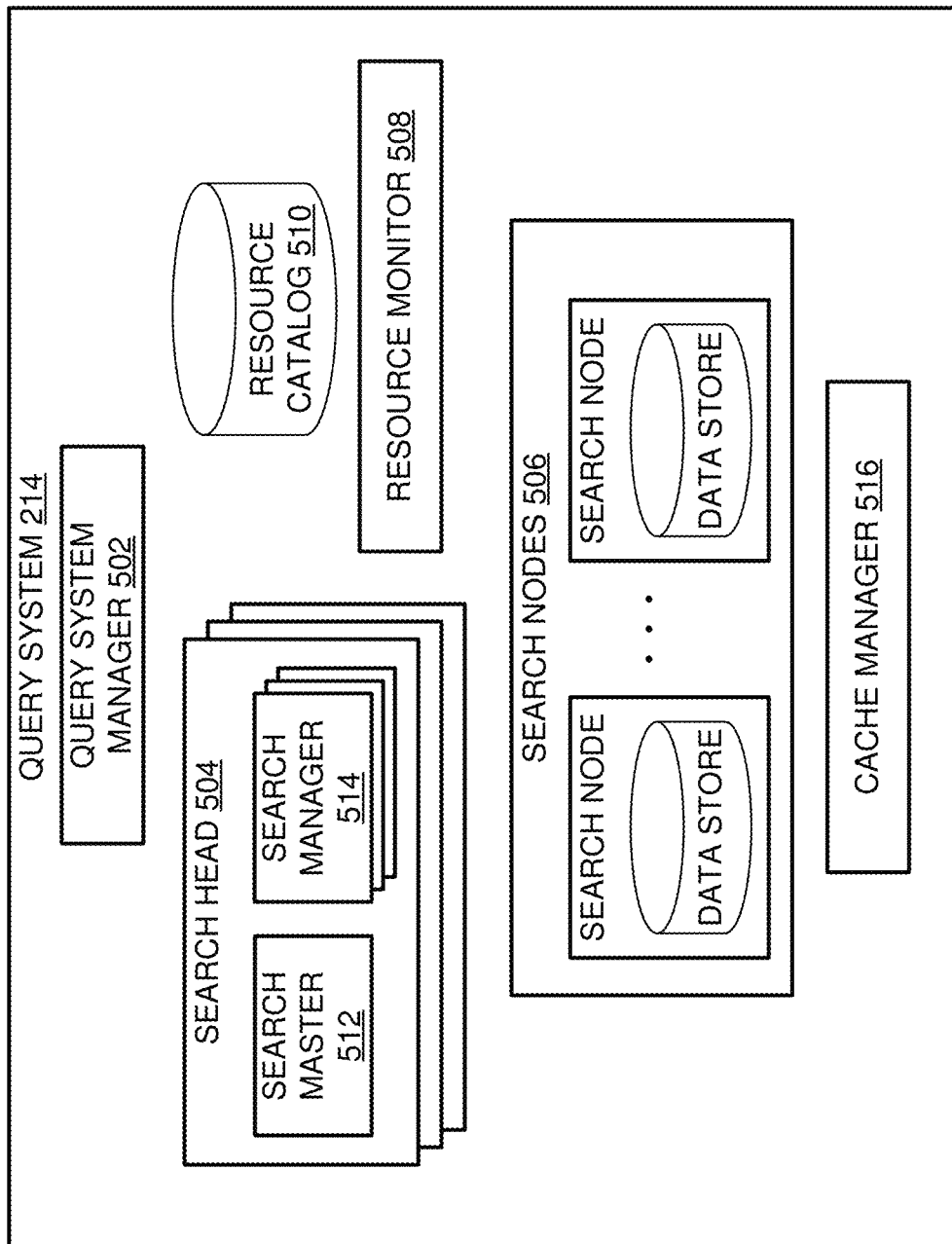
FIG. 5 is a block diagram illustrating an embodiment of a query system of the data intake and query system.

FIG. 5 is a block diagram illustrating an embodiment of a query system 214 of the data intake and query system 108. The query system 214 can receive, process, and execute queries from multiple client devices 204, which may be associated with different tenants, users, etc. Similarly, the query system 214 can execute the queries on data from the intake system 210, indexing system 212, common storage 216, acceleration data store 222, or other system. Moreover, the query system 214 can include various components that enable it to provide a stateless or state-free search service, or search service that is able to rapidly recover without data loss if one or more components of the query system 214 become unresponsive or unavailable.

In the illustrated embodiment, the query system 214 includes one or more query system managers 502 (collectively or individually referred to as query system manager 502), one or more search heads 504 (collectively or individually referred to as search head 504 or search heads 504), one or more search nodes 506 (collectively or individually referred to as search node 506 or search nodes 506), a resource monitor 508, and a resource catalog 510. However, it will be understood that the query system 214 can include fewer or more components as desired. For example, in some embodiments, the common storage 216, data store catalog 220, or query acceleration data store 222 can form part of the query system 214, etc.

As described herein, each of the components of the query system 214 can be implemented using one or more computing devices as distinct computing devices or as one or more container instances or virtual machines across one or more computing devices. For example, in some embodiments, the query system manager 502, search heads 504, and search nodes 506 can be implemented as distinct computing devices with separate hardware, memory, and processors. In certain embodiments, the query system manager 502, search heads 504, and search nodes 506 can be implemented on the same or across different computing devices as distinct container instances, with each container having access to a subset of the resources of a host computing device (e.g., a subset of the memory or processing time of the processors of the host computing device), but sharing a similar operating system. In some cases, the components can be implemented as distinct virtual machines across one or more computing devices, where each virtual machine can have its own unshared operating system but shares the underlying hardware with other virtual machines on the same host computing device.

3.4.1. Query System Manager

As mentioned, the query system manager 502 can monitor and manage the search heads 504 and search nodes 506, and can be implemented as a distinct computing device, virtual machine, container, container of a pod, or a process or thread associated with a container. For example, the query system manager 502 can determine which search head 504 is to handle an incoming query or determine whether to generate an additional search node 506 based on the number of queries received by the query system 214 or based on another search node 506 becoming unavailable or unresponsive. Similarly, the query system manager 502 can determine that additional search heads 504 should be generated to handle an influx of queries or that some search heads 504 can be de-allocated or terminated based on a reduction in the number of queries received.

In certain embodiments, the query system 214 can include one query system manager 502 to manage all search heads 504 and search nodes 506 of the query system 214. In some embodiments, the query system 214 can include multiple query system managers 502. For example, a query system manager 502 can be instantiated for each computing device (or group of computing devices) configured as a host computing device for multiple search heads 504 and/or search nodes 506.

Moreover, the query system manager 502 can handle resource management, creation, assignment, or destruction of search heads 504 and/or search nodes 506, high availability, load balancing, application upgrades/rollbacks, logging and monitoring, storage, networking, service discovery, and performance and scalability, and otherwise handle containerization management of the containers of the query system 214. In certain embodiments, the query system manager 502 can be implemented using Kubernetes or Swarm. For example, in certain embodiments, the query system manager 502 may be part of a sidecar or sidecar container that allows communication between various search nodes 506, various search heads 504, and/or combinations thereof.

In some cases, the query system manager 502 can monitor the available resources of a host computing device and/or request additional resources in a shared resource environment, based on workload of the search heads 504 and/or search nodes 506 or create, destroy, or reassign search heads 504 and/or search nodes 506 based on workload. Further, the query system manager 502 system can assign search heads 504 to handle incoming queries and/or assign search nodes 506 to handle query processing based on workload, system resources, etc. In some embodiments, the query system manager 502 system can assign search heads 504 to handle incoming queries based on a search head mapping policy, as described herein.

3.4.2. Search Head

As described herein, the search heads 504 can manage the execution of queries received by the query system 214. For example, the search heads 504 can parse the queries to identify the set of data to be processed and the manner of processing the set of data, identify the location of the data (non-limiting examples: intake system 210, common storage 216, acceleration data store 222, etc.), identify tasks to be performed by the search head and tasks to be performed by the search nodes 506, distribute the query (or sub-queries corresponding to the query) to the search nodes 506, apply extraction rules to the set of data to be processed, aggregate search results from the search nodes 506, store the search results in the query acceleration data store 222, return search results to the client device 204, etc.

As described herein, the search heads 504 can be implemented on separate computing devices or as containers or virtual machines in a virtualization environment. In some embodiments, the search heads 504 may be implemented using multiple-related containers. In certain embodiments, such as in a Kubernetes deployment, each search head 504 can be implemented as a separate container or pod. For example, one or more of the components of the search head 504 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized search head 504 can refer to the search head 504 as being a single container or as one or more components of the search head 504 being implemented as different, related containers.

In the illustrated embodiment, the search heads 504 includes a search master 512 and one or more search managers 514 to carry out its various functions. However, it will be understood that the search heads 504 can include fewer or more components as desired. For example, the search head 504 can include multiple search masters 512.

In some embodiments, the search heads 504 can provide information to the resource monitor 508 in order to update the information stored in the resource catalog 510, which may include information such as an identifier for each search head 504, as well as availability information. For example, the information in the resource catalog 510 may identify and indicate search heads 504 that are instantiated and available (e.g., have sufficient bandwidth to process/execute a query), instantiated but are unavailable or unresponsive, and so forth. The updated information may indicate the amount of processing resources currently in use by each search head 504, the current utilization rate of each search head 504, the amount of memory currently used by each search head 504, the number of queries being processed/executed by a search head 504, etc. It should be noted that the information can be provided ad hoc or on a periodic basis. In some such embodiments, the information considered "current" (e.g., the amount of processing resources currently in use) may refer to the most-recent updated information (e.g., the information last provided), the accuracy of which may depend on the how recently the information as reported. The search heads 504 may provide information upon request (e.g., in response to a ping) or may provide information based on a set schedule (e.g., send information to the resource monitor 508 on a periodic basis).

3.4.2.1. Search Master

The search master 512 can manage the execution of the various queries assigned to the search head 504, and can be implemented as a distinct computing device, virtual machine, container, container of a pod, or a process or thread associated with a container. For example, in certain embodiments, as the search head 504 is assigned a query, the search master 512 can generate one or more search manager(s) 514 to manage the query. In some cases, the search master 512 generates a separate search manager 514 for each query that is received by the search head 504. In addition, once a query is completed, the search master 512 can handle the termination of the corresponding search manager 514.

In certain embodiments, the search master 512 can track and store the queries assigned to the different search managers 514. Accordingly, if a search manager 514 becomes unavailable or unresponsive, the search master 512 can generate a new search manager 514 and assign the query to the new search manager 514. In this way, the search head 504 can increase the resiliency of the query system 214, reduce delay caused by an unresponsive component, and can aid in providing a stateless searching service.

In some embodiments, the search master 512 is implemented as a background process, or daemon, on the search head 504 and the search manager(s) 514 are implemented as threads, copies, or forks of the background process. In some cases, a search master 512 can copy itself, or fork, to create a search manager 514 or cause a template process to copy itself, or fork, to create each new search manager 514, etc., in order to support efficient multithreaded implementations

3.4.2.2. Search Manager

As mentioned, the search managers 514 can manage the processing and execution of the queries assigned to the search head 504, and can be implemented as a distinct computing device, virtual machine, container, container of a pod, or a process or thread associated with a container. In some embodiments, one search manager 514 manages the processing and execution of one query at a time. In such embodiments, if the search head 504 is processing one hundred queries, the search master 512 can generate one hundred search managers 514 to manage the one hundred queries. Upon completing an assigned query, the search manager 514 can await assignment to a new query or be terminated.

As part of managing the processing and execution of a query, and as described herein, a search manager 514 can parse the query to identify the set of data and the manner in which the set of data is to be processed (e.g., the transformations that are to be applied to the set of data), determine tasks to be performed by the search manager 514 and tasks to be performed by the search nodes 506, identify search nodes 506 that are available to execute the query, map search nodes 506 to the set of data that is to be processed, instruct the search nodes 506 to execute the query and return results, aggregate and/or transform the search results from the various search nodes 506, and provide the search results to a user and/or to the query acceleration data store 222.

In some cases, to aid in identifying the set of data to be processed, the search manager 514 can consult the data store catalog 220 (depicted in FIG. 2). As described herein, the data store catalog 220 can include information regarding the data stored in common storage 216. In some cases, the data store catalog 220 can include bucket identifiers, a time range, and a location of the buckets in common storage 216. In addition, the data store catalog 220 can include a tenant identifier and partition identifier for the buckets. This information can be used to identify buckets that include data that satisfies at least a portion of the query.

As a non-limiting example, consider a search manager 514 that has parsed a query to identify the following filter criteria that is used to identify the data to be processed: time range: past hour, partition: sales, tenant: ABC, Inc., keyword: Error. Using the received filter criteria, the search manager 514 can consult the data store catalog 220. Specifically, the search manager 514 can use the data store catalog 220 to identify buckets associated with the "_sales" partition and the tenant "ABC, Inc." and that include data from the "past hour." In some cases, the search manager 514 can obtain bucket identifiers and location information from the data store catalog 220 for the buckets storing data that satisfies at least the aforementioned filter criteria. In certain embodiments, if the data store catalog 220 includes keyword pairs, it can use the keyword "Error" to identify buckets that have at least one event that include the keyword "Error."

Accordingly, the data store catalog 220 can be used to identify relevant buckets and reduce the number of buckets that are to be searched by the search nodes 506. In this way, the data store catalog 220 can decrease the query response time of the data intake and query system 108. In addition, in some embodiments, using the bucket identifiers and/or the location information, the search manager 514 can identify and/or assign one or more search nodes 506 to search the corresponding buckets.

In some embodiments, the use of the data store catalog 220 to identify buckets for searching can contribute to the statelessness of the query system 214 and search head 504. For example, if a search head 504 or search manager 514 becomes unresponsive or unavailable, the query system manager 502 or search master 512, as the case may be, can spin up or assign an additional resource (e.g., new search head 504 or new search manager 514) to execute the query. As the bucket information is persistently stored in the data store catalog 220, data lost due to the unavailability or unresponsiveness of a component of the query system 214 can be recovered by using the bucket information in the data store catalog 220.

In certain embodiments, to identify search nodes 506 that are available to execute the query, the search manager 514 can consult the resource catalog 510. As described herein, the resource catalog 510 can include information regarding the search nodes 506 (and search heads 504). In some cases, the resource catalog 510 can include an identifier for each search node 506, as well as utilization and availability information. For example, the resource catalog 510 can identify search nodes 506 that are instantiated but are unavailable or unresponsive. In addition, the resource catalog 510 can identify the utilization rate of the search nodes 506. For example, the resource catalog 510 can identify search nodes 506 that are working at maximum capacity or at a utilization rate that satisfies utilization threshold, such that the search node 506 should not be used to execute additional queries for a time.

In addition, the resource catalog 510 can include architectural information about the search nodes 506. For example, the resource catalog 510 can identify search nodes 506 that share a data store and/or are located on the same computing device, or on computing devices that are co-located. In some embodiments, the search manager 514 can consult the resource monitor 508, which can retrieve the relevant information from the resource catalog 510 and provide it to the search manager 514.

Accordingly, in some embodiments, based on the receipt of a query, a search manager 514 can consult the resource catalog 510 (or the resource monitor 508) for search nodes 506 that are available to execute the received query. Based on the consultation of the resource catalog 510 (or the resource monitor 508), the search manager 514 can determine which search nodes 506 to assign to execute the query.

In some embodiments, the query system 214 (non-limiting examples: search manager 514 and/or resource monitor 508) can use a search node mapping policy to identify and/or assign search nodes 506 for a particular query or to access particular buckets as part of the query. In certain embodiments, the search node mapping policy can include sub-policies, such as a search head-node mapping policy and/or a search node-data mapping policy (described below).

Although reference is made herein to search manager 514 or resource monitor 508 identifying/assigning search nodes 506 for a particular query or bucket, it will be understood that any one any combination of the components of the query system 214 can make the assignments and/or use the search node mapping policy (or one of its sub-policies). For example, the search manager 514 can request one or more available search nodes 506 from the resource monitor 508 and then assign or map one or more of the available search nodes for the query, and/or assign the search nodes 506 to process particular buckets, etc. As another example, the search manager 514 can request one or more search nodes 506 and the resource monitor 508 can identify available search nodes 506, assign or map them to the search manager 514 for the query, inform the search manager 514 of the assigned search nodes 506, and/or assign the search nodes

506 to process particular buckets, etc. As another example, the resource monitor 508 may use a one search node mapping policy (e.g., search head-node mapping policy) to identify one or more search nodes 506 for a particular query and the search manager 514 may use a different search node mapping policy (e.g., search node-data mapping policy) to determine which buckets are to be accessed by which of the assigned search nodes, etc.

As part of the query execution, the search manager 514 can instruct the search nodes 506 to execute the query (or sub-query) on the assigned buckets. As described herein, the search manager 514 can generate specific queries or sub-queries for the individual search nodes 506. The search nodes 506 can use the queries to execute the query on the buckets assigned thereto.

In some embodiments, the search manager 514 stores the sub-queries and bucket assignments for the different search nodes 506. Storing the sub-queries and bucket assignments can contribute to the statelessness of the query system 214. For example, in the event an assigned search node 506 becomes unresponsive or unavailable during the query execution, the search manager 514 can re-assign the sub-query and bucket assignments of the unavailable search node 506 to one or more available search nodes 506 or identify a different available search node 506 from the resource catalog 510 to execute the sub-query. In certain embodiments, the query system manager 502 can generate an additional search node 506 to execute the sub-query of the unavailable search node 506. Accordingly, the query system 214 can quickly recover from an unavailable or unresponsive component without data loss and while reducing or minimizing delay.

During the query execution, the search manager 514 can monitor the status of the assigned search nodes 506. In some cases, the search manager 514 can ping or set up a communication link between it and the search nodes 506 assigned to execute the query. As mentioned, the search manager 514 can store the mapping of the buckets to the search nodes 506. Accordingly, in the event a particular search node 506 becomes unavailable or is unresponsive, the search manager 514 can assign a different search node 506 to complete the execution of the query for the buckets assigned to the unresponsive search node 506.

In some cases, as part of the status updates to the search manager 514, the search nodes 506 can provide the search manager with partial results and information regarding the buckets that have been searched. In response, the search manager 514 can store the partial results and bucket information in persistent storage. Accordingly, if a search node 506 partially executes the query and becomes unresponsive or unavailable, the search manager 514 can assign a different search node 506 to complete the execution, as described above. For example, the search manager 514 can assign a search node 506 to execute the query on the buckets that were not searched by the unavailable search node 506. In this way, the search manager 514 can more quickly recover from an unavailable or unresponsive search node 506 without data loss and while reducing or minimizing delay.

As the search manager 514 receives query results from the different search nodes 506, it can process the data. In some cases, the search manager 514 processes the partial results as it receives them. For example, if the query includes a count, the search manager 514 can increment the count as it receives the results from the different search nodes 506. In certain cases, the search manager 514 waits for the complete results from the search nodes before processing them. For example, if the query includes a command that operates on a result set, or a partial result set, e.g., a stats command (e.g., a command that calculates one or more aggregate statistics over the results set, e.g., average, count, or standard deviation, as examples), the search manager 514 can wait for the results from all the search nodes 506 before executing the stats command As the search manager 514 processes the results or completes processing the results, it can store the results in the query acceleration data store 222 or communicate the results to a client device 204. As described herein, results stored in the query acceleration data store 222 can be combined with other results over time. For example, if the query system 214 receives an open-ended query (e.g., no set end time), the search manager 515 can store the query results over time in the query acceleration data store 222. Query results in the query acceleration data store 222 can be updated as additional query results are obtained. In this manner, if an open-ended query is run at time B, query results may be stored from initial time A to time B. If the same open-ended query is run at time C, then the query results from the prior open-ended query can be obtained from the query acceleration data store 222 (which gives the results from time A to time B), and the query can be run from time B to time C and combined with the prior results, rather than running the entire query from time A to time C. In this manner, the computational efficiency of ongoing search queries can be improved.

3.4.2.2.1. Search Head-Node Mapping Policy

As described, the search node mapping policy can include one or more sub-policies. In certain embodiments, the search node mapping policy can include search head-node mapping policy, which can be used by the search manager 514 and/or resource monitor 508 to identify the search nodes 506 to use for a query or to assign search nodes 506 to a search head 504, to a search manager 514, or to a data identifier associated with the query. In some embodiments, the search head-node mapping policy can indicate that search nodes 506 are to be assigned for a particular query randomly, based on an order (e.g., sequentially assign search nodes 506 as queries are received), based on availability, based on previous assignments, based on a data identifier associated with the query, etc.

As described herein, each query received by the query system 214 can be associated with a data identifier that, for example, relates to a particular tenant, data source 202, index, or sourcetype, etc. In some cases, the resource monitor 508 can use the data identifier associated with a particular query to assign the search nodes 506 for the particular query.

In some embodiments, the resource catalog 510 can store a search node assignment listing that associates search nodes 506 with data identifiers. In some such embodiments, the search head-node mapping policy can indicate that the resource monitor 508 is to use the listing to determine whether a particular data identifier is associated with one or more search node(s) 506. As a non-limiting example, if the resource monitor 508 receives a request from a search manager 514 to map one or more search nodes 506 to a query associated with a data identifier, the resource monitor 508 can use the search node assignment listing to identify the search node(s) 506 that are to execute the query. In some such embodiments, the search node assignment listing can include multiple search nodes 506 associated with the data identifier and the resource monitor 508 can assign multiple search nodes 506 based on their determined availability (non-limiting example: metrics relating to that search node 506 satisfy one or more metrics thresholds). Accordingly, based on the data identifier and the determined availability of the search nodes 506, the resource monitor 508 can assign one or more search nodes 506 to execute the query.

In some cases, search heads 504 can store a search node assignment listing. In certain embodiments, the search node assignment listing stored by the search heads 504 can be the same as the search node assignment listing stored by the resource catalog 510. For example, the resource monitor 508 can generate the search node assignment listing for the resource catalog 510 and distribute the search node assignment listing to the instantiated search heads 504 and/or search managers 514. In some embodiments, the search node assignment listing stored by the search heads 504 can be different from the search node assignment listing stored by the resource catalog 510. For example, the search node assignment listing stored by the resource catalog 510 can correspond to search node assignments across some or all search heads 504 or search managers 514, whereas the search node assignment listing for a particular search head 504 or search manager 514 may only include the search node assignments for queries that it (or a group of related search heads 504) has processed.

As another example, in some embodiments, the search head-node mapping policy can indicate that the resource monitor 508 is to use a hash function or other function to map one or more particular search nodes 506 to a data identifier (or query) or search manager 514. In certain embodiments, the resource monitor 508 can hash the data identifier, and use the output of the hash to identify available search node(s) 506. For example, if there are ten search nodes 506 and three are to be used to execute a query associated with a particular tenant, the resource monitor 508 can assign three search nodes 506 to the search manager 514 that is managing the query based on a hash of a tenant identifier of the tenant. In this way, other queries associated with the same tenant can be assigned to the same search nodes 506, or the query system 214 can increase the likelihood that other queries associated with the same tenant can be assigned to the same search nodes 506.

In certain embodiments, the search head-node mapping policy can indicate that the resource monitor 508 is to use a consistent hash to map the search node(s) 506 to the search manager 514 for the query. As part of using a consistent hash, the resource monitor 508 can perform a hash on identifiers of the search nodes 506 and map the hash values to a hash ring. The resource monitor 508 can then perform a hash on the data identifier associated with the query (non-limiting example: tenant identifier of the tenant whose data is to be queried). Based on the location of the resulting hash value on the hash ring, the resource monitor 508 can assign one or more search nodes 506 for the query. In certain cases, the resource monitor 508 can assign one or more search nodes 506 for the query based on the location of the hashed data identifier to the location of the hashed search node identifiers on the hash ring. For example, if three search nodes 506 are to be used for the query, the resource monitor 508 can map the data identifier to the three search nodes 506 whose hashed node identifier is closest to or next in line (in a particular direction) on the hash ring to the hashed data identifier. In some cases, the resource monitor 508 maps the data identifier to multiple search nodes 506, for example, by selecting two or more search nodes 506 that have a position on the hash ring that is closest, or next in line, to the hash value of the data identifier when fitted on the hash ring. In some cases, the consistent hash function can be configured such that even with a different number of search nodes 506 being instantiated in the query system 214, the output of the hashing will consistently identify the same search node(s) 506, or have an increased probability of identifying the same search node(s) 506 for queries from the same tenants.

In some instances, the search head-node mapping policy can indicate that the resource monitor 508 is to map search node 506 for a query randomly, or in a simple sequence (e.g., a first search node(s) 506 is mapped to a first query, a second search node 506 is mapped to a second query, etc.). In other instances, as discussed, the search head-node mapping policy can indicate that the resource monitor 508 is to map search nodes 506 to queries/data identifiers/search manager 514 based on previous mappings.

In certain embodiments, according to the search head-node mapping policy, search nodes 506 may be mapped to queries/data identifiers/search managers 514 based on overlaps of computing resources of the search nodes 506. For example, if a search manager 514 is instantiated on the same host system as a search node 506, the resource monitor 508 can assign the search node 506 to the query that the search manager 514 is managing.

Accordingly, it will be understood that the resource monitor 508 can map any search node 506 to any query/data identifier/search manager 514, and that the search head-node mapping policy can indicate that the resource monitor 508 is to use any one or any combination of the above-described mechanisms to map search nodes 506 to search managers 514/queries/data identifiers.

Based on the determined query/data identifier/search manager 514 to search node(s) 506 mapping, the resource monitor 508 can respond to a search manager 514. The response can include an identifier for the assigned search nodes 506 that are to execute the query. In certain embodiments, the response can include instructions that the identified search node(s) 506 are to be used for some or all of the query execution.

In some embodiments, the resource monitor 508 can use different policies for queries associated with different data identifiers. For example, for queries associated with Tenant A, the resource monitor may use a consistent hashing algorithm to assign search nodes 506. For queries associated with Tenant B, the resource monitor may use a pre-configured set of search nodes 506 to execute the query. Similarly, the resource monitor 508 can assign different numbers of search nodes for different queries based on the data identifiers associated with the queries or based on some other priority indicator. For example, the resource monitor 508 may dynamically assign up to twelve search nodes for queries associated with Tenant A based on the size of the query (e.g., amount of data to be processed as part of the query) and may consistently assign four search nodes for queries associated with Tenant B regardless of the size of the query. In some cases, the number of search nodes 506 assigned can be based on a priority level associated with the data identifier or the query. For example, tenants or queries associated with a higher priority level can be allocated a larger number of search nodes 506. In certain cases, the priority level can be based on an indication received from a user, the identity of the tenant, etc.

3.4.2.2.1. Search Node-Data Mapping Policy

As described, the search node mapping policy can include a search node-data mapping policy, which can be used to map search nodes 506 to the data that is to be processed. In some embodiments, the search node-data mapping policy can indicate how search nodes 506 are to be assigned to data (e.g., buckets) and when search nodes 506 are to be assigned to (and instructed to search) the data or buckets. As mentioned, the search node-data mapping policy can be used alone or in conjunction with the search head-node mapping policy (non-limiting example: the number and identity of search nodes 506 for a query are identified based on a search head-node mapping policy and the data accessed by the assigned search nodes is determined based on a search node-data mapping policy) as part of the search node mapping policy.

In some cases, the search manager 514 can map the search nodes 506 to buckets that include data that satisfies at least a portion of the query. For example, in some cases, the search manager 514 can consult the data store catalog 220 to obtain bucket identifiers of buckets that include data that satisfies at least a portion of the query, e.g., as a non-limiting example, to obtain bucket identifiers of buckets that include data associated with a particular time range. Based on the identified buckets and search nodes 506, the search manager 514 can dynamically assign (or map) search nodes 506 to individual buckets according to a search node-data mapping policy.

In some embodiments, the search node-data mapping policy can indicate that the search manager 514 is to assign all buckets to search nodes 506 as a single operation. For example, where ten buckets are to be searched by five search nodes 506, the search manager 514 can assign two buckets to a first search node 506, two buckets to a second search node 506, etc. In another embodiment, the search node-data mapping policy can indicate that the search manager 514 is to assign buckets iteratively. For example, where ten buckets are to be searched by five search nodes 506, the search manager 514 can initially assign five buckets (e.g., one buckets to each search node 506), and assign additional buckets to each search node 506 as the respective search nodes 506 complete the execution on the assigned buckets.

Retrieving buckets from common storage 216 to be searched by the search nodes 506 can cause delay or may use a relatively high amount of network bandwidth or disk read/write bandwidth. In some cases, a local or shared data store associated with the search nodes 506 may include a copy of a bucket that was previously retrieved from common storage 216. Accordingly, to reduce delay caused by retrieving buckets from common storage 216, the search node-data mapping policy can indicate that the search manager 514 is to assign, preferably assign, or attempt to assign the same search node 506 to search the same bucket over time. In this way, the assigned search node 506 can keep a local copy of the bucket on its data store (or a data store shared between multiple search nodes 506) and avoid the processing delays associated with obtaining the bucket from the common storage 216.

In certain embodiments, the search node-data mapping policy can indicate that the search manager 514 is to use a consistent hash function or other function to consistently map a bucket to a particular search node 506. The search manager 514 can perform the hash using the bucket identifier obtained from the data store catalog 220, and the output of the hash can be used to identify the search node 506 assigned to the bucket. In some cases, the consistent hash function can be configured such that even with a different number of search nodes 506 being assigned to execute the query, the output will consistently identify the same search node 506, or have an increased probability of identifying the same search node 506. For example, as described herein, the hashing function can include placing the hash of the search node identifiers and the hash of the bucket identifiers on a hash ring, and assigning buckets to the search nodes based on the proximity of the hash of the bucket identifiers to the hash of the search node identifiers.

In certain embodiments where the query system 214 uses a hash ring as part of a search head-node mapping policy and a hash ring as part of a search node-data mapping policy, the hash rings can be different. For example, the first hash ring can include hash values of the indexing node identifiers and the data identifier associated with the query, and the second hash ring can include hash values of the bucket identifiers and indexing node identifiers. In some such embodiments, the first hash ring can be used to assign search nodes 506 for the query and the second hash ring can be used to assign buckets to the search nodes 506 assigned for the query.

In some embodiments, the query system 214 can store a mapping of search nodes 506 to bucket identifiers. The search node-data mapping policy can indicate that the search manager 514 is to use the mapping to determine whether a particular bucket has been assigned to a search node 506. If the bucket has been assigned to a particular search node 506 and that search node 506 is available, then the search manager 514 can assign the bucket to the search node 506. If the bucket has not been assigned to a particular search node 506, the search manager 514 can use a hash function to identify a search node 506 for assignment. Once assigned, the search manager 514 can store the mapping for future use.

In certain cases, the search node-data mapping policy can indicate that the search manager 514 is to use architectural information about the search nodes 506 to assign buckets. For example, if the identified search node 506 is unavailable or its utilization rate satisfies a threshold utilization rate, the search manager 514 can determine whether an available search node 506 shares a data store with the unavailable search node 506. If it does, the search manager 514 can assign the bucket to the available search node 506 that shares the data store with the unavailable search node 506. In this way, the search manager 514 can reduce the likelihood that the bucket will be obtained from common storage 216, which can introduce additional delay to the query while the bucket is retrieved from common storage 216 to the data store shared by the available search node 506.

In some instances, the search node-data mapping policy can indicate that the search manager 514 is to assign buckets to search nodes 506 randomly, or in a simple sequence (e.g., a first search nodes 506 is assigned a first bucket, a second search node 506 is assigned a second bucket, etc.). In other instances, as discussed, the search node-data mapping policy can indicate that the search manager 514 is to assign buckets to search nodes 506 based on buckets previously assigned to a search nodes 506, in a prior or current search. As mentioned above, in some embodiments each search node 506 may be associated with a local data store or cache of information (e.g., in memory of the search nodes 506, such as random access memory ["RAM"], disk-based cache, a data store, or other form of storage). Each search node 506 can store copies of one or more buckets from the common storage 216 within the local cache, such that the buckets may be more rapidly searched by search nodes 506. The search manager 514 (or cache manager 516) can maintain or retrieve from search nodes 506 information identifying, for each relevant search node 506, what buckets are copied within local cache of the respective search nodes 506. In the event that the search manager 514 determines that a search node 506 assigned to execute a search has within its data store or local cache a copy of an identified bucket, the search manager 514 can preferentially assign the search node 506 to search that locally-cached bucket.

In still more embodiments, according to the search node-data mapping policy, search nodes 506 may be assigned based on overlaps of computing resources of the search nodes 506. For example, where a containerized search node 506 is to retrieve a bucket from common storage 216 (e.g., where a local cached copy of the bucket does not exist on the search node 506), such retrieval may use a relatively high amount of network bandwidth or disk read/write bandwidth. Thus, assigning a second containerized search node 506 instantiated on the same host computing device might be expected to strain or exceed the network or disk read/write bandwidth of the host computing device. For this reason, in some embodiments, according to the search node-data mapping policy, the search manager 514 can assign buckets to search nodes 506 such that two containerized search nodes 506 on a common host computing device do not both retrieve buckets from common storage 216 at the same time.

Further, in certain embodiments, where a data store that is shared between multiple search nodes 506 includes two buckets identified for the search, the search manager 514 can, according to the search node-data mapping policy, assign both such buckets to the same search node 506 or to two different search nodes 506 that share the data store, such that both buckets can be searched in parallel by the respective search nodes 506.

The search node-data mapping policy can indicate that the search manager 514 is to use any one or any combination of the above-described mechanisms to assign buckets to search nodes 506. Furthermore, the search node-data mapping policy can indicate that the search manager 514 is to prioritize assigning search nodes 506 to buckets based on any one or any combination of: assigning search nodes 506 to process buckets that are in a local or shared data store of the search nodes 506, maximizing parallelization (e.g., assigning as many different search nodes 506 to execute the query as are available), assigning search nodes 506 to process buckets with overlapping timestamps, maximizing individual search node 506 utilization (e.g., ensuring that each search node 506 is searching at least one bucket at any given time, etc.), or assigning search nodes 506 to process buckets associated with a particular tenant, user, or other known feature of data stored within the bucket (e.g., buckets holding data known to be used in time-sensitive searches may be prioritized). Thus, according to the search node-data mapping policy, the search manager 514 can dynamically alter the assignment of buckets to search nodes 506 to increase the parallelization of a search, and to increase the speed and efficiency with which the search is executed.

It will be understood that the search manager 514 can assign any search node 506 to search any bucket. This flexibility can decrease query response time as the search manager can dynamically determine which search nodes 506 are best suited or available to execute the query on different buckets. Further, if one bucket is being used by multiple queries, the search manager 515 can assign multiple search nodes 506 to search the bucket. In addition, in the event a search node 506 becomes unavailable or unresponsive, the search manager 514 can assign a different search node 506 to search the buckets assigned to the unavailable search node 506. In some embodiments, the resource monitor 508 can use different search node-data mapping policies for queries associated with different data identifiers. For example, for queries associated with Tenant A, the resource monitor may use a consistent hashing algorithm to assign buckets to search nodes 506. For queries associated with Tenant B, the resource monitor may iteratively assign buckets to search nodes 506 to execute the query. Similarly, as described herein with reference to the search head-node mapping policy, a different number of search nodes 506 can be assigned for queries based on a priority level of the query and/or the data identifier associated with the query.

3.4.3. Search Nodes

As described herein, the search nodes 506 can be the primary query execution engines for the query system 214, and can be implemented as distinct computing devices, virtual machines, containers, container of a pods, or processes or threads associated with one or more containers. Accordingly, each search node 506 can include a processing device and a data store, as depicted at a high level in FIG. 5. Depending on the embodiment, the processing device and data store can be dedicated to the search node (e.g., embodiments where each search node is a distinct computing device) or can be shared with other search nodes or components of the data intake and query system 108 (e.g., embodiments where the search nodes are implemented as containers or virtual machines or where the shared data store is a networked data store, etc.).

In some embodiments, the search nodes 506 can obtain and search buckets identified by the search manager 514 that include data that satisfies at least a portion of the query, identify the set of data within the buckets that satisfies the query, perform one or more transformations on the set of data, and communicate the set of data to the search manager 514. Individually, a search node 506 can obtain the buckets assigned to it by the search manager 514 for a particular query, search the assigned buckets for a subset of the set of data, perform one or more transformation on the subset of data, and communicate partial search results to the search manager 514 for additional processing and combination with the partial results from other search nodes 506.

In some cases, the buckets to be searched may be located in a local data store of the search node 506 or a data store that is shared between multiple search nodes 506. In such cases, the search nodes 506 can identify the location of the buckets and search the buckets for the set of data that satisfies the query.

In certain cases, the buckets may be located in the common storage 216. In such cases, the search nodes 506 can search the buckets in the common storage 216 and/or copy the buckets from the common storage 216 to a local or shared data store and search the locally stored copy for the set of data. As described herein, the cache manager 516 can coordinate with the search nodes 506 to identify the location of the buckets (whether in a local or shared data store or in common storage 216) and/or obtain buckets stored in common storage 216.

Once the relevant buckets (or relevant files of the buckets) are obtained, the search nodes 506 can search their contents to identify the set of data to be processed. In some cases, upon obtaining a bucket from the common storage 216, a search node 306 can decompress the bucket from a compressed format, and accessing one or more files stored within the bucket. In some cases, the search node 306 references a bucket summary or manifest to locate one or more portions (e.g., records or individual files) of the bucket that potentially contain information relevant to the search.

In some cases, the search nodes 506 can use all of the files of a bucket to identify the set of data. In certain embodiments, the search nodes 506 use a subset of the files of a bucket to identify the set of data. For example, in some cases, a search node 506 can use an inverted index, bloom filter, or bucket summary or manifest to identify a subset of the set of data without searching the raw machine data of the bucket. In certain cases, the search node 506 uses the inverted index, bloom filter, bucket summary, and raw machine data to identify the subset of the set of data that satisfies the query.

In some embodiments, depending on the query, the search nodes 506 can perform one or more transformations on the data from the buckets. For example, the search nodes 506 may perform various data transformations, scripts, and processes, e.g., a count of the set of data, etc.

As the search nodes 506 execute the query, they can provide the search manager 514 with search results. In some cases, a search node 506 provides the search manager 514 results as they are identified by the search node 506, and updates the results over time. In certain embodiments, a search node 506 waits until all of its partial results are gathered before sending the results to the search manager 514.

In some embodiments, the search nodes 506 provide a status of the query to the search manager 514. For example, an individual search node 506 can inform the search manager 514 of which buckets it has searched and/or provide the search manager 514 with the results from the searched buckets. As mentioned, the search manager 514 can track or store the status and the results as they are received from the search node 506. In the event the search node 506 becomes unresponsive or unavailable, the tracked information can be used to generate and assign a new search node 506 to execute the remaining portions of the query assigned to the unavailable search node 506.

The search nodes 506 may provide information to the resource monitor 508 in order to update the information stored in the resource catalog 510, which may include information such as an identifier for each search node 506, as well as availability, responsiveness, and utilization information. For example, the updated information in the resource catalog 510 may identify and indicate search nodes 506 that are instantiated and currently available (e.g., currently not being used to execute queries), instantiated but are currently unavailable or unresponsive, and so forth. The updated information may indicate the amount of processing resources currently in use by each search node 506, the current utilization rate of each search node 506, the amount of memory currently used by each search node 506, etc. The updated information may also indicate a node type associated with each search node 506, the cache hit ratio for each search node 506, and so forth. It should be noted that the information can be provided on-the-fly or on a periodic basis, and in the latter case, the information considered "current" (e.g., the amount of processing resources currently in use) may refer to the most-recent updated information (e.g., the information last provided), which can be accurate if updated information is provided relatively frequently. The search nodes 506 may provide information upon request (e.g., in response to a ping) or may provide information based on a set schedule (e.g., send information to the resource monitor 508 on a periodic basis).

3.4.4. Cache Manager

As mentioned, the cache manager 516 can communicate with the search nodes 506 to obtain or identify the location of the buckets assigned to the search nodes 506, and can be implemented as a distinct computing device, virtual machine, container, a pod, or a process or thread associated with a container.

In some embodiments, based on the receipt of a bucket assignment, a search node 506 can provide the cache manager 516 with an identifier of the bucket that it is to search, a file associated with the bucket that it is to search, and/or a location of the bucket. In response, the cache manager 516 can determine whether the identified bucket or file is located in a local or shared data store or is to be retrieved from the common storage 216.

As mentioned, in some cases, multiple search nodes 506 can share a data store. Accordingly, if the cache manager 516 determines that the requested bucket is located in a local or shared data store, the cache manager 516 can provide the search node 506 with the location of the requested bucket or file. In certain cases, if the cache manager 516 determines that the requested bucket or file is not located in the local or shared data store, the cache manager 516 can request the bucket or file from the common storage 216, and inform the search node 506 that the requested bucket or file is being retrieved from common storage 216.

In some cases, the cache manager 516 can request one or more files associated with the requested bucket prior to, or in place of, requesting all contents of the bucket from the common storage 216. For example, a search node 506 may request a subset of files from a particular bucket. Based on the request and a determination that the files are located in common storage 216, the cache manager 516 can download or obtain the identified files from the common storage 216.

In some cases, based on the information provided from the search node 506, the cache manager 516 may be unable to uniquely identify a requested file or files within the common storage 216. Accordingly, in certain embodiments, the cache manager 516 can retrieve a bucket summary or manifest file from the common storage 216 and provide the bucket summary to the search node 506. In some cases, the cache manager 516 can provide the bucket summary to the search node 506 while concurrently informing the search node 506 that the requested files are not located in a local or shared data store and are to be retrieved from common storage 216.

Using the bucket summary, the search node 506 can uniquely identify the files to be used to execute the query. Using the unique identification, the cache manager 516 can request the files from the common storage 216. Accordingly, rather than downloading the entire contents of the bucket from common storage 216, the cache manager 516 can download those portions of the bucket that are to be used by the search node 506 to execute the query. In this way, the cache manager 516 can decrease the amount of data sent over the network and decrease the search time.

As a non-limiting example, a search node 506 may determine that an inverted index of a bucket is to be used to execute a query. For example, the search node 506 may determine that all the information that it needs to execute the query on the bucket can be found in an inverted index associated with the bucket. Accordingly, the search node 506 can request the file associated with the inverted index of the bucket from the cache manager 516. Based on a determination that the requested file is not located in a local or shared data store, the cache manager 516 can determine that the file is located in the common storage 216.

As the bucket may have multiple inverted indexes associated with it, the information provided by the search node 506 may be insufficient to uniquely identify the inverted index within the bucket. To address this issue, the cache manager 516 can request a bucket summary or manifest from the common storage 216, and forward it to the search node 506. The search node 506 can analyze the bucket summary to identify the particular inverted index that is to be used to execute the query, and request the identified particular inverted index from the cache manager 516 (e.g., by name and/or location). Using the bucket manifest and/or the information received from the search node 506, the cache manager 516 can obtain the identified particular inverted index from the common storage 216. By obtaining the bucket manifest and downloading the requested inverted index instead of all inverted indexes or files of the bucket, the cache manager 516 can reduce the amount of data communicated over the network and reduce the search time for the query.

In some cases, when requesting a particular file, the search node 506 can include a priority level for the file. For example, the files of a bucket may be of different sizes and may be used more or less frequently when executing queries. For example, the bucket manifest may be a relatively small file. However, if the bucket is searched, the bucket manifest can be a relatively valuable file (and frequently used) because it includes a list or index of the various files of the bucket. Similarly, a bloom filter of a bucket may be a relatively small file but frequently used as it can relatively quickly identify the contents of the bucket. In addition, an inverted index may be used more frequently than raw data of a bucket to satisfy a query.

Accordingly, to improve retention of files that are commonly used in a search of a bucket, the search node 506 can include a priority level for the requested file. The cache manager 516 can use the priority level received from the search node 506 to determine how long to keep, or when to evict, the file from the local or shared data store. For example, files identified by the search node 506 as having a higher priority level can be stored for a greater period of time than files identified as having a lower priority level.

Furthermore, the cache manager 516 can determine what data and how long to retain the data in the local or shared data stores of the search nodes 506 based on a bucket caching policy. In some cases, the bucket caching policy can rely on any one or any combination of the priority level received from the search nodes 506 for a particular file, least recently used, most recent in time, or other policies to indicate how long to retain files in the local or shared data store.

In some instances, according to the bucket caching policy, the cache manager 516 or other component of the query system 214 (e.g., the search master 512 or search manager 514) can instruct search nodes 506 to retrieve and locally cache copies of various buckets from the common storage 216, independently of processing queries. In certain embodiments, the query system 214 is configured, according to the bucket caching policy, such that one or more buckets from the common storage 216 (e.g., buckets associated with a tenant or partition of a tenant) or each bucket from the common storage 216 is locally cached on at least one search node 506.

In some embodiments, according to the bucket caching policy, the query system 214 is configured such that at least one bucket from the common storage 216 is locally cached on at least two search nodes 506. Caching a bucket on at least two search nodes 506 may be beneficial, for example, in instances where different queries both require searching the bucket (e.g., because the at least search nodes 506 may process their respective local copies in parallel). In still other embodiments, the query system 214 is configured, according to the bucket caching policy, such that one or more buckets from the common storage 216 or all buckets from the common storage 216 are locally cached on at least a given number n of search nodes 506, wherein n is defined by a replication factor on the system 108. For example, a replication factor of five may be established to ensure that five copies of a bucket are locally cached across different search nodes 506.

In certain embodiments, the search manager 514 (or search master 512) can assign buckets to different search nodes 506 based on time. For example, buckets that are less than one day old can be assigned to a first group of search nodes 506 for caching, buckets that are more than one day but less than one week old can be assigned to a different group of search nodes 506 for caching, and buckets that are more than one week old can be assigned to a third group of search nodes 506 for caching. In certain cases, the first group can be larger than the second group, and the second group can be larger than the third group. In this way, the query system 214 can provide better/faster results for queries searching data that is less than one day old, and so on, etc. It will be understood that the search nodes can be grouped and assigned buckets in a variety of ways. For example, search nodes 506 can be grouped based on a tenant identifier, index, etc. In this way, the query system 214 can dynamically provide faster results based any one or any number of factors.

In some embodiments, when a search node 506 is added to the query system 214, the cache manager 516 can, based on the bucket caching policy, instruct the search node 506 to download one or more buckets from common storage 216 prior to receiving a query. In certain embodiments, the cache manager 516 can instruct the search node 506 to download specific buckets, such as most recent in time buckets, buckets associated with a particular tenant or partition, etc. In some cases, the cache manager 516 can instruct the search node 506 to download the buckets before the search node 506 reports to the resource monitor 508 that it is available for executing queries. It will be understood that other components of the query system 214 can implement this functionality, such as, but not limited to the query system manager 502, resource monitor 508, search manager 514, or the search nodes 506 themselves.

In certain embodiments, when a search node 506 is removed from the query system 214 or becomes unresponsive or unavailable, the cache manager 516 can identify the buckets that the removed search node 506 was responsible for and instruct the remaining search nodes 506 that they will be responsible for the identified buckets. In some cases, the remaining search nodes 506 can download the identified buckets from common storage 216 or retrieve them from the data store associated with the removed search node 506.

In some cases, the cache manager 516 can change the bucket-search node 506 assignments, such as when a search node 506 is removed or added. In certain embodiments, based on a reassignment, the cache manager 516 can inform a particular search node 506 to remove buckets to which it is no longer assigned, reduce the priority level of the buckets, etc. In this way, the cache manager 516 can make it so the reassigned bucket will be removed more quickly from the search node 506 than it otherwise would without the reassignment. In certain embodiments, the search node 506 that receives the new for the bucket can retrieve the bucket from the now unassigned search node 506 and/or retrieve the bucket from common storage 216.

3.4.5. Resource Monitor and Catalog

The resource monitor 508 can monitor search nodes and populate the resource catalog 510 with relevant information, and can be implemented as a distinct computing device, virtual machine, container, container of a pod, or a process or thread associated with a container.

Although the resource monitor 508 and resource catalog 510 are shown as separate components, it will be understood that they can be implemented as part of the same machine, host system, isolated execution environment, pod, container, virtual machine, etc. Furthermore, although separate resource monitors 418, 508 and resource catalog 420 and 510 are shown for the indexing system 212 and the query system 214, it will be understood that the resource monitors 418, 508 and resource catalog 420 and 510 can be implemented as part of the same machine, isolated execution environment, pod, container, etc. For example, the indexing system 212 and the query system 214 can interact with a resource monitor and resource catalog in a manner similar to which these systems (or their components) interact with the common storage 216, data store catalog 220, metadata catalog 221, etc. Thus, the illustrated embodiments, should not be construed as limiting the resource monitors 418, 508 and resource catalog 420 and 510 to a particular architecture or design.

In some cases, the resource monitor 508 can ping the search nodes 506 over time to determine their availability, responsiveness, and/or utilization rate. In certain embodiments, each search node 506 can include a monitoring module that provides performance metrics or status updates about the search node 506 to the resource monitor 508. For example, the monitoring module can indicate the amount of processing resources in use by the search node 506, the utilization rate of the search node 506, the amount of memory used by the search node 506, etc. In certain embodiments, the resource monitor 508 can determine that a search node 506 is unavailable or failing based on the data in the status update or absence of a state update from the monitoring module of the search node 506.

In certain embodiments, each search head 504 can include a monitoring module that provides performance metrics or status updates (e.g., availability information) about the search node 506 to the resource monitor 508, along with information such as an identifier for that search head 504. For example, the monitoring module can indicate the number of queries being processed by the search head 504, the amount of processing resources in use by the search head 504, the amount of memory used by the search head 504, and so forth. In certain embodiments, the resource monitor 508 can determine that a search head 504 is unavailable or failing based on the data in the status update or absence of a state update from the monitoring module of the search node 506. Thus, the resource monitor 508 may be able to identify and indicate search heads 504 that are instantiated and available (e.g., include sufficient bandwidth to process one or more additional queries), instantiated but are unavailable or unresponsive, and so forth. Using the information obtained from the search heads 504 and search nodes 506, the resource monitor 508 can populate the resource catalog 510 and update it over time.

As the availability, responsiveness, and/or utilization change for the different search heads 504 and/or search nodes 506, the resource monitor 508 can update the resource catalog 510. In this way, the resource catalog 510 can retain an up-to-date list of search heads 504 available to handle queries and/or search nodes 506 available to execute a query.

Furthermore, as search heads 504 and/or search nodes 506 are instantiated (or at other times), the newly-instantiated search heads 504 and/or search nodes 506 can provide information to the resource monitor 508, which can update the resource catalog 510 with information about the newly-instantiated search heads 504 and/or search nodes 506, such as, but not limited to its computing resources, utilization, network architecture (identification of machine where it is instantiated, location with reference to other search heads 504 and/or search nodes 506, computing resources shared with other search heads 504 and/or search nodes 506, such as data stores, processors, I/O, etc.), etc.

In some embodiments, based on the receipt of a particular query or a request from a search service or a component of the query system 214, the resource monitor 508 can identify a search head to process the particular query. In certain embodiments, the resource monitor 508 can identify the search head based on a search head mapping policy. The search head mapping policy can indicate one or more criteria for identifying or assigning a search head 504 for a query. In some cases, the search head mapping policy can indicate that a search head 504 should be assigned based on its availability, the number of concurrent searches that it is processing/managing, resource utilization, etc. As such, the query system 214 can dynamically assign search heads 504 to process queries. In some such cases, a search head 512 can process and manage queries associated with different tenants. By configuring the search head 512 to process queries associated with different tenants, the data intake and query system 108 can improve resource utilization and decrease the amount of resource used. For example, if a search head 504 is statically assigned to a tenant, then its resources may be unavailable to other tenants or other components of the data intake and query system 108, even if the tenant is not executing any searches. In contrast if a search head 504 is dynamically assigned to queries associated with different tenants then if a particular tenant is not executing any searches then the search head 504 that would otherwise be unused can be used to process/manage queries associated with other tenants thereby increasing the resource utilization of the data intake and query system 108 as a whole.

As described herein, the search manager 514 and/or resource monitor 508 can use the resource catalog 510 to identify search nodes 506 available to execute a query. In some embodiments, the search manager 214 and/or resource monitor 508 can communicate with the resource catalog 510 using an API. In some embodiments, the search manager 514 and/or resource monitor 508 assign search nodes 506 to execute queries based on one or more policies, such as a search node mapping policy, etc. Similar to the dynamic assignment of search heads 504 to queries associated with different tenants or data identifiers, dynamically assigning search nodes 506 to queries can significantly improve resource utilization and decrease compute resources used by the data intake and query system 108.

3.5. Common Storage

Returning to FIG. 2, the common storage 216 can be used to store data indexed by the indexing system 212, and can be implemented using one or more data stores 218.

In some systems, the same computing devices (e.g., indexers) operate both to ingest, index, store, and search data. The use of an indexer to both ingest and search information may be beneficial, for example, because an indexer may have ready access to information that it has ingested, and can quickly access that information for searching purposes. However, use of an indexer to both ingest and search information may not be desirable in all instances. As an illustrative example, consider an instance in which ingested data is organized into buckets, and each indexer is responsible for maintaining buckets within a data store corresponding to the indexer. Illustratively, a set of ten indexers may maintain 100 buckets, distributed evenly across ten data stores (each of which is managed by a corresponding indexer). Information may be distributed throughout the buckets according to a load-balancing mechanism used to distribute information to the indexers during data ingestion. In an idealized scenario, information responsive to a query would be spread across the 100 buckets, such that each indexer may search their corresponding ten buckets in parallel, and provide search results to a search head. However, it is expected that this idealized scenario may not always occur, and that there will be at least some instances in which information responsive to a query is unevenly distributed across data stores. As one example, consider a query in which responsive information exists within ten buckets, all of which are included in a single data store associated with a single indexer. In such an instance, a bottleneck may be created at the single indexer, and the effects of parallelized searching across the indexers may be minimized. To increase the speed of operation of search queries in such cases, it may therefore be desirable to store data indexed by the indexing system 212 in common storage 216 that can be accessible to any one or multiple components of the indexing system 212 or the query system 214.

Common storage 216 may correspond to any data storage system accessible to the indexing system 212 and the query system 214. For example, common storage 216 may correspond to a storage area network (SAN), network attached storage (NAS), other network-accessible storage system (e.g., a hosted storage system, such as Amazon S3 or EBS provided by Amazon, Inc., Google Cloud Storage, Microsoft Azure Storage, etc., which may also be referred to as "cloud" storage), or combination thereof. The common storage 216 may include, for example, hard disk drives (HDDs), solid state storage devices (SSDs), or other substantially persistent or non-transitory media. Data stores 218 within common storage 216 may correspond to physical data storage devices (e.g., an individual HDD) or a logical storage device, such as a grouping of physical data storage devices or a containerized or virtualized storage device hosted by an underlying physical storage device. In some embodiments, the common storage 216 may also be referred to as a shared storage system or shared storage environment as the data stores 218 may store data associated with multiple customers, tenants, etc., or across different data intake and query systems 108 or other systems unrelated to the data intake and query systems 108.

The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape, etc.). Further, as data is received at the common storage 216 it can be automatically replicated multiple times according to a replication factor to different data stores across the same and/or different geographic locations.

In one embodiment, common storage 216 may be multi-tiered, with each tier providing more rapid access to information stored in that tier. For example, a first tier of the common storage 216 may be physically co-located with the indexing system 212 or the query system 214 and provide rapid access to information of the first tier, while a second tier may be located in a different physical location (e.g., in a hosted or "cloud" computing environment) and provide less rapid access to information of the second tier.

Distribution of data between tiers may be controlled by any number of algorithms or mechanisms. In one embodiment, a first tier may include data generated or including timestamps within a threshold period of time (e.g., the past seven days), while a second tier or subsequent tiers includes data older than that time period. In another embodiment, a first tier may include a threshold amount (e.g., n terabytes) or recently accessed data, while a second tier stores the remaining less recently accessed data.

In one embodiment, data within the data stores 218 is grouped into buckets, each of which is commonly accessible to the indexing system 212 and query system 214. The size of each bucket may be selected according to the computational resources of the common storage 216 or the data intake and query system 108 overall. For example, the size of each bucket may be selected to enable an individual bucket to be relatively quickly transmitted via a network, without introducing excessive additional data storage requirements due to metadata or other overhead associated with an individual bucket. In one embodiment, each bucket is 750 megabytes in size. Further, as mentioned, in some embodiments, some buckets can be merged to create larger buckets.

As described herein, each bucket can include one or more files, such as, but not limited to, one or more compressed or uncompressed raw machine data files, metadata files, filter files, indexes files, bucket summary or manifest files, etc. In addition, each bucket can store events including raw machine data associated with a timestamp.

As described herein, the indexing nodes 404 can generate buckets during indexing and communicate with common storage 216 to store the buckets. For example, data may be provided to the indexing nodes 404 from one or more ingestion buffers of the intake system 210. The indexing nodes 404 can process the information and store it as buckets in common storage 216, rather than in a data store maintained by an individual indexer or indexing node. Thus, the common storage 216 can render information of the data intake and query system 108 commonly accessible to elements of the system 108. As described herein, the common storage 216 can enable parallelized searching of buckets to occur independently of the operation of indexing system 212.

As noted above, it may be beneficial in some instances to separate data indexing and searching. Accordingly, as described herein, the search nodes 506 of the query system 214 can search for data stored within common storage 216. The search nodes 506 may therefore be communicatively attached (e.g., via a communication network) with the common storage 216, and be enabled to access buckets within the common storage 216.

Further, as described herein, because the search nodes 506 in some instances are not statically assigned to individual data stores 218 (and thus to buckets within such a data store 218), the buckets searched by an individual search node 506 may be selected dynamically, to increase the parallelization with which the buckets can be searched. For example, consider an instance where information is stored within 100 buckets, and a query is received at the data intake and query system 108 for information within ten buckets. Unlike a scenario in which buckets are statically assigned to an indexer, which could result in a bottleneck if the ten relevant buckets are associated with the same indexer, the ten buckets holding relevant information may be dynamically distributed across multiple search nodes 506. Thus, if ten search nodes 506 are available to process a query, each search node 506 may be assigned to retrieve and search within one bucket greatly increasing parallelization when compared to the low-parallelization scenarios (e.g., where a single indexer 206 is required to search all ten buckets).

Moreover, because searching occurs at the search nodes 506 rather than at the indexing system 212, indexing resources can be allocated independently to searching operations. For example, search nodes 506 may be executed by a separate processor or computing device than indexing nodes 404, enabling computing resources available to search nodes 506 to scale independently of resources available to indexing nodes 404. Additionally, the impact on data ingestion and indexing due to above-average volumes of search query requests is reduced or eliminated, and similarly, the impact of data ingestion on search query result generation time also is reduced or eliminated.

As will be appreciated in view of the above description, the use of a common storage 216 can provide many advantages within the data intake and query system 108. Specifically, use of a common storage 216 can enable the system 108 to decouple functionality of data indexing by indexing nodes 404 with functionality of searching by search nodes 506. Moreover, because buckets containing data are accessible by each search node 506, a search manager 514 can dynamically allocate search nodes 506 to buckets at the time of a search in order to increase parallelization. Thus, use of a common storage 216 can substantially improve the speed and efficiency of operation of the system 108.

3.6. Data Store Catalog

The data store catalog 220 can store information about the data stored in common storage 216, and can be implemented using one or more data stores. In some embodiments, the data store catalog 220 can be implemented as a portion of the common storage 216 and/or using similar data storage techniques (e.g., local or cloud storage, multi-tiered storage, etc.). In another implementation, the data store catalog 22—may utilize a database, e.g., a relational database engine, such as commercially-provided relational database services, e.g., Amazon's Aurora. In some implementations, the data store catalog 220 may use an API to allow access to register buckets, and to allow query system 214 to access buckets. In other implementations, data store catalog 220 may be implemented through other means, and maybe stored as part of common storage 216, or another type of common storage, as previously described. In various implementations, requests for buckets may include a tenant identifier and some form of user authentication, e.g., a user access token that can be authenticated by authentication service. In various implementations, the data store catalog 220 may store one data structure, e.g., table, per tenant, for the buckets associated with that tenant, one data structure per partition of each tenant, etc. In other implementations, a single data structure, e.g., a single table, may be used for all tenants, and unique tenant IDs may be used to identify buckets associated with the different tenants.

As described herein, the data store catalog 220 can be updated by the indexing system 212 with information about the buckets or data stored in common storage 216. For example, the data store catalog can store an identifier for a sets of data in common storage 216, a location of the sets of data in common storage 216, tenant or indexes associated with the sets of data, timing information about the sets of data, etc. In embodiments where the data in common storage 216 is stored as buckets, the data store catalog 220 can include a bucket identifier for the buckets in common storage 216, a location of or path to the buckets in common storage 216, a time range of the data in the bucket (e.g., range of time between the first-in-time event of the bucket and the last-in-time event of the bucket), a tenant identifier identifying a customer or computing device associated with the bucket, and/or an index or partition associated with the bucket, etc.

In certain embodiments, the data store catalog 220 can include an indication of a location of a copy of a bucket found in one or more search nodes 506. For example, as buckets are copied to search nodes 506, the query system 214 can update the data store catalog 220 with information about which search nodes 506 include a copy of the buckets. This information can be used by the query system 214 to assign search nodes 506 to buckets as part of a query.

In certain embodiments, the data store catalog 220 can function as an index or inverted index of the buckets stored in common storage 216. For example, the data store catalog 220 can provide location and other information about the buckets stored in common storage 216. In some embodiments, the data store catalog 220 can provide additional information about the contents of the buckets. For example, the data store catalog 220 can provide a list of sources, sourcetypes, or hosts associated with the data in the buckets.

In certain embodiments, the data store catalog 220 can include one or more keywords found within the data of the buckets. In such embodiments, the data store catalog can be similar to an inverted index, except rather than identifying specific events associated with a particular host, source, sourcetype, or keyword, it can identify buckets with data associated with the particular host, source, sourcetype, or keyword.

In some embodiments, the query system 214 (e.g., search head 504, search master 512, search manager 514, etc.) can communicate with the data store catalog 220 as part of processing and executing a query. In certain cases, the query system 214 communicates with the data store catalog 220 using an API. As a non-limiting example, the query system 214 can provide the data store catalog 220 with at least a portion of the query or one or more filter criteria associated with the query. In response, the data store catalog 220 can provide the query system 214 with an identification of buckets that store data that satisfies at least a portion of the query. In addition, the data store catalog 220 can provide the query system 214 with an indication of the location of the identified buckets in common storage 216 and/or in one or more local or shared data stores of the search nodes 506.

Accordingly, using the information from the data store catalog 220, the query system 214 can reduce (or filter) the amount of data or number of buckets to be searched. For example, using tenant or partition information in the data store catalog 220, the query system 214 can exclude buckets associated with a tenant or a partition, respectively, that is not to be searched. Similarly, using time range information, the query system 214 can exclude buckets that do not satisfy a time range from a search. In this way, the data store catalog 220 can reduce the amount of data to be searched and decrease search times.

As mentioned, in some cases, as buckets are copied from common storage 216 to search nodes 506 as part of a query, the query system 214 can update the data store catalog 220 with the location information of the copy of the bucket. The query system 214 can use this information to assign search nodes 506 to buckets. For example, if the data store catalog 220 indicates that a copy of a bucket in common storage 216 is stored in a particular search node 506, the query system 214 can assign the particular search node to the bucket. In this way, the query system 214 can reduce the likelihood that the bucket will be retrieved from common storage 216. In certain embodiments, the data store catalog 220 can store an indication that a bucket was recently downloaded to a search node 506. The query system 214 for can use this information to assign search node 506 to that bucket.

3.7. Query Acceleration Data Store

With continued reference to FIG. 2, the query acceleration data store 222 can be used to store query results or datasets for accelerated access, and can be implemented as, a distributed in-memory database system, storage subsystem, local or networked storage (e.g., cloud storage), and so on, which can maintain (e.g., store) datasets in both low-latency memory (e.g., random access memory, such as volatile or non-volatile memory) and longer-latency memory (e.g., solid state storage, disk drives, and so on). In some embodiments, to increase efficiency and response times, the accelerated data store 222 can maintain particular datasets in the low-latency memory, and other datasets in the longer-latency memory. For example, in some embodiments, the datasets can be stored in-memory (non-limiting examples: RAM or volatile memory) with disk spillover (non-limiting examples: hard disks, disk drive, non-volatile memory, etc.). In this way, the query acceleration data store 222 can be used to serve interactive or iterative searches. In some cases, datasets which are determined to be frequently accessed by a user can be stored in the lower-latency memory. Similarly, datasets of less than a threshold size can be stored in the lower-latency memory.

In certain embodiments, the search manager 514 or search nodes 506 can store query results in the query acceleration data store 222. In some embodiments, the query results can correspond to partial results from one or more search nodes 506 or to aggregated results from all the search nodes 506 involved in a query or the search manager 514. In such embodiments, the results stored in the query acceleration data store 222 can be served at a later time to the search head 504, combined with additional results obtained from a later query, transformed or further processed by the search nodes 506 or search manager 514, etc. For example, in some cases, such as where a query does not include a termination date, the search manager 514 can store initial results in the acceleration data store 222 and update the initial results as additional results are received. At any time, the initial results, or iteratively updated results can be provided to a client device 204, transformed by the search nodes 506 or search manager 514, etc.

As described herein, a user can indicate in a query that particular datasets or results are to be stored in the query acceleration data store 222. The query can then indicate operations to be performed on the particular datasets. For subsequent queries directed to the particular datasets (e.g., queries that indicate other operations for the datasets stored in the acceleration data store 222), the search nodes 506 can obtain information directly from the query acceleration data store 222.

Additionally, since the query acceleration data store 222 can be utilized to service requests from different client devices 204, the query acceleration data store 222 can implement access controls (e.g., an access control list) with respect to the stored datasets. In this way, the stored datasets can optionally be accessible only to users associated with requests for the datasets. Optionally, a user who provides a query can indicate that one or more other users are authorized to access particular requested datasets. In this way, the other users can utilize the stored datasets, thus reducing latency associated with their queries.

In some cases, data from the intake system 210 (e.g., ingested data buffer 310, etc.) can be stored in the acceleration data store 222. In such embodiments, the data from the intake system 210 can be transformed by the search nodes 506 or combined with data in the common storage 216.

Furthermore, in some cases, if the query system 214 receives a query that includes a request to process data in the query acceleration data store 222, as well as data in the common storage 216, the search manager 514 or search nodes 506 can begin processing the data in the query acceleration data store 222, while also obtaining and processing the other data from the common storage 216. In this way, the query system 214 can rapidly provide initial results for the query, while the search nodes 506 obtain and search the data from the common storage 216.

It will be understood that the data intake and query system 108 can include fewer or more components as desired. For example, in some embodiments, the system 108 does not include an acceleration data store 222. Further, it will be understood that in some embodiments, the functionality described herein for one component can be performed by another component. For example, the search master 512 and search manager 514 can be combined as one component, etc.

3.8. Metadata Catalog

Figure 6:
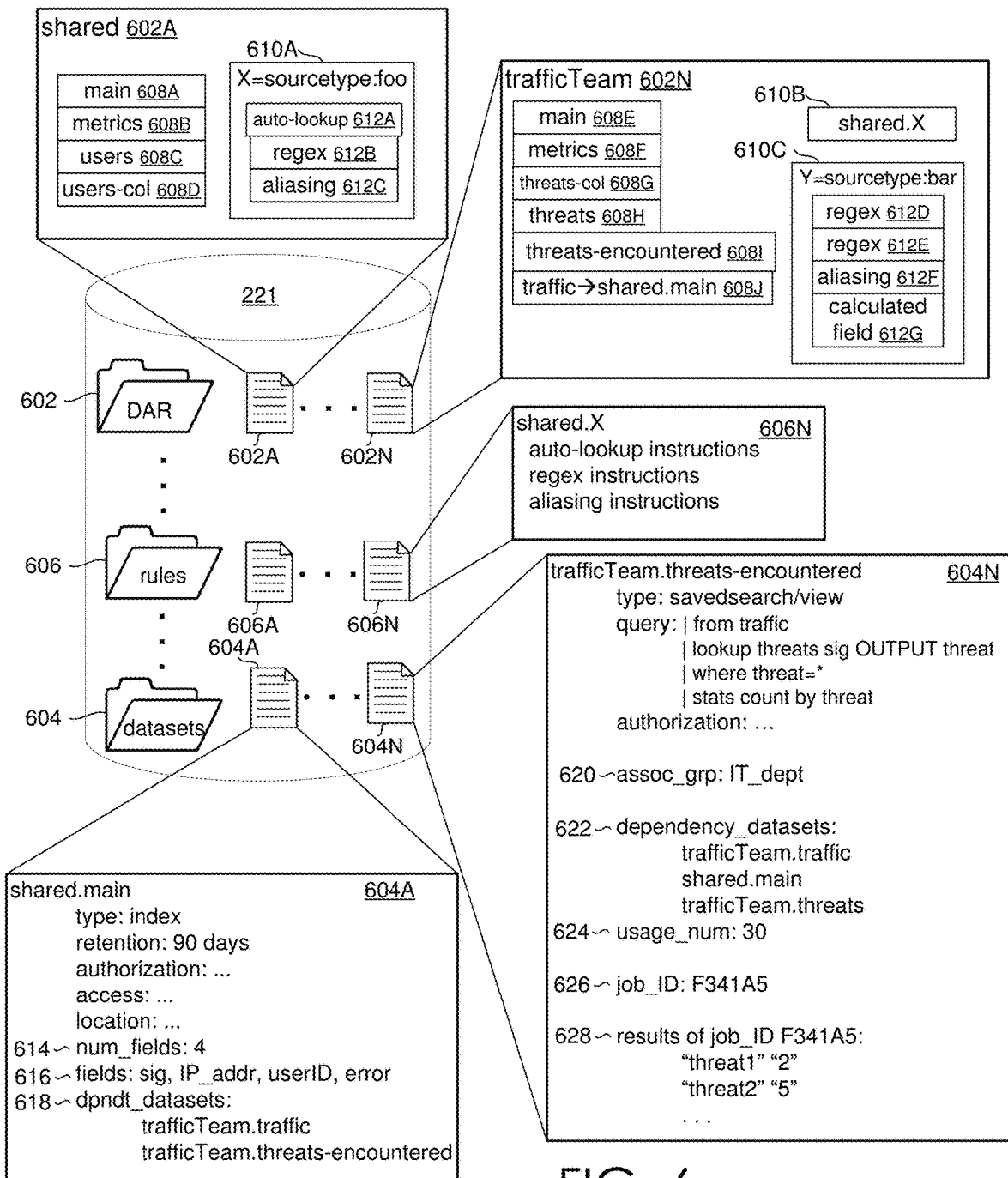
FIG. 6 is a block diagram illustrating an embodiment of a metadata catalog.

FIG. 6 is a block diagram illustrating an embodiment of a metadata catalog 221. The metadata catalog 221 can be implemented using one or more data stores, databases, computing devices, or the like. In some embodiments, the metadata catalog 221 is implemented using one or more relational databases, such as, but not limited to, Dynamo DB and/or Aurora DB.

As described herein, the metadata catalog 221 can store information about datasets and/or rules used or supported by the data intake and query system 108. Furthermore, the metadata catalog 221 can be used to, among other things, interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the query system 214 can use the metadata catalog 221 to dynamically determine the dataset configurations and rule configurations to be used to execute the query (also referred to herein as the query configuration parameters). In certain embodiments, the query system 214 can use the dynamically determined query configuration parameters to provide a stateless search experience. For example, if the query system 214 determines that search heads 504 are to be used to process a query or if an assigned search head 504 becomes unavailable, the query system 214 can communicate the dynamically determined query configuration parameters (and query to be executed) to another search head 504 without data loss and/or with minimal or reduced time loss.

In the illustrated embodiment, the metadata catalog 221 stores one or more dataset association records 602, one or more dataset configuration records 604, and one or more rule configuration records 606. It will be understood, that the metadata catalog 221 can store more or less information as desired. Although shown in the illustrated embodiment as belonging to different folders or files, it will be understood, that the various dataset association records 602, dataset configuration records 604, and rule configuration records 606 can be stored in the same file, directory, and/or database. For example, in certain embodiments, the metadata catalog 221 can include one or more entries in a database for each dataset association record 602, dataset (or dataset configuration record 604), and/or rule (or rule configuration record 606). Moreover, in certain embodiments, the dataset configuration records 604 and/or the rule configuration records 606 can be included as part of the dataset association records 602.

In some cases, the metadata catalog 221 may not store separate dataset association records 602. Rather the datasets association records 602 shown in FIG. 6 can be considered logical associations between one or more dataset configuration records 604 and/or one or more rule configuration records 606. In some such embodiments, the logical association can be determined based on an identifier or entry of each dataset configuration record 604 and/or rule configuration record 606. For example, the dataset configuration records 604 and rule configuration records 606 that begin with "shared," can be considered part of the "shared" dataset association record 602A (even if separate data structure does not physically or logically exist on a data store) and the dataset configuration records 604 and rule configuration records 606 that begin with "trafficTeam," can be considered part of the "trafficTeam" dataset association record 602N.

In some embodiments, a user can modify the metadata catalog 221 via the gateway 215. For example, the gateway 215 can receive instruction from client device 204 to add/modify/delete dataset association records 602, dataset configuration records 604, and/or rule configuration records 606. The information received via the gateway 215 can be used by the metadata catalog 221 to create, modify, or delete a dataset association record 602, dataset configuration record 604, and/or a rule configuration record 606. However, it will be understood that the metadata catalog 221 can be modified in a variety of ways and/or without using the gateway 215.

In certain embodiments, the metadata catalog 221 can create, modify, or delete a dataset association record 602, dataset configuration record 604, and/or a rule configuration record 606 based on an explicit instruction to do so from a user.

In some embodiments, the metadata catalog 221 can create, modify, or delete a dataset association record 602, dataset configuration record 604, and/or a rule configuration record 606 based on a user's interaction with the system 108 and/or without an explicit instruction. For example, if a user enters a query in a user interface and then instructs the system 108 to execute the query, the metadata catalog 221 can create a dataset configuration record 604 based on the query and/or can add the query as a dataset to a dataset association record 602 (depending on the module that was used or identified when the query was executed). With continued reference to the example, the created dataset configuration record 604 can include the query and indicate that the type of dataset is a query, saved search, or view. In addition, the created dataset configuration record 604 can include authorization information for users that are allowed to use the query or that have access to the datasets referenced by the query, the identity of the user that entered the query, the identity of a group of users with which the user is associated, tenant information, dependency datasets, a job ID corresponding to the job ID created by the system 108 as part of executing the query, results of the query, and/or query results identifier corresponding to the query results (e.g., job ID or other identifier that can be used to identify the query results). More or less information can be determined and added to the dataset association record as desired.

Similarly, if a user enters a query, the metadata catalog 221, can edit the dataset configuration record 604. With continued reference to the example above, if another user enters the same query or the same user executes the query at a later time (with or without prompting by the system 108), the metadata catalog 221 can edit the corresponding dataset configuration 604. For example, the metadata catalog 221 can increment a count for the number of times the query has been used, add information about the users that have used the query, include a job ID, query results, and/or query results identifier, each time the query is executed, etc.

3.8.1. Dataset Association Records

As described herein, the dataset association records 602 can indicate how to refer to one or more datasets (e.g., provide a name or other identifier for the datasets), identify associations or relationships between a particular dataset and one or more rules or other datasets and/or indicate the scope or definition of a dataset. Accordingly, a dataset association record 602 can include or identify one or more datasets 608 and/or rules 610.

In certain embodiments, a dataset association record 602 can provide a mechanism to avoid conflicts in dataset and/or rule identifiers. For example, different dataset association records 602 can use the same name to refer to different datasets, however, the data intake and query system 108 can differentiate the datasets with the same name based on the dataset association record 602 with which the different datasets are associated. Accordingly, in some embodiments, a dataset can be identified using a logical identifier or name and/or a physical identifier or name. The logical identifier may refer to a particular dataset in the context of a particular dataset association record 602. The physical identifier may be used by the metadata catalog 221 and/or the data intake and query system 108 to uniquely identify the dataset from other datasets supported or used by the data intake and query system 108.

In some embodiments, the data intake and query system 108 can determine a physical identifier for a dataset using an identifier of the dataset association record 602 with which the dataset is associated. In some embodiments, the physical name can correspond to a combination of the logical name and the name of the dataset association record 602. In certain embodiments, the data intake and query system 108 can determine the physical name for a dataset by appending the name of the dataset association record 602 to the name of the dataset. For example, if the name of the dataset is "main" and it is associated with or part of the "shared" dataset association record 602, the data intake and query system 108 can generate a physical name for the dataset as "shared.main" or "shared_main" In this way, if another dataset association record 602 "test" includes a "main" dataset, the "main" dataset from the "shared" dataset association record will not conflict with the "main" dataset from the "test" dataset association record (identified as "test.main" or "test_main") It will be understood that a variety of ways can be used to generate or determine a physical name for a dataset. For example, the data intake and query system 108 can concatenate the logical name and the name of the dataset association record 602, use a different identifier, etc.

In some embodiments, the dataset association records 602 can also be used to limit or restrict access to datasets and/or rules. For example, if a user uses one dataset association record 602 they may be unable to access or use datasets and/or rules from another dataset association record 602. In some such embodiments, if a query identifies a dataset association record 602 for use but references datasets or rules of another dataset association record 602, the data intake and query system 108 can indicate an error.

In certain embodiments, datasets and/or rules can be imported from one dataset association record 602 to another dataset association record 602. Importing a dataset and/or rule can enable a dataset association record 602 to use the referenced dataset and/or rule. In certain embodiments, when importing a dataset and/or rule 610, the imported dataset and/or rule 610 can be given a different name for use in the dataset association record 602. For example, a "main" dataset in one dataset association record can be imported to another dataset association record and renamed "traffic."

However, it will be understood that in some embodiments, the imported dataset 608 and/or rule 610 can retain the same name.

Accordingly, in some embodiments, the logical identifier for a dataset can vary depending on the dataset association record 602 used, but the physical identifier for the dataset may not change. For example, if the "main" dataset from the "shared" dataset association record is imported by the "test" dataset association record and renamed as "traffic," the same dataset may be referenced as "main" when using the "shared" dataset association record and may be referenced as "traffic" when using the "test" dataset association record. However, in either case, the data intake and query system 108 can recognize that, regardless of the logical identifier used, both datasets refer to the "shared.main" dataset.

In some embodiments, one or more datasets and/or rules can be imported automatically. For example, consider a scenario where a rule from the "main" dataset association record 602 is imported by the "test" dataset association record and references dataset "users." In such a scenario, even if the dataset "users" is not explicitly imported by the "test" dataset association record 602, the "users" dataset can be imported by the "test" dataset association record 602. In this way, the data intake and query system 108 can reduce the likelihood that an error occurs when an imported dataset and/or rule references a dataset and/or rule that was not explicitly imported.

In certain cases, when a dataset and/or rule is automatically imported, the data intake and query system 108 can provide limited functionality with respect to the automatically imported dataset and/or rule. For example, by explicitly importing a dataset and/or rule, a user may be able to reference the dataset and/or rule in a query, whereas if the dataset and/or rule is automatically imported, a user may not be able to reference the dataset and/or rule the query. However, the data intake and query system 108 may be able to reference the automatically imported dataset and/or rule in order to execute a query without errors.

Datasets of a dataset association record 602 can be associated with a dataset type. A dataset type can be used to differentiate how to interact with the dataset. In some embodiments, datasets of the same type can have similar characteristics or be interacted with in a similar way. For example, index datasets and metrics interactions datasets may be searchable, collection datasets may be searchable via a lookup dataset, view datasets may include query parameters or a query, etc. Non-limiting examples of dataset types include, but are not limited to: index (or partition), view, lookup, collections, metrics interactions, action service, interactions, four hexagonal coordinate systems, etc.

In some cases, the datasets may or may not refer to other datasets. In certain embodiments, a dataset may refer to no other datasets, one other dataset, or multiple datasets. A dataset that does not refer to another dataset may be referred to herein as a non-referential dataset, a dataset that refers to one dataset may be referred to as a single reference dataset, and a dataset that refers to multiple datasets may be referred to as a multi-reference dataset.

In certain embodiments, some datasets can include data of the data intake and query system 108. Some such datasets may also be referred to herein as source datasets. For example, index or partition datasets can include data stored in buckets as described herein. Similarly, collection datasets can include collected data. As yet another example metrics interactions datasets can include metrics data. In some cases, a source dataset may not refer to another dataset or otherwise identified as a non-referential dataset or non-referential source dataset. However, it will be understood that in certain embodiments, a source dataset can be a single reference dataset (or single reference source dataset) and/or a multi-reference dataset (or multi-reference source dataset).

In some embodiments, certain datasets can be used to reference data in a particular source dataset. Some such datasets may be referred to herein as source reference datasets. For example, a source dataset may include certain restrictions that preclude it from making its data searchable generally. In some such cases, a source reference dataset can be used to access the data of the source dataset. For example, a collection dataset may not make its data searchable except via a lookup dataset. As such, the collection dataset may be referred to as a source dataset and the lookup dataset may be referred to as a source reference dataset. In some embodiments, a source reference dataset can correspond to or be paired with a particular source dataset. In certain embodiments, each source reference dataset references only one other (source) dataset. In such embodiments, the source reference dataset can be referred to as a single reference dataset or single source reference dataset. However, it will be understood that source reference datasets can be configured in a variety of ways and/or may reference multiple datasets (and be referred to as a multi-reference dataset or multi-source reference dataset).

In certain embodiments, a dataset can include one or more query parameters. Some such datasets may be referred to as query datasets. For example a view dataset can include a query that identifies a set of data and how to process the set of data and/or one or more query parameters. When referenced, the data intake and query system 108 can incorporate the query parameters of the query dataset into a query to be processed/executed by the query system 214. Similar to a query, a query dataset can reference one dataset (single reference dataset or single reference query dataset) or multiple datasets (multi-reference dataset or multi-reference query dataset) and/or include an instruction to access one or more datasets (e.g., from, lookup, search, etc.). Moreover, the query dataset can include multiple query parameters to process the data from the one or more datasets (e.g., union, stats, count by, sort by, where, etc.)

As mentioned, in some cases, a dataset 608 in a dataset association record 602 can be imported or inherited from another dataset association record 602. In some such cases, if the dataset association record 602 includes an imported dataset 608, it can identify the dataset 608 as an imported dataset and/or it can identify the dataset 608 as having the same dataset type as the corresponding dataset 608 from the other dataset association record 602.

Rules of a dataset association record 602 can identify types of data and one or more actions that are to be performed on the identified types of data. The rule can identify the data in a variety of ways. In some embodiments, the rule can use a field-value pair, index, or other metadata to identify data that is to be processed according to the actions of the rule. For example, a rule can indicate that the data intake and query system 108 is to perform three processes or extraction rules on data from the "main" index dataset (or multiple or all datasets of a dataset association record 602) with a field-value pair "sourcetype:foo." In certain cases, a rule can apply to one or more datasets of a dataset association record 602. In some cases, a rule can apply to all datasets of dataset association record 602. For example, the rule 610A can apply to all datasets of the shared dataset association record 602A or to all index type datasets of the shared dataset association record 602A, etc.

The actions of a rule can indicate a particular process that is to be applied to the data. Similar to dataset types, each action can have an action type. Action of the same type can have a similar characteristic or perform a similar process on the data. Non-limiting examples of action types include regex, aliasing, auto-lookup, and calculated field.

Regex actions can indicate a particular extraction rule that is to be used to extract a particular field value from a field of the identified data. Auto-lookup actions can indicate a particular lookup that is to take place using data extracted from an event to identify related information stored elsewhere. For example, an auto-lookup can indicate that when a UID value is extracted from an event, it is to be compared with a data collection that relates UIDs to usernames to identify the username associated with the UID. Aliasing actions can indicate how to relate fields from different data. For example, one sourcetype may include usernames in a "customer" field and another sourcetype may include usernames in a "user" field. An aliasing action can associate the two field names together or associate both field names with another field name, such as "username." Calculated field actions can indicate how to calculate a field from data in an event. For example, a calculated field may indicate that an average is to be calculated from the various numbers in an event and assigned to the field name "score_avg." It will be understood that additional actions can be used to process or extract information from the data as desired.

In the illustrated embodiment of FIG. 6, two dataset association records 602A, 602N (also referred to herein as dataset association record(s) 602), two dataset configuration records 604A, 604N (also referred to herein as dataset configuration record(s) 604), and two rule configuration records 606A, 606N (also referred to herein as rule configuration record(s) 606) are shown. However, it will be understood that fewer or more dataset association records 602 dataset configuration records 604, and/or rule definitions 606 can be included in the metadata catalog 221.

As mentioned, each dataset association record 602 can include a name (or other identifier) for the dataset association record 602, an identification of one or more datasets 608 associated with the dataset association record 602, and one or more rules 610. As described herein, the datasets 608 of a dataset association record 602 can be native to the dataset association record 602 or imported from another dataset association record 602. Similarly, rules of a dataset association record 602 can be native to the dataset association record 602 and/or imported from another dataset association record 602.

In the illustrated embodiment, the name of the dataset association record 602A is "shared" and includes the "main" dataset 608A, "metrics" dataset 608B, "users" dataset 608C, and "users-col" dataset 608D. In addition, the "main" dataset 608A and "metrics" dataset 608B are index datasets, the "users" dataset 608C is a lookup dataset associated with the collection "users-col" dataset 608D. Moreover, in the illustrated embodiment, the "main" dataset 608A, "metrics" dataset 608B, and "users-col" dataset 608D are non-referential source datasets and the "users" dataset 608C is a source reference dataset (and single reference dataset) that references the "users-col" dataset 608D.

In addition, in the illustrated embodiment, the dataset association record 602A includes the "X" rule 610A associated with the "main" dataset 608A and "metrics" dataset 608B. The "X" rule 610A uses a field-value pair "sourcetype:foo" to identify data that is to be processed according to an "auto lookup" action 612A, "regex" action 612B, and "aliasing" action 612C. Accordingly, in some embodiments, when data from the "main" dataset 608A is accessed, the actions 612A, 612B, 612C of the "X" rule 610A are applied to data of the sourcetype "foo."

Similar to the dataset association record 602A, the dataset association record 602N includes a name ("trafficTeam") and various native index datasets 608E, 608F ("main" and "metrics," respectively), a collection dataset 608G ("threats-col") and a lookup dataset 608H ("threats"), and a native rule 610C ("Y"). In addition, the dataset association record 602 includes a view dataset 608I ("threats-encountered"). The "threats-encountered" dataset 608I includes a query (shown in the dataset configuration record 604N) "|from traffic| lookup threats sig OUTPUT threat|where threat=*.. stats count by threat" that references two other datasets 608J, 608H ("traffic" and "threats"). Thus, when the "threats-encountered" dataset 608I is referenced, the data intake and query system 108 can process and execute the identified query. Moreover, in the illustrated embodiment, the "main" dataset 608E, "metrics" dataset 608E, and "threats-col" dataset 608G are non-referential source datasets, the "threats" dataset 608H is a single source reference dataset (source reference and single reference dataset) that references the "threats-col" dataset 608G, and the "threats-encountered dataset" 608I is a multi-reference query dataset.

The dataset association record 602N also includes an imported "traffic" dataset 608J and an imported "shared.X" rule 610B. In the illustrated embodiment, the "traffic" dataset 608J corresponds to the "main" dataset 608A from the "shared" dataset association record 602A. As described herein, in some embodiments, to associate the "main" dataset 608A (from the "shared" dataset association record 602A) with the "traffic" dataset 608J (from the "trafficTeam" dataset association record 602N), the name of the dataset association record 602A ("shared") is placed in front of the name of the dataset 608A ("main") However it will be understood that a variety of ways can be used to associate a dataset 608 from one dataset association record 602 with the dataset 608 from another dataset association record 602. As described herein, by importing the dataset "main" dataset 608A, a user using the dataset association record 602 and can reference the "main" dataset 608A and/or access the data in the "main" dataset 608A.

Similar to the "main" dataset 608A, the "X" rule 610A is also imported by the "trafficTeam" dataset association record 602N as the "shared.X" rule 610B. As described herein, by importing "X" rule 610A, a user using the "trafficTeam" dataset association record 602N can use the "X" rule 610A. Furthermore, in some embodiments, if the "X" rule 610A (or a dataset) references other datasets, such as, the "users" dataset 608C and the "users-col" dataset 608D, these datasets can be automatically imported by the "trafficTeam" dataset association record 602N. However, a user may not be able to reference these automatically imported rules (datasets) in a query.

3.8.2. Dataset Configuration Records

The dataset configuration records 604 can include the configuration and/or access information for the datasets associated with the dataset association records 602 or otherwise used or supported by the data intake and query system 108. In certain embodiments, the metadata catalog 221 includes the dataset configuration records 604 for all of the datasets 608 used or supported by the data intake and query system 108 in one or more files or entries. In some embodiments, the metadata catalog 221 includes a separate file, record, or entry for each dataset 608 or dataset configuration record 604.

The dataset configuration record 604 for each dataset 608 can identify a physical and/or logical name for the dataset, a dataset type, authorization information indicating users or credentials that have to access the dataset, access information (e.g., IP address, end point, indexer information), and/or location information (e.g., physical location of data) to enable access to the data of the dataset, etc. Furthermore, depending on the dataset type, each dataset configuration record 604 can indicate custom fields or characteristics associated with the dataset. In some embodiments, index, metrics, lookup, and collection datasets may include location information, while view datasets do not. For example, in some cases view datasets may not have data except that which is access via an index, metrics, lookup, and collection datasets. Accordingly, the content and information for the dataset association records 602 can vary depending on the dataset type.

In the illustrated embodiment, the "shared.main" dataset configuration record 604A for the "shared.main" dataset 608A indicates that it is an index data type, and includes authorization information indicating the entities that have access to the "shared.main" dataset 608A, access information that enables the data intake and query system 108 to access the data of the "shared.main" dataset 608A, and location information that indicates the location where the data is located. In some cases, the location information and access information can overlap or be combined. In addition, the dataset configuration record 604A includes a retention period indicating the length of time in which data associated with the "shared.main" dataset 608A is to be retained by the data intake and query system 108. In some embodiments, because "shared.main" is imported into the "trafficTeam" dataset association record 602N as the dataset "traffic," it may also be identified as the "trafficTeam.traffic" dataset 608J. Accordingly, in some such embodiments, the dataset configuration record 604A may include an additional identifier for "trafficTeam.traffic" or as is shown in the illustrated embodiment, it may indicate that the "trafficTeam.traffic" dataset is a dependent dataset.

Similarly, in the illustrated embodiment, the "trafficTeam.threats-encountered" dataset configuration record 604N for the "trafficTeam.threats-encountered" dataset 608I indicates that it is a view type of dataset and includes authorization information indicating the entities that have access to it. In addition, the dataset configuration record 604N includes the query for the "trafficTeam.threats-encountered" dataset 608I.

The dataset configuration record 604 can also include additional information or metadata (also referred to herein as annotations). The annotations can correspond to user annotations added by a user or to system annotations that are automatically generated by the system.

In the illustrated embodiment of FIG. 6, the dataset configuration record 604A includes a system annotation 614 that indicates the number of identified fields of the "shared.main" dataset (4), a system annotations 616 that identify the fields of the "shared.main" dataset (sig, IP_addr, userID, error), and a system annotation 618 that identifies the datasets that depend on the "shared.main" dataset ("trafficTeam.traffic" and "trafficTeam.threats-encountered"). In the illustrated embodiment, the dependent datasets annotation 618 includes reference to the "trafficTeam.traffic" dataset 608J even though it is only an identifier to import the "shared.main" dataset to the dataset association record 602N. However, in some embodiments, datasets that only import another dataset or are merely identifiers for another dataset may not be identified as dependent datasets and/or may not be included as part of a system annotation.

With further reference to the illustrated embodiment of FIG. 6, the dataset configuration record 604N includes a user annotation 620 that identifies a group associated with the dataset "trafficTeam.threats-encountered" 608I (also referred to herein as "threats-encountered"). This annotation can be used by the system to determine which group is responsible for the dataset 602N and/or should be charged for its use. The dataset configuration record 604N also includes a system annotation 622 that identifies the datasets on which the "threats-encountered" dataset depends ("trafficTeam.traffic," which is also "shared.main" and "trafficTeam.threats"), and a system annotation 624 that identifies the number of times the "threats-encountered" dataset 608I has been used and/or accessed. In some embodiments, because trafficTeam.traffic merely imports "shared.main" it may not be considered a related dataset or may be omitted from the dependency dataset annotation 622.

In some embodiments, the data intake and query system 108 (e.g., the query system 214) creates a job ID each time a query is run or executed (e.g., each time a dataset is used or accessed). The job ID may reference a specific query run at a specific time, or in reference to a specific time, and point to results of the query. The data intake and query system 108 (e.g., the query system 214) can store the job ID in a dataset configuration record that includes the query that is run. In general, a dataset configuration record associated with a dataset that is of the type "savedsearch/view" or any other type on which a query can be run includes at least one job ID once the query included in dataset configuration record is run at least once. For example, the query included in a dataset configuration record can be run one or more times. The dataset configuration record can include the job ID for the most recent query that is run, the job ID for the first query that is run, the job IDs for some, but not all, of the queries that are run, the job IDs for all of the queries that are run, and/or any combination thereof. With further reference to the illustrated embodiment of FIG. 6, the system annotation 624 indicates that the "trafficTeam.threats-encountered" dataset 608I has been used and/or accessed 30 times. Thus, the query included in the dataset configuration record 604N may have been run 30 times. In the illustrated embodiment, the dataset configuration record 604N includes a system annotation 626 that identifies a job ID ("F341A5") of the most recent query that is run on the "trafficTeam.threats-encountered" dataset 608I. In other embodiments not illustrated, however, the dataset configuration record 604N can include a system annotation 626 that identifies the job ID of the first query that is run on the "trafficTeam.threats-encountered" dataset 608I, job IDs of some, but not all, of the queries run on the "trafficTeam.threats-encountered" dataset 608I, job IDs of all of the queries run on the "trafficTeam.threats-encountered" dataset 608I, and/or any combination thereof.

In some embodiments, the data intake and query system 108 (e.g., the query system 214) includes in a dataset configuration record not only some or all of the job IDs of a query that is run or executed, but also the results of each executed query that has a job ID present in the dataset configuration record. With further reference to the illustrated embodiment of FIG. 6, the dataset configuration record 604N includes a system annotation 628 that identifies the results of the query associated with the job ID identified by the system annotation 626 ("F341A5"). For example, the most recent results of running the dataset configuration record 604N query on the "trafficTeam.threats-encountered"

dataset 608I can be a count of 2 for "threat1," a count of 5 for "threat2," and so on. In other embodiments not illustrated, the dataset configuration record 604N can include the query result of the first query that is run on the "trafficTeam.threats-encountered" dataset 608I, the query results of some, but not all, of the queries that are run on the "trafficTeam.threats-encountered" dataset 608I, the query results of all of the queries that are run on the "trafficTeam.threats-encountered" dataset 608I, and/or any combination thereof. For example, if the dataset configuration record 604N includes one or more system annotations 626 identifying multiple job IDs, then the dataset configuration record 604N may also include one or more system annotations 628 identifying the results of each job ID identified by the system annotation(s) 626. The query results can be represented in a JSON format, as a table, or in some other format, as desired.

In addition to the job ID and query results, a dataset configuration record can store additional information related to a query, such as, but not limited to, the user that executed a query, the tenant associated with the query, the time the query was executed, or the time the job ID was created, etc. The system 108 can use this information to generate statistical information about different queries and/or provide recommendations to users. For example, the system 108 can provide query recommendations based on the most frequently used queries generally or by the user, or users from the same tenant, users with similar administrative privileges or access controls, etc.

It will be understood that fewer or more annotations can be included in the dataset configuration record 604N. For example, the dataset configuration record 604N can include the identity and number of fields used by the "threats-encountered" dataset.

It will be understood that more or less information or annotations can be included in each dataset configuration record 604. For example, the dataset configuration records 604 can indicate whether the dataset is a non-referential, single reference or multi-reference dataset and/or identify any datasets that it references (by the physical or logical identifier of the datasets or other mechanism), is dependent on or that depend on it, its usage, etc. As another example, the dataset configuration records 604 can identify one or more rules associated with the dataset. Additional information regarding example annotations that can be generated and/or included in dataset configuration records 604 or in the metadata catalog 221 are described herein.

Although not illustrated in FIG. 6, it will be understood that the metadata catalog 221 can include a separate dataset configuration record 604 for the datasets 608B, 608C, 608D, 608E, 608F, 608G, 608H, and 608J. Furthermore, it will be understood that the metadata catalog 221 can include data from multiple tenants. In some cases, the data (e.g., dataset association records, dataset configuration records, and/or rule configuration records, etc.) from different tenants can be logically and/or physically segregated within the metadata catalog 221.

In some embodiments, some datasets may not have a separate dataset configuration record 604. For example, imported datasets and/or view datasets may not include a separate dataset configuration record 604. In certain embodiments, view datasets can include a query identified in a dataset association record 602, but may not have a separate dataset configuration record 604 like index, metrics, collection, and/or lookup datasets.

In some embodiments, the dataset configuration record 604 for the "traffic" dataset 608J (or other imported datasets) can indicate that the "traffic" dataset 608J is an imported version of the "shared.main" dataset 608A. In certain cases, the dataset configuration record 604 for the "traffic" dataset 608J can include a reference to the dataset configuration record 604 for the "shared.main" dataset 608A and/or can include all of the configuration information for the "shared.main" dataset 608A. In certain embodiments, the metadata catalog 221 may omit a separate dataset configuration record 604 for the "traffic" dataset 608J because that dataset is an imported dataset of the "main" dataset 608A from the "share" dataset association record 602A.

As described herein, although the dataset association records 602A, 602N each include a "main" dataset 608B, 608E and a "metrics" dataset 608B, 608F, the data intake and query system 108 can differentiate between the datasets from the different dataset association records based on the dataset association record 602 associated with the datasets. For example, the metadata catalog 221 can include separate dataset configuration records 604 for the "shared.main" dataset 608A, "trafficTeam main" dataset 608E, "shared.metrics" dataset 608B, and the "trafficTeam.metrics" dataset 608F.

3.8.3. Rule Configuration Records

The rule configuration records 606 can include the rules, actions, and instructions for executing the rules and actions for the rules referenced of the dataset association records 602 or otherwise used or supported by the data intake and query system 108. In some embodiments, the metadata catalog 221 includes a separate file or entry for each rule configuration record 606. In certain embodiments, the metadata catalog 221 includes the rule configuration records 606 for all of the rules 610 in one or more files or entries.

In the illustrated embodiment, a rule configuration records 606N is shown for the "shared.X" rule 610A. The rule configuration record 606N can include the specific parameters and instructions for the "shared.X" rule 610A. For example, the rule configuration record 606N can identify the data that satisfies the rule (sourcetype:foo of the "main" dataset 608A). In addition, the rule configuration record 606N can include the specific parameters and instructions for the actions associated with the rule. For example, for the "regex" action 612B, the rule configuration record 606N can indicate how to parse data with a sourcetype "foo" to identify a field value for a "customerID" field, etc. With continued reference to the example, for the "aliasing" action 612C, the rule configuration record 606N can indicate that the "customerID" field corresponds to a "userNumber" field in data with a sourcetype "roo." Similarly, for the "auto-lookup" action 612A, the rule configuration record 606N can indicate that the field value for the "customerID" field can be used to lookup a customer name using the "users" dataset 608C and "users-col" dataset 608D.

It will be understood that more or less information can be included in each rule configuration record 606. For example, the rule configuration records 606 can identify the datasets or dataset association records 602 to which the rule applies, indicate whether a rule is imported, indicate include authorizations and/or access information to use the rule, etc.

Similar to the dataset configuration records 604, the metadata catalog 221 can include rule configuration records 606 for the various rules 610 of the dataset association record 602 or other rules supported for use by the data intake and query system 108. For example, the metadata catalog 221 can include rule configuration record 606 for the "shared.X" rule 610A and the "trafficTeam.Y" rule 610C.

As described herein, the dataset association records 602, dataset configuration records 604, and/or rule configuration records 606 can be used by the system 108 to interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the dataset association records 602, dataset configuration records 604, and/or rule configuration records 606 can be used to identify primary datasets and secondary datasets. The primary datasets can include datasets that are to be used to execute the query. The secondary datasets can correspond to datasets that are directly or indirectly referenced by the query but are not used to execute the query. Similarly, the dataset association records 602, dataset configuration records 604, and/or rule configuration records 606 can be used to identify rules (or primary rules) that are to be used to execute the query.

3.8.4. Annotations

In some embodiments, the system 108 stores data without type or as unstructured data. Thus, the system 108 may not "know" or have insight (e.g., include a table or other stored information) into the content of the data. For example, the system 108 may not have any insight into what fields (e.g., IP address, error code, userID, etc.) can be found in which datasets or what rules are related to what datasets. While it may be advantageous for a variety of reasons to store data without type or as unstructured data and use late binding schema to query the data, this can result in longer query times and the use of greater processing resources during query processing and execution. To decrease query times and/or processing resources used during a query, the system 108 can dynamically add information or metadata (also referred to herein as annotations) to the metadata catalog as it is learned.

In some embodiments, the annotations can be added to the dataset configuration records 604, the rule configuration records 606 or as a separate annotation entry in the metadata catalog 221, or elsewhere in the system 108. For example, as changes are made to the metadata catalog 221 or as queries are executed on the data, the system 108 can infer information or learn about the datasets and rules and update the dataset configuration records 604 and rule configuration records 606 with this information. In the illustrated embodiment of FIG. 6, dynamically generated annotations 614, 616, 618, 622, 624 are included as part of the dataset configuration records 604A, 604N. However, as mentioned, the annotations can be stored as a separate entry or data structure. For example, the system 108 can update or create an annotation entry for each annotation and store the annotations in a database, such as a relational database or table of the metadata catalog 221, or elsewhere in the system 108. When stored in a separate data structure, the annotations can identify any datasets or fields to which they are associated or related.

The updated datasets configuration records 604 (or annotation entries) can be used by the system 108 to propagate annotations to related datasets, protect datasets from deletion, improve portability, and make recommendations to a user and/or process additional queries as they are received, etc. In this way, the system 108 can provide an incrementally evolving schema or map of the data and can enable more efficient queries and/or reduce the amount of processing resources used during query execution.

3.8.4.1. Generating Annotations

In some cases, the annotations can be added to the metadata catalog 221 (in dataset configuration records 604 or as annotation entries) manually by a user or automatically by the system 108.

It will be understood that a user can manually add a variety of annotations (also referred to herein as "user annotations") to the metadata catalog 221, which can be used by the system 108 to dynamically make user recommendations, improve query processing, and/or search time. For example, a user can add or revise a dataset configuration record 604 to the metadata catalog 221 for a dataset. As part of adding/revising the dataset configuration record, the user can add annotations about the capabilities of the dataset source associated with the dataset (e.g., speed, bandwidth, parallelization, size, etc.), one or more fields of the dataset and one or more relationships between the fields, one or more datasets related to the new/revised dataset, users or groups associated with the dataset, units or preferred units for data from the dataset, etc.

In certain embodiments, the annotations can be added automatically by the system 108 in response to monitoring system 108 use and/or based on detected changes to the metadata catalog 221 (also referred to herein as "system annotations"). To generate the various system annotations, the system 108 can use one or more processes, threads, containers, isolated execution environments, etc. (generically referred to as processes). In some cases, the system 108 can use multiple processes to generate system annotations. For example, a separate process can be used to generate annotations based on parsing a query, monitoring query execution, monitoring user/groups, monitoring applications, etc. Similarly, separate processes can be used to generate annotations based on detected changes to the metadata catalog 221. For example, separate processes can be used to generate annotations in response to detecting the addition or removal of a field, dataset, unit or preferred unit, field-dataset relationship, inter-field relationship, inter-dataset relationship, etc.

Moreover, the various processes can communicate with each other to generate the system annotations. For example, consider the scenario where one process is used to generate annotations based on parsing a query and another process is used to generate annotations based on the identification of a new field or new field-dataset relationship in the metadata catalog 221. If the process that parses the query identifies and generates an annotation based on a new field for a dataset, it can alert the process that generates annotations based on new fields added to the dataset. In this way, the system 108 can effectively increase its knowledge or understanding of the data stored thereon, and use this understanding to facilitate more effective searching of the data.

3.8.4.1.1. System Annotations Based on System Use

A variety of system annotations can be generated based on monitoring system use. As non-limiting examples, system annotations can be automatically added to the metadata catalog 221 in response to parsing a query, executing a query, tracking user interactions with the system 108, tracking the use of different applications executing in the system 108, or other system use monitoring, etc.

The system annotations generated based on monitoring system use can be used for a variety of functions. For example, the system annotations generated based on monitoring system use can be used to track field use, dataset use, suggest fields or datasets to a user (e.g., frequently/infrequently used fields or datasets, related fields or datasets, similar fields or datasets, datasets that satisfy the criteria of another dataset, such as datasets that satisfy the field criteria of a view dataset, etc.), display similar datasets, suggest applications, identify groups or individuals responsible for the use of a particular dataset (e.g., determine charge back distribution), cost-based optimizations (e.g., when querying data from multiple datasets, how to prioritize which dataset to obtain first), propagate annotations to related datasets or fields, etc.

3.8.4.1.1.1. Query Parsing

In some cases, the system 108 can parse and extract metadata from queries to generate system annotations. The queries can correspond to queries entered by a user in a user interface or queries that form part of a dataset, such as a view dataset.

In some embodiments, the system 108 can use the syntax and semantics of a query to extract metadata from the query. For example, based on the known syntax of a query processing language, the system 108 can identify query commands and locations where information can be extracted, such as dataset names or identifiers, field names or identifiers, etc. Based on the syntax and semantics of the query, the system 108 can identify relationships between the datasets and fields of the query. Furthermore, the system 108 can iteratively parse the identified datasets to identify additional datasets, fields, relationships, etc. For example, the system 108 can use the dataset identifiers to identify and parse the corresponding dataset configuration records 604 to identify additional datasets, fields, and/or rules.

As a non-limiting example, with reference to the query "|from traffic|lookup threats sig OUTPUT threat|where threat=*|stats count by threat" of the "threats-encountered" dataset 602N, the system 108 can, based on a knowledge of the commands for the query language used, determine that "from," "lookup," "OUTPUT," "where," "stats," and "count by" are query commands. In addition, the system 108 can, based on the known syntax or semantics of the query language, determine that the words following the "from," and "lookup" commands are dataset names or identifiers and the words following "where," "stats," "count by," and "OUTPUT" are field names or identifiers. Similarly, the system 108 can determine that the second word following the "lookup" command is a field name or identifier. Accordingly, the system 108 can determine that the "threats-encountered" dataset 602N references datasets "trafficTeam.traffic" and "trafficTeam.threats" and fields "threat" and "sig." In addition, based on the dataset association records 602 or a dataset configuration record 604, the system 108 can determine that "trafficTeam.traffic" is the "shared.main" dataset imported from the dataset association record 602A.

In addition to identifying the identity of datasets and fields of the query, the system 108 can extract other metadata from the query, such as, but not limited to, field-dataset relationships, inter-dataset relationships, inter-field relationships, etc. In certain embodiments, the system 108 can identify relationships between the fields and datasets of the query. For example, based on the presence and placement of the field names "sig" and "threat" in the query, the system 108 can determine that the dataset "trafficTeam.traffic" (and "shared.main") includes a field "sig," and the dataset "trafficTeam.threats" includes the fields "sig" and "threat."

In some embodiments, the system 108 can determine inter-field relationships. For example, given that the field "sig" is included in both "trafficTeam.traffic" and "trafficTeam.threats," the system 108 can determine that there is a relationship between "sig" in "trafficTeam.traffic" (or "shared.main") and "sig" in "trafficTeam.threats" (e.g., that the two "sigs" correspond to each other).

Moreover, in some cases, the system 108 can determine inter-dataset relationships. In some embodiments, based on the presence of the "trafficTeam.traffic" and "trafficTeam.threats" datasets in the query of the "threats-encountered" dataset 602N, the system 108 can determine that the "threats-encountered" dataset 602N is related to and dependent on the "trafficTeam.traffic" and "trafficTeam.threats" datasets. For example, if the datasets "traffic" and "threats" do not exist or are not defined, the "threats-encountered" dataset may return an error or be unable to function properly. In addition, the system 108 can identify a relationship between the "traffic" and "threats" datasets. For example, given that the "traffic" and "threats" datasets both have the same field "sig," the system 108 can identify a foreign key relationship between them—similar to the inter-field relationship discussed above.

As additional datasets are identified, the system 108 can parse the corresponding dataset configuration records 604 to identify additional relationships. For example, the system 108 can determine that the "trafficTeam.threats" dataset is dependent on a "trafficTeam.threats-col" dataset, and that the "trafficTeam.traffic" (or "shared.main" dataset) is related to a rule "X," which is dependent on dataset "shared.users," which in turn depends on a dataset "shared.users-col." Accordingly, the system 108 can iteratively parse the dataset configurations to determine the relationships between the various rules and datasets of the system 108. Another non-limiting example of parsing a query and extracting information about the datasets and rules referenced by the query is given with reference to FIG. 10.

Based on the extracted metadata of the query (e.g., identity of fields and datasets, field-dataset relationships, inter-field relationships, inter-dataset relationships, etc.), the system 108 can generate one or more annotations. In some embodiments, the system 108 can generate an annotation for each piece of extracted metadata and/or each identified relationship. In certain embodiments, the system 108 can generate one or more annotations for any one or any combination of the identified fields and datasets, the identified field-dataset relationships, the identified inter-field relationships, and/or the identified inter-dataset relationships, etc.

As described herein, the annotations generated from the extracted metadata of the query can be used to track field use, dataset use, suggest fields or datasets to a user (e.g., frequently/infrequently used fields or datasets, related fields or datasets, similar fields or datasets, datasets that satisfy the criteria of another dataset, such as datasets that satisfy the field criteria of a view dataset, etc.), display similar datasets, suggest applications, identify groups or individuals responsible for the use of a particular dataset (e.g., determine charge back distribution), propagate annotations to related datasets or fields, etc.

3.8.4.1.1.2. Query Execution

In some embodiments, the system 108 can monitor system use during query execution. For example, during query execution, the system 108 can track which dataset is being accessed, the amount of data of the dataset being retrieved from a dataset source (e.g., the total number of data entries being retrieved, the number of data entries by field that are retrieved, the total amount of data being retrieved, etc.), the amount of processing resources used to retrieve data from the dataset source, the amount of time taken to obtain the data from the dataset source, the speed at which data is retrieved from the dataset source, whether a dataset source supports parallelization (e.g., whether the system 108 can extract data from the dataset source in parallel or serially), etc.

Based on the information that is tracked during query execution, the system 108 can generate one or more annotations. For example, based on the information, the system 108 can generate or update annotations about the speed and size of a dataset or dataset source (e.g., the number of data entries in the dataset, the number of data entries for each known field of the dataset, total size of the dataset or dataset source, etc.), the connectivity or latency with a dataset source, etc. In some embodiments, the system 108 can generate an annotation for each statistic that is monitored or generate an annotation for a group or all of the statistics being tracked. As described herein, the annotations can be stored as part of a dataset configuration record 604 or other annotation entry.

The annotations generated based on monitoring the system 108 during query execution can be used to track the speed and size of datasets and the capabilities of dataset sources. The system 108 can further use this information to generate cost-based optimizations during query execution. Consider the scenario where a query indicates that data from dataset A and dataset B are to be joined. The system 108 can use the annotations generated from monitoring the system 108 during query execution to determine which dataset to access first. For example, the annotations may indicate that for field 1, dataset A has significantly more data entries or is slower than dataset B. Thus, if the query includes a join of field 1, the system 108 can access dataset B first and use the information from dataset B to refine the data that is requested from dataset A. As another example, if another query indicates that field 2 of datasets A and B are to be used for a join and the annotations indicate that dataset B has significantly more data entries than dataset A, the system 108 can pull data from dataset A first and use it to refine the query for dataset B. Furthermore, the system 108 can use a combination of annotations to determine which dataset to access first. For example, if dataset B has significantly more data for field 3 than dataset A, but dataset A is significantly slower, the system 108 may determine that it will take less time and be more efficient to pull data from dataset B first and use that to refine the query for dataset A.

3.8.4.1.1.3. User Monitoring

In some embodiments, the system 108 can monitor users as they interact with the system 108. For example, the system 108 can monitor which users use the system 108, the duration of use, the frequency of use, which datasets are created, accessed, modified, or used by the user, which applications are used by the user, typical fields that are used by the user, etc. Similarly, if a user is part of a group, the system 108 can monitor the collective actions of the users of the group. This information can be used to generate user/group annotations. As described herein, the annotations can be stored as part of a dataset configuration record 604 or other annotation entry.

The system 108 can use the user/group annotations to track usage of the system 108 by user or group. Furthermore, the system 108 can use the user/group annotations to suggest fields, datasets, applications, etc. to the user or the group. For example, the system 108 can identify fields or datasets that are related to or similar to fields or datasets typically used by the user. As another example, if users with similar characteristics to the current user use certain fields, applications, or datasets, the system 108 can recommend these fields, application, or datasets to the user, etc. In this way, the system 108 can improve the users understanding of the data in the system 108 and enhance the user's ability to user or query data in the system.

3.8.4.1.1.4. Application Monitoring

In certain embodiments, the system can monitor applications used on the system 108. For example, the system 108 can monitor which applications are available on the system 108, which datasets or dataset sources are used by the application, the frequency of use of applications, an identification of applications that are frequently used together, an identity of users or user types that use particular applications, etc. This information can be used to generate annotations.

The system 108 can use the annotations generated by monitoring applications to track the usage of the applications and to make suggestions to users. For example, if multiple users of a group frequently use one or more applications, the system 108 can recommend the applications to other users of the group. As another example, if one user of a group begins using and spends significant time on one application compared to time spent on other applications before beginning use of the "new" application, the system 108 can recommend the "new" application to other members of the group. In this way, the system 108 can propagate knowledge about the system 108 and applications to various users and improve their understanding of the system 108 and how to use it effectively.

3.8.4.1.2. System Annotations Based on Changes to the Metadata Catalog

As mentioned, in some embodiments, system 108 annotations can be added automatically to the metadata catalog 221 in response to changes in the metadata catalog 221. The changes may be the result of a manual change by a user, such as a user annotation, or an automated change by the system 108, such as a system 108 annotation. For example, when a user adds or revises information about a first dataset, the system 108 can compare information about the first dataset with other information of other datasets to identify potential relationships or similarities. If a relationship or similarity is detected, the system 108 can add an annotation to the dataset configuration record 604 (or annotation entry) of the first dataset as well as to the dataset configuration records 604 of the other identified datasets. As another example, if the system 108 updates information for the first dataset based on a query, the system 108 can identify other datasets that are related to the first dataset and update metadata of the other identified datasets. In this way, as the system 108 is used, it can learn about the datasets, and use the information to improve search time or search capabilities. As described herein, in some cases, the system 108 can use one or more processes to identify the change to the metadata catalog 221 and generate additional annotations based on the change.

In some embodiments, based on the addition of a dataset, the system 108 can identify fields of the dataset, related datasets (datasets on which the dataset depends), similar datasets (e.g., datasets with similar fields), dataset to which the new dataset can be mapped (e.g., view datasets to which the new dataset can be mapped), etc. In certain embodiments, if the added dataset is a view dataset that includes a query, the system 108 can process the query as described above to generate one or more annotations.

In certain embodiments, based on the addition of a field-dataset relationship annotation or the identification of a field of a dataset, the system 108 can determine a total number of fields of the dataset, identify similar datasets and/or datasets to which the dataset can be mapped, and generate corresponding annotations. For example, based on the addition of the field "userID" to the dataset "Logons," the system 108 can identify other datasets with a "userID" field. If found, the system 108 can generate an annotation for the dataset "Logons" and/or the other dataset to indicate a similar field is located in each dataset. As another example, based on the addition of the field "userID" to the dataset "Logons," the system 108 can identify view datasets that use the field "userID" to generate a view or interface. If the view dataset uses additional fields that are also found in the "Logons" dataset, the system 108 can generate an annotation for the dataset "Logons" and/or the other dataset to indicate that the view dataset may be related or usable with the "Logons" dataset or that the "Logon" dataset may be mapped to the view dataset.

In certain embodiments, based on the addition of an inter-field relationship or inter-dataset annotation, the system 108 can identify additional inter-field and inter-dataset relationships. For example if dataset A is dependent on dataset B and dataset B is dependent on dataset C, the system 108 can determine that dataset A is dependent on dataset B and generate an additional inter-dataset annotation indicating A's dependency on C. As another example, if field "userID" of dataset B is related to field "ID" of dataset C and a new relationship between field "ID" of dataset C and field "UID" of dataset D, the system 108 can determine that "userID" of dataset B is related to "UID" of dataset D.

In addition, based on the addition of an inter-dataset annotation, the system 108 can propagate one or more annotations. For example, if an alarm threshold, unit, or preferred unit is associated with a metrics dataset A and an inter-dataset relationship annotation is added that relates metrics dataset A with metrics dataset B, the system 108 can propagate the alarm threshold, unit, and/or preferred unit to metrics dataset B. Specifically, if an annotation for metric cpu_speed of dataset A indicates that the units are Hz and the preferred units are GHz, the system 108 can propagate the Hz and GHz units/preferred units to a corresponding cpu_speed metric of dataset B. Similarly, if a data category annotation for a dataset or field of a dataset indicates that the information is confidential, then based on an inter-field relationship that indicates another field is derived from the confidential field or an inter-dataset relationship that indicates another dataset uses the confidential information, the system 108 can propagate the data category annotation to the related field or dataset.

In some embodiments, based on the addition of an inter-dataset annotation, the system 108 can generate an annotation indicating that the dataset that is depended on should not be deleted so long as the dependent dataset exists or an annotation indicating that if the dataset that is depended on is deleted then the dependent dataset should also be deleted. The system can also use an inter-dataset annotation to generate an annotation that indicates the total number (and identity) of datasets that depend on a particular dataset, or the total number (and identity) of datasets on which the particular dataset depends.

In certain embodiments, based on an update to the field use for a field, the system 108 can compare the field use of the field with the field use of other fields and determine the popularity of the fields. Based on the popularity, the system 108 can generate one or more annotations indicating the popularity of the fields. Similarly, the system 108 can use the dataset use and application use to generate annotations indicating the popularity of different datasets and applications, respectively. In addition, using the user or group information, the system 108 can determine the popularity of fields, datasets, and/or applications for a particular user or group.

In certain embodiments, based on a change/addition of a unit or preferred unit for a dataset, the system 108 can identify related datasets and generate annotations for the units and preferred units for the related datasets. Similarly, the system 108 can generate annotations for one or more datasets or fields in response to change/additions of alarm thresholds or data category (e.g., use restrictions) annotations to a related dataset or field.

3.8.4.2. Example Annotations

As mentioned, the metadata catalog 221 can include annotations or information about the datasets, fields, users, or applications of the system 108 and can be revised as additional information is learned. Non-limiting examples of annotations that can be added to the dataset configuration records 604, other configurations, annotation tables or entries, or other locations of the metadata catalog 221 or system 108, include but are not limited to, the identification and use of fields in a dataset, number of fields in a dataset, related fields, related datasets, number (and identity) of dependent datasets, number (and identity) of datasets depended on, capabilities of a dataset or related dataset source or provider, the identification of datasets with similar configurations or fields, units or preferred units of data obtained from a dataset, alarm thresholds, data categories (e.g., restrictions), users or groups, applications, popular field, datasets, and applications (in total or by user or group), etc. In certain cases, the annotations can be added as the system 108 monitors system use (e.g., processing queries, monitoring query execution, user interaction, etc.) or as the system 108 detects changes to the metadata catalog 221 (e.g., one manual/automated change can lead to another automated change), etc.

3.8.4.2.1. Field Annotations

The metadata catalog 221 can store various annotations about the fields found in datasets. For example, the metadata catalog 221 can include an identification of the dataset associated with a field (or field-dataset relationship), the number of fields of a dataset (or field count), an identification of all fields of a dataset, the frequency of use of the different fields, users of the field, etc. As described herein, the information about the fields of a dataset can be stored as part of a dataset configuration record 604 or as part of a separate data structure. When stored as a separate data structure, the data structure can identify the datasets that include the field or are otherwise associated with or related to the field.

The number and identity of fields of a dataset can be identified in a variety of ways. In some cases, a user can manually include or add a field to the metadata catalog 221 (e.g., the dataset configuration record 604 or an annotation entry). For example, the user may add or relate a regex rule to a dataset. The regex rule can define how to extract field values for the field from the dataset. Based on the information in the regex rule, the system 108 can identify the field and increment the number of fields associated with the dataset.

In some embodiments, the system 108 can parse a query to identify fields of a dataset. As described herein, in parsing the query, the system 108 can identify phrases or use the syntax of the query to identify (and count the number of) fields. For example, with reference to the query "|from traffic|lookup threats sig OUTPUT threat|where threat=*|stats count by threat." of threats-encountered dataset 602N, the system 108 can, based on the query language used, identify "from" and "lookup" as commands and determine that the words after "from" and "lookup," respectively, identify a dataset and the words after "threats" and "OUTPUT," respectively, identify a field. Accordingly, the system 108 can infer that the dataset "traffic" has a field "sig" and a dataset "threats" has fields "sig" and "threat." In some embodiments, based on this inference, the system 108 can update the dataset configuration record 604 of the dataset "traffic" or generate a field-dataset relationship annotation in the metadata catalog 221 with field information that identifies "sig" as a field associated with dataset "traffic." Similarly, the system 108 can update the metadata catalog 221 with a field-dataset annotation that identifies "sig" and "threat" as fields of the dataset "threats." Additionally, the system 108 can identify other fields in a query based on the syntax of the query. With each new field, the system 108 can update the corresponding dataset configuration record 604 and/or update a table that stores field information of fields in the system 108.

As queries are executed or the fields are used, the system 108 can further revise the dataset configuration records 604 or field entries to reflect the use of the fields over time. In this way, the system 108 can track the fields in the system 108, the relationship of the fields to datasets, and the frequency of use of the fields.

The system 108 can use the metadata related to the fields for a variety of functions. In some cases, the system 108 can use the metadata related to the fields to make field recommendations to a user, identify datasets with similar fields, suggest datasets for use together, identify datasets with a particular field, etc.

In some embodiments, as a user is typing a query related to a dataset, the system 108 can use the identified fields of the dataset to indicate to the user which fields are known about that dataset. In this way, the system 108 can provide insight into the content of a dataset as the user enters a query. Moreover, based on information of which fields are used most frequently, the system 108 can recommend or more prominently display a field to the user. For example, if the system 108 has determined (and the dataset configuration record 604 indicates) that the dataset "main" has at least three fields: "userID," "IP address," and "errorCode," then as the user is typing out the query "from main|group by . . . " the system 108 can display "userID," "IP address," and "errorCode." Furthermore, if the system 108 has determined that "userID" is the most frequently used field (in total, by the user, or by a group associated with the user) related to "main" and/or most frequently used after "group by," then the system 108 can suggest "userID" first or place it more prominently relative to the other fields. In this way, the system 108 can aid the user in crafting a query for the system 108 to execute based on information that the system 108 has iteratively learned about the data.

In certain cases, the system 108 can use the annotations related to the fields to identify datasets with similar fields and suggest use of datasets for views for queries. For example, if a first dataset with fields: "userID," "productID," and "viewTime," is used to generate a view (or mapped to a view dataset), the system 108 can use the dataset configuration records 604 to compare the fields of the first dataset with fields of other datasets. If a second dataset is identified that includes the fields "userID," "productID," and "viewTime," the system 108 can recommend the second dataset to the user for viewing and/or annotate the dataset configuration records 604 of the first and second dataset to indicate the existence of another dataset with similar fields. As another example, if a first dataset is a view dataset that uses the fields "userID," "productID," and "viewTime" from a second dataset to generate a view or UI, the system 108 can identify other datasets with the fields "userID," "productID," and "viewTime," and suggest the identified datasets to the user of the view dataset. In this way, the system 108 can track similar datasets and identify potentially related datasets.

In some cases, a user may want to execute a query using a particular field. As the user enters a field identifier, the system 108 can suggest or identify datasets that include the particular field. In this way, the system 108 can aid the user in understanding the content of the data based on information that the system has iteratively learned about the data.

In certain embodiments, the system 108 can use the number of fields to estimate a size of a particular dataset.

3.8.4.2.2. Inter-Field Relationship Annotations

The metadata catalog 221 can store information about relationships between fields of datasets. In certain embodiments, the relationships can correspond to one field being derived from another field, fields with matching, corresponding, or correlating field values, etc. As described herein, annotations about the relationship between fields of datasets can be stored as part of a dataset configuration record 604 or as part of a separate data structure. When stored as a separate data structure, the data structure can identify the datasets that include the field or are otherwise associated with or related to the field.

In some cases, when storing the inter-field relationship annotations, the system 108 can store an ID for the relationship (e.g., name or unique name for the relationship), identifiers for the datasets associated with the related fields, and identifiers for the fields of the datasets that are related. In addition, the system 108 can store a relationship type. In some embodiments, the relationship type may be an exact relationship, such that field values of the different fields match (e.g., the field value for a "UID" field of one dataset matches the field value for an "ID" field of another dataset). In certain embodiments, the relationship type may be correlated, such as a field value of "time" in one dataset that is the most recent in time and before a field value of "_time" in another dataset. In some embodiments, the relationship type may be a complex relationship, such as the combination of field values from multiple fields in one dataset to one field value of one field in another dataset.

The relationships between fields can be identified in a variety of ways. In some cases, a user can manually include or add an inter-field relationship annotation to the metadata catalog 221 (e.g., the dataset configuration record 604 or an annotation entry).

In some embodiments, the system 108 can parse a query or dataset to identify relationships between fields. Similar to the identification of fields described herein, the system 108 can use the syntax of the query to identify relationships between fields. For example, with continued reference to the query of the threats-encountered dataset 602N, based on the identification of a "sig" field in the datasets "traffic" and "threats," the system 108 can determine that there is a relationship or foreign-key relationship between the "sig" field of "traffic" and the "sig" field of "threats." In some such cases, based on the existence of the "sig" field in both datasets and its use in the same query, the system 108 can determine that field values in the "sig" field of "traffic" match the field values in the "sig" field of "threats." As such, the system 108 can identify and store information about the relationship in the metadata catalog 221.

As another example, based on a query or parsing a dataset, the system 108 can identify fields derived from other fields. For example, a query may initially refer to a field "salary."

Field values of the field "salary," may be transformed and/or combined with other data as part of the query and later referenced as the field "sum." In some such cases, by parsing the syntax of the query, the system 108 can identify the relationship between "sum" and "salary" and identify "sum" as a field derived from "salary." As such, the system 108 can identify and store information about the relationship in the metadata catalog 221.

In certain embodiments, the system 108 can identify inter-field relationships based on changes to the metadata catalog 221. For example if the metadata catalog 221 identifies a relationship between fields A and B (e.g., field B is derived from field A) and a new inter-field relationship annotation is added indicating a relationship between fields B and C (e.g., field C is derived from field B), the system 108 can determine and generate an inter-field relationship annotation for fields A and C (e.g., field C is derived from field A).

The system 108 can use the inter-field relationship annotations to propagate additional annotations. With continued reference to the "sum" and "salary" field example above, if the "salary" field is indented as personally identifiable information or is otherwise subject to restrictions, the system 108 can use the relationship information to also mark the "sum" field as PII or restricted. As another example, if units or preferred units are identified for one field, the system 108 can use the identification of related fields to automatically identify units or preferred units for the field. By iteratively learning and storing information about relationships between fields, the system 108 can iteratively learn about the various connections between fields and improve compliance with data restrictions.

3.8.4.2.3. Inter-Dataset Relationship Annotations

The metadata catalog 221 can store annotations about relationships between datasets. In some embodiments, a dataset configuration record 604 of a first dataset can include the number and/or identification of related datasets, such as datasets that depend on the first dataset or datasets on which the first dataset depends. For example, if a first dataset refers to or uses data from a second dataset, the dataset configuration record 604 of the first dataset and the second dataset can identify the first dataset as being dependent on the second dataset. In certain embodiments, certain metrics data may be identified as being related to certain raw machine data datasets. As such the dataset configuration records 604 of the metrics data and raw machine data datasets can identify each other as being related. As described herein, in some cases, fields of different datasets may be related or correspond to each other. As such, based on the relationship between the fields, the metadata catalog 221 can identify the datasets as being related. As described herein, annotations about the relationship between fields of datasets can be stored as part of a dataset configuration record 604 or as part of a separate data structure. When stored as a separate data structure, the data structure can identify the datasets that include the field or are otherwise associated with or related to the field.

The relationships between datasets can be identified in a variety of ways. In some cases, a user can manually include or add a relationship between datasets to a dataset configuration record 604 and/or an annotation entry.

In certain embodiments, the system 108 can parse a query or dataset to identify relationships between datasets. For example, with continued reference to the threat-encountered dataset 602N, the system 108 can parse the query "|from traffic|lookup threats sig OUTPUT threat|where threat=*|stats count by threat." In parsing the query, the system 108 can use the syntax of the query language to identify datasets and relationships. For example, "from" and "lookup" can be commands and words following those commands can identify datasets. Accordingly, the system 108 can identify the datasets "trafficTeam.traffic" (which is the "shared.main" dataset imported from dataset association record 602A) and "trafficTeam.threats" from the query. Furthermore, the system 108 can determine that the threats-encountered dataset 602N is dependent on the "trafficTeam.traffic" and "trafficTeam.threats" datasets given that those datasets are used in the threats-encountered query. In other words, without the datasets "trafficTeam.traffic" and "trafficTeam.threats," the "threats-encountered" dataset would not function properly or would return an error.

In addition, the system 108 can identify a relationship between the "trafficTeam.traffic" and "trafficTeam.threats" datasets. For example, given that the "trafficTeam.traffic" and "trafficTeam.threats" datasets both have the same field "sig," the system 108 can identify a foreign key relationship between them and store a corresponding annotation—similar to the inter-field relationship field annotation.

In certain embodiments, the system 108 can identify inter-dataset relationships based on changes to the metadata catalog 221. For example, if the metadata catalog 221 identifies a relationship between dataset A and B (non-limiting examples: (1) dataset B depends from dataset A, (2) dataset A can be mapped to dataset B, (3) dataset A and B have similar fields) and a new inter-field relationship annotation is added indicating a relationship between datasets B and C (non-limiting examples: (1) dataset C depends from dataset B, (2) dataset C can be mapped to dataset B, (3) dataset B can be mapped to dataset C), the system 108 can determine and generate an inter-dataset relationship annotation for datasets A and C (non-limiting examples: (1) dataset C depends from dataset A, (2) dataset A and C have similar fields, (3) dataset A can be mapped to dataset C).

The inter-dataset relationship annotations can be used for a variety of functions. In some cases, the system 108 can use the inter-dataset relationship annotations to generate additional annotations (e.g., additional inter-dataset relationships as described above), to propagate annotations from one dataset to another dataset (e.g., if units or preferred units are identified for dataset one then the units or preferred units may also be used for related dataset two), to lock datasets from or identify datasets for deletion (e.g., if dataset one depends on dataset two then dataset two should not be deleted or if dataset one depends on dataset two and dataset two is to be deleted then dataset one should also be deleted).

In certain embodiments, the system 108 can use the inter-dataset relationship annotations to propagate annotations from one dataset to another. For example, if dataset one is annotated as containing restricted information, the system 108 can use the inter-dataset relationship annotations to identify and annotate other datasets that depend from dataset one. As another example, if data from one dataset is annotated with a particular unit or preferred unit (e.g., MB instead of bytes), the system 108 can use the inter-dataset relationship annotations to identify other datasets that can be similarly annotated. Similarly, alarm thresholds for one dataset may be propagated to related datasets, etc.

3.8.4.2.4. Dataset Properties Annotations

The metadata catalog 221 can store annotations about the properties of a dataset, such as, but not limited to, an (estimated) size of a dataset, the usage of the dataset, and/or the capabilities of the dataset or dataset source. In some embodiments as users interact with the datasets, the system 108 can track when a dataset is used, the frequency of its use, the users or groups that use the dataset, etc. In addition, as a dataset is used, the metadata catalog 221 can estimate its size as it learns about the number of fields in the dataset and/or track the amount of data obtained from the dataset. In some cases, as data is extracted from datasets or dataset sources, the system 108 can monitor the performance of the dataset or dataset source. For example, the system 108 can monitor the speed of the dataset source, its bandwidth, network connectivity, etc. Based on this information, the system 108 can determine a cost to access a particular dataset. The cost may refer to time, computing resources, etc. This information can be stored as an annotation entry or as part of a dataset configuration record 604 as described herein.

Using the usage annotations, the system 108 can make recommendations to a user. For example, based on the frequency of use of dataset one or the number of datasets that refer to or depend from dataset one, the system 108 can recommend that dataset one be used for a particular query by the user.

Using the estimated size, speed, cost, or capability of a dataset, the system 108 can allocate resources for a query that depends on the dataset. For example, the system 108 can allocate more resources if it determines that the dataset is relatively large, slow, or supports parallelization, or allocate fewer resources if it determines that the dataset is relatively small or fast or does not support parallelization, etc. In addition, the system 108 can use the capabilities of the dataset to perform cost-based optimizations. For example, if, based on a query, the system 108 is to join data from dataset A and dataset B, based on the size, speed, etc. of the datasets, the system 108 can determine which dataset to access first. If, for example, dataset A is smaller or faster than dataset B, the system 108 can determine that dataset A should be accessed first and the results of dataset A can be used to refine the query to dataset B.

3.8.4.2.5. Normalization Annotations

The metadata catalog 221 can store normalization annotations about the datasets. In some cases, datasets may not be explicitly related, but may include similar data or fields. In some such cases, the system 108 can analyze the datasets to identify similar datasets or dataset that include similar data or fields.

In some cases, the metadata catalog 221 can identify similar datasets by comparing fields of datasets. As field annotations are added to the metadata catalog 221, as described herein, the system 108 can compare the fields of one dataset with the fields of another dataset. If a threshold number of fields are the same, then the system 108 can generate a normalization annotation (or inter-dataset relationship annotation) indicating that the datasets include similar data. The threshold number can be based on the total number of fields in one or both datasets or the number of fields used in another dataset, such as a view dataset.

In certain embodiments, as datasets are added, such as a view dataset that references dataset 1, the fields used by the view dataset can be compared with the fields of other datasets in the metadata catalog 221. If dataset 2 includes the same or similar fields to those used by the view dataset from dataset 1, the system 108 can generate a normalization annotation (or inter-dataset relationship annotation) indicating the similarity of dataset 2 to dataset 1 and/or indicate that dataset 2 could be used with the view dataset.

The normalization annotations can be used by the system 108 to make suggestions to a user about which datasets can be used with other datasets, such as view datasets, or to suggest that a user review a dataset. For example, as a user views an interface resulting from multiple fields from dataset 1 being mapped to a view dataset, the system 108 can recommend to the user that dataset 2 may provide additional results that may be helpful to the user's analysis of dataset 1.

3.8.4.2.6. Unit Annotations

The metadata catalog 221 can store unit annotations about the datasets or fields of the datasets. In some cases, the system 108 can identify the unit annotations based on user input and/or based on analysis of related datasets. In certain embodiments, a user can indicate that data from a particular dataset or field has a particular unit and/or has a preferred unit. For example, a user can indicate that the unit for a particular metric is Hz and/or that the preferred unit for the metric is MHz or GHz. The unit and/or preferred unit can be stored by the system 108 as a unit annotation. As described herein, the unit annotation can be stored as part of a dataset configuration record 604 and/or annotation entry.

In some embodiments, the system 108 can determine unit annotations based on changes to the metadata catalog 221. For example, if datasets A and B (or a field or metric of dataset A and B) are related and a new annotation is added indicating a preferred unit for dataset A (or a metric or field of dataset A), the system 108 can automatically determine and generate an annotation for dataset B (or a metric or field of dataset B) indicating the same preferred unit.

The unit annotations can be used by the system 108 to convert and/or display the data in a particular way. For example, if the unit annotation for a field or metric is identified as a byte and the preferred unit is a gigabyte, the system 108 can convert the bytes from the dataset to gigabytes and display the data as a gigabyte. Furthermore, the system 108 can propagate a unit annotation from one dataset to other datasets. In certain embodiments, the system 108 can identify fields or datasets related to the annotated field or dataset and propagate the unit annotation to the identified field or dataset.

3.8.4.2.7. Alarm Threshold Annotations

The metadata catalog 221 can store alarm threshold annotations about the datasets or fields of the datasets. In some cases, the system 108 can identify the alarm threshold annotations based on user input or based on previous user actions. For example, a user can indicate that when a particular metric or value satisfies a threshold, a person should be alerted or an alarm sounded.

In some embodiments, the system 108 can determine alarm threshold annotations based on changes to the metadata catalog 221. For example, if datasets A and B (or a field or metric of dataset A and B) are related and a new annotation is added indicating an alarm threshold for dataset A (or a metric or field of dataset A), the system 108 can automatically determine and generate an annotation for dataset B (or a metric or field of dataset B) indicating the same alarm threshold.

The alarm threshold annotations can be used by the system 108 to generate alarms or automatically execute a query. For example, based on an alarm threshold being satisfied, the system 108 can execute a query that surfaces information related to the alarm threshold. In addition, the system 108 can propagate the alarm thresholds to related datasets or fields.

3.8.4.2.8. Data Category Annotations

The metadata catalog 221 can store data category annotations about the datasets or fields of the datasets. In some cases, the system 108 can identify the data category (or use restriction) annotations based on user input. For example, a user can indicate that a particular field or dataset includes personally identifiable information, should be separately tracked or monitored, etc. Based on the identification, the system 108 can store a data category annotation for that field or dataset.

In some embodiments, the system 108 can determine data category annotations based on changes to the metadata catalog 221. For example, if datasets A and B (or a field or metric of dataset A and B) are related and a new annotation is added indicating a data category for dataset A (or a metric or field of dataset A), the system 108 can automatically determine and generate an annotation for dataset B (or a metric or field of dataset B) indicating the same data category. For instance, consider a scenario where dataset A includes a "social_security_num" field and a data category annotation indicating that the field is PII, and dataset B includes an "ID" field. If the metadata catalog is updated to reflect that the "ID" field is derived from the "social_security_num" field, then the system can automatically propagate the data category for the "social_security_num" field to the "ID" field.

The data category annotations can be used by the system 108 to track how certain data is being used and/or for compliance purposes. For example, the system can monitor PII data and generate alerts if it is not properly stored or processed.

3.8.4.2.9. User/Group Annotations

The metadata catalog 221 can store user or group annotations. In some cases, the system 108 can identify the user/group annotations based on user input. For example, a user can indicate that a particular user or group is associated with a particular dataset. In certain embodiments, the system 108 can generate the user/group annotations based on usage information. For example, the system 108 can track which datasets are accessed by which users or groups of users. This information can be stored as user/group annotations. As yet another example, if a particular user or group is the most frequent user of a dataset, the system 108 can relate the user or group to the dataset and generate a user/group annotation.

The user/group annotations can be used by the system 108 to determine how usage time should be allocated between parties. For example, if twenty users have access to a dataset, the system 108 can track which of the users or groups used the dataset most frequently and should be charged for the usage.

3.8.4.2.10. Application Annotations

The metadata catalog 221 can store application annotations. In certain embodiments, the system 108 can generate the application annotations based on usage information. For example, the system 108 can track which applications are used by which users and with what datasets. This information can be stored as application annotations as part of a dataset configuration record 604 or annotation entry.

The application annotations can be used by the system 108 to make recommendations to users. For example, if a threshold number of users frequently use three applications and a different user frequently uses two of the three applications, the system 108 can recommend the third application to the user.

4.0. Data Intake and Query System Functions

As described herein, the various components of the data intake and query system 108 can perform a variety of functions associated with the intake, indexing, storage, and querying of data from a variety of sources. It will be understood that any one or any combination of the functions described herein can be combined as part of a single routine or method. For example, a routine can include any one or any combination of one or more data ingestion functions, one or more indexing functions, and/or one or more searching functions.

4.1 Intake

Figure 7:
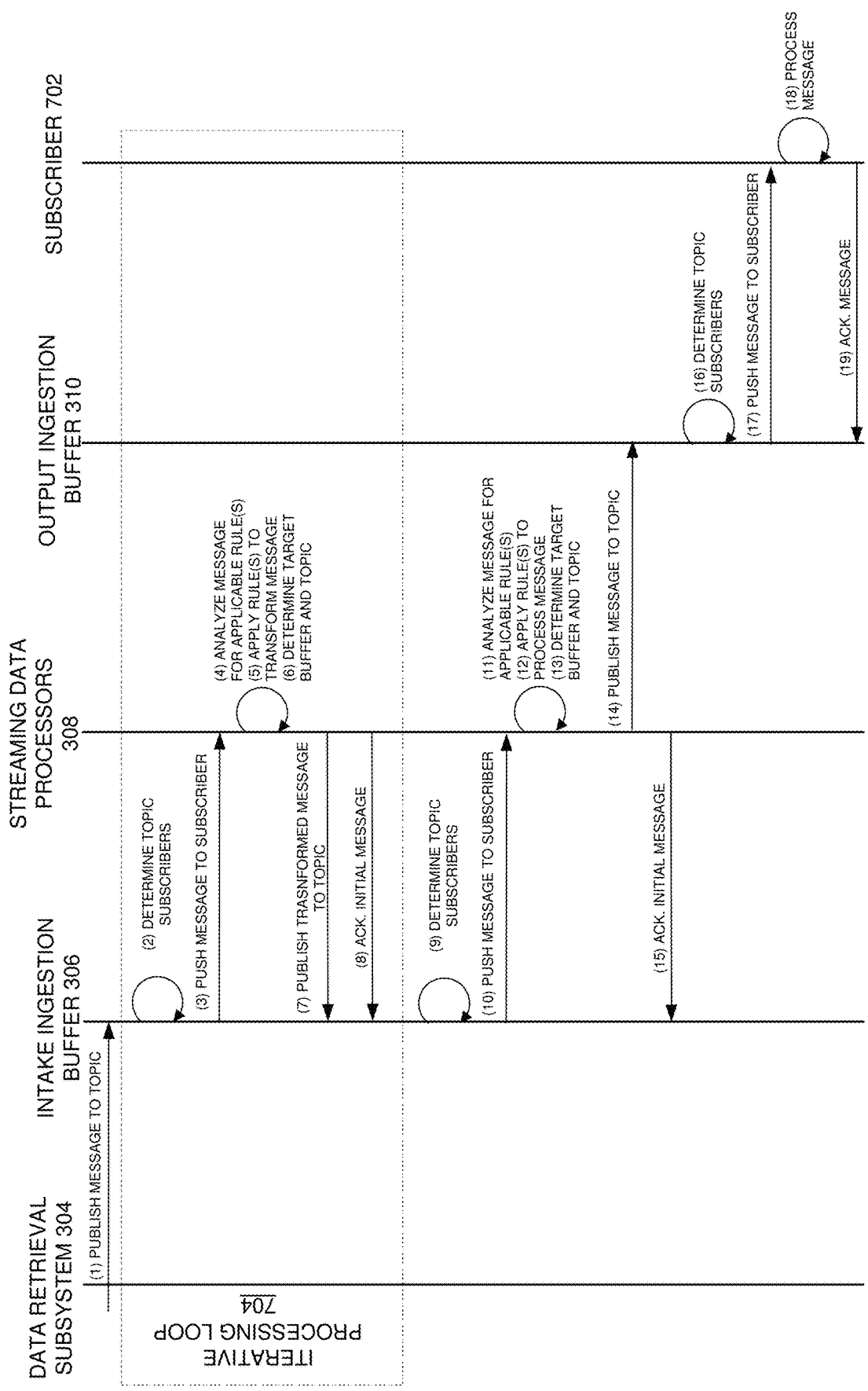
FIG. 7 is a data flow diagram depicting illustrative interactions for processing data through an intake system, in accordance with example embodiments.

As discussed above, ingestion into the data intake and query system 108 can be facilitated by an intake system 210, which functions to process data according to a streaming data model, and make the data available as messages on an output ingestion buffer 310, categorized according to a number of potential topics. Messages may be published to the output ingestion buffer 310 by a streaming data processors 308, based on preliminary processing of messages published to an intake ingestion buffer 306. The intake ingestion buffer 306 is, in turn, populated with messages by one or more publishers, each of which may represent an intake point for the data intake and query system 108. The publishers may collectively implement a data retrieval subsystem 304 for the data intake and query system 108, which subsystem 304 functions to retrieve data from a data source 202 and publish the data in the form of a message on the intake ingestion buffer 306. A flow diagram depicting an illustrative embodiment for processing data at the intake system 210 is shown at FIG. 7. While the flow diagram is illustratively described with respect to a single message, the same or similar interactions may be used to process multiple messages at the intake system 210.

4.1.1 Publication to Intake Topic(s)

As shown in FIG. 7, processing of data at the intake system 210 can illustratively begin at (1), where a data retrieval subsystem 304 or a data source 202 publishes a message to a topic at the intake ingestion buffer 306. Generally described, the data retrieval subsystem 304 may include either or both push-based and pull-based publishers. Push-based publishers can illustratively correspond to publishers which independently initiate transmission of messages to the intake ingestion buffer 306. Pull-based publishes can illustratively correspond to publishers which await an inquiry by the intake ingestion buffer 306 for messages to be published to the buffer 306. The publication of a message at (1) is intended to include publication under either push- or pull-based models.

As discussed above, the data retrieval subsystem 304 may generate the message based on data received from a forwarder 302 and/or from one or more data sources 202. In some instances, generation of a message may include converting a format of the data into a format suitable for publishing on the intake ingestion buffer 306. Generation of a message may further include determining a topic for the message. In one embodiment, the data retrieval subsystem 304 selects a topic based on a data source 202 from which the data is received, or based on the specific publisher (e.g., intake point) on which the message is generated. For example, each data source 202 or specific publisher may be associated with a particular topic on the intake ingestion buffer 306 to which corresponding messages are published. In some instances, the same source data may be used to generate multiple messages to the intake ingestion buffer 306 (e.g., associated with different topics).

4.1.2 Transmission to Streaming Data Processors

After receiving a message from a publisher, the intake ingestion buffer 306, at (2), determines subscribers to the topic. For the purposes of example, it will be associated that at least one device of the streaming data processors 308 has subscribed to the topic (e.g., by previously transmitting to the intake ingestion buffer 306 a subscription request). As noted above, the streaming data processors 308 may be implemented by a number of (logically or physically) distinct devices. As such, the streaming data processors 308, at (2), may operate to determine which devices of the streaming data processors 308 have subscribed to the topic (or topics) to which the message was published.

Thereafter, at (3), the intake ingestion buffer 306 publishes the message to the streaming data processors 308 in accordance with the pub-sub model. This publication may correspond to a "push" model of communication, whereby an ingestion buffer determines topic subscribers and initiates transmission of messages within the topic to the subscribers. While interactions of FIG. 7 are described with reference to such a push model, in some embodiments, a pull model of transmission may additionally or alternatively be used. Illustratively, rather than an ingestion buffer determining topic subscribers and initiating transmission of messages for the topic to a subscriber (e.g., the streaming data processors 308), an ingestion buffer may enable a subscriber to query for unread messages for a topic, and for the subscriber to initiate transmission of the messages from the ingestion buffer to the subscriber. Thus, an ingestion buffer (e.g., the intake ingestion buffer 306) may enable subscribers to "pull" messages from the buffer. As such, interactions of FIG. 7 (e.g., including interactions (2) and (3) as well as (9), (10), (16), and (17) described below) may be modified to include pull-based interactions (e.g., whereby a subscriber queries for unread messages and retrieves the messages from an appropriate ingestion buffer).

4.1.3 Messages Processing

On receiving a message, the streaming data processors 308, at (4), analyze the message to determine one or more rules applicable to the message. As noted above, rules maintained at the streaming data processors 308 can generally include selection criteria indicating messages to which the rule applies. This selection criteria may be formatted in the same manner or similarly to extraction rules, discussed in more detail below, and may include any number or combination of criteria based on the data included within a message or metadata of the message, such as regular expressions based on the data or metadata.

On determining that a rule is applicable to the message, the streaming data processors 308 can apply to the message one or more processing sub-rules indicated within the rule. Processing sub-rules may include modifying data or metadata of the message. Illustratively, processing sub-rules may edit or normalize data of the message (e.g., to convert a format of the data) or inject additional information into the message (e.g., retrieved based on the data of the message). For example, a processing sub-rule may specify that the data of the message be transformed according to a transformation algorithmically specified within the sub-rule. Thus, at (5), the streaming data processors 308 applies the sub-rule to transform the data of the message.

In addition or alternatively, processing sub-rules can specify a destination of the message after the message is processed at the streaming data processors 308. The destination may include, for example, a specific ingestion buffer (e.g., intake ingestion buffer 306, output ingestion buffer 310, etc.) to which the message should be published, as well as the topic on the ingestion buffer to which the message should be published. For example, a particular rule may state that messages including metrics within a first format (e.g., imperial units) should have their data transformed into a second format (e.g., metric units) and be republished to the intake ingestion buffer 306. At such, at (6), the streaming data processors 308 can determine a target ingestion buffer and topic for the transformed message based on the rule determined to apply to the message. Thereafter, the streaming data processors 308 publishes the message to the destination buffer and topic.

For the purposes of illustration, the interactions of FIG. 7 assume that, during an initial processing of a message, the streaming data processors 308 determines (e.g., according to a rule of the data processor) that the message should be republished to the intake ingestion buffer 306, as shown at (7). The streaming data processors 308 further acknowledges the initial message to the intake ingestion buffer 306, at (8), thus indicating to the intake ingestion buffer 306 that the streaming data processors 308 has processed the initial message or published it to an intake ingestion buffer. The intake ingestion buffer 306 may be configured to maintain a message until all subscribers have acknowledged receipt of the message. Thus, transmission of the acknowledgement at (8) may enable the intake ingestion buffer 306 to delete the initial message.

It is assumed for the purposes of these illustrative interactions that at least one device implementing the streaming data processors 308 has subscribed to the topic to which the transformed message is published. Thus, the streaming data processors 308 is expected to again receive the message (e.g., as previously transformed the streaming data processors 308), determine whether any rules apply to the message, and process the message in accordance with one or more applicable rules. In this manner, interactions (2) through (8) may occur repeatedly, as designated in FIG. 7 by the iterative processing loop 402. By use of iterative processing, the streaming data processors 308 may be configured to progressively transform or enrich messages obtained at data sources 202. Moreover, because each rule may specify only a portion of the total transformation or enrichment of a message, rules may be created without knowledge of the entire transformation. For example, a first rule may be provided by a first system to transform a message according to the knowledge of that system (e.g., transforming an error code into an error descriptor), while a second rule may process the message according to the transformation (e.g., by detecting that the error descriptor satisfies alert criteria). Thus, the streaming data processors 308 enable highly granulized processing of data without requiring an individual entity (e.g., user or system) to have knowledge of all permutations or transformations of the data.

After completion of the iterative processing loop 402, the interactions of FIG. 7 proceed to interaction (9), where the intake ingestion buffer 306 again determines subscribers of the message. The intake ingestion buffer 306, at (10), the transmits the message to the streaming data processors 308, and the streaming data processors 308 again analyze the message for applicable rules, process the message according to the rules, determine a target ingestion buffer and topic for the processed message, and acknowledge the message to the intake ingestion buffer 306, at interactions (11), (12), (13), and (15). These interactions are similar to interactions (4), (5), (6), and (8) discussed above, and therefore will not be re-described. However, in contrast to interaction (13), the streaming data processors 308 may determine that a target ingestion buffer for the message is the output ingestion buffer 310. Thus, the streaming data processors 308, at (14), publishes the message to the output ingestion buffer 310, making the data of the message available to a downstream system.

FIG. 7 illustrates one processing path for data at the streaming data processors 308. However, other processing paths may occur according to embodiments of the present disclosure. For example, in some instances, a rule applicable to an initially published message on the intake ingestion buffer 306 may cause the streaming data processors 308 to publish the message out ingestion buffer 310 on first processing the data of the message, without entering the iterative processing loop 402. Thus, interactions (2) through (8) may be omitted.

In other instances, a single message published to the intake ingestion buffer 306 may spawn multiple processing paths at the streaming data processors 308. Illustratively, the streaming data processors 308 may be configured to maintain a set of rules, and to independently apply to a message all rules applicable to the message. Each application of a rule may spawn an independent processing path, and potentially a new message for publication to a relevant ingestion buffer. In other instances, the streaming data processors 308 may maintain a ranking of rules to be applied to messages, and may be configured to process only a highest ranked rule which applies to the message. Thus, a single message on the intake ingestion buffer 306 may result in a single message or multiple messages published by the streaming data processors 308, according to the configuration of the streaming data processors 308 in applying rules.

As noted above, the rules applied by the streaming data processors 308 may vary during operation of those processors 308. For example, the rules may be updated as user queries are received (e.g., to identify messages whose data is relevant to those queries). In some instances, rules of the streaming data processors 308 may be altered during the processing of a message, and thus the interactions of FIG. 7 may be altered dynamically during operation of the streaming data processors 308.

While the rules above are described as making various illustrative alterations to messages, various other alterations are possible within the present disclosure. For example, rules in some instances be used to remove data from messages, or to alter the structure of the messages to conform to the format requirements of a downstream system or component. Removal of information may be beneficial, for example, where the messages include private, personal, or confidential information which is unneeded or should not be made available by a downstream system. In some instances, removal of information may include replacement of the information with a less confidential value. For example, a mailing address may be considered confidential information, whereas a postal code may not be. Thus, a rule may be implemented at the streaming data processors 308 to replace mailing addresses with a corresponding postal code, to ensure confidentiality. Various other alterations will be apparent in view of the present disclosure.

4.1.4 Transmission to Subscribers

As discussed above, the rules applied by the streaming data processors 308 may eventually cause a message containing data from a data source 202 to be published to a topic on an output ingestion buffer 310, which topic may be specified, for example, by the rule applied by the streaming data processors 308. The output ingestion buffer 310 may thereafter make the message available to downstream systems or components. These downstream systems or components are generally referred to herein as "subscribers." For example, the indexing system 212 may subscribe to an indexing topic 342, the query system 214 may subscribe to a search results topic 348, a client device 102 may subscribe to a custom topic 352A, etc. In accordance with the pub-sub model, the output ingestion buffer 310 may transmit each message published to a topic to each subscriber of that topic, and resiliently store the messages until acknowledged by each subscriber (or potentially until an error is logged with respect to a subscriber). As noted above, other models of communication are possible and contemplated within the present disclosure. For example, rather than subscribing to a topic on the output ingestion buffer 310 and allowing the output ingestion buffer 310 to initiate transmission of messages to the subscriber 702, the output ingestion buffer 310 may be configured to allow a subscriber 702 to query the buffer 310 for messages (e.g., unread messages, new messages since last transmission, etc.), and to initiate transmission of those messages form the buffer 310 to the subscriber 702. In some instances, such querying may remove the need for the subscriber 702 to separately "subscribe" to the topic.

Accordingly, at (16), after receiving a message to a topic, the output ingestion buffer 310 determines the subscribers to the topic (e.g., based on prior subscription requests transmitted to the output ingestion buffer 310). At (17), the output ingestion buffer 310 transmits the message to a subscriber 702. Thereafter, the subscriber may process the message at (18). Illustrative examples of such processing are described below, and may include (for example) preparation of search results for a client device 204, indexing of the data at the indexing system 212, and the like. After processing, the subscriber can acknowledge the message to the output ingestion buffer 310, thus confirming that the message has been processed at the subscriber.

4.1.5 Data Resiliency and Security

In accordance with embodiments of the present disclosure, the interactions of FIG. 7 may be ordered such that resiliency is maintained at the intake system 210. Specifically, as disclosed above, data streaming systems (which may be used to implement ingestion buffers) may implement a variety of techniques to ensure the resiliency of messages stored at such systems, absent systematic or catastrophic failures. Thus, the interactions of FIG. 7 may be ordered such that data from a data source 202 is expected or guaranteed to be included in at least one message on an ingestion system until confirmation is received that the data is no longer required.

For example, as shown in FIG. 7, interaction (8)—wherein the streaming data processors 308 acknowledges receipt of an initial message at the intake ingestion buffer 306—can illustratively occur after interaction (7)—wherein the streaming data processors 308 republishes the data to the intake ingestion buffer 306. Similarly, interaction (15)—wherein the streaming data processors 308 acknowledges receipt of an initial message at the intake ingestion buffer 306—can illustratively occur after interaction (14)—wherein the streaming data processors 308 republishes the data to the intake ingestion buffer 306. This ordering of interactions can ensure, for example, that the data being processed by the streaming data processors 308 is, during that processing, always stored at the ingestion buffer 306 in at least one message. Because an ingestion buffer 306 can be configured to maintain and potentially resend messages until acknowledgement is received from each subscriber, this ordering of interactions can ensure that, should a device of the streaming data processors 308 fail during processing, another device implementing the streaming data processors 308 can later obtain the data and continue the processing.

Similarly, as shown in FIG. 7, each subscriber 702 may be configured to acknowledge a message to the output ingestion buffer 310 after processing for the message is completed. In this manner, should a subscriber 702 fail after receiving a message but prior to completing processing of the message, the processing of the subscriber 702 can be restarted to successfully process the message. Thus, the interactions of FIG. 7 can maintain resiliency of data on the intake system 108 commensurate with the resiliency provided by an individual ingestion buffer 306.

While message acknowledgement is described herein as an illustrative mechanism to ensure data resiliency at an intake system 210, other mechanisms for ensuring data resiliency may additionally or alternatively be used.

As will be appreciated in view of the present disclosure, the configuration and operation of the intake system 210 can further provide high amounts of security to the messages of that system. Illustratively, the intake ingestion buffer 306 or output ingestion buffer 310 may maintain an authorization record indicating specific devices or systems with authorization to publish or subscribe to a specific topic on the ingestion buffer. As such, an ingestion buffer may ensure that only authorized parties are able to access sensitive data. In some instances, this security may enable multiple entities to utilize the intake system 210 to manage confidential information, with little or no risk of that information being shared between the entities. The managing of data or processing for multiple entities is in some instances referred to as "multi-tenancy."

Illustratively, a first entity may publish messages to a first topic on the intake ingestion buffer 306, and the intake ingestion buffer 306 may verify that any intake point or data source 202 publishing to that first topic be authorized by the first entity to do so. The streaming data processors 308 may maintain rules specific to the first entity, which the first entity may illustrative provide through authenticated session on an interface (e.g., GUI, API, command line interface (CLI), etc.). The rules of the first entity may specify one or more entity-specific topics on the output ingestion buffer 310 to which messages containing data of the first entity should be published by the streaming data processors 308. The output ingestion buffer 310 may maintain authorization records for such entity-specific topics, thus restricting messages of those topics to parties authorized by the first entity. In this manner, data security for the first entity can be ensured across the intake system 210. Similar operations may be performed for other entities, thus allowing multiple entities to separately and confidentially publish data to and retrieve data from the intake system.

4.2. Indexing

Figure 8:
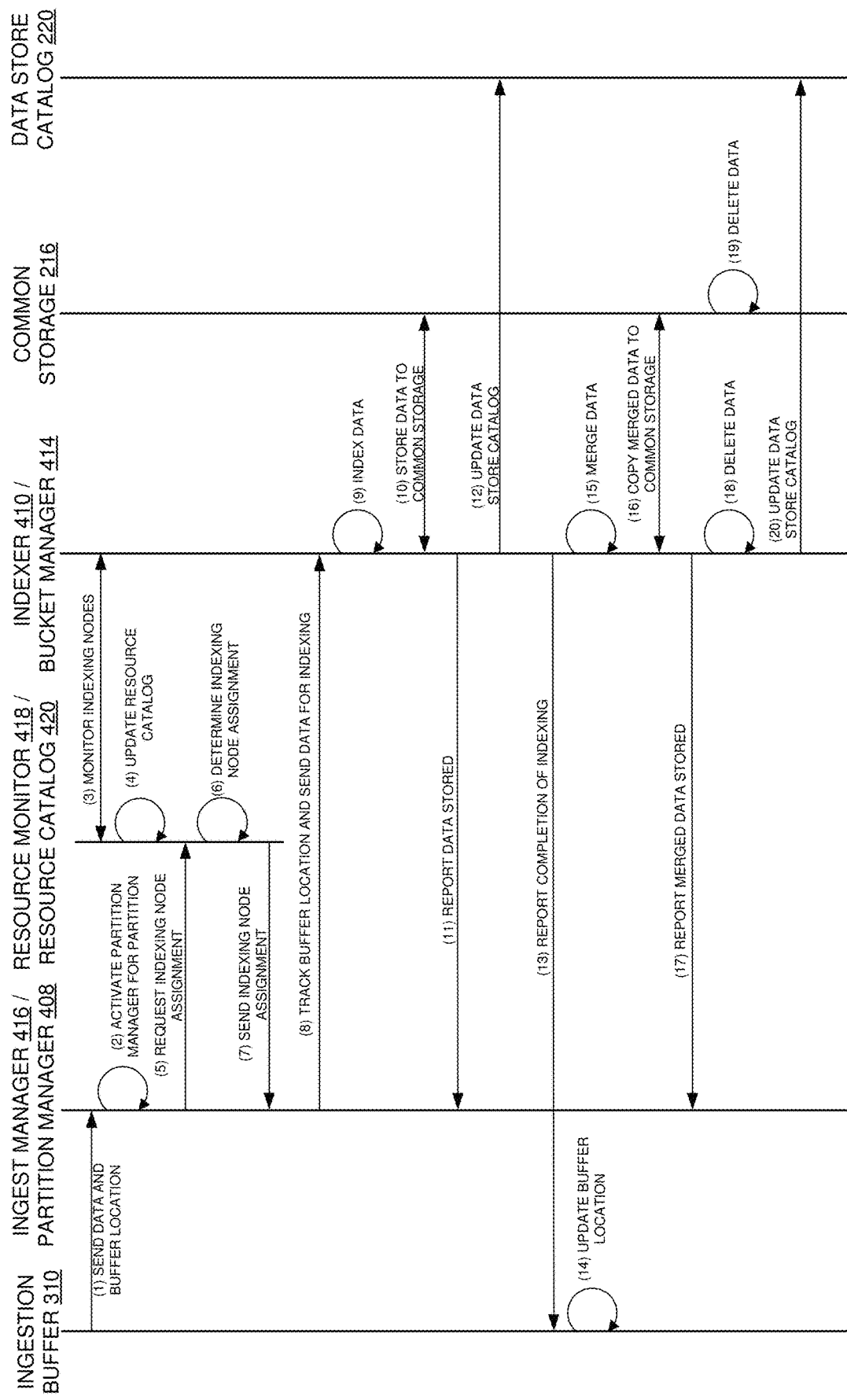
FIG. 8 is a data flow diagram illustrating an embodiment of the data flow and communications between a variety of the components of the data intake and query system during indexing.

FIG. 8 is a data flow diagram illustrating an embodiment of the data flow and communications between a variety of the components of the data intake and query system 108 during indexing. Specifically, FIG. 8 is a data flow diagram illustrating an embodiment of the data flow and communications between an ingestion buffer 310, an ingest manager 406, a partition manager 408, a resource monitor 418, a resource catalog 420, an indexing node 404 or an indexer 410 or bucket manager 414, common storage 216, and/or a data store catalog 220. However, it will be understood, that in some of embodiments, one or more of the functions described herein with respect to FIG. 8 can be omitted, performed in a different order and/or performed by a different component of the data intake and query system 108. Accordingly, the illustrated embodiment and description should not be construed as limiting.

At (1), the ingestion buffer 310 of the intake system 210 sends data records and buffer locations using one or more partitions to the ingest manager 406. A buffer location can refer to the location in the ingestion buffer 310 where a particular data record can be accessed. In some embodiments, a data record can include data associated with a particular tenant or a reference to a location (e.g. physical or logical directory, file name, etc.) that stores the data associated with the tenant that is to be processed by the indexing system 212. In certain embodiments, the data record can also include a data identifier for the data, such as a tenant identifier identifying the tenant to which the data (either in the data record or at the location referenced by the data record) is associated. The data in the data record or in the location referenced by the data record can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

In some embodiments, the ingestion buffer 310 can operate according to a pub-sub messaging service. As such, the ingestion buffer 310 can communicate the data records of the one or more partitions to the ingest manager 406, and also ensure that the data records of the partitions are available for additional reads until the ingestion buffer 310 receives an acknowledgement from a partition manager 408 or an indexing node 404 that the data can be removed. In some cases, the ingestion buffer 310 can use one or more read pointers or location markers to track data that has been communicated to the ingest manager 406 but that has not been acknowledged for removal. Accordingly, based on the location markers, the ingestion buffer 310 can retain a portion of its data persistently until it receives confirmation that the data can be deleted or has been stored in common storage 216. As the ingestion buffer 310 receives acknowledgments, it can update the location markers. In some cases, the ingestion buffer 310 can include at least one location marker for each partition. In this way, the ingestion buffer 310 can separately track the progress of the data reads in the different partitions.

In certain embodiments, the ingest manager 406 or partition managers 408 can receive (and/or store) the location markers in addition to or as part of the data records received from the ingestion buffer 310. Accordingly, the ingest manager 406 can track the location of the data in the ingestion buffer 310 that the ingest manager 406 has received from the ingestion buffer 310. In this way, if a partition manager 408 becomes unavailable or fails, the ingest manager 406 can assign a different partition manager 408 to manage the data from the ingestion buffer 310 and provide the partition manager 408 with a location from which the partition manager 408 can obtain the data. Similarly, if an indexing node 404 becomes unavailable or fails, the partition manager 408 or resource monitor 418 can assign a different indexing node 404 to process or manage data from the ingestion buffer 310 and provide the indexing node 404 with a location from which the indexing node 404 can obtain the data record from the ingestion buffer 310.

At (2), the ingest manager 406 activates a partition manager 408 for a partition. As described herein, the ingest manager 406 can receive data records from the ingestion buffer 310 across multiple partitions. In some embodiments, the ingest manager 406 can activate (for example, generate or assign) a particular partition manager 408 for a particular partition of the ingestion buffer 310. In this way, the particular partition manager 408 receives the data records corresponding to the particular partition of the ingestion buffer 310. In some cases, the ingest manager 406 activates a different partition manager 408 for each of the partitions of the ingestion buffer 310. In some cases, the ingest manager 406 activates a partition manager 408 to manage data records from multiple partitions. In some embodiments, the ingest manager 406 can activate a partition manager 408 based on the output of an additional partition from the intake system 210, based on a partition manager 408 becoming unresponsive or unavailable, etc. In some embodiments, the partition manager 408 can be a copy of the ingest manager 406 or a copy of a template process. In certain embodiments, the partition manager 408 can be instantiated in a separate container from the ingest manager 406.

At (3), the resource monitor 418 monitors the indexing nodes 404 of the indexing system 212. As described herein, monitoring the indexing nodes 404 can include requesting and/or receiving status information from the indexing nodes 404. In some embodiments, the resource monitor 418 passively receives status information from the indexing nodes 404 without explicitly requesting the information. For example, the indexing nodes 404 can be configured to periodically send status updates to the resource monitor. In certain embodiments, the resource monitor 418 receives status information in response to requests made by the resource monitor 418. As described herein, the status information can include any one or any combination of indexing node identifiers, metrics (e.g., CPU utilization, available memory), network architecture data, or indexing node assignments, etc.

At (4), the resource monitor 418 can use the information received from the indexing nodes 404 to update the resource catalog 420. As the status of indexing nodes 404 change over time, the resource monitor 418 can update the resource catalog 420. In this way, the resource monitor 418 can maintain the resource catalog 420 with information about the indexing nodes 404 of the indexing system 212.

It will be understood that (3) and (4) may be repeated together periodically, according to a schedule, policy, or algorithm, such that the current (or reasonably current) availability, responsiveness, and/or utilization rate of the indexing nodes 404 and/or indexers 410 is stored in resource catalog 420. For example, a time-based schedule may be used so that (3) and (4) may be performed every X number of seconds, or every X minute(s), and so forth. The performance of (3) on a periodic basis may be referred to as a "heartbeat."

At (5), a partition manager 408 assigned to distribute one or more data records from a partition of the ingestion buffer 310 to one or more indexers 410 requests an indexing node assignment from the resource monitor 418 and/or resource catalog 420. In some cases, the partition manager 408 requests an indexing node assignment based on an indexing node mapping policy. The indexing node mapping policy can use any one or any combination of data identifiers, time period, etc. to indicate how indexing nodes 404 should be assigned to process data records. In some cases, based on the indexing node mapping policy, the partition manager 408 requests an indexing node assignment for each data record or for a group of data records. For example, the partition manager 408 can request an indexing node assignment for some or all data records associated with the same tenant identifier or other data identifier. In some such cases, the partition manager 408 can include the data identifier associated with the data record(s) in its request for an indexing node assignment.

In certain cases, based on the indexing node mapping policy, the partition manager 408 requests an indexing node assignment for a particular amount of time, such as one minute, five minutes, etc. In some embodiments, based on the indexing node mapping policy, the partition manager 408 can request an indexing node assignment for data records based on a combination of data identifiers and time. For example, the partition manager can request an indexing node assignment for data records associated with the same tenant identifier for one minute, five minutes, etc.

In certain embodiments, based on the indexing node mapping policy, the partition manager 408 requests an indexing node identifier for the indexing node 404 that is to process a data record or group of data records. As described herein, the indexing node identifier can include an IP address, location address, or other identifier that can be used to identify a particular indexing node that is to process the data record or group of data records.

At (6) the resource monitor 418 identifies the indexing node assignment based on the indexing node mapping policy. As described herein, the indexing node mapping policy can use a variety of techniques to make an indexing node assignment. In some cases, the indexing node mapping policy can indicate that indexing node assignments are to be made based on any one or any combination of: a data identifier associated with the data record(s), availability of indexing nodes or other information from the resource catalog 420 such as indexing node identifiers associated with the indexing nodes 404, a hashing or consistent hashing scheme, a time period, etc.

In some embodiments, based on the indexing node policy, the resource monitor assigns one or a group of indexing nodes 404 to process data records with the same data identifier (e.g., tenant identifier). In certain embodiments, based on the indexing node mapping policy, the resource monitor 418 assigns data records with the same data identifier to the same indexing node 404 (or group of indexing nodes 404) for a particular time interval.

In some embodiments, based on the indexing node mapping policy, the resource monitor 418 identifies available indexing nodes using the information from the resource catalog 420 and assigns one of the available indexing nodes 404 to process the data record. As described herein, the resource monitor 418 can identify an available indexing node using various techniques. For example, the resource monitor 418 can consult the resource catalog 420 to identify an available indexing node.

In certain embodiments, based on the indexing node mapping policy, the resource monitor 418 maps the data identifier to one or more indexing nodes 404 and then makes the indexing node assignment based on the availability of the one or more indexing nodes 404. In some cases, the resource monitor 418 identifies available indexing nodes 404 and then maps the data identifier to one or more of the available indexing nodes 404. In some embodiments, based on the indexing node mapping policy, the resource monitor 418 maps the data identifier to one or more indexing nodes 404 using a hash or consistent hash scheme. In certain embodiments, based on the indexing node mapping policy and for a particular time interval, the resource monitor 418 identifies the indexing node assignment for data records associated with the same tenant using a consistent hash that maps the tenant identifier to indexing node identifiers on a hash ring.

In some cases, based on the indexing node mapping policy, a new indexing node can be generated and assigned to process the data record. For example, if the resource monitor 418 determines that there are insufficient indexing nodes 404 or that the indexing nodes are too busy (e.g., satisfy a utilization threshold), the resource monitor 418 can request that a new indexing node 404 be instantiated and assign the newly instantiated indexing node 404 to process the data record.

At (7), the resource monitor 418 communicates the indexing node assignment to the partition manager 408. In some cases, the indexing node assignment can include an identifier of the indexing node 404 that is to process the data record. In certain embodiments, the indexing node assignment can include other information, such as a time interval for which the assignment is to last, a backup indexing node 404 in the event the assigned indexing node 404 is not available or fails, etc. The partition manager 408 can use the information from the indexing node assignment to communicate the data records to a particular indexing node.

In some embodiments, (5), (6), and (7) can be omitted. For example, instead of requesting and receiving an indexing node assignment from the resource monitor 418, the partition manager 408 can consult an indexing node assignment listing that identifies recent indexing node assignments. The indexing node assignment listing can include a table or list of data identifiers and indexing nodes 404 that have processed, or are assigned to process, data associated with the data identifiers. The table or list can be stored as a lookup table or in a database, etc. In some embodiments, if the partition manager 408 determines that an indexing node 404 is already assigned to process data associated with the data identifier, the partition manager 408 can omit (5), (6), and (7), and send the data to the assigned indexing node 404 for processing. In certain embodiments, if the partition manager 408 determines that an indexing node 404 is not assigned to process data associated the data identifier, the partition manager 408 can proceed with steps (5), (6), and (7), and store the results of the indexing node assignment in the indexing node assignment listing.

In certain embodiments, indexing node assignments can be temporary. For example, indexing nodes 404 can be dynamically added or removed from the indexing system 212. Accordingly, to accommodate the change in indexing nodes 404, the indexing node assignments can be periodically redone. To facilitate the reassignment, the indexing node assignment listing can be cleared or deleted periodically. For example, each 15, 30, 60, or 90 seconds, the indexing node assignment listing can be cleared or removed. In certain embodiments, the indexing node assignment listing can include a timestamp indicating when a particular assignment was made. After a predetermined time period, the particular indexing node assignment can be deleted. Accordingly, different entries of the indexing node assignment listing can change at different times.

In some cases, a different indexing node assignment listing can be stored on or associated with each different partition manager 408. For example, a particular partition manager 408 can manage its own indexing node assignment listing by cataloging the indexing node assignments received from the resource monitor 418. As another example, the ingest manager 406 can manage some or all of the indexing node assignment listings of its partition managers 408. In some cases, an indexing node assignment listing can be associated with some or all of the partition managers 408. For example, the ingest manager 406 or the partition managers 408 can manage the indexing node assignment listing by cataloging the indexing node assignments received from the resource monitor 418.

At (8), the ingest manager 406 tracks the buffer location and the partition manager(s) 408 communicate the data to the indexer(s) 410. As described herein, the ingest manager 406 can track (and/or store) the buffer location for the various partitions received from the ingestion buffer 310. In addition, as described herein, the partition manager 408 can forward the data received from the ingestion buffer 310 to the indexer(s) 410 for processing. In various implementations, as previously described, the data from ingestion buffer 310 that is sent to the indexer(s) 410 may include a path to stored data, e.g., data stored in common storage 216 or another common storage, which is then retrieved by the indexer 410 or another component of the indexing node 404.

As described herein, in some embodiments, the partition manager 408 can communicate different records to different indexing nodes 404. For example, the partition manager 408 can communicate records associated with one tenant (or one data identifier) to one indexing node 404 and records associated with another tenant (or another data identifier) to another indexing node 404. Accordingly, the partition manager 408 can concurrently distribute data associated with different tenants to different indexing nodes 404 for processing. In some cases, data records associated with different tenants can be communicated to the same indexing node 404 for processing. For example, based on the indexing node mapping policy, the same indexing node 404 may be mapped to data from different tenants. As such, the partition manager 406 can communicate data from different tenants to the same indexing node 404. As a corollary, an indexing node 404 can receive and concurrently process data from different tenants.

At (9), the indexer 410 processes the data records. As described herein, in some cases, the data records include the data that is to be further processed by the indexing node 404. In some such embodiments, the indexing node 404 can process the data in the data records. In certain embodiments, the data records include a reference to the data that is to be further processed by the indexing node 404. In some such embodiments, the indexing node 404 can access and process the data using the reference in the data record. As described herein, the indexer 410 can perform a variety of functions, enrichments, or transformations on the data as it is indexed. For example, the indexer 410 can parse the data, identify events from the data, identify and associate timestamps with the events, associate metadata or one or more field values with the events, group events (e.g., based on time, partition, and/or tenant ID, etc.), etc. Furthermore, the indexer 410 can generate buckets based on a bucket creation policy and store the events in the hot buckets, which may be stored in a data store 412 of the indexing node 404 associated with that indexer 410 (see FIGS. 4A and/or 4B). As described herein, when generating buckets, the indexer 410 can generate separate buckets for data associated with different tenants and/or indexes.

With reference to (1), (8), and (9), it will be understood that data associated with different data identifiers can be concurrently received, distributed, and/or processed by the same partition of the ingestion buffer 310, the same partition manager 408 and/or the same indexer 410. Similarly, data associated with the same data identifier can be concurrently received, distributed, and/or processed by different partitions of the ingestion buffer 310, different partition managers 408 and/or different indexers 410.

With reference to (1), it will be understood that data records associated with different identifiers can be found in the same partition of the ingestion buffer 310 and that data records associated with the same data identifier can be found across different partitions of the ingestion buffer 310. For example, Partition 1 of ingestion buffer 310 can include data from Tenant A and Tenant B, and Partition 2 can include data from Tenant A and Tenant C.

With reference to (1) and (8), one partition manager 408 can receive and distribute data associated with different data identifiers, and different partition managers 408 can receive and distribute data associated with the same data identifier. With continued reference to the example, Partition Manager 1 associated with Partition 1 can process and distribute data from Tenant A and Tenant B (the data from Partition 1) and Partition Manager 2 association with Partition 2 can process and distribute data from Tenant A and Tenant C (the data from Partition 2).

With reference to (9), indexing nodes 404 can receive and concurrently process data associated with the same data identifier from different partition managers 408 (or from the same partition manager 408) and data associated with different data identifiers from the same partition manager 408 (or from different partition managers 408). With continued reference to the example above, based on an indexing node mapping policy, Indexer 1 can be assigned to receive and process Tenant A data from Partition Managers 1 and 2, and to receive and process Tenant C data from Partition Manager 2.

At (10), the indexer 410 copies and/or stores the data to common storage 216. For example, the indexer 410 can determine (and/or the partition manager 408 can instruct the indexer 410) to copy the data to common storage 216 based on a bucket roll-over policy. The bucket roll-over policy can use any one or any combination of bucket size, data size, time period, etc. to determine that the data is to be copied to common storage 216.

In some cases, based on the bucket roll-over policy, the indexer 410 periodically determines that the data is to be copied to common storage 216. For example, the bucket roll-over policy may indicate a time-based schedule so that the indexer 410 determines to copy and/or store the data every X number of seconds, or every X minute(s), and so forth. As another example, the bucket roll-over policy may indicate that one or more buckets are to be rolled over based on size. Accordingly, in some embodiments, the indexer 410 can determine to copy the data to common storage 216 based on a determination that the amount of data stored on the indexer 410 satisfies a threshold amount. The threshold amount can correspond to the amount of data being processed by the indexer 410 for any partition or any tenant identifier. In some cases, the bucket roll-over policy may indicate that one or more buckets are to be rolled over based on a combination of a time-based schedule and size. For example, the bucket roll-over policy may indicate a time-based schedule in combination with a data threshold. For example, the indexer 410 can determine to copy the data to common storage 216 based on a determination that the amount of data stored on the indexer 410 satisfies a threshold amount or a determination that the data has not been copied in X number of seconds, X number of minutes, etc. Accordingly, in some embodiments, the indexer 410 can determine that the data is to be copied to common storage 216 without communication with the partition manager 408 or the ingest manager 416.

In some cases, based on the bucket roll-over policy, the partition manager 408 can instruct the indexer 410 to copy the data to common storage 216. For example, the bucket roll-over policy may indicate that one or more buckets are to be rolled over based on time and/or size. In some such cases, the partition manager 408 can determine to instruct the indexer 410 to copy the data to common storage 216 based on a determination that the amount of data stored on the indexer 410 satisfies a threshold amount. The threshold amount can correspond to the amount of data associated with the partition that is managed by the partition manager 408 or the amount of data being processed by the indexer 410 for any partition. For example, the indexer 410 can report and/or the partition manager 408 can monitor the size of the data being indexed to the partition manager 408 and/or the size of data being processed by the indexer 410 for any partition or any tenant identifier.

In some such cases, the indexer 410 can report the size of the data in the aggregate and/or the size of the data for each data identifier. For example, the indexer 410 can include the size of the data being processed for one tenant and the size of the data being processed for a different tenant.

In some cases, the indexer 410 can routinely provide a status update to the partition manager 408 regarding the data. The status update can include, but is not limited to the size of the data, the number of buckets being created, the amount of time since the buckets have been created, etc. In some embodiments, the indexer 410 can provide the status update based on one or more thresholds being satisfied (e.g., one or more threshold sizes being satisfied by the amount of data being processed, one or more timing thresholds being satisfied based on the amount of time the buckets have been created, one or more bucket number thresholds based on the number of buckets created, the number of hot or warm buckets, number of buckets that have not been stored in common storage 216, etc.).

In certain cases, the indexer 410 can provide an update to the partition manager 408 regarding the size of the data that is being processed by the indexer 410 in response to one or more threshold sizes being satisfied. For example, each time a certain amount of data is added to the indexer 410 (e.g., 5 MB, 10 MB, etc.), the indexer 410 can report the updated size to the partition manager 408. In some cases, the indexer 410 can report the size of the data stored thereon to the partition manager 408 once a threshold size is satisfied.

In certain embodiments, the indexer 410 reports the size of the data being indexed to the partition manager 408 based on a query by the partition manager 408. In certain embodiments, the indexer 410 and partition manager 408 maintain an open communication link such that the partition manager 408 is persistently aware of the amount of data on the indexer 410.

In some cases, a partition manager 408 monitors the data processed by the indexer 410. For example, the partition manager 408 can track the size of the data on the indexer 410 that is associated with the partition being managed by the partition manager 408. In certain cases, one or more partition managers 408 can track the amount or size of the data on the indexer 410 that is associated with any partition being managed by the ingest manager 406 or that is associated with the indexing node 404.

Any one or any combination of the aforementioned reporting or monitoring can be done for different data or data associated with different data identifiers. For example, the indexers 410 can use one reporting scheme for data associated with one tenant and another reporting scheme for data associated with a different tenant. Similarly, the indexers 410 can separately report information for different data. Furthermore, the partition manager 408 can monitor/track the data processed by the indexer 410 for different data identifiers.

In some cases, the partition manager 408 can instruct the indexer 410 to copy the data that corresponds to the partition being managed by the partition manager 408 to common storage 216 based on the size of the data that corresponds to the partition satisfying the threshold amount. In certain embodiments, the partition manager 408 can instruct the indexer 410 to copy the data associated with any partition being processed by the indexer 410 to common storage 216 based on the amount of the data from the partitions that are being processed by the indexer 410 satisfying the threshold amount and/or an amount of time that has passed since a bucket was stored to common storage 216, etc.

As described herein, the partition manager and/or indexer 410 can use different bucket roll-over policies for buckets associated with different data identifiers. For example, the indexer 410 can use one bucket roll-over policy (or thresholds) for buckets associated with one tenant and a bucket roll-over policy (or thresholds) for buckets associated with a different tenant. As such, an indexer 410 may copy data associated with one data identifier more or less frequently than data associated with another identifier, or use different criteria to determine when to copy data associated with the different data identifiers.

As part of storing the data to common storage 216, the indexer 410 can verify or obtain acknowledgements that the data is stored successfully. In some embodiments, the indexer 410 can determine information regarding the data stored in the common storage 216. For example, the information can include location information regarding the data that was stored to the common storage 216, bucket identifiers of the buckets that were copied to common storage 216, as well as additional information, e.g., in implementations in which the ingestion buffer 310 uses sequences of records as the form for data storage, the list of record sequence numbers that were used as part of those buckets that were copied to common storage 216.

When storing the data to common storage 216, the indexer 410 can physically and/or logically separate data or buckets associated with different data identifiers. For example, the indexer 410 can store buckets associated with Tenant A in a separate directory, file structure, or data store from buckets associated with Tenant B. In this way, the indexer 410 can maintain the mutual exclusivity and/or independence between data from different tenants. Similarly, the indexer 410 can physically and/or logically separate data or buckets associated with different indexes of a tenant.

At (11), the indexer 410 reports or acknowledges to the partition manager 408 that the data is stored in the common storage 216. In various implementations, this can be in response to periodic requests from the partition manager 408 to the indexer 410 regarding which buckets and/or data have been stored to common storage 216. The indexer 410 can provide the partition manager 408 with information regarding the data stored in common storage 216 similar to the data that is provided to the indexer 410 by the common storage 216. In some cases, (11) can be replaced with the common storage 216 acknowledging or reporting the storage of the data to the partition manager 408 and/or the indexer 410.

At (12), the indexer 410 updates the data store catalog 220. As described herein, the indexer 410 can update the data store catalog 220 with information regarding the data or buckets stored in common storage 216. For example, the indexer 410 can update the data store catalog 220 to include location information, a bucket identifier, a time range, and tenant and partition information regarding the buckets copied to common storage 216, etc. In this way, the data store catalog 220 can include up-to-date information regarding the buckets stored in common storage 216.

At (13), the partition manager 408 reports the completion of the storage to the ingestion buffer 310 and/or another data store (for example, DynamoDB) that stores that stores the location marker information, and at (14), the ingestion buffer 310 updates the buffer location or marker and/or the another store updates it marker. Accordingly, in some embodiments, the ingestion buffer 310 and/or the another database system can maintain the location marker for a particular data record until the ingestion buffer 310 (or other data store) receives an acknowledgement that the data that the ingestion buffer 310 sent to the indexing node 404 has been indexed by the indexing node 404 and stored to common storage 216. In addition, the updated buffer location or marker can be communicated to and stored by the ingest manager 406. In this way, a data intake and query system 108 can use the ingestion buffer 310 to provide a stateless environment for the indexing system 212. For example, as described herein, if an ingest manager 406, partition manager 408, indexing node 404 or one of its components (e.g., indexer 410, data store 412, etc.) becomes unavailable or unresponsive before data from the ingestion buffer 310 is copied to common storage 216, the indexing system 212 can generate or assign a new component, to process the data that was assigned to the now unavailable component while reducing, minimizing, or eliminating data loss.

At (15), a bucket manager 414, which may form part of the indexer 410, the indexing node 404, or indexing system 212, merges multiple buckets into one or more merged buckets. As described herein, to reduce delay between processing data and making that data available for searching, the indexer 410 can convert smaller hot buckets to warm buckets and copy the warm buckets to common storage 216. However, as smaller buckets in common storage 216 can result in increased overhead and storage costs, the bucket manager 414 can monitor warm buckets in the indexer 410 and merge the warm buckets into one or more merged buckets.

In some cases, the bucket manager 414 can merge the buckets according to a bucket merge policy. As described herein, the bucket merge policy can indicate which buckets are candidates for a merge (e.g., based on time ranges, size, tenant, index, or other identifiers, etc.), the number of buckets to merge, size or time range parameters for the merged buckets, a frequency for creating the merged buckets, etc. It will be understood that the bucket manager 414 can use different bucket merge policies for data associated with different data identifiers. For example, the bucket manager 414 can merge buckets associated with one tenant using a first bucket merge policy and buckets associated with a second tenant using a second bucket merge policy.

At (16), the bucket manager 414 stores and/or copies the merged data or buckets to common storage 216, and obtains information about the merged buckets stored in common storage 216. Similar to (7), the obtained information can include information regarding the storage of the merged buckets, such as, but not limited to, the location of the buckets, one or more bucket identifiers, tenant or partition identifiers, etc. At (17), the bucket manager 414 reports the storage of the merged data to the partition manager 408, similar to the reporting of the data storage at (11).

At (18), the indexer 410 deletes data from the data store (e.g., data store 412). As described herein, once the merged buckets have been stored in common storage 216, the indexer 410 can delete corresponding buckets that it has stored locally according to a bucket management policy. For example, the indexer 410 can delete the merged buckets from the data store 412, as well as the pre-merged buckets (buckets used to generate the merged buckets). By removing the data from the data store 412, the indexer 410 can free up additional space for additional hot buckets, warm buckets, and/or merged buckets.

At (19), the common storage 216 deletes data according to a bucket management policy. As described herein, once the merged buckets have been stored in common storage 216, the common storage 216 can delete the pre-merged buckets stored therein. In some cases, as described herein, the common storage 216 can delete the pre-merged buckets immediately, after a predetermined amount of time, after one or more queries relying on the pre-merged buckets have completed, or based on other criteria in the bucket management policy, etc. In certain embodiments, a controller at the common storage 216 handles the deletion of the data in common storage 216 according to the bucket management policy. In certain embodiments, one or more components of the indexing node 404 delete the data from common storage 216 according to the bucket management policy. However, for simplicity, reference is made to common storage 216 performing the deletion. As described herein, it will be understood that different bucket management policies can be used for data associated with different data identifiers. For example, the indexer 410 or common storage 216 can use one bucket management policy for buckets associated with one tenant and another bucket management policy for buckets associated with a different tenant.

At (20), the indexer 410 updates the data store catalog 220 with the information about the merged buckets. Similar to (12), the indexer 410 can update the data store catalog 220 with the merged bucket information. The information can include, but is not limited to, the time range of the merged buckets, location of the merged buckets in common storage 216, a bucket identifier for the merged buckets, tenant and partition information of the merged buckets, etc. In addition, as part of updating the data store catalog 220, the indexer 410 can remove reference to the pre-merged buckets. Accordingly, the data store catalog 220 can be revised to include information about the merged buckets and omit information about the pre-merged buckets. In this way, as the search managers 514 request information about buckets in common storage 216 from the data store catalog 220, the data store catalog 220 can provide the search managers 514 with the merged bucket information.

As mentioned previously, in some of embodiments, one or more of the functions described herein with respect to FIG. 8 can be omitted, performed in a variety of orders and/or performed by a different component of the data intake and query system 108. For example, the indexer 410 can (12) update the data store catalog 220 before, after, or concurrently with the deletion of the data in the (18) indexer 410 or (19) common storage 216. Similarly, in certain embodiments, the indexer 410 can (15) merge buckets before, after, or concurrently with (10)-(14), etc. As another example, the partition manager 408 can perform (12) and/or (14). In some cases, the indexer 410 can update the data store catalog 220 before, after, or concurrently with (17)-(19), etc.

In some cases, (1)-(4) can be performed in any order, or concurrently with each other. For example, the ingest manager 416 can generate the partition managers 408 before or after receiving data from the ingestion buffer 310, while the resource monitor 418 concurrently monitors the indexers 410 and updates the resource catalog 420.

In certain embodiments, such as when an indexing system 212 is instantiated for a single tenant, (3)-(7) may be omitted. For example, in some such embodiments, the indexing system 212 may not include a resource monitor 418 and/or resource catalog 420 and/or the indexing system 212 may have dedicated indexing nodes 404 for the tenant. In some such cases, the partition manager 408 can be configured to send the data to a particular indexer 410.

As another example, in some cases, the partition manager 408 may not request an indexer assignment from the resource monitor 418. In such cases, the ingest manager 406 or partition manager 408 can determine the indexer assignment. For example, the ingest manager 406 or partition manager 408 can use an indexing node mapping policy to identify an indexer 410 to process a particular data record. As another example, the partition manager 408 may use an indexing node assignment listing to determine that a data record associated with a data identifier has already been assigned to a particular indexer 410. In some such cases, the partition manager 408 can communicate the data record to the particular indexer 410 without requesting an indexer assignment from the resource monitor 418.

In some embodiments, the one or more components of the indexing system 212 and/or the ingestion buffer 310 can concurrently process data from multiple tenants. For example, each partition of the ingestion buffer 310 can include data records associated with different tenants. In some cases, a data record can include data associated with one tenant and different data records can include data from different tenants. In certain cases, a data record can include location and/or identification information of data or a file with data from a particular tenant and/or a tenant identifier corresponding to the particular tenant. For each data record, the partition manager 408 can request an indexing node assignment to process the data record, the resource monitor 418 can provide an indexing node assignment for the data record, and the assigned indexing node 404 can process the data record (including any data referenced by the data record). The ingest manager 406/partition manager 408, the resource monitor 418, and/or the indexer 410 can concurrently process multiple data records in this manner. As different data records can be associated with different tenants, the ingest manager 406 ingest manager 406/partition manager 408, the resource monitor 418, and/or the indexer 410 can concurrently process data associated with different tenants.

In certain embodiments, the components of the indexing system 212 may only process data from one tenant. For example, the ingestion buffer 310 can be configured to only process data from one tenant. Correspondingly, the data records received and processed by the ingest manager 406/partition manager 408 and/or indexer 410 can correspond to the same tenant. In some embodiments in which the components of the indexing system 212 only process data from one tenant, the resource monitor 418 and/or resource catalog 420 (and corresponding (3), (4), (5), (6)) can be omitted. In some such embodiments, the ingest manager 406/partition manager 408 may form part of an indexing node 404 as illustrated at FIG. 4A and/or the data records from the partition manager 408 can be sent to one of a group of indexers 410 designated for the particular tenant using a load balancing scheme. Further, in some embodiments in which the components of the indexing system 212 only process data from one tenant, separate ingestion buffer(s) 310, ingest manager(s) 406/partition manager(s) 408, resource monitor(s) 418, resource catalog(s) 420, indexer(s) 410, and bucket manager(s) 414 can be instantiated for each tenant.

4.3. Querying

Figure 9:
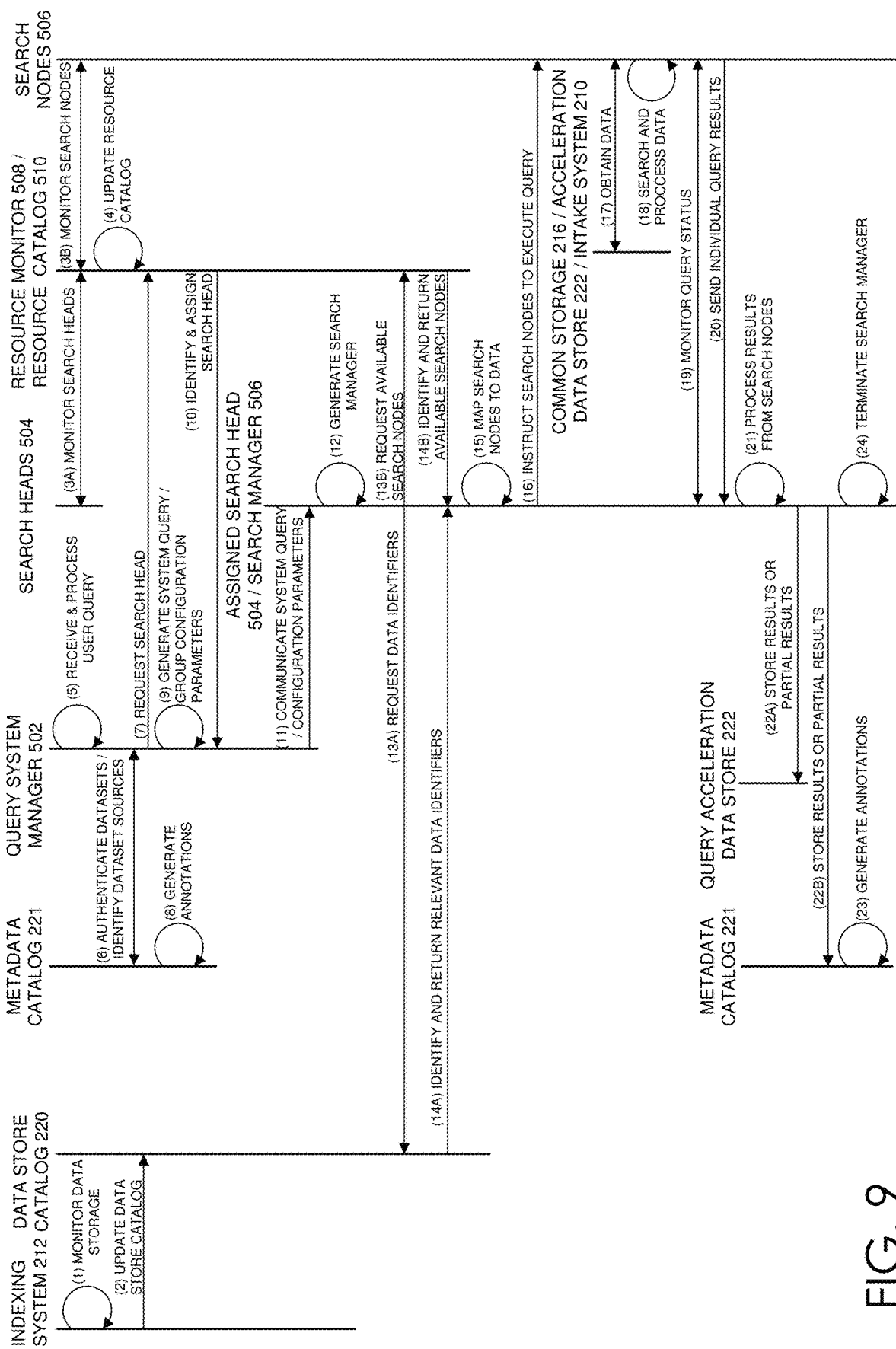
FIG. 9 is a data flow diagram illustrating an embodiment of the data flow and communications between a variety of the components of the data intake and query system during execution of a query.

FIG. 9 is a data flow diagram illustrating an embodiment of the data flow and communications between a variety of the components of the data intake and query system 108 in relation to a query. Specifically, FIG. 9 is a data flow diagram illustrating an embodiment of the data flow and communications between the indexing system 212, data store catalog 220, metadata catalog 221, query system manager 502, search head(s) 504, resource monitor 508, resource catalog 510, search nodes 506, common storage 216, and the query acceleration data store 222. However, it will be understood, that in some of embodiments, one or more of the functions described herein with respect to FIG. 9 can be omitted, performed in a different order and/or performed by a different component of the data intake and query system 108. For example, in some embodiments, the steps identified as being performed by the query system manager 502 and search head 504 can be performed by the same component (e.g., the query system manager 502, the search head 504, or another component of the data intake and query system 108). In some such embodiments, (6) can be omitted. Accordingly, the illustrated embodiment and description should not be construed as limiting.

Further, it will be understood that the various functions described herein with respect to FIG. 9 can be performed by one or more distinct components of the data intake and query system 108. For example, for simplicity, reference is made to a search head 504 performing one or more functions. However, it will be understood that these functions can be performed by one or more components of the search head 504, such as, but not limited to, the search master 512 and/or the search manager 514. Similarly, reference is made to the indexing system 212 performing one or more functions. However, it will be understood that the functions identified as being performed by the indexing system 212 can be performed by one or more components of the indexing system 212.

At (1) and (2), the indexing system 212 monitors the storage of processed data and updates the data store catalog 220 based on the monitoring. As described herein, one or more components of the indexing system 212, such as the partition manager 408 and/or the indexer 410 can monitor the storage of data or buckets to common storage 216. As the data is stored in common storage 216, the indexing system 212 can obtain information about the data stored in the common storage 216, such as, but not limited to, location information, bucket identifiers, tenant identifier (e.g., for buckets that are single tenant) etc. The indexing system 212 can use the received information about the data stored in common storage 216 to update the data store catalog 220.

Furthermore, as described herein, in some embodiments, the indexing system 212 can merge buckets into one or more merged buckets, store the merged buckets in common storage 216, and update the data store catalog to 220 with the information about the merged buckets stored in common storage 216.

At (3A) the resource monitor 508 monitors some or all of the search heads 504 and (3B) search nodes 506 (in the query system 214), including the specific search head 504 and search nodes 506 used to execute the query, and (4) updates the resource catalog 510. As described herein, the resource monitor 508 can monitor the availability, responsiveness, and/or utilization rate of the search heads 504 and search nodes 506. Based on the status of the search heads 504 and the search nodes 506, the resource monitor 508 can update the resource catalog 510. In this way, the resource catalog 510 can retain information regarding a current status of each of the search heads 504 and the search nodes 506 in the query system 214. It will be understood that (3A), (3B), and (4) may be repeated together periodically, according to a schedule, policy, or algorithm, such that the current (or reasonably current) availability, responsiveness, and/or utilization rate of the search heads 504 and the search nodes 506 is stored in resource catalog 510. For example, a time-based schedule may be used so that (3A), (3B), and (4) may be performed every X number of seconds, or every X minute(s), and so forth. The performance of (3A), (3B), and (4) on a periodic basis may be referred to as a "heartbeat."

The monitoring of the search heads 504 and search nodes 506 may allow for improved resource utilization through the implementation of dynamic resource scaling. Resource scaling can be performed by provisioning additional search heads 504 and/or search nodes 506 ("spinning up") or decommissioning idle search heads 504 and/or search nodes 506 ("spinning down") based on various individual or aggregate capacity utilization metrics, such as CPU/memory utilization, the number of concurrent running searches, and so forth. For example, each search head 504 and each search node 506 may periodically report (e.g., for a "heartbeat") its status to the resource monitor 508, including information such as CPU/memory utilization and capacity, an indication of whether the search head is processing a search request (or if the search node is processing the execution of a query), and so forth. Provisioning and decommissioning resources can be performed based on applying an algorithm or a policy to the capacity utilization metrics. For instance, there may be different thresholds used for provisioning and decommissioning resources. Thus, if many resources are being utilized and a particular tenant requires more capacity than is available, additional resources can be spun up to meet that demand, or if not many resources are being utilized, resources can be spun down to a minimum threshold of idle computing.

In some embodiments one or more search heads 504, can be spun up or based on search utilization. For instance, the current number of concurrently running searches may be known (e.g., from "heartbeats" received from the search heads). For instance, if based on the number of search heads allocated 32 searches can be executed concurrently and only 20 searches are being concurrently executed the query system 214 that about 60% of the search head capacity is being utilized. An upper threshold can be set (e.g., above 80% capacity) and once that threshold is satisfied, the number of search heads can be increased (e.g., by 5 additional search heads). Once those new search heads are provisioned, they can start reporting (e.g., via "heartbeat") to the resource monitor 508 and the status of those search heads 504 can be tracked. In embodiments in which information associated with a search request (e.g., extraction rules, and so forth) are independently stored in a catalog (e.g., a metadata catalog 221) rather than passed as metadata associated with the search request to be locally stored on a search head, spinning up additional search heads 504, the query system 214 may be able to spin up a search head 504 relatively quickly given that configuration management and synchronization between search heads 504 may not be required and available search heads can be freely assigned to handle any search request associated with any tenant.

A lower threshold can also be set (e.g., below 20% capacity) and once capacity utilization decreases below the lower threshold, idle search heads 504 or search nodes 506 can be decommissioned. In some cases, there may be a floor or minimum number of search heads that must be available at all times (e.g., 32 total search heads). For spinning down search heads 504, in some embodiments, the only requirement may be that a search head 504 must stop processing a search request before it can be removed. In some embodiments, spinning up or down the number of search heads 504 can be performed by the query system manager 502.

In the case of the search nodes 506, additional search nodes 506 may be spun up or spun down based on capacity utilization and/or based on the number of queries being executed. In some embodiments, a search node 506 may be allocated to one query at a time. In some such embodiments, if more queries are requested than there are available search nodes or if the a threshold number of the total instantiated search nodes 506 are in use, the query system 214 can instantiate an additional number of search nodes 506.

In certain embodiments, such as where a search node 506 is concurrently assigned to multiple queries, spinning search nodes 506 up or down can be based on capacity or resource utilization. For instance, the total CPU/memory utilization and capacity across the search nodes 506 can be determined (e.g., by aggregating the individual CPU/memory utilization and capacity for each search node). An upper threshold can be set (e.g., above 80% utilization of total CPU/memory capacity) and once that threshold is exceeded, the number of search nodes can be increased (e.g., by 20 additional search nodes 506). Once the new search nodes 506 are provisioned, they can start reporting (e.g., via "heartbeat") to the resource monitor 508 and the status of those search nodes 506 can be tracked. The new search nodes 506 can then available to be assigned to a search head 504 (or search manager 514) to execute a query. As described in greater detail herein, a variety of factors can be considered when assigning search nodes 506.

A lower threshold can also be set (e.g., below 20% utilization of total CPU/memory capacity) and once utilization drops below that lower threshold, certain search nodes may be decommissioned (e.g., search nodes that were recently spun up). In some cases, there may be a set of search nodes 506 that cannot be spun down first (e.g., the search nodes with high cache hit ratio). In some embodiments, spinning up or down the number of search heads 504 can be performed by the query system manager 502.

At (5), a search service or query system manager 502 receives and processes a user query. The user query can correspond to a query received from a client device 204 and can include one or more query parameters. In some cases, the user query can be received via the gateway 215 and/or via the network 208. The query can identify (and the query parameters can include) a set of data and manner processing the set of data. In certain embodiments the set of data of a query can include multiple datasets. For example, the set of data of the query can include one or more source datasets, source reference datasets and/or query datasets. In turn a dataset can include one or more queries (or subqueries). For example, a query dataset can be identified as at least a portion of the set of data of a received query, and can include a query (or subquery) that identifies a set of data and a manner of processing the set of data. As another example, the query dataset could reference one or more additional query datasets that in turn include one or more subqueries.

Furthermore, the query can include at least one dataset identifier and/or dataset association record identifier. In some embodiments, the dataset identifier can be a logical identifier of a dataset. In certain embodiments, the dataset identifier and/or dataset association record identifier can follow a particular query parameter, such as "from" "datasetID," "moduleID," etc. In some embodiments, the dataset identifier and/or dataset association record identifier can be included as a parameter of a command received by the query system manager 502. For example, in some embodiments, the data intake and query system 108 can receive the query as one parameter and the dataset identifier and/or the dataset association record as another parameter.

As part of processing the user query, the query system manager 502 can identify the dataset identifier(s) and/or the dataset association record identifier. In some embodiments, the query system manager 502 can parse the query to identify the dataset identifier and/or dataset association record identifier. For example, the query system manager 502 can identify "from" (or some other query parameter) in the query and determine that the subsequent string is the dataset identifier. Furthermore, it will be understood that the query system manager 502 can identify multiple dataset identifier(s) and/or dataset association record identifier(s) as part of processing the user query.

At (6), the query system manager 502 communicates with the metadata catalog 221 to authenticate the datasets identified in the query (and other datasets parsed during the query processing), identify primary datasets (e.g. datasets with configurations used to execute the query), secondary datasets (datasets referenced directly or indirectly by the query but that do not include configurations used to execute the query) and/or identify query configuration parameters.

In some embodiments, upon identifying a dataset association record 602 associated with the query, the query system manager 502 uses the dataset association record 602 to identify additional information associated with the user query, such as one or more datasets and/or rules. In some embodiments, using the dataset association record, the query system manager 502 can determine whether a user associated with the query has the authorizations and/or permissions to access the datasets identified in the query.

Once the query system manager 502 identifies the dataset of the dataset association record 602 referenced in the query, the query system manager 502 can determine whether the identified dataset identifies one or more additional datasets (e.g., is a single or multi-reference dataset), includes additional query parameters, is a source dataset, a secondary dataset, and/or a primary dataset that will be used by the data intake and query system to execute the query.

In the event, the dataset is a single or multi-reference dataset, with each additional dataset identified, the query system manager 502 can recursively review information about the dataset to determine whether it is a non-referential, single, or multi-reference dataset, a secondary dataset, and/or a primary dataset until it has identified any dataset referenced directly or indirectly by the query (e.g., all primary and secondary datasets). For example, as described in herein, the dataset identifier used in the user query may refer to a dataset that is from another dataset association record. Based on the determination that the dataset is imported, the query system manager 502 can review the other dataset association record to identify any additional datasets, identify configuration parameter (e.g., access information, dataset type, etc.) of the imported dataset, and/or determine whether the referenced dataset was imported from a third dataset. The query system manager 502 can continue to review the dataset association records 602 until it has identified the dataset association record where the dataset is native.

As another example, the dataset identifier in the user query may refer to a multi-reference dataset, such as a query dataset that refers to one or more source datasets, source reference datasets, and/or other query datasets. Accordingly, the query system manager 502 can recursively review the datasets referred to in the multi-reference dataset until it identifies datasets that do not rely on any other datasets (e.g., non-referential datasets) and/or identifies the source datasets that include the data that forms at least a portion of the set of data or other primary datasets.

With each new dataset identified from the dataset association records, the query system manager 502 can authenticate the dataset. As part of authenticating the datasets, the query system manager 502 can determine whether the dataset referred to is imported by the dataset association record and/or whether the user has the proper credentials, authorizations, and/or permissions to access the dataset.

In addition to identifying additional datasets, the query system manager 502 can identify additional query parameters. For example, one or more datasets, such as a query dataset, may include additional query parameters. Accordingly, as the query system manager 502 parses the various datasets, it can identify additional query parameters that are to be processed and/or executed.

Furthermore, as the query system manager 502 parses the dataset association records 602, it can identify one or more rules that are to be used to process data from one or more datasets. As described herein, the rules can be imported by different dataset association records 602. Accordingly, the query system manager 502 can recursively parse the rules to identify the dataset association record 602 from which the rule originated. Furthermore, as the query system manager 502 parses the dataset association records 602 and identifies additional rules, it can determine whether the user has the proper credentials permissions etc. to access the identified rules. In addition, the query system manager 502 can identify one or more datasets associated with the rules (e.g., that reference, use, are referenced by, or used by, the additional rules). As described herein, in some embodiments these datasets may not be explicitly imported in a dataset association record, but may be automatically included as part of the query processing process.

In addition to identifying the various datasets and/or rules associated with the query, the query system manager 502 can identify the configurations associated with the datasets and rules associated with the query. In some embodiments, the query system manager 502 can use the dataset configuration records 604 and/or rule configuration records 606 to identify the relevant configurations for the datasets and/or rules associated with the query. For example, the query system manager 502 can refer to the dataset configuration records 604 to identify the dataset types of the various datasets associated with the query. In some embodiments, based on the dataset type, the query system manager 502 can determine how to interact with or generate commands for the dataset. For example, for a lookup dataset, the query system manager may generate a "lookup" command, for an "index" dataset, the query system manager may generate a "search" command, and for a metrics interaction dataset, the query system manager may generate an "mstats" command As described herein, in some embodiments, the dataset configuration records 604 and rule configuration records 606 can include a physical identifier for the datasets and/or rules. Accordingly, in some embodiments, the query system manager 502 can obtain the physical identifiers for each of the datasets and/or rules associated with the query. In certain embodiments, the query system manager 502 can determine the physical identifiers for each of the datasets and/or rules associated with the query based on the logical name and dataset association record 602 associated with the dataset or rule. For example, in certain embodiments, the physical identifier can correspond to a combination of the logical identifier of the dataset and the logical identifier of the associated dataset association record.

In some embodiments, when identifying the rule configuration records 606 and/or dataset configuration records 604, the query system manager 502 can obtain a subset of the dataset configuration records 604 and/or rule configuration records 606 in the metadata catalog 221 and/or a subset of the dataset configuration records 604 and/or rule configuration records 606 associated with the dataset association records 602 identified by the query or referenced while processing the query. In certain embodiments, the query system manager 502 obtains only the dataset configuration records 604 and/or rule configuration records 606 that are needed to process the query or only the primary dataset configuration records 604 and primary rule configuration records 606. For example, if the dataset association record 602 reference three datasets and two rules, but the query only uses one of the datasets and one of the rules, the query system manager 502 can obtain the dataset configuration record 604 of the dataset referenced and the rule configuration record 606 in the query but not the dataset configuration records 604 and rule configuration records 606 of the datasets and rule not referenced in or used by the query.

At (7), the query system manager 502 requests a search head. As described herein the search heads 504 can be dynamically assigned to process queries associated with different tenants. Accordingly, prior to a search head 504 processing a query, the query system manager 502 or search service can request an identification of a search head for the (system) query from the resource monitor 508. In some cases, (7) can be done before, after, or concurrently with (6). For example, the query system manager 502 can request the search head 504 before, after, or concurrently with authenticating the datasets and/or identifying dataset sources.

At (8), the metadata catalog 221 generates annotations. As described herein, the metadata catalog 221 can generate annotations based on interactions with or changes to the metadata catalog 221. For example, based on the authentication of the datasets and identify the dataset sources, the metadata catalog 221 can generate one or more annotations. The annotations can include, but are not limited to, updating the number of times a dataset is used, updating a dataset configuration record based on the search, generating a dataset configuration record based on the query, identifying the user associated with the query, storing a job ID associated with the query in a dataset configuration record, etc. As described herein, in some cases, the metadata catalog 221 can generate annotations based on the content of a query. For example, if the query indicates that a dataset includes a particular field, the metadata catalog 221 can generate an annotation for the corresponding dataset configuration record that identifies the field as a field of the dataset, etc. In certain cases, (8) can be done before, after, or concurrently with (7), (9), or other steps. In certain embodiments, the metadata catalog 221 generates the annotations as soon as an interaction or change occurs. In some embodiments, the metadata catalog 221 waits until the query is complete before generating annotations, or generates all annotations at a predetermined time, etc.

At (9), the query system manager 502 generates a system query and/or groups query configuration parameters. The query configuration parameters can include the dataset configuration records 604 corresponding to the primary datasets and/or the rule configuration records 606 corresponding to the rules associated with the query or primary rules. In some cases, (9) can be done before, after, or concurrently with (7), (8), (10), and the like. In certain embodiments (9) is done after (6) and before (11).

In some embodiments, the system query can be based on the user query, one or more primary or secondary datasets, the physical name of a primary dataset(s), the dataset type of the primary dataset(s), additional query parameters identified from the datasets, and/or based on information about the search head 504, etc. In certain embodiments, the system query corresponds to the user query modified to be compatible with the search head 504. For example, in some embodiments, the search head 504 may not be able to process one or more commands in the system query. Accordingly, the query system manager 502 can replace the commands unsupported by the search head 504 with commands that are supported by the search head 504.

In some embodiments, as the system query parses the dataset association records 602 and/or dataset configuration records 604, it identifies the datasets to be included in the query. In certain embodiments, the query system manager 502 identifies the datasets to be included based on the dataset identifier(s) included in the query. For example, if the query identifies a source dataset or source reference dataset, the query system manager 502 can include an identifier for the source dataset or source reference dataset in the system query. Similarly, if the query identifies a single or multi-reference dataset, the query system manager 502 can include an identifier for the single or multi-reference dataset in the system query and/or may include an identifier for one or more (primary) datasets referenced by the single or multi-reference dataset in the system query In some embodiments, the query system manager 502 identifies the datasets to be included based on the dataset identifier(s) included in the query and/or one or more query parameters of a dataset referenced by the query. For example, if the query identifies (or references) a query dataset, the query system manager 502 can include the query parameters (including any referenced primary datasets) of the query dataset in the query. As another example, the query system manager 502 can recursively parse the query parameters (including any referenced datasets) of the query dataset to identify primary datasets and instructions for processing data from (or referenced by) the primary datasets, and include the identified primary datasets and instructions for processing the data in the query. Similarly, if a query dataset references one or more single reference or multi-reference datasets, the query system manager 502 can recursively process the single reference or multi-reference datasets referenced by the query dataset until it identifies the query parameters referenced by any dataset referenced by the query dataset and the primary datasets that include (or reference) the data to be processed according to the identified query parameters.

In certain embodiments, the system query replaces any logical dataset identifier of the user query (such as a query dataset) with the physical dataset identifier of a primary dataset or source dataset identified from the metadata catalog 221. For example, if the logical name of a dataset is "main" and the dataset association record 602 is "test," the query system manager 502 can replace "main" with "test.main" or "test_main," as the case may be. Accordingly, the query system manager 502 can generate the system query based on the physical identifier of the primary datasets or source datasets.

In some embodiments, the query system manager 502 generates the system query based on the dataset type of one or more primary datasets, source datasets, or other datasets to be referenced in the system query. For example, datasets of different types may be interacted with using different commands and/or procedures. Accordingly, the query system manager 502 can include the command associated with the dataset type of the dataset in the query. For example, if the dataset type is an index type, the query system manager 502 can replace a "from" command with a "search" command. Similarly, if the dataset type is a lookup type, the query system manager 502 can replace the "from" command with a "lookup" command. As yet another example, if the dataset type is a metrics interactions type, the query system manager 502 can replace the "from" command with an "mstats" command. As yet another example, if the dataset type is a view dataset, the query system manager 502 can replace the "from" and dataset identifier with a query identified by the view dataset. Accordingly, in certain embodiments, the query system manager 502 can generate the system query based on the dataset type of one or more primary datasets.

In certain embodiments, the query system manager 502 does not include identifiers for any secondary datasets used to parse the user query. In some cases, as the query system manager 502 parses the dataset referenced by a query, it can determine whether a dataset associated with the query will be used to execute the query. If not, the dataset can be omitted from the system query. For example, if a query dataset includes query parameters, which reference two source datasets, the query system manager 502 can include the query parameters and identifiers for the two source dataset in the system query. Having included the content of the query dataset in the query, the query system manager 502 can determine that no additional information or configurations from the query dataset will be used by the query or to execute the query. Accordingly, the query system manager 502 can determine that the query dataset is a secondary dataset and omit it from the query.

In some embodiments, the query system manager 502 includes only datasets (or source datasets or source reference datasets) explicitly referenced in the user query or in a query parameter of another dataset in the system query. For example, if the user query references a "main" source dataset, the "main" source dataset will only be included in the query. As another example, if the user query (or a query parameter of another dataset, such as a query dataset) includes a "main" source dataset and a "test" source reference dataset, only the "main" source dataset and "test" source reference dataset, will be included in the system query. However, it will be understood that the query system manager 502 can use a variety of techniques to determine whether to include a dataset in the system query.

In certain embodiments, the query system manager 502 can identify query configuration parameters (configuration parameters associated with the query) based on the primary datasets and/or rules associated with the query. For example, as the query system manager 502 parses the dataset configuration records 604 of the datasets referenced (directly or indirectly) by the user query it can determine whether the dataset configuration records 604 are to be used to execute the system query.

In some cases, to determine whether the dataset configuration record 604 is to be used to execute the query, the query system manager 502 can parse a generated system query. In parsing the system query, the query system manager 502 can determine that the datasets referenced in the system query will be used to execute the system query. Accordingly, the query system manager 502 can obtain the dataset configuration records 604 corresponding to the datasets referenced in the system query. For example, if a system query references the "test.main" dataset, the query system manager 502 can obtain the dataset configuration record 604 of the "test.main" dataset.

In addition, in some cases, the query system manager can identify any datasets referenced by the datasets in the system query and obtain the dataset configuration records 604 of the datasets referenced by the datasets in the system query. For example, if the system query references a "users" source reference dataset, the query system manager 502 can identify the source dataset referenced by the "users" source reference dataset and obtain the corresponding dataset configuration records 604, as well as the dataset configuration record 604 for the "users" source reference dataset.

In certain embodiments, the query system manager 502 can identify and obtain dataset configuration records 604 for any source dataset(s) and source reference dataset(s) referenced (directly or indirectly) by the query.

In some embodiments, the query system manager 502 can identify and obtain rules configurations 606 for any rules referenced by: the (system or otherwise) query, a dataset included in the system (or other generated) query, a dataset for which a dataset configuration record 604 is obtained as part of the query configuration parameters, and/or a dataset association record referenced (directly or indirectly) by the user query. In some cases, the query system manager 502 includes all rules associated with the dataset association record(s) associated with the query in the query configuration parameters. In certain cases, the query system manager 502 includes a subset of the rules associated with the dataset a dataset association record(s) associated with the query. For example, the query system manager 502 can include rule configuration records 606 for only the rules referenced by or associated with a dataset that is also being included in the query configuration parameters.

As described herein, the query system manager 502 can obtain the dataset configuration records 604 and/or rule configuration records 606 from the metadata catalog 221 based on a dynamic parsing of the user query. Accordingly, in some embodiments, the query system manager 502 can dynamically identify the query configuration parameters to be used to process and execute the query.

At (10), the resource monitor 508 can assign a search head 504 for the query. In some embodiments, the resource monitor 508 can dynamically select a search head 504 and assign it in response to the search request based on a search head mapping policy. For example, based on the search head mapping policy, the resource monitor 508 may identify a search head 504 for the query based on a current availability, responsiveness, and/or utilization rate of the search heads 504 identified in the resource catalog 510. As described herein, the resource catalog 510 can include metrics like concurrent search count, CPU/memory capacity, and so forth. In some embodiments, based on the search head mapping policy, the research catalog 510 may be queried to identify an available search head 504 with free capacity for processing the search request.

There may be numerous benefits associated with dynamically (e.g., in response to a request) selecting and assigning, based on availability and utilization, the search head 504 for the search request, instead of using a pre-assigned search head 504 (e.g., to specific tenants). Pre-assigning resources to tenants (or based on data identifiers) may result in resource utilization issues, whereas dynamically assigning search heads 504 can improve resource utilization by allowing for the implementation of dynamic resource scaling based on resource utilization. In addition, dynamically assigning search heads 504 for queries can enable a search head 504 to be shared across tenants, thereby reducing the amount of compute resources used by the data intake and query system 108 and increase resource utilization. For instance, when pre-assigning resources, there may be various business or implementation rationales which dictate a maximum amount of resources that can be provided to any individual tenant, as well as a minimum amount of resources that must always be allocated for each tenant. However, some tenants may require more capacity than can be statically reserved or assigned to them. Similarly, some tenants may be overprovisioned resources if they request fewer searches than expected. In such cases, their provisioned search heads 504 may sit idle. In contrast, by dynamically assigning search heads 504 for incoming queries, available search heads 504 can be used to process search requests from different tenants or process queries associated with different data identifiers.

At (11), the query system manager 502 communicates the system query and/or query configuration parameters to the search head 504. As described herein, in some embodiments, the query system manager can communicate the system query to the search head 504. In certain embodiments, the query system manager 502 can communicate the query configuration parameters to the search head 504. Accordingly, the query system manager 502 can communicate either the system query, the query configuration parameters, or both.

In certain embodiments, by dynamically determining and communicating the query configuration parameters to the search head 504, the query system manager 502 can provide a stateless search experience. For example, if the search head 504 becomes unavailable, the query system manager 502 can communicate the dynamically determined query configuration parameters (and/or query to be executed) to another search head 504 without data loss and/or with minimal or reduced time loss. Furthermore, by dynamically assigning a search head 504 to queries associated with different tenants, the data intake and query system 108 can improve resource utilization and decrease resources used.

The assigned search head 504 receives and processes the query and (12) generates a search manager 514. In some embodiments, once the search head 504 is selected (non-limiting example: based on a search head mapping policy), the query can be forwarded to it from the resource monitor 508 query system manager 502, etc. As described herein, in some cases, a search master 512 can generate the search manager 514. For example, the search master 512 can spin up or instantiate a new process, container, or virtual machine, or copy itself to generate the search manager 514, etc. As described herein, in some embodiments, the search manager 514 can perform one or more of functions described herein with reference to FIG. 9 as being performed by the search head 504 to process and execute the query.

The search head 504 (13A) requests data identifiers from the data store catalog 220. As described, the data store catalog 220 can include information regarding the data stored in common storage 216. Accordingly, the search head 504 ca query the data store catalog 220 to identify data or buckets that include data that satisfies at least a portion of the query.

The search head 504 (13B) requests an identification of available search nodes from the resource monitor 508 and/or resource catalog 510. As described herein, the resource catalog 510 can include information regarding the search nodes 506 of the query system 214. The search head 504 can either directly query the resource catalog 510 in order to identify a number of search nodes available to execute the query, or the search head 504 may send a request to the resource monitor 508, which will identify a number of search nodes available to execute the query by consulting the resource catalog 510. In some cases, the (13A) and (13B) requests can be done concurrently or in any order.

In some cases, the search head 504 requests a search node assignment based on a search node mapping policy. The search node mapping policy can use any one or any combination of data identifiers associated with the query, search node identifiers, priority levels, etc. to indicate how search nodes 506 should be assigned for a query. In some cases, based on the search node mapping policy, the search head 504 requests a search node assignment for the query. In some such cases, the search head 504 can include the data identifier associated with the query in its request for a search node assignment.

At (14A), the data store catalog 220 provides the search head 504 with an identification of data that satisfies at least a portion of the query. As described herein, in response to the request from the search head 504, the data store catalog 220 can be used to identify and return identifiers of buckets in common storage 216 and/or location information of data in common storage 216 that satisfy at least a portion of the query or at least some filter criteria (e.g., buckets associated with an identified tenant or partition or that satisfy an identified time range, etc.).

In some cases, as the data store catalog 220 can routinely receive updates by the indexing system 212, it can implement a read-write lock while it is being queried by the search head 504. Furthermore, the data store catalog 220 can store information regarding which buckets were identified for the search. In this way, the data store catalog 220 can be used by the indexing system 212 to determine which buckets in common storage 216 can be removed or deleted as part of a merge operation.

At (14B), the resource catalog 510 (or the resource monitor 508, by consulting the resource catalog 510) provides the search head 504 with a search node assignment and/or an identification of available search nodes 506. As described herein, in response to the request from the search head 504, the resource catalog 510 and/or the resource monitor 508 can be used to identify and return identifiers for search nodes 506 that are available to execute the query. In some embodiments, the resource monitor 508 or resource catalog 510 determines the search node assignment based on a search node mapping policy, which can include a search head-node mapping policy. As described herein, the search node assignment can be based on numerous factors, including the availability and utilization of each search node 506, a data identifier associated with the query, search node identifiers, etc.

There may be numerous benefits associated with dynamically (e.g., in response to a request) selecting and assigning the search nodes 506 for executing the query, in a manner that factors in availability and utilization rather than relying on pre-assigned search nodes (e.g., to specific tenants). Pre-assigning resources to tenants may result in resource utilization issues, whereas dynamically assigning search nodes 506 can improve resource utilization by allowing for the implementation of dynamic resource scaling based on resource utilization, as previously mentioned, and also enabling search nodes to be shared across tenants and allocated based on demand. For instance, when pre-assigning resources, there may be various business or implementation rationales which dictate a maximum amount of resources that can be provided to any individual tenant, as well as a minimum amount of resources that must always be allocated for each tenant. However, some tenants may require more capacity than statically provided to them. Or, there may be overprovisioning if some tenants do not request any searches, since the search nodes 506 assigned to those tenants may sit idle. In contrast, under dynamic assignment, search nodes 506 can be selected based on availability and shared between tenants to execute queries.

As previously discussed, the search head-node mapping policy may also consider additional factors beyond availability and utilization of the different search nodes. For instance, the total number of search nodes 506 being assigned to execute the query can vary and be determined during assignment of search nodes 506, such that the maximum number of search nodes 506 being assigned is dynamic. The number of search nodes 506 being assigned can be based on a static configuration, based on an algorithm run at the time the search nodes are being identified, and so forth. For instance, there may be a global static configuration (e.g., always return X number of search nodes 506 in this scenario). Or there may be a data identifier-specific static configuration (e.g., return at least or no more than X number of search nodes 506 if the search request is associated with tenant Y), such that the number of search nodes 506 to assign to the search head 504 for executing the query may be preconfigured based on the data identifier associated with the query (non-limiting example, a tenant identifier associated with the query). Alternatively, the number of search nodes 506 being assigned may be specified in the query, either as an absolute number of search nodes (e.g., X number of search nodes), as a percentage of resources (e.g., 20% of the total number of search nodes or 20% of the number of search nodes with sufficient capacity), and so forth. Thus, the resource monitor 508 and/or the resource catalog 510 may wait until there are a sufficient number of search nodes 506 with availability that meets the requested number of search nodes 506 before assigning those search nodes 506 to execute the query, or the resource monitor 508 and/or the resource catalog 510 may have additional search nodes 506 spun up to meet the required number of search demands Furthermore, since data identifiers, such as tenant identifiers, are mapped to search nodes 506, similar queries for a specific tenant may be associated with data stored in similar sets of buckets. In other words, some of the data for a specific tenant may reside in a local or shared data store between search nodes 506 from an earlier query (e.g., the search nodes 506), and it may be desirable to assign additional queries for that tenant to those search nodes (e.g., the search nodes 506). Thus, the search head-node mapping policy may additionally attempt to repeatedly choose, for a specific tenant, the same search nodes 506 or as many of the same search nodes as possible that were used for previous queries for that tenant in order to take advantage of caching. For example, if the query system 214 receives two queries associated with a specific tenant and the same number of search nodes 506 are to be used for both queries, the same search nodes 506 can be assigned to the first query and the second query (either concurrently or consecutively). However, if the set of available search nodes 506 has changed between the two queries, then the search head-node mapping policy may indicate that a minimum amount of different search nodes 506 should be introduced for the second query. This affinity for using the same search nodes 506 can exist even when the search head 504 changes. For example, queries associated with the same data identifier can be assigned to various different search heads 504, but the same search nodes 506 or similar search nodes 506 (e.g., used in previous queries) can be used with the different search heads 504.

As described herein, in some embodiments, using a consistent hashing algorithm, the query system 214 can increase the likelihood that the same search nodes 506 will be used to execute queries associated with the same data identifiers. For example, as described herein, a hash can be performed on a tenant identifier associated with the tenant requesting the search, and the output of the hash can be used to identify the search nodes 506 assigned to that tenant to use for the query. In some implementations, the hash may be a consistent hash or use a hash ring, to increase the likelihood that the same search nodes 506 are selected for the queries associated with the same data identifier. In some cases, the consistent hash function can be configured such that even with a different number of search nodes 506 being assigned to execute the query, the output can consistently identify some of the same search nodes 506 to execute the query, or have an increased probability of identifying some of the same search nodes 506 for the query.

In some embodiments, all the search nodes 506 may be mapped out to various different tenants (e.g., using tenant identifiers), such that each search node 506 can be mapped to one or more specific tenants. Thus, in certain embodiments, a specific tenant can have a group of one or more search nodes 506 assigned to it.

At (15) the search head 504 maps the identified search nodes 506 to the data according to a search node mapping policy, which can include a search node-data mapping policy. In some cases, per the search node-data mapping policy, the search head 504 can dynamically map search nodes 506 to the identified data or buckets. As described herein, the search head 504 can map the identified search nodes 506 to the identified data or buckets at one time or iteratively as the buckets are searched according to the search node-data mapping policy. In certain embodiments, per the search node-data mapping policy, the search head 504 can map the identified search nodes 506 to the identified data based on previous assignments, data stored in a local or shared data store of one or more search heads 504, network architecture of the search nodes 506, a hashing algorithm, etc.

In some cases, as some of the data may reside in a local or shared data store between the search nodes 506, the search head 504 can attempt to map that was previously assigned to a search node 506 to the same search node 506. In certain embodiments, to map the data to the search nodes 506, the search head 504 uses the identifiers, such as bucket identifiers, received from the data store catalog 220. In some embodiments, the search head 504 performs a hash function to map a bucket identifier to a search node 506. In some cases, the search head 504 uses a consistent hash algorithm, similar to a consistent hashing used to assign search nodes 506 to queries using a data identifier, to increase the probability of mapping a bucket identifier to the same search node 506.

In certain embodiments, the search head 504 or query system 214 can maintain a table or list of bucket mappings to search nodes 506. In such embodiments, per the search node-data mapping policy, the search head 504 can use the mapping to identify previous assignments between search nodes and buckets. If a particular bucket identifier has not been assigned to a search node 506, the search head 504 can use a hash algorithm to assign it to a search node 506. In certain embodiments, prior to using the mapping for a particular bucket, the search head 504 can confirm that the search node 506 that was previously assigned to the particular bucket is available for the query. In some embodiments, if the search node 506 is not available for the query, the search head 504 can determine whether another search node 506 that shares a data store with the unavailable search node 506 is available for the query. If the search head 504 determines that an available search node 506 shares a data store with the unavailable search node 506, the search head 504 can assign the identified available search node 506 to the bucket identifier that was previously assigned to the now unavailable search node 506.

At (16), the search head 504 instructs the search nodes 506 to execute the query. As described herein, based on the assignment of buckets to the search nodes 506, the search head 504 can generate search instructions for each of the assigned search nodes 506. These instructions can be in various forms, including, but not limited to, JSON, DAG, etc. In some cases, the search head 504 can generate sub-queries for the search nodes 506. Each sub-query or instructions for a particular search node 506 generated for the search nodes 506 can identify any one or any combination of: the buckets that are to be searched, the filter criteria to identify a subset of the set of data to be processed, and the manner of processing the subset of data, etc. Accordingly, the instructions can provide the search nodes 506 with the relevant information to execute their particular portion of the query.

At (17), the search nodes 506 obtain the data to be searched. As described herein, in some cases the data to be searched can be stored on one or more local or shared data stores of the search nodes 506. In some embodiments, the data to be searched is located in the intake system 210 and/or the acceleration data store 222. In certain embodiments, the data to be searched is located in the common storage 216. In such embodiments, the search nodes 506 or a cache manager 516 can obtain the data from the common storage 216.

In some cases, the cache manager 516 can identify or obtain the data requested by the search nodes 506. For example, if the requested data is stored on the local or shared data store of the search nodes 506, the cache manager 516 can identify the location of the data for the search nodes 506. If the requested data is stored in common storage 216, the cache manager 516 can obtain the data from the common storage 216. As another example, if the requested data is stored in the intake system 210 and/or the acceleration data store 222, the cache manager 516 can obtain the data from the intake system 210 and/or the acceleration data store 222.

As described herein, in some embodiments, the cache manager 516 can obtain a subset of the files associated with the bucket to be searched by the search nodes 506. For example, based on the query, the search node 506 can determine that a subset of the files of a bucket are to be used to execute the query. Accordingly, the search node 506 can request the subset of files, as opposed to all files of the bucket. The cache manager 516 can download the subset of files from common storage 216 and provide them to the search node 506 for searching.

In some embodiments, such as when a search node 506 cannot uniquely identify the file of a bucket to be searched, the cache manager 516 can download a bucket summary or manifest that identifies the files associated with the bucket. The search node 506 can use the bucket summary or manifest to uniquely identify the file to be used in the query. The common storage 216 can then obtain that uniquely identified file from common storage 216.

At (18), the search nodes 506 search and process the data. As described herein, the sub-queries or instructions received from the search head 504 can instruct the search nodes 506 to identify data within one or more buckets and perform one or more transformations on the data. Accordingly, each search node 506 can identify a subset of the set of data to be processed and process the subset of data according to the received instructions. This can include searching the contents of one or more inverted indexes of a bucket or the raw machine data or events of a bucket, etc. In some embodiments, based on the query or sub-query, a search node 506 can perform one or more transformations on the data received from each bucket or on aggregate data from the different buckets that are searched by the search node 506.

At (19), the search head 504 monitors the status of the query of the search nodes 506. As described herein, the search nodes 506 can become unresponsive or fail for a variety of reasons (e.g., network failure, error, high utilization rate, etc.). Accordingly, during execution of the query, the search head 504 can monitor the responsiveness and availability of the search nodes 506. In some cases, this can be done by pinging or querying the search nodes 506, establishing a persistent communication link with the search nodes 506, or receiving status updates from the search nodes 506 (non-limiting example: the "heartbeat"). In some cases, the status can indicate the buckets that have been searched by the search nodes 506, the number or percentage of remaining buckets to be searched, the percentage of the query that has been executed by the search node 506, etc. In some cases, based on a determination that a search node 506 has become unresponsive, the search head 504 can assign a different search node 506 to complete the portion of the query assigned to the unresponsive search node 506.

In certain embodiments, depending on the status of the search nodes 506, the search manager 514 can dynamically assign or re-assign buckets to search nodes 506. For example, as search nodes 506 complete their search of buckets assigned to them, the search manager 514 can assign additional buckets for search. As yet another example, if one search node 506 is 95% complete with its search while another search node 506 is less than 50% complete, the query manager can dynamically assign additional buckets to the search node 506 that is 95% complete or re-assign buckets from the search node 506 that is less than 50% complete to the search node that is 95% complete. In this way, the search manager 514 can improve the efficiency of how a computing system performs searches through the search manager 514 increasing parallelization of searching and decreasing the search time.

At (20), the search nodes 506 send individual query results to the search head 504. As described herein, the search nodes 506 can send the query results as they are obtained from the buckets and/or send the results once they are completed by a search node 506. In some embodiments, as the search head 504 receives results from individual search nodes 506, it can track the progress of the query. For example, the search head 504 can track which buckets have been searched by the search nodes 506. Accordingly, in the event a search node 506 becomes unresponsive or fails, the search head 504 can assign a different search node 506 to complete the portion of the query assigned to the unresponsive search node 506. By tracking the buckets that have been searched by the search nodes and instructing different search node 506 to continue searching where the unresponsive search node 506 left off, the search head 504 can reduce the delay caused by a search node 506 becoming unresponsive, and can aid in providing a stateless searching service.

At (21), the search head 504 processes the results from the search nodes 506. As described herein, the search head 504 can perform one or more transformations on the data received from the search nodes 506. For example, some queries can include transformations that cannot be completed until the data is aggregated from the different search nodes 506. In some embodiments, the search head 504 can perform these transformations.

At (22A), the search head 504 communicates or stores results in the query acceleration data store 222. As described herein, in some cases some, all, or a copy of the results of the query can be stored in the query acceleration data store 222. The results stored in the query acceleration data store 222 can be combined with other results already stored in the query acceleration data store 222 and/or be combined with subsequent results. For example, in some cases, the query system 214 can receive ongoing queries, or queries that do not have a predetermined end time. In such cases, as the search head 504 receives a first set of results, it can store the first set of results in the query acceleration data store 222. As subsequent results are received, the search head 504 can add them to the first set of results, and so forth. In this way, rather than executing the same or similar query data across increasingly larger time ranges, the query system 214 can execute the query across a first time range and then aggregate the results of the query with the results of the query across the second time range. In this way, the query system can reduce the amount of queries and the size of queries being executed and can provide query results in a more time efficient manner. At (22B), the search head 504 communicates the results to the metadata catalog 221. In some cases, (22A) and (22B) can be done concurrently.

At (23), the metadata catalog 221 generates annotations. As mentioned, the metadata catalog 221 can generate annotations each time changes are made to it. Accordingly, based on the receipt of the query results, the metadata catalog 221 can generate annotations that include the query results. As described herein, in some cases, query results can be stored in the metadata catalog 221. In some such embodiments, the query results can be accessed at a later time without re-executing the query. In this way, the data intake and query system can reduce the compute resources used. In certain embodiments, the metadata catalog 221 can generate annotations based on the content of the query results. For example, if the query results identify one or more fields associated with a dataset, the metadata catalog 221 can generate annotations for the corresponding dataset configuration record that identify the fields of the dataset, etc. Further, the results may result in additional annotations to other queries, etc.

At (24), the search head 504 terminates the search manager 514. As described herein, in some embodiments a search head 504 or a search master 512 can generate a search manager 514 for each query assigned to the search head 504. Accordingly, in some embodiments, upon completion of a search, the search head 504 or search master 512 can terminate the search manager 514. In certain embodiments, rather than terminating the search manager 514 upon completion of a query, the search head 504 can assign the search manager 514 to a new query. In some cases, (24) can be performed before, after, or concurrently with (23).

As mentioned previously, in some of embodiments, one or more of the functions described herein with respect to FIG. 9 can be omitted, performed in a variety of orders and/or performed by a different component of the data intake and query system 108. For example, the search head 504 can monitor the status of the query throughout its execution by the search nodes 506 (e.g., during (17), (18), and (20)). Similarly, (1), (2), (3A), (3B), and (4), can be performed concurrently with each other and/or with any of the other steps. In some cases, are being performed consistently or repeatedly. Steps (13A) and (13B) and steps (14A) and (14B) can be performed before, after, or concurrently with each other. Further, (13A) and (14A) can be performed before, after, or concurrently with (14A) and (14B). As yet another example, (17), (18), and (20) can be performed concurrently. For example, a search node 506 can concurrently receive one or more files for one bucket, while searching the content of one or more files of a second bucket and sending query results for a third bucket to the search head 504. Similarly, the search head 504 can (15) map search nodes 506 to buckets while concurrently (15) generating instructions for and instructing other search nodes 506 to begin execution of the query. In some cases, such as when the set of data is from the intake system 210 or the acceleration data store 222, (13A) and (14A) can be omitted. Furthermore, in some such cases, the data may be obtained (17) from the intake system 210 and/or the acceleration data store 222.

In some embodiments, such as when one or more search heads 504 and/or search nodes 506 are statically assigned to queries associated to a tenant and/or with a particular data identifier, (3A), (3B), (7), and (10) may be omitted. For example, in some such embodiments, there may only be one search head 504 associated with the data identifier or tenant. As such, the query system 214 may not dynamically assign a search head 504 for the query. In certain embodiments, even where search heads 504 and/or search nodes 506 are statically assigned to a tenant or a data identifier, (3A), (3B), (7), and (10) may be used to determine which of multiple search heads 504 assigned to the tenant or data identifier is to be used for the query, etc.

In certain embodiments, the query system can use multiple sub-policies of a search node mapping policy to identify search nodes for a query and/or to process data. For example, the query system 214 may use a search head-node mapping policy to identify search nodes 506 to use in the query and/or may use a search node-data policy to determine which of the assigned search nodes 506 is to be used to process certain data of the query. In some cases, the search node mapping policy may only include a search head-node mapping policy or a search node-data policy to identify search nodes 506 for the query, etc. Moreover, it will be understood that any one or any combination of the components of the query system 214 can be used to implement a search node mapping policy. For example, the resource monitor 508 or search head 504 can implement the search node mapping policy, or different portions of the search node mapping policy, as desired.

4.3.1. Example Metadata Catalog Processing

Figure 10:
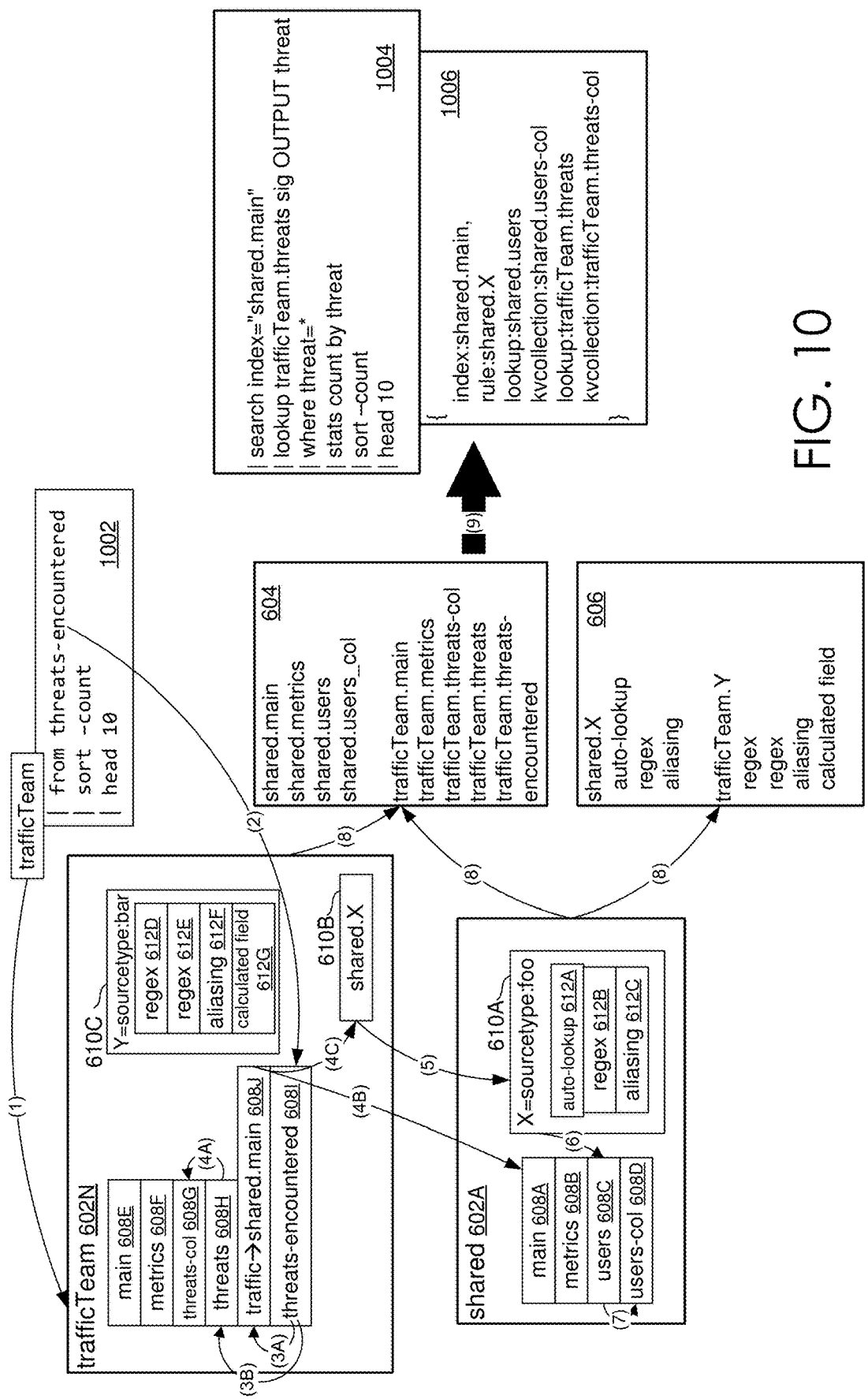
FIG. 10 is a data flow diagram illustrating an embodiment of the data flow for identifying query datasets and query configuration parameters for a particular query.

FIG. 10 is a data flow diagram illustrating an embodiment of the data flow for identifying primary datasets, secondary datasets, and query configuration parameters for a particular query 1002. In the illustrated embodiment, the query system manager 502 receives the query 1002, which includes the following query parameters "|from threats-encountered-|sort—count|head 10." In addition, "trafficTeam" is identified as the identifier of a dataset association record 602N associated with the query 1002.

Based on the identification of "trafficTeam" as the dataset association record identifier, the query system manager 502 (1) determines that the "trafficTeam" dataset association record 602N is associated with the query, is to be searched, and/or determines a portion of the physical name for datasets (or dataset configuration records 604) to be searched.

In addition, based on the query 1002, the query system manager 502 identifies "threats-encountered" as a logical dataset identifier. For example, the query system manager 502 can determine that a dataset identifier follows the "from" command. Accordingly, at (2), the query system manager 502 parses the "threats-encountered" dataset 608I (or associated dataset configuration record 604). As part of parsing the "threats-encountered" dataset 608I, the query system manager 502 determines that the "threats-encountered" dataset 608I is a multi-reference query dataset that references two additional datasets 608J and 608H ("traffic" and "threats"). In some embodiments, the query system manager 502 can identify the related datasets 608J and 608H based on a system annotation in the dataset configuration record 604N and/or based on parsing the query of the dataset configuration record 604N. Based on the identification of the additional datasets, the query system manager 502 parses the "traffic" dataset 608J and the "threats" dataset 608H (or associated dataset configuration record 604) at (3A) and (3B), respectively. Based on parsing the "threats" dataset 608H (or association dataset configuration record 604), the query system manager 502 determines that the "threats" dataset 608H is a single source reference dataset that references or relies on the "threats-col" dataset 608G. In certain cases, the query system manager 502 can identify the "threats-col" dataset 608G based on an annotation in the dataset configuration record 604 associated with the "threats" dataset 608H. Accordingly, at (4A) query system manager 502 parses the "threats-col" dataset 608G (or associated dataset configuration record 604). Based on parsing the "threats-col" dataset 608G, the query system manager 502 determines that the "threats-col" dataset 608G is a non-referential source dataset.

Based on parsing the "traffic" dataset 608J, the query system manager 502 determines that the "traffic" dataset 608J is an imported dataset that corresponds to the "main" dataset 608A of the "shared" dataset association record 602A, which may also be referred to as the "shared.main" dataset 608A. In some cases, the query system manager 502 can identify the "shared.main" dataset 608A based on the definition of the "traffic" dataset 608J in the dataset association record 602N or based on an annotation in a dataset configuration record 604 associated with the dataset "traffic" 608H. Accordingly, at (4B), the query system manager 502 parses the "shared.main" dataset 608A (or associated dataset configuration record 604). Based on parsing the "shared.main" dataset 608A, the query system manager 502 determines that the "shared.main" dataset 608A is a non-referential source dataset. In some embodiments, based on parsing the "shared.main" dataset 608A, the query system manager 502 can determine that the rule "shared.X" 610A is related to the "shared.main" dataset 608A and begin parsing the rule "shared.X" 610A based on the identification. This may be done in place of or concurrently with step (4C) and (5) described below.

As part of parsing the "traffic" dataset 608J, the query system manager 502 also determines that the "shared.X" rule 610B is associated with the "traffic" dataset 608J (e.g., based on its presence in the dataset association record 602N and/or based on another indication of a relationship, such as an annotation in a rule configuration record 606 for the "shared.X" rule 610B or an annotation in a dataset configuration record 604 for the "shared.main" dataset 608A), and at (4C), parses the "shared.X" rule 610B (which may include parsing the rule configuration record 606 of the "shared.X" rule 610B). Based on parsing the "shared.X" rule 610B, the query system manager 502 determines that the "shared.X" rule 610B is imported from the "shared" dataset association record 602A and at (5) parses the "X" rule 610A of the dataset association record 602A. Based on parsing the "X" rule 610A (or associated rule configuration record 606), the query system manager 502 determines that the "X" rule 610A references the "users" dataset 608C, and at (6) parses the "users" dataset 608C (or associated dataset configuration record 604). Based on parsing the "users" dataset 608C, the query system manager 502 determines that the "users" dataset 608C references the "users-col" dataset 608D and at (7) parses the "users-col" dataset 608D. Based on parsing the "users-col" dataset 608D, the query system manager 502 determines that the "users-col" dataset 608D is a non-referential source dataset.

In some embodiments, each time the query system manager 502 identifies a new dataset, it can identify the dataset as a dataset associated with the query. As the query system manager 502 processes the dataset, it can determine whether the dataset is a primary dataset or a secondary dataset. For example, if a view dataset merely references other datasets or includes additional query parameters and the configurations of the view dataset will not be used (or needed) to execute the query parameters or access the referenced datasets, it can be identified as a secondary dataset and omitted as a primary dataset. With reference to the illustrated embodiment, the query system manager 502 may identify "threats-encountered" dataset 608I as being associated with the query based on its presence in the user query 1002. However, once the query system manager 502 determines that the "threats-encountered" dataset 608I adds additional query parameters to the query 1002, but does not include data and/or will not be used to execute the query, it can identify the "threats-encountered" dataset 608I as secondary dataset but not a primary dataset (and may or may not keep the query parameters).

As described herein, in some cases, the query system manager 502 determines the physical names of the primary datasets based on dataset association records 602A, 602N. For example, the query system manager 502 can use the names or identifiers of the dataset association records 602A, 602N to determine the physical names of the primary datasets and/or rules associated with the query. Using the physical names of the primary datasets and/or rules associated with the query, the query system manager 502 (8) identifies the dataset configuration records 604 from various dataset configuration records 604 and rule configuration records 606 from various rule configuration records 606 for inclusion as query configuration parameters 1006. In some embodiments, the query system manager 502 can determine the dataset types of the primary datasets and other query configuration parameters associated with the primary datasets and rules associated with the query using the dataset configuration records 604 and rule configuration records 606.

In the illustrated embodiment, the query system manager 502 can determine that the datasets 608B, 608E, and 608F are not datasets associated with the query as they were not referenced (directly or indirectly) by the query 1002. Conversely, in the illustrated embodiment, the query system manager 502 determines that datasets 608A, 608C, 608D, 608G, 608H, 608I, and 608J are datasets associated with the query as they were referenced (directly or indirectly) by the query 1002.

In addition, in the illustrated embodiment, the query system manager 502 determines that the "shared.main," "shared.users," "shared.users-col," "trafficTeam.threats," and "trafficTeam.threat-col" datasets 608A, 608C, 608D, 608H, 608G, respectively, are primary datasets as they will be used to execute or process the system query 1004 and that the "trafficTeam.threats-encountered" dataset 608I and "trafficTeam.traffic" dataset 608J are secondary datasets as they will not be used to process/execute the query. Moreover, the query system manager 502 determines that the rule "shared.X" is associated with the query and/or will be used to process/execute the system query.

As mentioned, although, the "threats-encountered" and "traffic" datasets 608I, 608J, respectively, were identified as part of the processing, the query system manager 502 determines not to include them as primary datasets as they are not source datasets or will not be used to execute the system query. Rather, the "threats-encountered" and "traffic" datasets 608I, 608J were used to identify other datasets and query parameters. For example, the "threats-encountered" dataset 608I is a view dataset that includes additional query parameters that reference two other datasets, and the "traffic" dataset 608J is merely the name of the "shared.main" dataset 608A imported into the "trafficTeam" dataset association record 602N.

Based on the acquired information, the query system manager 502 (9) generates the system query 1004 and/or the query configuration parameters 1006 for the query. With reference to the system query 1004, the query system manager 502 has included query parameters identified from the "threats-encountered dataset" in the system query 1004 and replaced the logical identifiers of datasets in the query with physical identifiers of the datasets (e.g., replaced "threats-encountered" with "shared.main" and "trafficTeam.threats"). In addition, the query system manager 502 includes commands specific to the dataset type of the datasets in the query (e.g., "from" replaced with "search" for the "shared.main" dataset 608A and "lookup" included for the lookup "trafficTeam.threats" dataset 608H). Accordingly, the system query 1004 is configured to be communicated to the search head 504 for processing and execution.

Moreover, based on the information from the metadata catalog 221, the query system manager 502 is able to generate the query configuration parameters 1006 for the query to be executed by the data intake and query system 108. In some embodiments, the query configuration parameters 1006 include dataset configuration records 604 (or portions thereof) associated with: datasets identified in the query 1004, datasets referenced by the datasets identified in the query 1004, and/or datasets referenced by a rule or rule configuration record 606 included (or identified for inclusion) in the query configuration parameters 1006. In certain embodiments, the query configuration parameters 1006 include dataset configuration records 604 (or portions thereof) associated with the primary datasets. In some cases, when including dataset configuration records 604, the query system manager 502 may omit certain portions of the dataset configuration records 604. For example, the query system manager 502 may omit one or more annotations, such as the annotations identifying relationships between datasets or fields, etc. In certain embodiments, the query system manager 502 includes a reference to the various dataset configuration records 604 rather than a copy of the dataset configuration records 604.

In some embodiments, the query configuration parameters 1006 includes rule configuration records 606 of rules associated with: the query (referenced directly or indirectly), datasets identified in the query 1004, and/or datasets (or dataset configuration records 604) identified in the query configuration parameters 1006.

In some cases, the query system manager 502 can iteratively identify dataset configuration records 604 and/or rules configurations 606 for inclusion in the query configuration parameters 1006. As a non-limiting example, the query system manager 502 can include a first dataset configuration record 604 in the query configuration parameters 1006 (e.g., of a dataset referenced in the query to be executed). The query system manager 502 can then include dataset configuration records 604 or rule configuration records 606 of any datasets referenced by the first dataset (or corresponding configuration 604). The query system manager 502 can iteratively include dataset and rule configuration records

604, 606 corresponding to datasets or rules referenced by an already included rule or dataset (or corresponding configurations 604, 606) until the relevant dataset and rule configuration records 606 are included in the query configuration parameters 1006. In certain embodiments, only configurations corresponding to primary datasets and primary rules are included in the query configuration parameters 1006. Less or additional information or configurations can be included in the query configuration parameters 1006.

As another non-limiting example and with reference to the illustrated embodiment, the query system manager 502 can include the "shared.main" dataset configuration record 604 and "trafficTeam.threats" dataset configuration record 604 in the query configuration parameters 1006 based on their presence in the query 1004. Based on a determination that the "trafficTeam.threats-col" dataset configuration record 604 is referenced by the "trafficTeam.threats" dataset (or corresponding configuration 604), the query system manager 502 can include the "trafficTeam.threats-col" dataset configuration record 604 in the query configuration parameters 1006.

Based on a determination that the "shared.X" rule is referenced by the "shared.main" dataset 608A or a determination that the "shared.X" rule is included in the dataset association record 602N, the query system manager 502 can include the "shared.X" rule configuration record 606 in the query configuration parameters 1006. Furthermore, based on a determination that the "shared.users" dataset 608C is referenced by the "shared.X" rule (inclusive of any action of the "shared.X" rule or corresponding configuration 606), the query system manager 502 can include the "shared.users" dataset 608C in the query configuration parameters 1006. Similarly, the query system manager 502 can include the "shared.users-col" dataset 608D in the query configuration parameters 1006 based on a determination that it is referenced by the "shared.users" dataset 608C.

In the illustrated embodiment, the query system manager 502 determines that the datasets "shared.main," "shared.users," "shared.users-col," "trafficTeam.threats," and "trafficTeam.threat-col" are primary datasets. Accordingly, the query system manager 502 includes the dataset configuration records 604 corresponding to the identified primary datasets as part of the query configuration parameters 1006. Similarly, the query system manager 502 determines that the "shared.X" rule is associated with the query and/or will be used to process/execute the query and includes the corresponding rule configuration record 606 as part of the query configuration parameters 1006.

In the illustrated embodiment, the query to be executed by the data intake and query system 108 corresponds to the system query 1004, however, it will be understood that in other embodiments, the query system manager 502 may identify the query configuration parameters 1006 for the query and may not translate the user query to the system query 1004. Thus, the query configuration parameters 1006 can be used to execute a system query, a user query, or some other query generated from the user query 1002.

As mentioned, in some embodiments, the metadata catalog 221 may not store separate dataset association records 602. Rather, the datasets association records 602 illustrated in FIG. 10 can be considered a logical association between one or more dataset configuration records 604 and/or one or more rule configuration records 606. In certain embodiments, the datasets 608 and/or rules 610 of each dataset association record 602 may be references to dataset configuration records 604 and/or rule configuration records 606. Accordingly, in some embodiments, rather than moving from or parsing different portions of a dataset association record 602, it will be understood that the query system manager 502 can parse different dataset configuration records 604 and/or rule configuration records 606 based on the identified physical identifier for the dataset or rule. For example, (2) may refer to parsing the "trafficTeam.threats-encountered" dataset configuration record 604, (3A) and (3B) may refer to parsing the "trafficTeam.traffic" and "trafficTeam.threats" dataset configuration records 604, respectively, (4A) and (4B) may refer to parsing the "trafficTeam.threats-col" and "shared.main," dataset configuration records 604, respectively, (4C) may refer to parsing the "trafficTeam.shared.X" (or "shared.X") rule configuration record 606, (5) may refer to parsing the "shared.X" rule configuration record 606 (or be combined with (4C)), (6) may refer to parsing the "shared.users" dataset configuration record 604, and (7) may refer to parsing the "shared.users-col" dataset configuration record 604. Thus, as the query system manager 502 parses different datasets 608 or rules 610, it can do so using the dataset configuration records 604 and rule configuration records 606, respectively. Moreover, in some such embodiments (8) may be omitted (or considered as part of each parsing step) as the query system manager 502 references the relevant dataset configuration records 604 and rule configuration records 606 throughout the review or parsing process. Based on the review of the various dataset configuration records 604 and rule configuration records 606, the query system manager 502 can (9) generate the system query 1004 and/or the query configuration parameters 1006.

Furthermore, when parsing the dataset configuration records 604 or rule configuration records 606, the system can use one or more annotations to identify related datasets. For example, the system can determine that the "threats-encountered" dataset 608I depends on and/or is related to the "traffic" dataset 608J and "threats" dataset 608H based on one or more annotations, such as an inter-dataset relationship annotation, in the dataset configuration record 604N. In some embodiments, using the annotations in the dataset configuration records 604, the system can more quickly traverse between the different datasets and identify the primary datasets for the query 1002.

In certain embodiments, as the system parses the query 1002, it can extract metadata and generate additional annotations for one or more dataset configuration records 604 and rule configuration records 606. For example, the query 1002 can be referred to as a dataset "job." Based on its reference to "threats-encountered," the system can determine that the dataset "job" is dependent on "threats-encountered" and generate an annotation based on the determined relationship. The system can generate one or more additional annotations for the dataset "job" as described herein. In some embodiments the annotations can be stored for future use or reference. For example, for each query that is entered, the system can generate a dataset configuration record 606 and store the annotations generated for the query.

In addition, if the system has not already generated annotations for other datasets referenced by the query (e.g., when the various datasets are added to the metadata catalog 221), then the system can generate annotations as it traverses the datasets as part of parsing the query 1002. For example, as described herein, the system can generate annotations for the dataset configuration record 604N indicating that the "threats-encountered" dataset 608I is dependent on the "traffic" and "threats" datasets 608H, 608J, respectively. As also described herein, the system can determine a relationship between the field "sig" of the "traffic" dataset 608J and the field "sig" of the "threats" dataset 608H. Likewise, the system can determine inter-dataset relationships between the "traffic" and "main" datasets 608J and 608A, the "threats-col" and "threats" datasets 608G and 608H, and the "users" and "users-col" datasets 608C and 608D. In a similar way, the system can determine a rule-dataset relationship between rule "X" 610A and dataset "users" 608C, etc. The system can use the various determined relationships to generate annotations for corresponding dataset and rule configuration records 604, 606, respectively. In some embodiments, the generated annotations can be used to more efficiently parse and execute the query if it is executed again, to generate suggestions for the user, and/or to enable the user to gain a greater understanding of the data associated with, stored by, or managed by the system.

4.4. Data Ingestion, Indexing, and Storage Flow

Figure 11A:
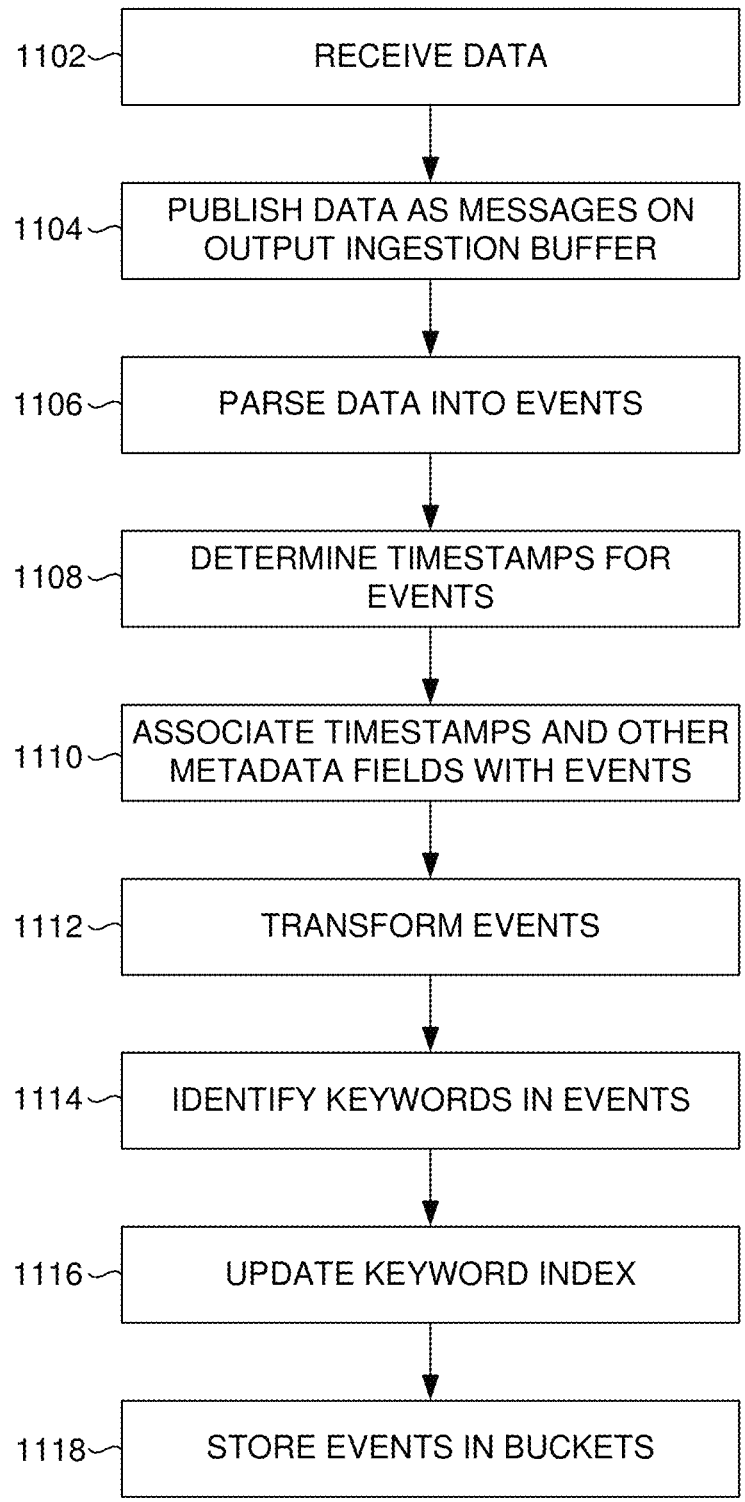
FIG. 11A is a flow diagram of an example method that illustrates how indexers process, index, and store data received from intake system, in accordance with example embodiments.

FIG. 11A is a flow diagram of an example method that illustrates how a data intake and query system 108 processes, indexes, and stores data received from data sources 202, in accordance with example embodiments. The data flow illustrated in FIG. 11A is provided for illustrative purposes only; it will be understood that one or more of the steps of the processes illustrated in FIG. 11A may be removed or that the ordering of the steps may be changed. Furthermore, for the purposes of illustrating a clear example, one or more particular system components are described in the context of performing various operations during each of the data flow stages. For example, the intake system 210 is described as receiving and processing machine data during an input phase; the indexing system 212 is described as parsing and indexing machine data during parsing and indexing phases; and a query system 214 is described as performing a search query during a search phase. However, other system arrangements and distributions of the processing steps across system components may be used.

4.4.1. Input

At block 1102, the intake system 210 receives data from an input source, such as a data source 202 shown in FIG. 2. The intake system 210 initially may receive the data as a raw data stream generated by the input source. For example, the intake system 210 may receive a data stream from a log file generated by an application server, from a stream of network data from a network device, or from any other source of data. In some embodiments, the intake system 210 receives the raw data and may segment the data stream into messages, possibly of a uniform data size, to facilitate subsequent processing steps. The intake system 210 may thereafter process the messages in accordance with one or more rules, as discussed above for example with reference to FIGS. 7 and 8, to conduct preliminary processing of the data. In one embodiment, the processing conducted by the intake system 210 may be used to indicate one or more metadata fields applicable to each message. For example, the intake system 210 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a source type related to the message. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps.

At block 504, the intake system 210 publishes the data as messages on an output ingestion buffer 310. Illustratively, other components of the data intake and query system 108 may be configured to subscribe to various topics on the output ingestion buffer 310, thus receiving the data of the messages when published to the buffer 310.

4.4.2. Parsing

At block 1106, the indexing system 212 receives messages from the intake system 210 (e.g., by obtaining the messages from the output ingestion buffer 310) and parses the data of the message to organize the data into events. In some embodiments, to organize the data into events, the indexing system 212 may determine a source type associated with each message (e.g., by extracting a source type label from the metadata fields associated with the message, etc.) and refer to a source type configuration corresponding to the identified source type. The source type definition may include one or more properties that indicate to the indexing system 212 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexing system 212, the indexing system 212 may infer a source type for the data by examining the structure of the data. Then, the indexing system 212 can apply an inferred source type definition to the data to create the events.

At block 1108, the indexing system 212 determines a timestamp for each event. Similar to the process for parsing machine data, an indexing system 212 may again refer to a source type definition associated with the data to locate one or more properties that indicate instructions for determining a timestamp for each event. The properties may, for example, instruct the indexing system 212 to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 1110, the indexing system 212 associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 1104, the default metadata fields associated with each event may include a host, source, and source type field including or in addition to a field storing the timestamp.

At block 1112, the indexing system 212 may optionally apply one or more transformations to data included in the events created at block 1106. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 11C illustrates an illustrative example of how machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 11C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 1136, source 1137, source type 1138 and timestamps 1135 can be generated for each event, and associated with a corresponding portion of machine data 1139 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexing system 212 or indexing node 404 based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 11C, the first three rows of the table represent events 1131, 1132, and 1133 and are related to a server access log that records requests from multiple clients processed by a server, as indicated by entry of "access.log" in the source column 1137.

In the example shown in FIG. 11C, each of the events 1131-1133 is associated with a discrete request made from a client device. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. As seen in FIG. 11C, all the raw machine data retrieved from the server access log is retained and stored as part of the corresponding events 1131-1133 in the data store.

Event 1134 is associated with an entry in a server error log, as indicated by "error.log" in the source column 1137 that records errors that the server encountered when processing a client request Similar to the events related to the server access log, all the raw machine data in the error log file pertaining to event 1134 can be preserved and stored as part of the event 1134.

Saving minimally processed or unprocessed machine data in a data store associated with metadata fields in the manner similar to that shown in FIG. 11C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

4.4.3. Indexing

At blocks 1114 and 1116, the indexing system 212 can optionally generate a keyword index to facilitate fast keyword searching for events. To build a keyword index, at block 1114, the indexing system 212 identifies a set of keywords in each event. At block 1116, the indexing system 212 includes the identified keywords in an index, which associates each stored keyword with reference pointers to events containing that keyword (or to locations within events where that keyword is located, other location identifiers, etc.). When the data intake and query system 108 subsequently receives a keyword-based query, the query system 214 can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 1118, the indexing system 212 stores the events with an associated timestamp in a local data store 208 and/or common storage 216. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 212 may be responsible for storing the events contained in various data stores 218 of common storage 216. By distributing events among the data stores in common storage 216, the query system 214 can analyze events for a query in parallel. For example, using map-reduce techniques, each search node 506 can return partial responses for a subset of events to a search head that combines the results to produce an answer for the query. By storing events in buckets for specific time ranges, the indexing system 212 may further optimize the data retrieval process by enabling search nodes 506 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In some embodiments, each indexing node 404 (e.g., the indexer 410 or data store 412) of the indexing system 212 has a home directory and a cold directory. The home directory stores hot buckets and warm buckets, and the cold directory stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexing node 404 may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexing node 404 may store old, archived data in a frozen bucket that is not capable of being searched at search time. In some embodiments, a frozen bucket may be stored in slower and/or larger memory, such as a hard disk, and may be stored in offline and/or remote storage.

In some embodiments, an indexing node 404 may not include a cold directory and/or cold or frozen buckets. For example, as warm buckets and/or merged buckets are copied to common storage 216, they can be deleted from the indexing node 404. In certain embodiments, one or more data stores 218 of the common storage 216 can include a home directory that includes warm buckets copied from the indexing nodes 404 and a cold directory of cold or frozen buckets as described above.

Moreover, events and buckets can also be replicated across different indexing nodes 404 and data stores 218 of the common storage 216.

Figure 11B:
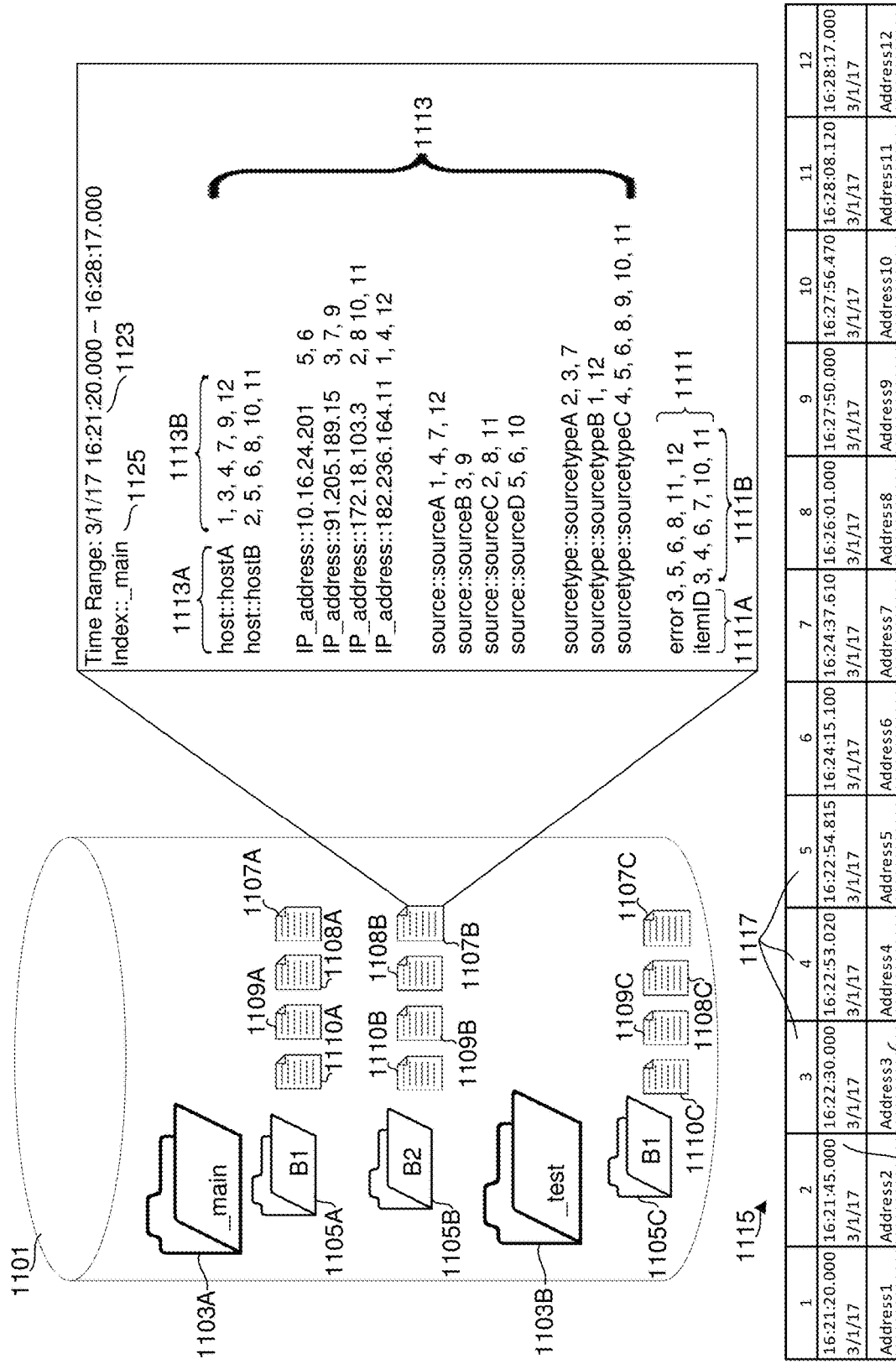
FIG. 11B is a block diagram of a data structure in which time-stamped event data can be stored in a data store, in accordance with example embodiments.

FIG. 11B is a block diagram of an example data store 1101 that includes a directory for each index (or partition) that contains a portion of data stored in the data store 1101, and a sub-directory for one or more buckets of the index. FIG. 11B further illustrates details of an embodiment of an inverted index 1107B and an event reference array 1115 associated with inverted index 1107B.

The data store 1101 can correspond to a data store 218 that stores events in common storage 216, a data store 412 associated with an indexing node 404, or a data store associated with a search node 506. In the illustrated embodiment, the data store 1101 includes a_main directory 1103A associated with a_main partition and a_test directory 1103B associated with a_test partition. However, the data store 1101 can include fewer or more directories. In some embodiments, multiple indexes can share a single directory or all indexes can share a common directory. Additionally, although illustrated as a single data store 1101, it will be understood that the data store 1101 can be implemented as multiple data stores storing different portions of the information shown in FIG. 11B. For example, a single index or partition can span multiple directories or multiple data stores, and can be indexed or searched by multiple search nodes 506.

Furthermore, although not illustrated in FIG. 11B, it will be understood that, in some embodiments, the data store 1101 can include directories for each tenant and sub-directories for each partition of each tenant, or vice versa. Accordingly, the directories 1103A and 1103B illustrated in FIG. 11B can, in certain embodiments, correspond to sub-directories of a tenant or include sub-directories for different tenants.

In the illustrated embodiment of FIG. 11B, two sub-directories 1105A, 1105B of the_main directory 1103A and one sub-directory 1103C of the_test directory 1103B are shown. The sub-directories 1105A, 1105B, 1105C can correspond to buckets of the partitions associated with the directories 1103A, 1103B. For example, the sub-directories 1105A and 1105B can correspond to buckets "B1" and "B2" of the partition "_main" and the sub-directory 1105C can correspond to bucket "B1" of the partition "_test." Accordingly, even though there are two buckets "B1," as each "B1" bucket associated with a different partition (and corresponding directory 1103), the system 108 can uniquely identify them.

Although illustrated as buckets "B1" and "B2," it will be understood that the buckets (and/or corresponding sub-directories 1105) can be named in a variety of ways. In certain embodiments, the bucket (or sub-directory) names can include information about the bucket. For example, the bucket name can include the name of the partition with which the bucket is associated, a time range of the bucket, etc.

As described herein, each bucket can have one or more files associated with it, including, but not limited to one or more raw machine data files, bucket summary files, filter files, inverted indexes, high performance indexes, permissions files, configuration files, etc. In the illustrated embodiment of FIG. 11B, the files associated with a particular bucket can be stored in the sub-directory corresponding to the particular bucket. Accordingly, the files stored in the sub-directory 1105A can correspond to or be associated with bucket "B1," of partition "_main," the files stored in the sub-directory 1105B can correspond to or be associated with bucket "B2" of partition "_main," and the files stored in the sub-directory 1105C can correspond to or be associated with bucket "B1" of partition "_test."

In the illustrated embodiment of FIG. 11B, each sub-directory 1105A-1105C of the partition-specific directories 1103A and 1103B includes an inverted index 1107A, 1107B, 1107C, respectively (generically referred to as inverted index(es) 1107). The inverted indexes 1107 can be keyword indexes or field-value pair indexes described herein and can include less or more information than depicted in FIG. 11B.

In some embodiments, the inverted indexes 1107 can correspond to distinct time-series buckets stored in common storage 216, a search node 506, or an indexing node 404 and that contains events corresponding to the relevant partition (e.g., _main partition, _test partition). As such, each inverted index 1107 can correspond to a particular range of time for a partition. In the illustrated embodiment of FIG. 11B, each inverted index 1107 corresponds to the bucket associated with the sub-directory 1103 in which the inverted index 1107 is located. In some embodiments, an inverted index 1107 can correspond to multiple time-series buckets (e.g., include information related to multiple buckets) or inverted indexes 1107 can correspond to a single time-series bucket.

In the illustrated embodiment of FIG. 11B, each sub-directory 1105 includes additional files. In the illustrated embodiment, the additional files include raw data files 1108A-1108C, high performance indexes 1109A-1109C, and filter files 1110A-110C. However, it will be understood that each bucket can be associated with fewer or more files and each sub-directory can store fewer or more files.

Each inverted index 1107 can include one or more entries, such as keyword (or token) entries or field-value pair entries. Furthermore, in certain embodiments, the inverted indexes 1107 can include additional information, such as a time range 1123 associated with the inverted index or a partition identifier 1125 identifying the partition associated with the inverted index 1107. It will be understood that each inverted index 1107 can include less or more information than depicted.

Token entries, such as token entries 1111 illustrated in inverted index 1107B, can include a token 1111A (e.g., "error," "itemID," etc.) and event references 1111B indicative of events that include the token. For example, for the token "error," the corresponding token entry includes the token "error" and an event reference, or unique identifier, for each event stored in the corresponding time-series bucket that includes the token "error." In the illustrated embodiment of FIG. 11B, the error token entry includes the identifiers 3, 5, 6, 8, 11, and 12 corresponding to events located in the time-series bucket associated with the inverted index 1107B that is stored in common storage 216, a search node 506, or an indexing node 404 and is associated with the partition "_main," which in turn is associated with the directory 1103A.

In some cases, some token entries can be default entries, automatically determined entries, or user specified entries. In some embodiments, the indexing system 212 can identify each word or string in an event as a distinct token and generate a token entry for the identified word or string. In some cases, the indexing system 212 can identify the beginning and ending of tokens based on punctuation, spaces, as described in greater detail herein. In certain cases, the indexing system 212 can rely on user input or a configuration file to identify tokens for token entries 1111, etc. It will be understood that any combination of token entries can be included as a default, automatically determined, or included based on user-specified criteria.

Similarly, field-value pair entries, such as field-value pair entries 1113 shown in inverted index 1107B, can include a field-value pair 1113A and event references 1113B indicative of events that include a field value that corresponds to the field-value pair. For example, for a field-value pair sourcetype::sendmail, a field-value pair entry can include the field-value pair sourcetype::sendmail and a unique identifier, or event reference, for each event stored in the corresponding time-series bucket that includes a sendmail sourcetype.

In some cases, the field-value pair entries 1113 can be default entries, automatically determined entries, or user specified entries. As a non-limiting example, the field-value pair entries for the fields host, source, and sourcetype can be included in the inverted indexes 1107 as a default. As such, all of the inverted indexes 1107 can include field-value pair entries for the fields host, source, sourcetype. As yet another non-limiting example, the field-value pair entries for the IP_address field can be user specified and may only appear in the inverted index 1107B based on user-specified criteria. As another non-limiting example, as the indexing system 212 indexes the events, it can automatically identify field-value pairs and create field-value pair entries. For example, based on the indexing system's 212 review of events, it can identify IP_address as a field in each event and add the IP_address field-value pair entries to the inverted index 1107B. It will be understood that any combination of field-value pair entries can be included as a default, automatically determined, or included based on user-specified criteria.

With reference to the event reference array 1115, each unique identifier 1117, or event reference, can correspond to a unique event located in the time series bucket. However, the same event reference can be located in multiple entries of an inverted index. For example if an event has a sourcetype "splunkd," host "www1" and token "warning," then the unique identifier for the event will appear in the field-value pair entries sourcetype::splunkd and host::www1, as well as the token entry "warning." With reference to the illustrated embodiment of FIG. 11B and the event that corresponds to the event reference 3, the event reference 3 is found in the field-value pair entries 1113 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 11B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 1117 can be used to locate the events in the corresponding bucket. For example, the inverted index can include, or be associated with, an event reference array 1115. The event reference array 1115 can include an array entry 1117 for each event reference in the inverted index 1107B. Each array entry 1117 can include location information 1119 of the event corresponding to the unique identifier (non-limiting example: seek address of the event), a timestamp 1121 associated with the event, or additional information regarding the event associated with the event reference, etc.

For each token entry 1111 or field-value pair entry 1113, the event reference 1101B or unique identifiers can be listed in chronological order or the value of the event reference can be assigned based on chronological data, such as a timestamp associated with the event referenced by the event reference. For example, the event reference 1 in the illustrated embodiment of FIG. 11B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 11B, the entries are sorted first by entry type and then alphabetically.

As a non-limiting example of how the inverted indexes 1107 can be used during a data categorization request command, the query system 214 can receive filter criteria indicating data that is to be categorized and categorization criteria indicating how the data is to be categorized. Example filter criteria can include, but is not limited to, indexes (or partitions), hosts, sources, sourcetypes, time ranges, field identifier, tenant and/or user identifiers, keywords, etc.

Using the filter criteria, the query system 214 identifies relevant inverted indexes to be searched. For example, if the filter criteria includes a set of partitions (also referred to as indexes), the query system 214 can identify the inverted indexes stored in the directory corresponding to the particular partition as relevant inverted indexes. Other means can be used to identify inverted indexes associated with a partition of interest. For example, in some embodiments, the query system 214 can review an entry in the inverted indexes, such as a partition-value pair entry 1113 to determine if a particular inverted index is relevant. If the filter criteria does not identify any partition, then the query system 214 can identify all inverted indexes managed by the query system 214 as relevant inverted indexes.

Similarly, if the filter criteria includes a time range, the query system 214 can identify inverted indexes corresponding to buckets that satisfy at least a portion of the time range as relevant inverted indexes. For example, if the time range is last hour then the query system 214 can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the query system 214 can focus the processing to only a subset of the total number of inverted indexes in the data intake and query system 108.

Once the relevant inverted indexes are identified, the query system 214 can review them using any additional filter criteria to identify events that satisfy the filter criteria. In some cases, using the known location of the directory in which the relevant inverted indexes are located, the query system 214 can determine that any events identified using the relevant inverted indexes satisfy an index filter criterion. For example, if the filter criteria includes a partition main, then the query system 214 can determine that any events identified using inverted indexes within the partition main directory (or otherwise associated with the partition main) satisfy the index filter criterion.

Furthermore, based on the time range associated with each inverted index, the query system 214 can determine that any events identified using a particular inverted index satisfies a time range filter criterion. For example, if a time range filter criterion is for the last hour and a particular inverted index corresponds to events within a time range of 50 minutes ago to 35 minutes ago, the query system 214 can determine that any events identified using the particular inverted index satisfy the time range filter criterion. Conversely, if the particular inverted index corresponds to events within a time range of 59 minutes ago to 62 minutes ago, the query system 214 can determine that some events identified using the particular inverted index may not satisfy the time range filter criterion.

Using the inverted indexes, the query system 214 can identify event references (and therefore events) that satisfy the filter criteria. For example, if the token "error" is a filter criterion, the query system 214 can track all event references within the token entry "error." Similarly, the query system 214 can identify other event references located in other token entries or field-value pair entries that match the filter criteria. The system can identify event references located in all of the entries identified by the filter criteria. For example, if the filter criteria include the token "error" and field-value pair sourcetype::web_ui, the query system 214 can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The query system 214 can determine that the events associated with the identified event references satisfy the filter criteria.

In some cases, the query system 214 can further consult a timestamp associated with the event reference to determine whether an event satisfies the filter criteria. For example, if an inverted index corresponds to a time range that is partially outside of a time range filter criterion, then the query system 214 can consult a timestamp associated with the event reference to determine whether the corresponding event satisfies the time range criterion. In some embodiments, to identify events that satisfy a time range, the query system 214 can review an array, such as the event reference array 1115 that identifies the time associated with the events. Furthermore, as mentioned above using the known location of the directory in which the relevant inverted indexes are located (or other partition identifier), the query system 214 can determine that any events identified using the relevant inverted indexes satisfy the index filter criterion.

In some cases, based on the filter criteria, the query system 214 reviews an extraction rule. In certain embodiments, if the filter criteria includes a field name that does not correspond to a field-value pair entry in an inverted index, the query system 214 can review an extraction rule, which may be located in a configuration file, to identify a field that corresponds to a field-value pair entry in the inverted index.

For example, the filter criteria includes a field name "sessionID" and the query system 214 determines that at least one relevant inverted index does not include a field-value pair entry corresponding to the field name sessionID, the query system 214 can review an extraction rule that identifies how the sessionID field is to be extracted from a particular host, source, or sourcetype (implicitly identifying the particular host, source, or sourcetype that includes a sessionID field). The query system 214 can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the query system 214 can then identify a field-value pair entry in the inverted index that includes a field value corresponding to the identity of the particular host, source, or sourcetype identified using the extraction rule.

Once the events that satisfy the filter criteria are identified, the query system 214 can categorize the results based on the categorization criteria. The categorization criteria can include categories for grouping the results, such as any combination of partition, source, sourcetype, or host, or other categories or fields as desired.

The query system 214 can use the categorization criteria to identify categorization criteria-value pairs or categorization criteria values by which to categorize or group the results. The categorization criteria-value pairs can correspond to one or more field-value pair entries stored in a relevant inverted index, one or more partition-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The query system 214 can use the nineteen distinct field-value pair entries as categorization criteria-value pairs to group the results.

Specifically, the query system 214 can identify the location of the event references associated with the events that satisfy the filter criteria within the field-value pairs, and group the event references based on their location. As such, the query system 214 can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the query system 214 can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the query system 214 can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the query system 214 can generate up to thirty groups for the results that satisfy the filter criteria. Each group can be associated with a unique combination of categorization criteria-value pairs (e.g., unique combinations of partition value sourcetype value, and host value).

In addition, the query system 214 can count the number of events associated with each group based on the number of events that meet the unique combination of categorization criteria for a particular group (or match the categorization criteria-value pairs for the particular group). With continued reference to the example above, the query system 214 can count the number of events that meet the unique combination of partition, sourcetype, and host for a particular group.

The query system 214, such as the search head 504 can aggregate the groupings from the buckets, or search nodes 506, and provide the groupings for display. In some cases, the groups are displayed based on at least one of the host, source, sourcetype, or partition associated with the groupings. In some embodiments, the query system 214 can further display the groups based on display criteria, such as a display order or a sort order as described in greater detail above.

As a non-limiting example and with reference to FIG. 11B, consider a request received by the query system 214 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, a search node 506 of the query system 214 that is associated with the data store 1101 identifies_main directory 1103A and can ignore_test directory 1103B and any other partition-specific directories. The search node 506 determines that inverted index 1107B is a relevant index based on its location within the_main directory 1103A and the time range associated with it. For sake of simplicity in this example, the search node 506 determines that no other inverted indexes in the_main directory 1103A, such as inverted index 1107A satisfy the time range criterion.

Having identified the relevant inverted index 1107B, the search node 506 reviews the token entries 1111 and the field-value pair entries 1113 to identify event references, or events that satisfy all of the filter criteria.

With respect to the token entries 1111, the search node 506 can review the error token entry and identify event references 3, 5, 6, 8, 11, 12, indicating that the term "error" is found in the corresponding events. Similarly, the search node 506 can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the search node 506 can ignore those field-value pair entries.

In addition to identifying event references found in at least one token entry or field-value pair entry (e.g., event references 3, 4, 5, 6, 8, 9, 10, 11, 12), the search node 506 can identify events (and corresponding event references) that satisfy the time range criterion using the event reference array 1115 (e.g., event references 2, 3, 4, 5, 6, 7, 8, 9, 10). Using the information obtained from the inverted index 1107B (including the event reference array 1115), the search node 506 can identify the event references that satisfy all of the filter criteria (e.g., event references 5, 6, 8).

Having identified the events (and event references) that satisfy all of the filter criteria, the search node 506 can group the event references using the received categorization criteria (source). In doing so, the search node 506 can determine that event references 5 and 6 are located in the field-value pair entry source::sourceD (or have matching categorization criteria-value pairs) and event reference 8 is located in the field-value pair entry source::sourceC. Accordingly, the search node 506 can generate a sourceC group having a count of one corresponding to reference 8 and a sourceD group having a count of two corresponding to references 5 and 6. This information can be communicated to the search head 504. In turn the search head 504 can aggregate the results from the various search nodes 506 and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, consider a request received by a search node 506 that includes the following filter criteria: partition=_main, time range=3/1/17 3/1/17 16:21:20.000-16:28:17.000, and the following categorization criteria: host, source, sourcetype can result in the search node 506 identifying event references 1-12 as satisfying the filter criteria. The search node 506 can generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the search node 506 generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The search node 506 communicates the groups to the search head 504 for aggregation with results received from other search nodes 506. In communicating the groups to the search head 504, the search node 506 can include the categorization criteria-value pairs for each group and the count. In some embodiments, the search node 506 can include more or less information. For example, the search node 506 can include the event references associated with each group and other identifying information, such as the search node 506 or inverted index used to identify the groups.

As another non-limiting example, consider a request received by an search node 506 that includes the following filter criteria: partition=_main, time range=3/1/17 3/1/17 16:21:20.000-16:28:17.000, source=sourceA, sourceD, and keyword=itemID and the following categorization criteria: host, source, sourcetype can result in the search node identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The search node 506 communicates the groups to the search head 504 for aggregation with results received from other search node 506s. As will be understand there are myriad ways for filtering and categorizing the events and event references. For example, the search node 506 can review multiple inverted indexes associated with a partition or review the inverted indexes of multiple partitions, and categorize the data using any one or any combination of partition, host, source, sourcetype, or other category, as desired.

Further, if a user interacts with a particular group, the search node 506 can provide additional information regarding the group. For example, the search node 506 can perform a targeted search or sampling of the events that satisfy the filter criteria and the categorization criteria for the selected group, also referred to as the filter criteria corresponding to the group or filter criteria associated with the group.

In some cases, to provide the additional information, the search node 506 relies on the inverted index. For example, the search node 506 can identify the event references associated with the events that satisfy the filter criteria and the categorization criteria for the selected group and then use the event reference array 1115 to access some or all of the identified events. In some cases, the categorization criteria values or categorization criteria-value pairs associated with the group become part of the filter criteria for the review.

With reference to FIG. 11B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head 504 communicates with the search node 506 to provide additional information regarding the group.

In some embodiments, the search node 506 identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the search node 506 identifies event references 4, 5, 6, 8, 10, 11.

Based on a sampling criteria, discussed in greater detail above, the search node 506 can determine that it will analyze a sample of the events associated with the event references 4, 5, 6, 8, 10, 11. For example, the sample can include analyzing event data associated with the event references 5, 8, 10. In some embodiments, the search node 506 can use the event reference array 1115 to access the event data associated with the event references 5, 8, 10. Once accessed, the search node 506 can compile the relevant information and provide it to the search head 504 for aggregation with results from other search nodes. By identifying events and sampling event data using the inverted indexes, the search node can reduce the amount of actual data this is analyzed and the number of events that are accessed in order to generate the summary of the group and provide a response in less time.

4.5. Query Processing Flow

Figure 12A:
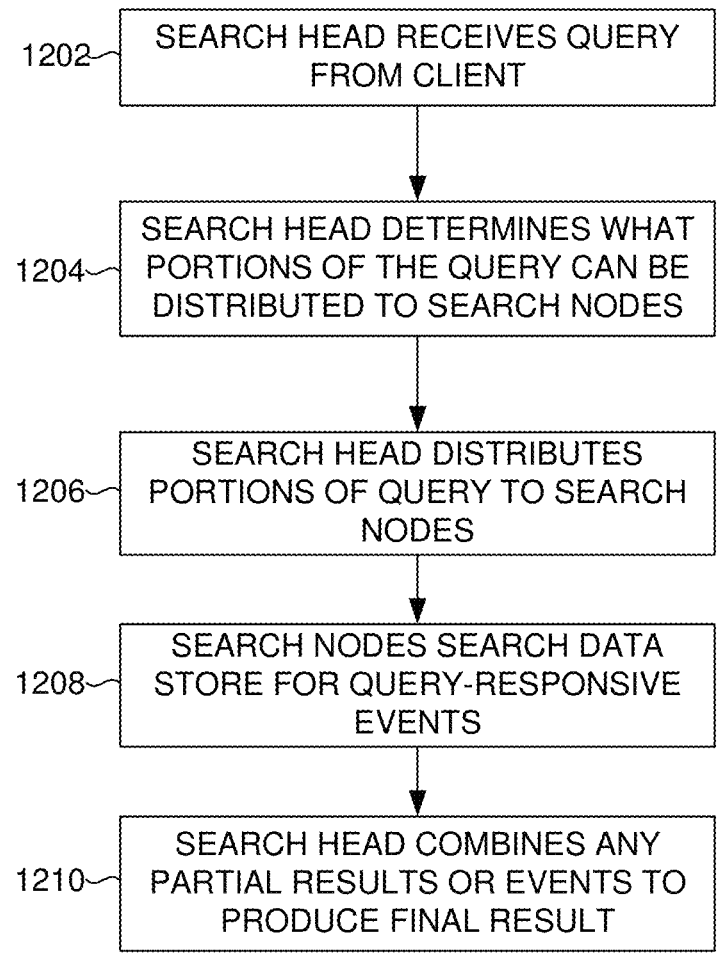
FIG. 12A is a flow diagram of an example method that illustrates how a search head and indexers perform a search query, in accordance with example embodiments.

FIG. 12A is a flow diagram illustrating an embodiment of a routine implemented by the query system 214 for executing a query. At block 1202, a search head 504 receives a search query. At block 1204, the search head 504 analyzes the search query to determine what portion(s) of the query to delegate to search nodes 506 and what portions of the query to execute locally by the search head 504. At block 1206, the search head distributes the determined portions of the query to the appropriate search nodes 506. In some embodiments, a search head cluster may take the place of an independent search head 504 where each search head 504 in the search head cluster coordinates with peer search heads 504 in the search head cluster to schedule jobs, replicate search results, update configurations, fulfill search requests, etc. In some embodiments, the search head 504 (or each search head) consults with a resource catalog 510 that provides the search head with a list of search nodes 506 to which the search head can distribute the determined portions of the query. A search head 504 may communicate with the resource catalog 510 to discover the addresses of active search nodes 506.

At block 1208, the search nodes 506 to which the query was distributed, search data stores associated with them for events that are responsive to the query. To determine which events are responsive to the query, the search node 506 searches for events that match the criteria specified in the query. These criteria can include matching keywords or specific values for certain fields. The searching operations at block 1208 may use the late-binding schema to extract values for specified fields from events at the time the query is processed. In some embodiments, one or more rules for extracting field values may be specified as part of a source type definition in a configuration file. The search nodes 506 may then either send the relevant events back to the search head 504, or use the events to determine a partial result, and send the partial result back to the search head 504.

At block 1210, the search head 504 combines the partial results and/or events received from the search nodes 506 to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head 504 can also perform various operations to make the search more efficient. For example, before the search head 504 begins execution of a query, the search head 504 can determine a time range for the query and a set of common keywords that all matching events include. The search head 504 may then use these parameters to query the search nodes 506 to obtain a superset of the eventual results. Then, during a filtering stage, the search head 504 can perform field-extraction operations on the superset to produce a reduced set of search results. This speeds up queries, which may be particularly helpful for queries that are performed on a periodic basis.

4.6. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 12B:
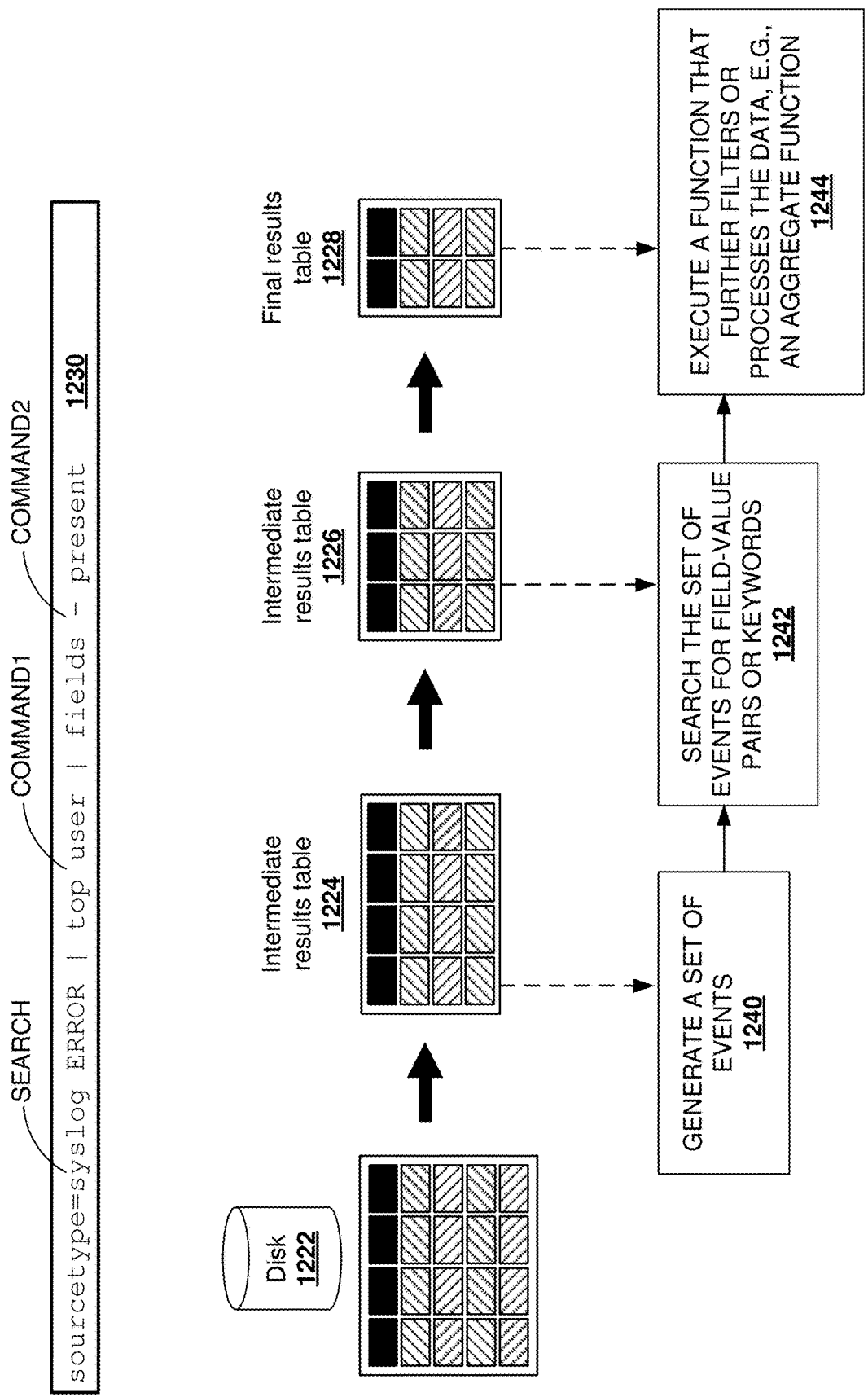
FIG. 12B provides a visual representation of an example manner in which a pipelined command language or query operates, in accordance with example embodiments.

FIG. 12B provides a visual representation of the manner in which a pipelined command language or query operates in accordance with the disclosed embodiments. The query 1230 can be inputted by the user into a search. The query comprises a search, the results of which are piped to two commands (namely, command 1 and command 2) that follow the search step.

Disk 1222 represents the event data in the raw record data store.

When a user query is processed, a search step will precede other queries in the pipeline in order to generate a set of events at block 1240. For example, the query can comprise search terms "sourcetype=syslog ERROR" at the front of the pipeline as shown in FIG. 12B. Intermediate results table 1224 shows fewer rows because it represents the subset of events retrieved from the index that matched the search terms "sourcetype=syslog ERROR" from search command 1230. By way of further example, instead of a search step, the set of events at the head of the pipeline may be generating by a call to a pre-existing inverted index (as will be explained later).

At block 1242, the set of events generated in the first part of the query may be piped to a query that searches the set of events for field-value pairs or for keywords. For example, the second intermediate results table 1226 shows fewer columns, representing the result of the top command, "top user" which summarizes the events into a list of the top 10 users and displays the user, count, and percentage.

Finally, at block 1244, the results of the prior stage can be pipelined to another stage where further filtering or processing of the data can be performed, e.g., preparing the data for display purposes, filtering the data based on a condition, performing a mathematical calculation with the data, etc. As shown in FIG. 12B, the "fields—percent" part of command 1230 removes the column that shows the percentage, thereby, leaving a final results table 1228 without a percentage column. In different embodiments, other query languages, such as the Structured Query Language ("SQL"), can be used to create a query.

4.7. Field Extraction

The query system 214 allows users to search and visualize events generated from machine data received from heterogeneous data sources. The query system 214 also allows users to search and visualize events generated from machine data received from heterogeneous data sources. The query system 214 includes various components for processing a query, such as, but not limited to a query system manager 502, one or more search heads 504 having one or more search masters 512 and search managers 514, and one or more search nodes 506. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands Other query languages, such as the Structured Query Language ("SQL"), can be used to create a query.

In response to receiving the search query, a search head 504 (e.g., a search master 512 or search manager 514) can use extraction rules to extract values for fields in the events being searched. The search head 504 can obtain extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 504 can apply the extraction rules to events that it receives from search nodes 506. The search nodes 506 may apply the extraction rules to events in an associated data store or common storage 216. Extraction rules can be applied to all the events in a data store or common storage 216 or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 13A:
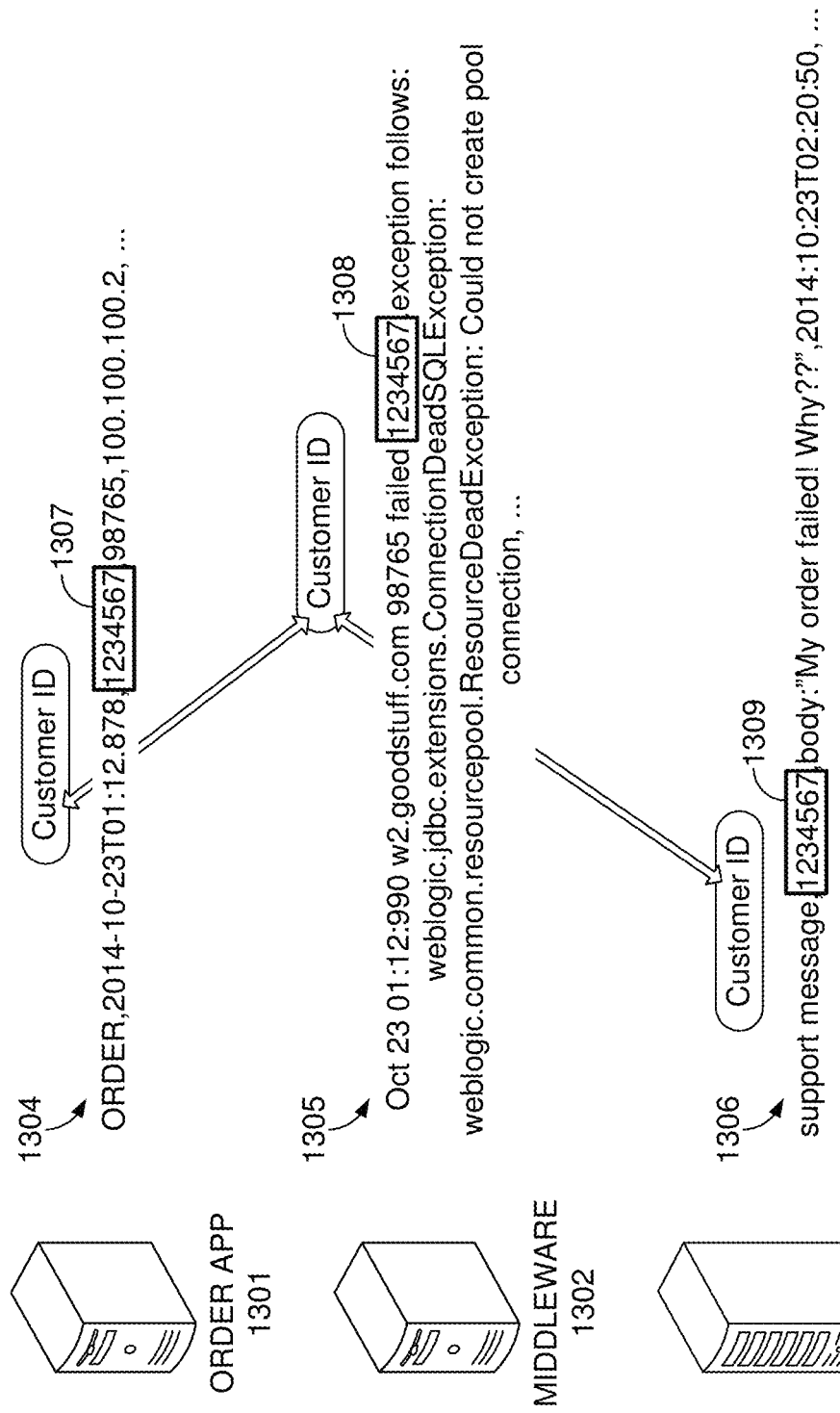
FIG. 13A is a diagram of an example scenario where a common customer identifier is found among log data received from three disparate data sources, in accordance with example embodiments.

FIG. 13A is a diagram of an example scenario where a common customer identifier is found among log data received from three disparate data sources, in accordance with example embodiments. In this example, a user submits an order for merchandise using a vendor's shopping application program 1301 running on the user's system. In this example, the order was not delivered to the vendor's server due to a resource exception at the destination server that is detected by the middleware code 1302. The user then sends a message to the customer support server 1303 to complain about the order failing to complete. The three systems 1301, 1302, and 1303 are disparate systems that do not have a common logging format. The order application 1301 sends log data 1304 to the data intake and query system 108 in one format, the middleware code 1302 sends error log data 1305 in a second format, and the support server 1303 sends log data 1306 in a third format.

Using the log data received at the data intake and query system 108 from the three systems, the vendor can uniquely obtain an insight into user activity, user experience, and system behavior. The query system 214 allows the vendor's administrator to search the log data from the three systems, thereby obtaining correlated information, such as the order number and corresponding customer ID number of the person placing the order. The system also allows the administrator to see a visualization of related events via a user interface. The administrator ca query the query system 214 for customer ID field value matches across the log data from the three systems that are stored in common storage 216. The customer ID field value exists in the data gathered from the three systems, but the customer ID field value may be located in different areas of the data given differences in the architecture of the systems. There is a semantic relationship between the customer ID field values generated by the three systems. The query system 214 requests events from the one or more data stores 218 to gather relevant events from the three systems. The search head 504 then applies extraction rules to the events in order to extract field values that it can correlate. The search head 504 may apply a different extraction rule to each set of events from each system when the event format differs among systems. In this example, the user interface can display to the administrator the events corresponding to the common customer ID field values 1307, 1308, and 1309, thereby providing the administrator with insight into a customer's experience.

Note that query results can be returned to a client, a search head 504, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 13B:
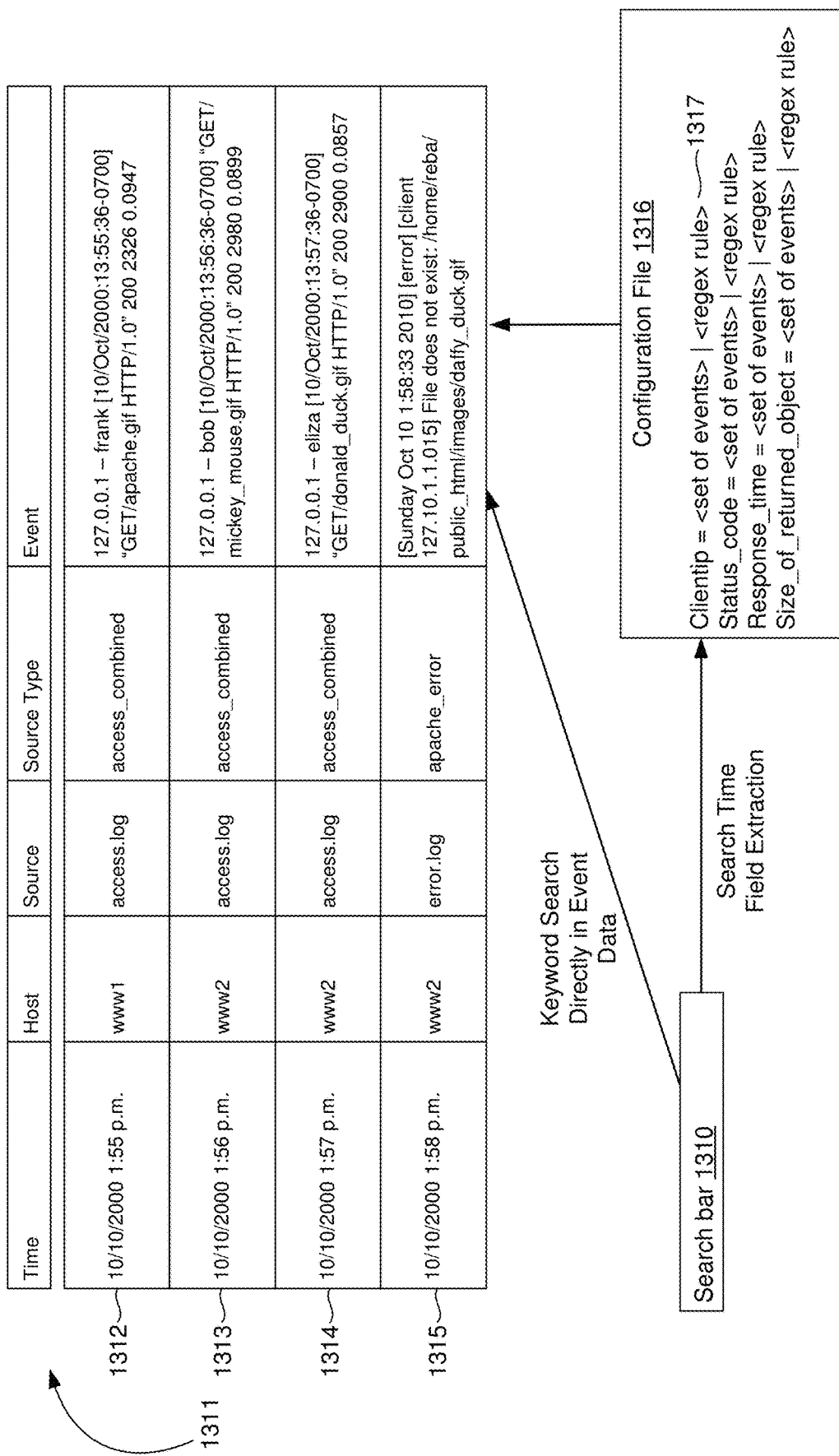
FIG. 13B illustrates an example of processing keyword searches and field searches, in accordance with disclosed embodiments.

The query system 214 enables users to run queries against the stored data to retrieve events that meet criteria specified in a query, such as containing certain keywords or having specific values in defined fields. FIG. 13B illustrates the manner in which keyword searches and field searches are processed in accordance with disclosed embodiments.

If a user inputs a search query into search bar 1310 that includes only keywords (also known as "tokens"), e.g., the keyword "error" or "warning", the query system 214 of the data intake and query system 108 can search for those keywords directly in the event data 1311 stored in the raw record data store. Note that while FIG. 13B only illustrates four events 1312, 1313, 1314, 1315, the raw record data store (corresponding to data store 208 in FIG. 2) may contain records for millions of events.

As disclosed above, the indexing system 212 can optionally generate a keyword index to facilitate fast keyword searching for event data. The indexing system 212 can include the identified keywords in an index, which associates each stored keyword with reference pointers to events containing that keyword (or to locations within events where that keyword is located, other location identifiers, etc.). When the query system 214 subsequently receives a keyword-based query, the query system 214 can access the keyword index to quickly identify events containing the keyword. For example, if the keyword "HTTP" was indexed by the indexing system 212 at index time, and the user searches for the keyword "HTTP", the events 1312, 1313, and 1314, will be identified based on the results returned from the keyword index. As noted above, the index contains reference pointers to the events containing the keyword, which allows for efficient retrieval of the relevant events from the raw record data store.

If a user searches for a keyword that has not been indexed by the indexing system 212, the data intake and query system 108 may nevertheless be able to retrieve the events by searching the event data for the keyword in the raw record data store directly as shown in FIG. 13B. For example, if a user searches for the keyword "frank", and the name "frank" has not been indexed at search time, the query system 214 can search the event data directly and return the first event 1312. Note that whether the keyword has been indexed at index time or search time or not, in both cases the raw data with the events 1311 is accessed from the raw data record store to service the keyword search. In the case where the keyword has been indexed, the index will contain a reference pointer that will allow for a more efficient retrieval of the event data from the data store. If the keyword has not been indexed, the query system 214 can search through the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the query system 214 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 evaemerson."

The data intake and query system 108 advantageously allows for search time field extraction. In other words, fields can be extracted from the event data at search time using late-binding schema as opposed to at data ingestion time, which was a major limitation of the prior art systems.

In response to receiving the search query, a search head 504 of the query system 214 can use extraction rules to extract values for the fields associated with a field or fields in the event data being searched. The search head 504 can obtain extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 13B illustrates the manner in which configuration files may be used to configure custom fields at search time in accordance with the disclosed embodiments. In response to receiving a search query, the data intake and query system 108 determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the query system 214 may, in one or more embodiments, need to locate configuration file 1316 during the execution of the search as shown in FIG. 13B.

Configuration file 1316 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 1316.

In some embodiments, the indexing system 212 can automatically discover certain custom fields at index time and the regular expressions for those fields will be automatically generated at index time and stored as part of extraction rules in configuration file 1316. For example, fields that appear in the event data as "key=value" pairs may be automatically extracted as part of an automatic field discovery process. Note that there may be several other ways of adding field definitions to configuration files in addition to the methods discussed herein.

The search head 504 can apply the extraction rules derived from configuration file 1316 to event data that it receives from search nodes 506. The search nodes 506 may apply the extraction rules from the configuration file to events in an associated data store or common storage 216. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 1316 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 1315 also contains "clientip" field, however, the "clientip" field is in a different format from events 1312, 1313, and 1314. To address the discrepancies in the format and content of the different types of events, the configuration file will also need to specify the set of events that an extraction rule applies to, e.g., extraction rule 1317 specifies a rule for filtering by the type of event and contains a regular expression for parsing out the field value. Accordingly, each extraction rule can pertain to only a particular type of event. If a particular field, e.g., "clientip" occurs in multiple types of events, each of those types of events can have its own corresponding extraction rule in the configuration file 1316 and each of the extraction rules would comprise a different regular expression to parse out the associated field value. The most common way to categorize events is by source type because events generated by a particular source can have the same format.

The field extraction rules stored in configuration file 1316 perform search-time field extractions. For example, for a query that requests a list of events with source type "access_combined" where the "clientip" field equals "127.0.0.1," the query system 214 can first locate the configuration file 1316 to retrieve extraction rule 1317 that allows it to extract values associated with the "clientip" field from the event data 1320 "where the source type is "access_combined. After the "clientip" field has been extracted from all the events comprising the "clientip" field where the source type is "access_combined," the query system 214 can then execute the field criteria by performing the compare operation to filter out the events where the "clientip" field equals "127.0.0.1." In the example shown in FIG. 13B, the events 1312, 1313, and 1314 would be returned in response to the user query. In this manner, the query system 214 can service queries containing field criteria in addition to queries containing keyword criteria (as explained above).

In some embodiments, the configuration file 1316 can be created during indexing. It may either be manually created by the user or automatically generated with certain predetermined field extraction rules. As discussed above, the events may be distributed across several data stores in common storage 216, wherein various indexing nodes 404 may be responsible for storing the events in the common storage 216 and various search nodes 506 may be responsible for searching the events contained in common storage 216.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system 108 maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system 108 to search and correlate data across heterogeneous sources flexibly and efficiently.

Further, by providing the field definitions for the queried fields at search time, the configuration file 1316 allows the record data store to be field searchable. In other words, the raw record data store can be searched using keywords as well as fields, wherein the fields are searchable name/value pairings that distinguish one event from another and can be defined in configuration file 1316 using extraction rules. In comparison to a search containing field names, a keyword search does not need the configuration file and can search the event data directly as shown in FIG. 13B.

It should also be noted that any events filtered out by performing a search-time field extraction using a configuration file 1316 can be further processed by directing the results of the filtering step to a processing step using a pipelined search language. Using the prior example, a user can pipeline the results of the compare step to an aggregate function by asking the query system 214 to count the number of events where the "clientip" field equals "127.0.0.1."

4.8. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user can iteratively applies a model development tool to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data, generate reports, etc. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

4.9. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system 108 also employs a number of unique acceleration techniques that have been developed to speed up analysis operations performed at search time. These techniques include: (1) performing search operations in parallel using multiple search nodes 506; (2) using a keyword index; (3) using a high performance analytics store; and (4) accelerating the process of generating reports. These novel techniques are described in more detail below.

4.9.1. Aggregation Technique

Figure 14:
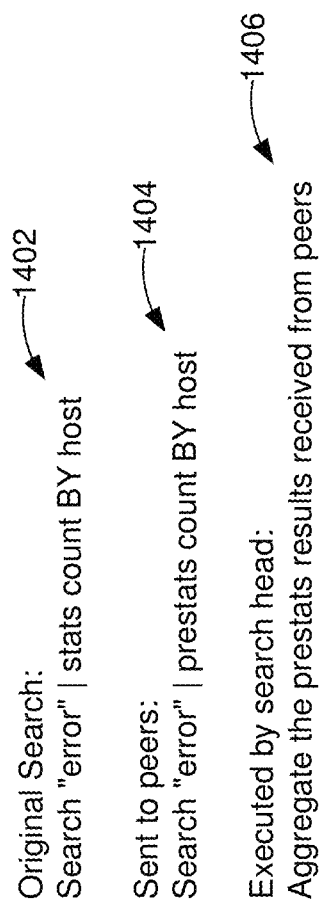
FIG. 14 is an example search query received from a client and executed by search peers, in accordance with example embodiments.

To facilitate faster query processing, a query can be structured such that multiple search nodes 506 perform the query in parallel, while aggregation of search results from the multiple search nodes 506 is performed at the search head 504. For example, FIG. 14 is an example search query received from a client and executed by search nodes 506, in accordance with example embodiments. FIG. 14 illustrates how a search query 1402 received from a client at a search head 504 can split into two phases, including: (1) subtasks 1404 (e.g., data retrieval or simple filtering) that may be performed in parallel by search nodes 506 for execution, and (2) a search results aggregation operation 1406 to be executed by the search head 504 when the results are ultimately collected from the search nodes 506.

During operation, upon receiving search query 1402, a search head 504 determines that a portion of the operations involved with the search query may be performed locally by the search head 504. The search head 504 modifies search query 1402 by substituting "stats" (create aggregate statistics over results sets received from the search nodes 506 at the search head 504) with "prestats" (create statistics by the search node 506 from local results set) to produce search query 1404, and then distributes search query 1404 to distributed search nodes 506, which are also referred to as "search peers" or "peer search nodes." Note that search queries may generally specify search criteria or operations to be performed on events that meet the search criteria. Search queries may also specify field names, as well as search criteria for the values in the fields or operations to be performed on the values in the fields. Moreover, the search head 504 may distribute the full search query to the search peers, or may alternatively distribute a modified version (e.g., a more restricted version) of the search query to the search peers. In this example, the search nodes 506 are responsible for producing the results and sending them to the search head 504. After the search nodes 506 return the results to the search head 504, the search head 504 aggregates the received results 1406 to form a single search result set. By executing the query in this manner, the system effectively distributes the computational operations across the search nodes 506 while minimizing data transfers.

4.9.2. Keyword Index

As described herein, the data intake and query system 108 can construct and maintain one or more keyword indexes to quickly identify events containing specific keywords. This technique can greatly speed up the processing of queries involving specific keywords. As mentioned above, to build a keyword index, an indexing node 404 first identifies a set of keywords. Then, the indexing node 404 includes the identified keywords in an index, which associates each stored keyword with references to events containing that keyword, or to locations within events where that keyword is located. When the query system 214 subsequently receives a keyword-based query, the indexer can access the keyword index to quickly identify events containing the keyword.

4.9.3. High Performance Analytics Store

To speed up certain types of queries, some embodiments of data intake and query system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a summarization table for the common storage 216, one or more data stores 218 of the common storage 216, buckets cached on a search node 506, etc. The different summarization tables can include entries for the events in the common storage 216, certain data stores 218 in the common storage 216, or data stores associated with a particular search node 506, etc.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of data intake and query system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in certain embodiments, the query system 214 can employ the inverted index separate from the raw record data store to generate responses to the received queries.

Note that the term "summarization table" or "inverted index" as used herein is a data structure that may be generated by the indexing system 212 that includes at least field names and field values that have been extracted and/or indexed from event records. An inverted index may also include reference values that point to the location(s) in the field searchable data store where the event records that include the field may be found. Also, an inverted index may be stored using various compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiments, a query can comprise an initial step that calls up a pre-generated inverted index on which further filtering and processing can be performed. For example, referring back to FIG. 12B, a set of events can be generated at block 1240 by either using a "collection" query to create a new inverted index or by calling up a pre-generated inverted index. A query with several pipelined steps will start with a pre-generated index to accelerate the query.

FIG. 13C illustrates the manner in which an inverted index is created and used in accordance with the disclosed embodiments. As shown in FIG. 13C, an inverted index 1322 can be created in response to a user-initiated collection query using the event data 1323 stored in the raw record data store. For example, a non-limiting example of a collection query may include "collect clientip=127.0.0.1" which may result in an inverted index 1322 being generated from the event data 1323 as shown in FIG. 13C. Each entry in inverted index 1322 includes an event reference value that references the location of a source record in the field searchable data store. The reference value may be used to access the original event record directly from the field searchable data store.

In one or more embodiments, if one or more of the queries is a collection query, the one or more search nodes 506 may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 13C, prior to running the collection query that generates the inverted index 1322, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 1322 is scheduled to run periodically, one or more search nodes 506 can periodically search through the relevant buckets to update inverted index 1322 with event data for any new events with the "clientip" value of "127.0.0.1."

In some embodiments, the inverted indexes that include fields, values, and reference value (e.g., inverted index 1322) for event records may be included in the summarization information provided to the user. In other embodiments, a user may not be interested in specific fields and values contained in the inverted index, but may need to perform a statistical query on the data in the inverted index. For example, referencing the example of FIG. 13C rather than viewing the fields within the inverted index 1322, a user may want to generate a count of all client requests from IP address "127.0.0.1." In this case, the query system 214 can simply return a result of "4" rather than including details about the inverted index 1322 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 1322 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for one or more data stores 218 of common storage 216, an indexing node 404, or a search node 506. The specific inverted indexes can include entries for the events in the one or more data stores 218 or data store associated with the indexing nodes 404 or search node 506. In some embodiments, if one or more of the queries is a stats query, a search node 506 can generate a partial result set from previously generated summarization information. The partial result sets may be returned to the search head 504 that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from a search node 506 that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

4.9.3.1. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 11C, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1322 to another filtering step requesting the user ids for the entries in inverted index 1322 where the server response time is greater than "0.0900" microseconds. The query system 214 can use the reference values stored in inverted index 1322 to retrieve the event data from the field searchable data store, filter the results based on the "response time" field values and, further, extract the user id field from the resulting event data to return to the user. In the present instance, the user ids "frank" and "eliza" would be returned to the user from the generated results table 1325.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the query system 214 can again use the reference values stored in inverted index 1322 to retrieve the event data from the field searchable data store and, further, extract the object size field values from the associated events 1331, 1332, 1333 and 1334. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 1322. The query system 214, in this case, can automatically determine that an inverted index 1322 already exists in the system that could expedite this query. In one embodiment, prior to running any search comprising a field-value pair, for example, a query system 214 can search though all the existing inverted indexes to determine if a pre-generated inverted index could be used to expedite the search comprising the field-value pair. Accordingly, the query system 214 can automatically use the pre-generated inverted index, e.g., index 1322 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system 108 includes an intake system 210 that receives data from a variety of input data sources, and an indexing system 212 that processes and stores the data in one or more data stores or common storage 216. By distributing events among the data stores 218 of common storage 213, the query system 214 can analyze events for a query in parallel. In some embodiments, the data intake and query system 108 can maintain a separate and respective inverted index for each of the above-described time-specific buckets that stores events for a specific time range. A bucket-specific inverted index includes entries for specific field-value combinations that occur in events in the specific bucket. As explained above, a search head 504 can correlate and synthesize data from across the various buckets and search nodes 506.

This feature advantageously expedites searches because instead of performing a computationally intensive search in a centrally located inverted index that catalogues all the relevant events, a search node 506 is able to directly search an inverted index stored in a bucket associated with the time-range specified in the query. This allows the search to be performed in parallel across the various search nodes 506. Further, if the query requests further filtering or processing to be conducted on the event data referenced by the locally stored bucket-specific inverted index, the search node 506 is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the query system 214 automatically determines that using an inverted index can expedite the processing of the query, the search nodes 506 can search through each of the inverted indexes associated with the buckets for the specified time-range. This feature allows the High Performance Analytics Store to be scaled easily.

Figure 13D:
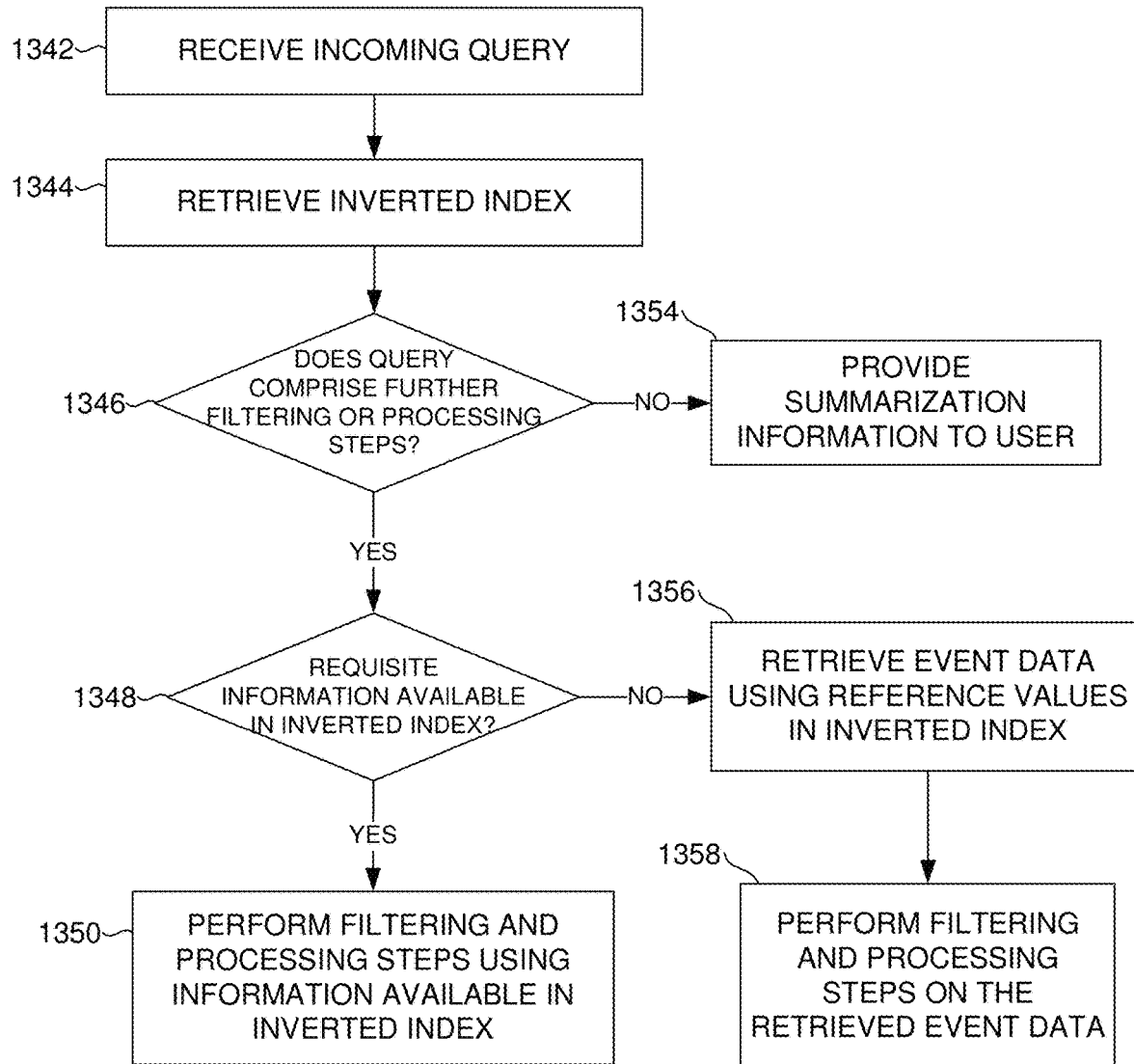
FIG. 13D is a flow diagram of an example use of an inverted index in a pipelined search query, in accordance with example embodiments.

FIG. 13D is a flow diagram illustrating an embodiment of a routine implemented by one or more computing devices of the data intake and query system for using an inverted index in a pipelined search query to determine a set of event data that can be further limited by filtering or processing. For example, the routine can be implemented by any one or any combination of the search head 504, search node 506, search master 512, or search manager 514, etc. However, for simplicity, reference below is made to the query system 214 performing the various steps of the routine.

At block 1342, a query is received by a data intake and query system 108. In some embodiments, the query can be received as a user generated query entered into search bar of a graphical user search interface. The search interface also includes a time range control element that enables specification of a time range for the query.

At block 1344, an inverted index is retrieved. Note, that the inverted index can be retrieved in response to an explicit user search command inputted as part of the user generated query. Alternatively, a query system 214 can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in some embodiments, the query system 214 employs the inverted index separate from the raw record data store to generate responses to the received queries.

At block 1346, the query system 214 determines if the query contains further filtering and processing steps. If the query contains no further commands, then, in one embodiment, summarization information can be provided to the user at block 1354.

If, however, the query does contain further filtering and processing commands, then at block 1348, the query system 214 determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 1350.

If, however, the query references fields that are not extracted in the inverted index, the query system 214 can access event data pointed to by the reference values in the inverted index to retrieve any further information required at block 1356. Subsequently, any further filtering or processing steps are performed on the fields extracted directly from the event data and the results are provided to the user at step 1358.

4.9.4. Accelerating Report Generation

In some embodiments, a data server system such as the data intake and query system 108 can accelerate the process of periodically generating updated reports based on query results. To accelerate this process, a summarization engine can automatically examine the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period may only include events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query system 214 determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

4.10. Security Features

The data intake and query system 108 provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system 108. The enterprise security application provides the security practitioner with visibility into security-relevant threats found in the enterprise infrastructure by capturing, monitoring, and reporting on data from enterprise security devices, systems, and applications. Through the use of the data intake and query system 108 searching and reporting capabilities, the enterprise security application provides a top-down and bottom-up view of an organization's security posture.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

Figure 15:
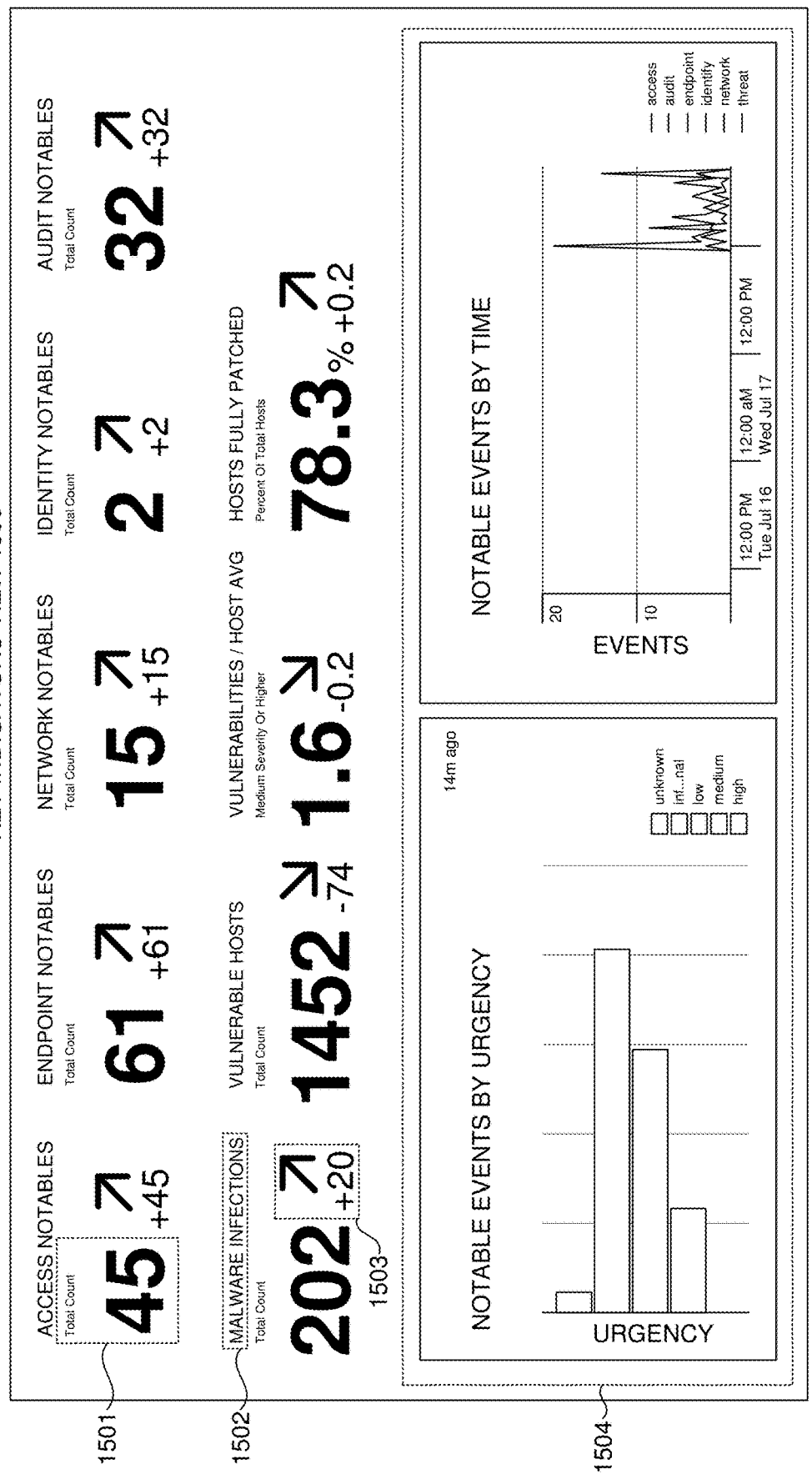
FIG. 15 is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 15 illustrates an example key indicators view 1500 that comprises a dashboard, which can display a value 1501, for various security-related metrics, such as malware infections 1502. It can also display a change in a metric value 1503, which indicates that the number of malware infections increased by 63 during the preceding interval. Key indicators view 1500 additionally displays a histogram panel 1504 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes. Additional disclosure regarding the security features is described in U.S. application Ser. No. 16/512,899, incorporated by reference herein in its entirety.

4.11. Data Center Monitoring

As mentioned above, the data intake and query platform provides various features that simplify the developer's task to create various applications, including for data center monitoring. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks. Additional disclosure regarding the data center monitoring is described in U.S. application Ser. No. 16/512,899, incorporated by reference herein in its entirety.

Additional disclosure regarding the use of performance metrics for data center monitoring is described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes. Additional disclosure regarding a proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes. Additional disclosure regarding a user interface that can be used for data center monitoring is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

4.12. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system 108 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.13. Other Architectures

In view of the description above, it will be appreciate that the architecture disclosed herein, or elements of that architecture, may be implemented independently from, or in conjunction with, other architectures. For example, the Incorporated Applications disclose a variety of architectures wholly or partially compatible with the architecture of the present disclosure.

Generally speaking one or more components of the data intake and query system 108 of the present disclosure can be used in combination with or to replace one or more components of the data intake and query system 108 of the Incorporated Applications. For example, depending on the embodiment, the operations of the forwarder 204 and the ingestion buffer 4802 of the Incorporated Applications can be performed by or replaced with the intake system 210 of the present disclosure. The parsing, indexing, and storing operations (or other non-searching operations) of the indexers 206, 230 and indexing cache components 254 of the Incorporated Applications can be performed by or replaced with the indexing nodes 404 of the present disclosure. The storage operations of the data stores 208 of the Incorporated Applications can be performed using the data stores 412 of the present disclosure (in some cases with the data not being moved to common storage 216). The storage operations of the common storage 4602, cloud storage 256, or global index 258 can be performed by the common storage 216 of the present disclosure. The storage operations of the query acceleration data store 3308 can be performed by the query acceleration data store 222 of the present disclosure.

As continuing examples, the search operations of the indexers 206, 230 and indexing cache components 254 of the Incorporated Applications can be performed by or replaced with the indexing nodes 404 in some embodiments or by the search nodes 506 in certain embodiments. For example, in some embodiments of certain architectures of the Incorporated Applications (e.g., one or more embodiments related to FIGS. 2, 3, 4, 18, 25, 27, 33, 46), the indexers 206, 230 and indexing cache components 254 of the Incorporated Applications may perform parsing, indexing, storing, and at least some searching operations, and in embodiments of some architectures of the Incorporated Applications (e.g., one more embodiments related to FIG. 48), indexers 206, 230 and indexing cache components 254 of the Incorporated Applications perform parsing, indexing, and storing operations, but do not perform searching operations. Accordingly, in some embodiments, some or all of the searching operations described as being performed by the indexers 206, 230 and indexing cache components 254 of the Incorporated Applications can be performed by the search nodes 506. For example, in embodiments described in the Incorporated Applications in which worker nodes 214, 236, 246, 3306 perform searching operations in place of the indexers 206, 230 or indexing cache components 254, the search nodes 506 can perform those operations. In certain embodiments, some or all of the searching operations described as being performed by the indexers 206, 230 and indexing cache components 254 of the Incorporated Applications can be performed by the indexing nodes 404. For example, in embodiments described in the Incorporated Applications in which the indexers 206, 230 and indexing cache components 254 perform searching operations, the indexing nodes 404 can perform those operations.

As a further example, the query operations performed by the search heads 210, 226, 244, daemons 210, 232, 252, search master 212, 234, 250, search process master 3302, search service provider 216, and query coordinator 3304 of the Incorporated Applications, can be performed by or replaced with any one or any combination of the query system manager 502, search head 504, search master 512, search manager 514, resource monitor 508, and/or the resource catalog 510. For example, these components can handle and coordinate the intake of queries, query processing, identification of available nodes and resources, resource allocation, query execution plan generation, assignment of query operations, combining query results, and providing query results to a user or a data store.

In certain embodiments, the query operations performed by the worker nodes 214, 236, 246, 3306 of the Incorporated Applications can be performed by or replaced with the search nodes 506 of the present disclosure. In some embodiments, the intake or ingestion operations performed by the worker nodes 214, 236, 246, 3306 of the Incorporated Applications can be performed by or replaced with one or more components of the intake system 210.

Furthermore, it will be understood that some or all of the components of the architectures of the Incorporated Applications can be replaced with components of the present disclosure. For example, in certain embodiments, the intake system 210 can be used in place of the forwarders 204 and/or ingestion buffer 4802 of one or more architectures of the Incorporated Applications, with all other components of the one or more architecture of the Incorporated Applications remaining the same. As another example, in some embodiments the indexing nodes 404 can replace the indexer 206 of one or more architectures of the Incorporated Applications with all other components of the one or more architectures of the Incorporated Applications remaining the same. Accordingly, it will be understood that a variety of architectures can be designed using one or more components of the data intake and query system 108 of the present disclosure in combination with one or more components of the data intake and query system 108 of the Incorporated Applications.

Illustratively, the architecture depicted at FIG. 2 of the Incorporated Applications may be modified to replace the forwarder 204 of that architecture with the intake system 210 of the present disclosure. In addition, in some cases, the indexers 206 of the Incorporated Applications can be replaced with the indexing nodes 404 of the present disclosure. In such embodiments, the indexing nodes 404 can retain the buckets in the data stores 412 that they create rather than store the buckets in common storage 216. Further, in the architecture depicted at FIG. 2 of the Incorporated Applications, the indexing nodes 404 of the present disclosure can be used to execute searches on the buckets stored in the data stores 412. In some embodiments, in the architecture depicted at FIG. 2 of the Incorporated Applications, the partition manager 408 can receive data from one or more forwarders 204 of the Incorporated Applications. As additional forwarders 204 are added or as additional data is supplied to the architecture depicted at FIG. 2 of the Incorporated Applications, the indexing node 404 can spawn additional partition manager 408 and/or the indexing manager system 402 can spawn additional indexing nodes 404. In addition, in certain embodiments, the bucket manager 414 may merge buckets in the data store 414 or be omitted from the architecture depicted at FIG. 2 of the Incorporated Applications.

Furthermore, in certain embodiments, the search head 210 of the Incorporated Applications can be replaced with the search head 504 of the present disclosure. In some cases, as described herein, the search head 504 can use the search master 512 and search manager 514 to process and manager the queries. However, rather than communicating with search nodes 506 to execute a query, the search head 504 can, depending on the embodiment, communicate with the indexers 206 of the Incorporated Applications or the search nodes 404 to execute the query.

Similarly the architecture of FIG. 3 of the Incorporated Applications may be modified in a variety of ways to include one or more components of the data intake and query system 108 described herein. For example, the architecture of FIG. 3 of the Incorporated Applications may be modified to include an intake system 210 in accordance with the present disclosure within the cloud-based data intake and query system 1006 of the Incorporated Applications, which intake system 210 may logically include or communicate with the forwarders 204 of the Incorporated Applications. In addition, the indexing nodes 404 described herein may be utilized in place of or to implement functionality similar to the indexers described with reference to FIG. 3 of the Incorporated Applications. In addition, the architecture of FIG. 3 of the Incorporated Applications may be modified to include common storage 216 and/or search nodes 506.

With respect to the architecture of FIGS. 4A and/or 4B of the Incorporated Applications, the intake system 210 described herein may be utilized in place of or to implement functionality similar to either or both the forwarders 204 or the ERP processes 410 through 412 of the Incorporated Applications. Similarly, the indexing nodes 506 and the search head 504 described herein may be utilized in place of or to implement functionality similar to the indexer 206 and search head 210, respectively. In some cases, the search manager 514 described herein can manage the communications and interfacing between the indexer 206 and the ERP processes 410 through 412.

With respect to the flow diagrams and functionality described in FIGS. 5A-5C, 6A, 6B, 7A-7D, 8A, 8B, 9, 10, 11A-11D, 12-16, and 17A-17D of the Incorporated Applications, it will be understood that the processing and indexing operations described as being performed by the indexers 206 can be performed by the indexing nodes 404, the search operations described as being performed by the indexers 206 can be performed by the indexing nodes 404 or search nodes 506 (depending on the embodiment), and/or the searching operations described as being performed by the search head 210, can be performed by the search head 504 or other component of the query system 214.

Figure 18:
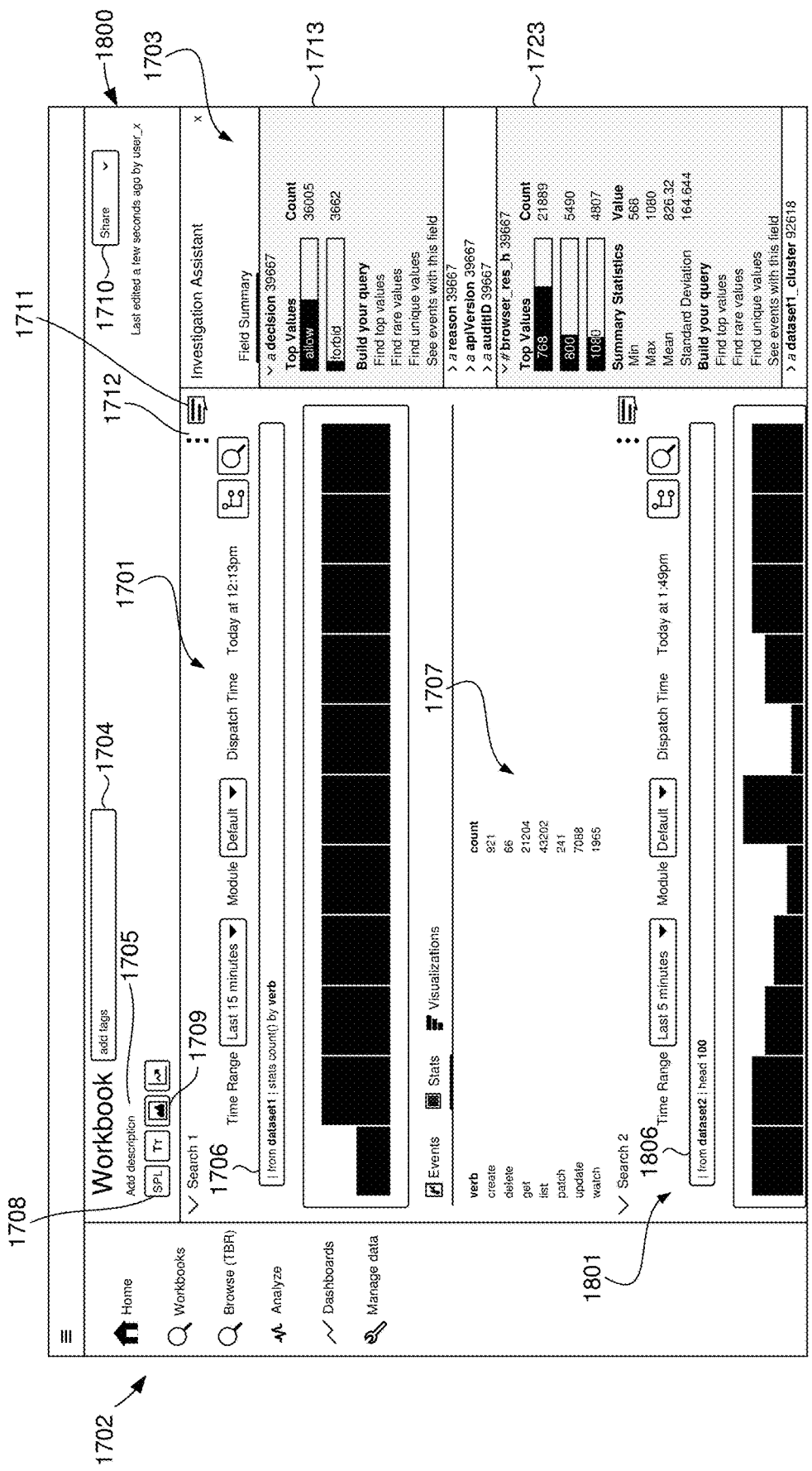

With reference to FIG. 18 of the Incorporated Applications, the indexing nodes 404 and search heads 504 described herein may be utilized in place of or to implement functionality similar to the indexers 206 and search head 210, respectively. Similarly, the search master 512 and search manager 514 described herein may be utilized in place of or to implement functionality similar to the master 212 and the search service provider 216, respectively, described with respect to FIG. 18 of the Incorporated Applications. Further, the intake system 210 described herein may be utilized in place of or to implement ingestion functionality similar to the ingestion functionality of the worker nodes 214 of the Incorporated Applications. Similarly, the search nodes 506 described herein may be utilized in place of or to implement search functionality similar to the search functionality of the worker nodes 214 of the Incorporated Applications.

Figure 25:
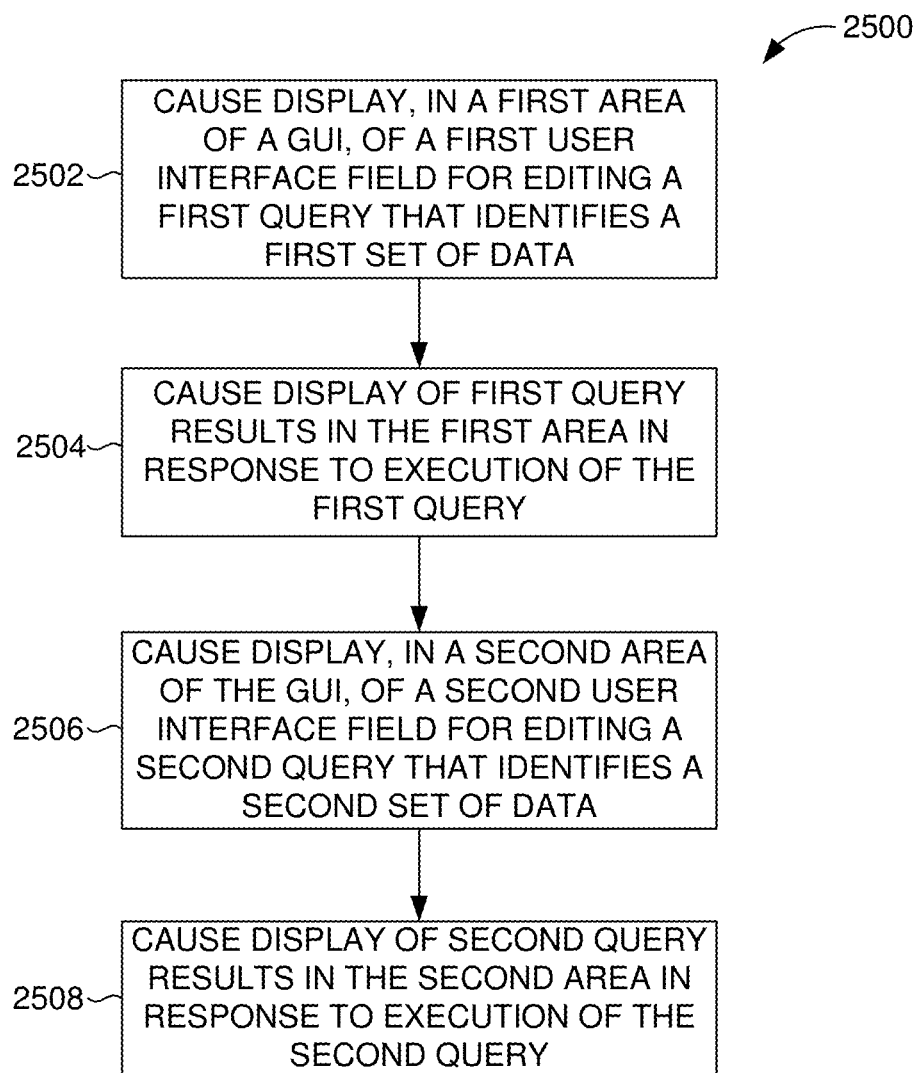
FIG. 25 is a flow diagram illustrative of an embodiment of a routine to concurrently display query results from two different queries in the same page.

With reference to FIG. 25 of the Incorporated Applications, the indexing nodes 404 and search heads 504 described herein may be utilized in place of or to implement functionality similar to the indexers 236 and search heads 226, respectively. In addition, the search head 504 described herein may be utilized in place of or to implement functionality similar to the daemon 232 and the master 234 described with respect to FIG. 25 of the Incorporated Applications. The intake system 210 described herein may be utilized in place of or to implement ingestion functionality similar to the ingestion functionality of the worker nodes 214 of the Incorporated Applications. Similarly, the search nodes 506 described herein may be utilized in place of or to implement search functionality similar to the search functionality of the worker nodes 234 of the Incorporated Applications.

Figure 27:
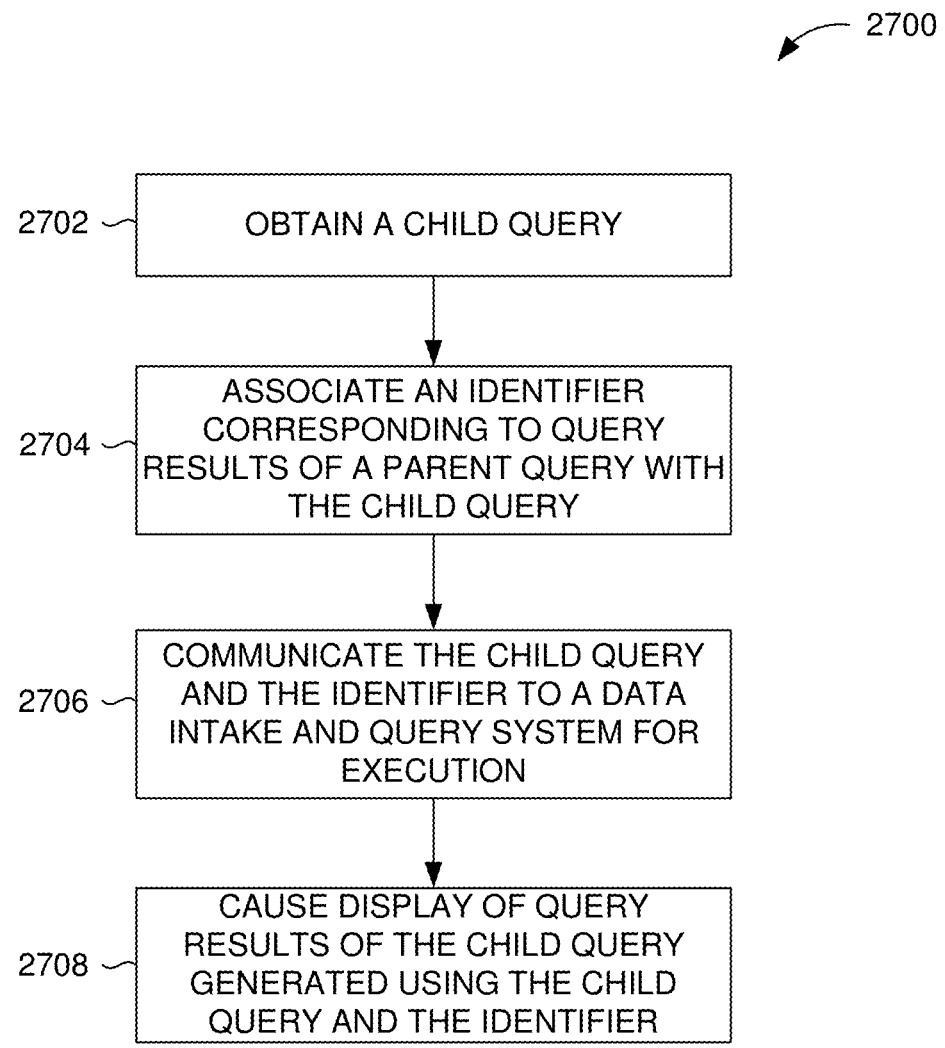
FIG. 27 is a flow diagram illustrative of an embodiment of a routine to cause display of query results generated from multiple, related queries.

With reference to FIG. 27 of the Incorporated Applications, the indexing nodes 404 or search nodes 506 described herein may be utilized in place of or to implement functionality similar to the index cache components 254. For example, the indexing nodes 404 may be utilized in place of or to implement parsing, indexing, storing functionality of the index cache components 254, and the search nodes 506 described herein may be utilized in place of or to implement searching or caching functionality similar to the index cache components 254. In addition, the search head 504 described herein may be utilized in place of or to implement functionality similar to the search heads 244, daemon 252, and/or the master 250 described with respect to FIG. 27 of the Incorporated Applications. The intake system 210 described herein may be utilized in place of or to implement ingestion functionality similar to the ingestion functionality of the worker nodes 246 described with respect to FIG. 27 of the Incorporated Applications. Similarly, the search nodes 506 described herein may be utilized in place of or to implement search functionality similar to the search functionality of the worker nodes 234 described with respect to FIG. 27 of the Incorporated Applications. In addition, the common storage 216 described herein may be utilized in place of or to implement functionality similar to the functionality of the cloud storage 256 and/or global index 258 described with respect to FIG. 27 of the Incorporated Applications.

Figure 33:
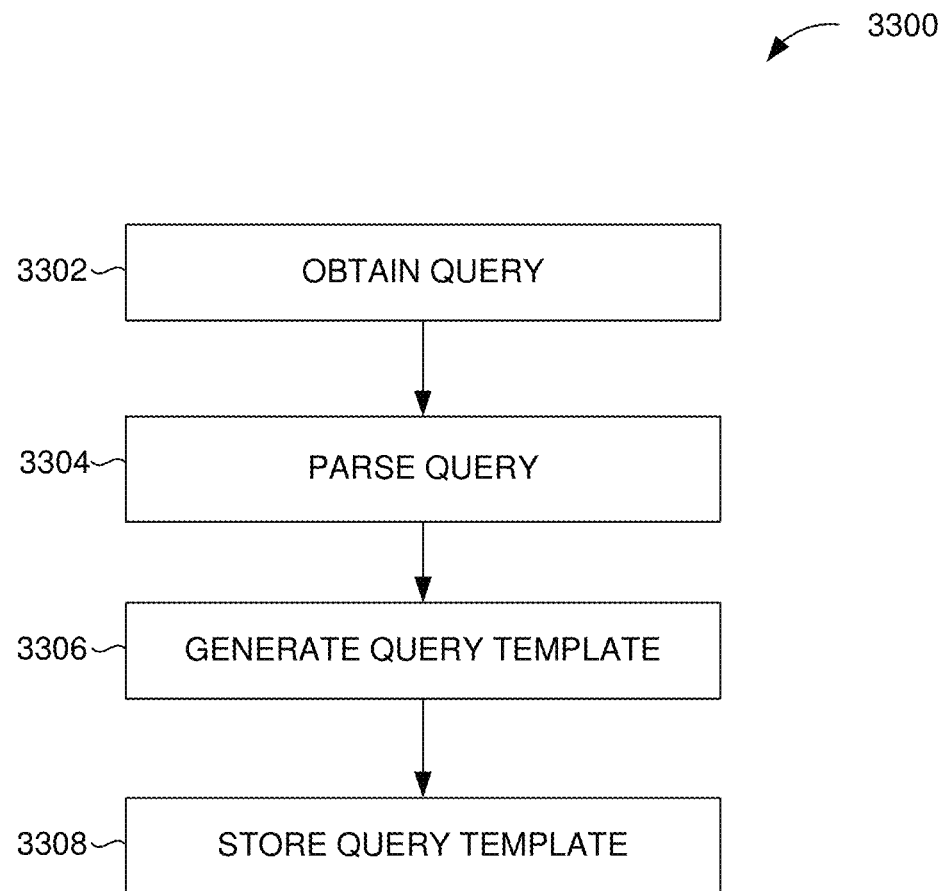
FIG. 33 is a flow diagram illustrative of an embodiment of a routine to recommend query parameters.

With respect to the architectures of FIGS. 33, 46, and 48 of the Incorporated Applications, the intake system 210 described herein may be utilized in place of or to implement functionality similar to the forwarders 204. In addition, the indexing nodes 404 of the present disclosure can perform the functions described as being performed by the indexers 206 (e.g., parsing, indexing, storing, and in some embodiments, searching) of the architectures of FIGS. 33, 46, and 48 of the Incorporated Applications; the operations of the acceleration data store 3308 of the architectures of FIGS. 33, 46, and 48 of the Incorporated Applications can be performed by the acceleration data store 222 of the present application; and the operations of the search head 210, search process maser 3302, and query coordinator 3304 of the architectures of FIGS. 33, 46, and 48 of the Incorporated Applications can be performed by the search head 504, resource catalog 510, and or resource monitor 508 of the present application. For example, the functionality of the workload catalog 3312 and node monitor 3314 of the architectures of FIGS. 33, 46, and 48 of the Incorporated Applications can be performed by the resource catalog 510 and resource monitor 508; the functionality of the search head 210 and other components of the search process master 3302 of the architectures of FIGS. 33, 46, and 48 of the Incorporated Applications can be performed by the search head 504 or search master 512; and the functionality of the query coordinator 3304 of the architectures of FIGS. 33, 46, and 48 of the Incorporated Applications can be performed by the search manager 514.

In addition, in some embodiments, the searching operations described as being performed by the worker nodes 3306 of the architectures of FIGS. 33, 46, and 48 of the Incorporated Applications can be performed by the search nodes 506 of the present application and the intake or ingestion operations performed by the worker nodes 3306 of the architectures of FIGS. 33, 46, and 48 of the Incorporated Applications can be performed by the intake system 210. However, it will be understood that in some embodiments, the search nodes 506 can perform the intake and search operations described in the Incorporated Applications as being performed by the worker nodes 3306. Furthermore, the cache manager 516 can implement one or more of the caching operations described in the Incorporated Applications with reference to the architectures of FIGS. 33, 46, and 48 of the Incorporated Applications.

With respect to FIGS. 46 and 48 of the Incorporated Applications, the common storage 216 of the present application can be used to provide the functionality with respect to the common storage 2602 of the architecture of FIGS. 46 and 48 of the Incorporated Applications. With respect to the architecture of FIG. 48 of the Incorporated Applications, the intake system 210 described herein may be utilized in place of or to implement operations similar to the forwarders 204 and ingested data buffer 4802, and may in some instances implement all or a portion of the operations described in that reference with respect to worker nodes 3306. Thus, the architecture of the present disclosure, or components thereof, may be implemented independently from or incorporated within architectures of the prior disclosures.

5.0. Query Interface System

It is a common problem for a user to have many tabs and/or windows open for the same project. The tabs and/or windows may not share information or otherwise interact with each other. Thus, the user may have to toggle between the open tabs and/or windows to view different information about the project. In addition, because the tabs and/or windows may not share any information, an application generating the tabs and/or windows, such as a client browser, may not be able to leverage caching techniques to load one tab or window using data from another tab or window.

In some cases, the tabs and/or windows are generated by different applications or programs, such as an image viewer and/or editor, a data intake and query system window, a chat application, and/or the like. Because the tabs and/or windows are generated by different applications and do not share any information, it can be difficult for the user to associate certain data displayed in one tab or window with other data displayed in another tab or window. For example, if one tab or window displays a query to execute on a dataset and another tab or window displays an image depicting results of the executed query, it can be difficult for the user to associate the query with the query results. A user may try to inefficiently place two tabs or windows adjacent to each other and scroll within the tabs or windows such that the query and query results are both visible, but the placement and scrolling may not be easily reproducible. Thus, if a user aligns tabs or windows to all display desired data and then closes the tabs or windows, the user may have to again align the tabs or windows to display the desired data when the tabs or windows are reopened. As another example, a user may attempt to run multiple queries. Conventional client browsers, however, do not allow a user to run multiple queries and view the query results in the same window. Rather, the user may be required to open a first tab or window to run a first query and view the first query results, to open a second tab or window to run a second query and view the second query results, and so on. If the user is attempting to run a large number of queries (e.g., 5 queries, 10 queries, 100 queries, etc.), it can be difficult for the user to work with the queries and understand the relationship between queries, if any, given that the queries are open in different tabs and/or windows and available screen space may limit the amount of tabs and/or windows that the user can view concurrently. The user, therefore, may spend an inordinate amount of time navigating or toggling back and forth between tabs and/or windows to compare queries, query results, and/or the like.

Even if one tab or window displays both a query and results of executing the query, other issues can occur. For example, some queries are time-based, such as a search for certain data ingested within the last N minutes. While a query may be time-based, the user may be specifically interested in the query results generated as a result of running the query at a specific time. If the user closes the tab or window and then later tries to reopen the tab or window, the query may be re-run given that the query is time-based and different data may have been ingested within the last N minutes. Re-running a time-based query at a later time may produce query results that are different than the query results originally produced when the time-based query was run for the first time. In other words, query results generated as a result of execution of a time-based query may not be frozen in time. Rather, new query results may be presented to a user each time the user opens a tab or window associated with the time-based query. The user may then lose the ability to view a desired set of results if the user happens to close the tab or window.

In some cases, a user can enter a long query (e.g., tens of lines long). While the long query enables a user to view a more-refined set of query results, entering a long query can make it difficult for a user to debug any errors or identify mistakes in the query itself. In addition, entering a long query causes the user interface to display a single set of query results. It can be difficult for the user, therefore, to understand how intermediate query results affect the final query results or how a dataset is being filtered as successive query commands are being applied.

Finally, given the amount of data ingested by a data intake and query system (e.g., gigabytes of data, terabytes of data, etc.) and the myriad of ways in which the data can be identified, searched, and processed, it can be difficult for a user to know where to begin. In addition, some users of a data intake and query system may be unfamiliar with the architecture of the data intake and query system or the query language used to query the data ingested therein. These obstacles can make it difficult for a user to obtain meaningful insights from the data.

Accordingly, described herein is a client browser that can render and display a workbook view that overcomes the technical shortcomings described above. The workbook view can allow a user to view a variety of information in a single window or tab. For example, the user can view a query, query results, an image corresponding to the query, text corresponding to the query, comments corresponding to the query, and/or the like within a single tab or window. Thus, the user may not have to toggle back and forth between tabs or windows or otherwise align tabs or windows to view relevant information concurrently. Because the related data of a project can be displayed in a single window or tab, the client browser can leverage caching techniques to load information and reduce a rendering delay experienced by users. The workbook view can also auto-save query results (e.g., as part of a panel) such that query results are "frozen"—the query results are not lost, but rather reproducible even if the query is a time-based query and a tab or window displaying the query results was previously closed. The workbook view also allows a user to break up a long query into smaller, related queries, displaying intermediate query results of the smaller queries to aid a user in debugging errors and understanding how different portions of the long query are affecting the final query results being produced. Finally, the workbook view can provide a user with suggested queries to run next, allowing the user to manipulate and further understand the ingested data without necessarily having to learn the query language or understand in great detail how the data intake and query system functions.

Figure 16:
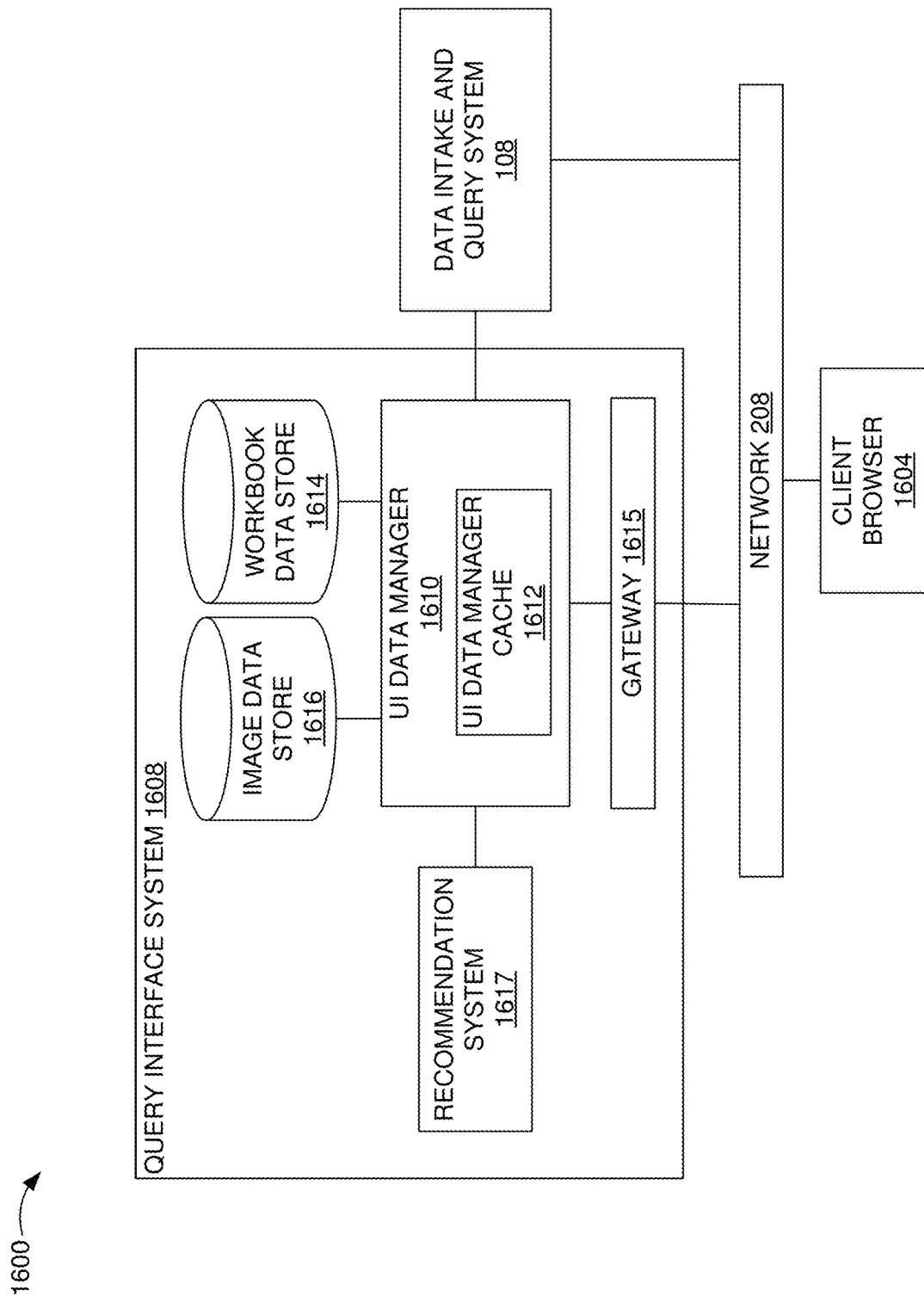
FIG. 16 is a block diagram of an embodiment of a workbook graphical user interface generation environment.

FIG. 16 is a block diagram of an embodiment of a workbook graphical user interface generation environment 1600. In the illustrated embodiment, the environment 1600 incudes the data intake and query system 108, a query interface system 1608, and a client browser 1604. The client browser 1604 may be a static client-side application running on one or more computing devices (e.g., client device 204), such as a mobile phone, tablet, laptop, desktop computer, workstation, etc., that communicates with the data intake and query system 108 and the query interface system 1608 via the network 208.

The client browser 1604 can render user interface data that causes the one or more computing devices running the client browser 1604 to display a GUI depicting a graphical representation of a workbook. A workbook is a data structure that provides a logical association of panels and enables a work environment in which one or more users can create and/or select one or more queries for execution by the query system 214. As a non-limiting example, a workbook can be created by a first user and optionally shared with one or more other users. The workbook can include one or more panels, where each panel is a data structure that provides a logical association between a query and one or more data artifacts, such as, but not limited to query results, graphical display objects, user interface elements, images, annotations, text, files, dashboards, comments, etc. Each panel can be associated with a specific query, and different panels in the same workbook can therefore be associated with different queries. As described in greater detail below, while different panels in the same workbook can be associated with different queries, the different queries can be independent queries or queries that are hierarchical in nature such that one query depends on the query results of another query. A user can optionally tag a workbook with one or more keywords such that workbooks having the same tag (e.g., same tagged keyword) can be associated with each other. Similarly, a user can add a title or other description to a workbook to aid in identifying a desired workbook in the future. A user may specify access levels to a workbook, making the workbook public, for example, or publicly accessible within that user's organization. Additionally, access to a workbook may be specified by user, role, or some other combination of features, such as password-protected workbooks. A workbook creator, or another with similar access, may specify different types of access for different users or roles—for example, a first user may have read-only access to the workbook, a second user may have read and write access to the workbook, a third user may be able to edit existing panels but not add new panels, and a fourth user may be able to add new panels but not edit existing panels.

Data of a workbook can include the workbook title and/or description, workbook tag(s), panel data, and/or an association with one or more panels. The panel data can include, for each panel of a workbook, a query, a query results identifier that references query results produced as a result of the query system 214 executing the associated query at a certain time (e.g., a job ID, an index key, or another type of identifier that is associated with a set of query results and that can be used to obtain the set of query results), an identifier of an added dashboard, a file, added text, comments, display objects, and/or any other data that is associated with the panel. The workbook data, and the associated panel data, can be stored in workbook data store 1614 of the query interface system 1608. Images associated with a panel can be stored in image data store 1616 of the query interface system 1608. Static data of a dashboard added to a panel (e.g., the height, width, and/or other parameters that define how a dashboard is to be visualized in a GUI) can be stored in the workbook data store 1614 and/or the metadata catalog 221. In some embodiments, any annotations to an image are also stored in the image data store 1616, either as a separate image or as metadata associated with the image that is annotated. In other embodiments, annotations to an image are stored in the workbook data store 1614.

As described herein, reference to displaying or depicting a panel (or displaying or depicting a graphical representation of a panel) can refer to displaying or depicting panel data, such as, a query of the panel, a user interface field depicting the query, and/or one or more data artifacts associated with the query, such as, but not limited to, query results produced as a result of the query, a query results identifier associated with the query results (e.g., a job ID, an index key, etc.), a dashboard, text, comments, images, files, and/or any other data associated with query or the panel. As a non-limiting example, displaying a panel can refer to displaying only the user interface field depicting the query. The user may be provided in the GUI with an option to view an expanded view of the panel, which, if selected, causes additional data to be displayed along with the user interface field (e.g., query results produced as a result of the query, a dashboard, text, comments, images, files, etc.). In addition, displaying a panel can refer to displaying one or more user interface elements associated with the panel that enable a user to enter a query, select a query, view query results, add and/or annotate images, add a dashboard, add text, add and/or remove comments, add a file, and/or the like. As described herein, reference to displaying or depicting a workbook (or displaying or depicting a graphical representation of a workbook) can refer to displaying or depicting workbook data, such as, but not limited to, a workbook title and/or description, workbook tag(s), user interface elements associated with the workbook, and/or displaying one or more graphical representations of panels of the workbook.

The query interface system 1608 can store workbook data, process data requests received from the client browser 1604, and communicate requested data to the client browser 1604. In the illustrated embodiment, the query interface system 1608 includes a UI data manager 1610, a gateway 1615, a workbook data store 1614, an image data store 1616, and a recommendation system 1617.

Each of the components of the query interface system 1608 can be implemented using one or more computing devices as distinct computing devices or as one or more container instances or virtual machines across one or more computing devices. For example, in some embodiments, the UI data manager 1610 and/or recommendation system 1617 can be implemented as distinct computing devices with separate hardware, memory, and processors. In certain embodiments, the UI data manager 1610 and recommendation system 1617 can be implemented on the same or across different computing devices as distinct container instances, with each container having access to a subset of the resources of a host computing device (e.g., a subset of the memory or processing time of the processors of the host computing device), but sharing a similar operating system. Similarly, in some embodiments, the workbook data store 1614, image data store 1616 can be implemented on separate and distinct data stores, logical partitions of the same data store, or in a shared resource environment. In some cases, the components can be implemented as distinct virtual machines across one or more computing devices, where each virtual machine can have its own unshared operating system but shares the underlying hardware with other virtual machines on the same host computing device.

The gateway 1615 can be similar to the gateway 215 of the data intake and query system 108. As a non-limiting example, the gateway 1615 can provide an interface between one or more components of the query interface system 1608 and other systems or computing devices, such as, but not limited to, the client browser 1604 and the data intake and query system 108 or the gateway 215 of the data intake and query system 108. In some embodiments, the gateway 1615 can be implemented using an API. In certain embodiments, the gateway 1615 can be implemented using a REST API.

The UI data manager 1610 can be a service that parses a request received from the client browser 1604 to identify the data source(s) from which to retrieve the requested data, and retrieves the requested data from the appropriate data source(s). The data source(s) from which the UI data manager 1610 retrieves the requested data may operate using different protocols, and thus the UI data manager 1610 can be configured to access the various data source(s) using the data source-specific protocols to retrieve the requested data. In some embodiments, some or all of the data to be displayed as part of a workbook is retrieved by the client browser 1604 via the UI data manager 1610. In an embodiment, the UI data manager 1610 implements a data query and manipulation language (e.g., GraphQL) to perform the functionality described herein.

As a non-limiting example, a user can open the client browser 1604. As a result of the user opening the client browser 1604, the client browser 1604 can request content resources from one or more content delivery networks (CDNs). If the user then selects an option in the client browser 1604 to view available workbooks, the client browser 1604 can communicate to the gateway 1615 a request for a list of available workbooks. In the context of this section, an available workbook is a workbook to which the user has access. In various implementations, access to a workbook may be at the tenant level, for example, only workbooks associated with a particular tenant to which the user has access may be retrieved. In other implementations, access to a workbook maybe based on one more properties of the user, such as the user's role, or an individual list of workbooks to which the user has access. In yet another implementation, both tenant-level access and user-level access may be applied to determine the list of available workbooks.

Upon determination of the list of available workbooks, the gateway 1615 can then forward the available workbook list request to the UI data manager 1610. The UI data manager 1610 can parse the available workbook list request and determine that the client browser 1604 is requesting names and/or descriptions of stored workbooks based on the parsing. As a result of determining that the client browser 1604 is requesting names and/or descriptions of stored workbooks, the UI data manager 1610 can access the workbook data store 1614, retrieve some or all of the workbook data corresponding to the stored workbooks (e.g., title, description, tags, etc.), and communicate the retrieved workbook data to the gateway 1615. The gateway 1615 can then communicate the retrieved workbook data to the client browser 1604. The client browser 1604 can process and render the workbook data, which causes a GUI to display names, descriptions, tags, etc. of some or all of the available workbooks.

A user can select, via the GUI, one of the workbooks for which workbook data is displayed. In response to a user selecting one workbook, the client browser 1604 can communicate a request to the gateway 1615 to open the selected workbook, which communicates the request to the UI data manager 1610. The request can include an identifier of the selected workbook which, in some embodiments, may have been previously transmitted to the client browser 1604, for example, when displaying a list of available workbooks as previously described. Thus, the UI data manager 1610 can access the workbook data store 1614 and retrieve workbook data corresponding to the identifier included in the request. As described above, the workbook data can include, for each panel included in the corresponding workbook, panel data. The panel data of a panel can include a query results identifier corresponding to query results produced as a result of a query associated with the panel (e.g., a job ID, an index key, etc.). The UI data manager 1610 can parse the request, determine which workbook is selected by identifying the selected workbook identifier, and retrieve the workbook data associated with the identifier from the workbook data store 1614. The UI data manager 1610 can identify the query results identifier(s) included in the workbook data and, for each query results identifier, communicate a request to the data intake and query system 108 for the query results associated with the respective query results identifier.

As will be described in more detail herein, one or more panels of the workbook may have panel data that includes a query results identifier corresponding to query results produced as a result of a query associated with the panel. In some implementations, these query results have been stored in the data intake and query system 108 and there is no need to run the query again. For example, the data intake and query system 108 can use the query results identifier(s) to retrieve the query results from the metadata catalog 221 and communicate the query results to the UI data manager 1610, directly or indirectly via the network 208 and the gateway 1615. As a non-limiting example, the data intake and query system 108 can use a job ID to retrieve query results from the metadata catalog 221. Once the query results are received, the UI data manager 1610 can communicate the query results to the client browser 1604 via the gateway 1615. UI data manager 1610 can use a similar process to retrieve and communicate to the client browser 1604 other data defining how the workbook is to be depicted and/or other data to be depicted with the GUI. The client browser 1604 can then render and display a graphical representation of the workbook in the GUI.

Alternatively, the UI data manager 1610 may not access the workbook data store 1614 and retrieve the workbook data upon receiving the request to open a particular workbook. Rather, the UI data manager 1610 can include a UI data manager cache 1612. When data is retrieved from the data intake and query system 108, the workbook data store 1614, and/or the image data store 1616, the UI data manager 1610 can temporarily store the retrieved data in the UI data manager cache 1612. Each time the client browser 1604 communicates a request for content to depict in the GUI, the UI data manager 1610 can first query the UI data manager cache 1612 to determine whether the requested content is present in the UI data manager cache 1612. If the requested content is not present in the UI data manager cache 1612, then the UI data manager 1610 can retrieve the requested content from the appropriate data source. Thus, the UI data manager 1610 may have previously retrieved and stored the workbook data of the workbook to be opened in the UI data manager cache 1612, such as when a request for a list of available workbooks was previously received.

As another alternative, the UI data manager 1610 may not need to access the workbook data store 1614 and retrieve the workbook data upon receiving the request to open a particular workbook, because the workbook data, or some portion of the workbook data, has been cached at the client browser 1604. In such implementations, client browser 1604 is a browser that supports browser-side caching of various assets and data, and may communicate to UI data manager 1610 that client browser 1604 already has the necessary resources. Similarly, assets that have previously been retrieved from workbook data store 1614 and image data store 1616 may be stored in the cache of client browser 1604. This may reduce the number of calls to both the data intake and query system 108 and the various data stores 1614, 1616 of query interface system 1608.

Use of the query results identifiers to retrieve query results therefore allows a user to open an existing workbook without requiring the query system 214 to re-run queries associated with the panel(s) of the opened workbook. Given that the time to run a query can range from minutes to hours, the workbook load time can be significantly reduced. In fact, some queries are time-based, such as a search for certain data ingested within the last N minutes. Re-running a time-based query at a later time may produce query results that are different than the query results originally produced when the time-based query was run for the first time. Because a query results identifier is associated with specific set of query results produced during a specific execution of a query, using the query results identifiers provides the ability to freeze query results for later viewing. In other words, the query results identifiers allow a client browser 1604 to open and display a graphical representation of a previously-closed workbook with query results as originally depicted, such as before the graphical representation of the workbook was closed. In some implementations, a workbook may have two panels, for example, a first panel and a second panel, associated with two different query results, for example, a first panel query results and a second panel query results. The first panel query results and the second panel query results may be independently time-based, that is, they may refer to different times, which may or may not overlap.

In some embodiments, the client browser 1604 communicates to the query interface system 1608 a request for an image associated with a panel of a workbook to be depicted in a portion of a user interface associated with the panel. The UI data manager 1610 can receive the request via the gateway 1615. The request can include a URL representing a storage location of the requested image in the image data store 1616. The UI data manager 1610 can resolve the URL to identify the storage location in the image data store 1616 and retrieve the image. In other implementations, the image data store 1616 may not be limited to images. Other types of data may be stored in the image data store 1616, and retrieved in a similar way. These other types of data include, but are not limited to, Portable Document File (PDF) files, sound files, e.g., WAV or MP3 files, video files, spreadsheets, text files that include code snippets, database files, or any other type of file that can be referenced or viewed in a panel implementation.

In some embodiments, the client browser 1604 can communicate a request for data directly to the data intake and query system 108 in place of or in addition to a request communicated to the query interface system 1608. As a non-limiting example, if the workbook data for a selected workbook had previously been communicated to the client browser 1604—such as in response to a request for a list of available or existing workbooks—a request to open a workbook communicated to the data intake and query system 108 can include the query results identifier(s) corresponding to query results associated with the panel(s) of the workbook that are to be depicted, and the data intake and query system 108 can use the query results identifier(s) to return the appropriate query results. The client browser 1604 may also communicate a request for other data to the query interface system 1608 so that remaining portions of the workbook can be displayed in a GUI. As another non-limiting example, the client browser 1604 can communicate a request for static data of a dashboard directly to the gateway 215 in embodiments in which the dashboard static data is stored in the metadata catalog 221.

As described above, the UI data manager 1610 can process requests communicated by the client browser 1604 when the client browser 1604 attempts to update a displayed GUI. Additional operations performed by the UI data manager 1610 to parse requests and retrieve the appropriate data, such as when a new panel is added to a workbook or when a query is entered, are described below with respect to FIGS. 17A through 21.

5.1. Workbook Features

In some embodiments, a user can attempt to run multiple queries. Conventional client browsers, however, do not allow a user to run multiple queries and view the query results in the same window. Rather, the user may be required to open a first tab or window to run a first query and view the first query results, to open a second tab or window to run a second query and view the second query results, and so on. If the user is attempting to run a large number of queries (e.g., 5 queries, 10 queries, 100 queries, etc.), it can be difficult for the user to work with the queries and understand the relationship between queries, if any, given that the queries are open in different tabs and/or windows and available screen space may limit the amount of tabs and/or windows that the user can view concurrently. The user, therefore, may spend an inordinate amount of time navigating back and forth between tabs and/or windows to compare queries, query results, and/or the like.

Figure 17A:
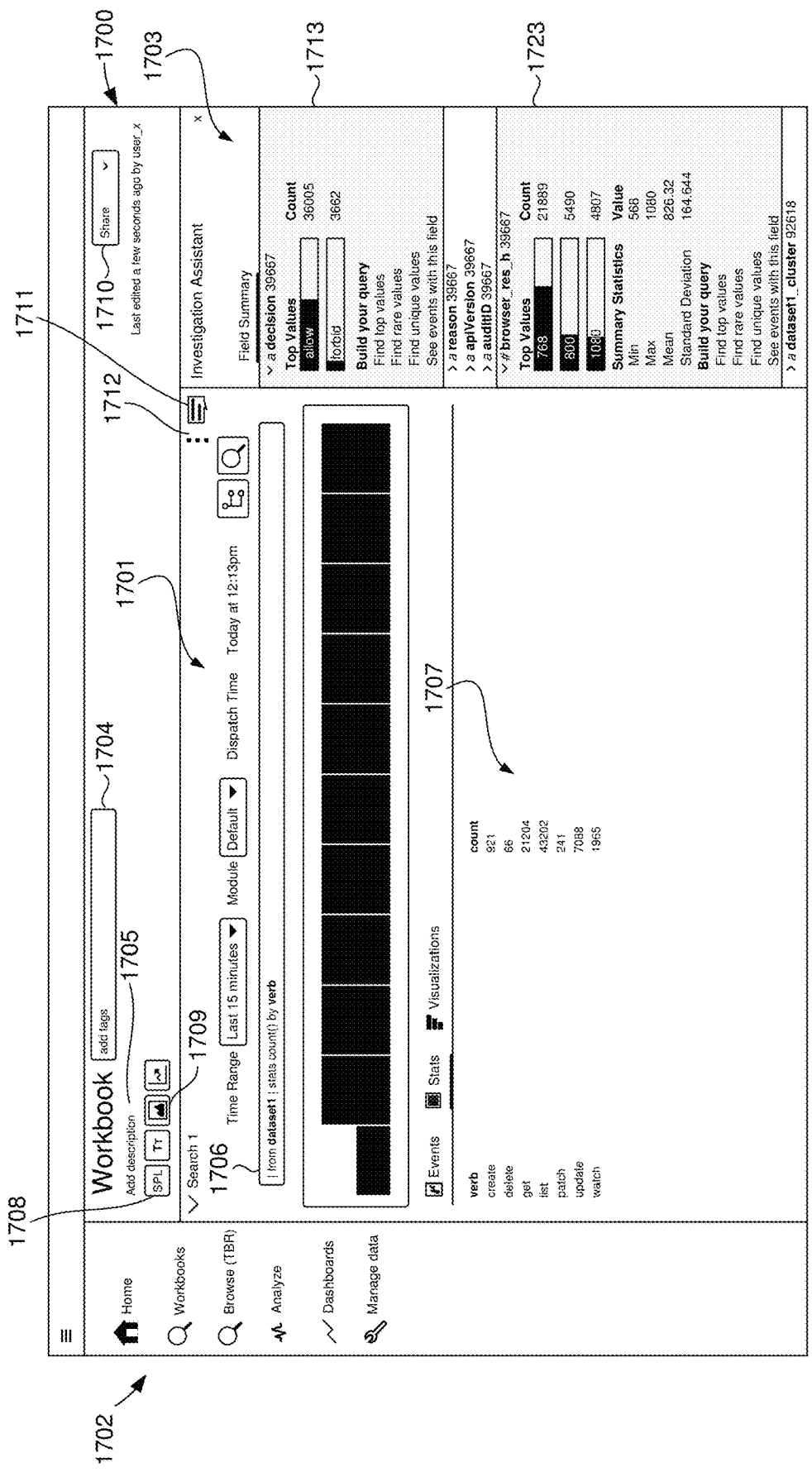
FIGS. 17A-17D, 18, 19, 20, and 21 are interface diagrams illustrating example embodiments of a workbook view.

Thus, the client browser 1604 described herein provides various visualizations to aid in performing a single query, a set of iterative queries, and/or multiple independent searches on data and viewing the query results within a single window. For example, FIG. 17A illustrates an example workbook view 1700 rendered and displayed by the client browser 1604 that comprises a panel view 1701, a menu 1702, and an investigation assistant view 1703. Within the workbook view 1700, a user can use the menu 1702 to search for one or more workbooks, to browse for data, analyze data and/or query results, view dashboards, manage data, etc.

Further, the workbook view 1700 depicts a workbook that can be tagged via text field 1704 and that can be titled or described via text field 1705. The workbook view 1700 can comprise one or more user interface elements, such as the panel view 1701. The panel view 1701 includes a text field 1706 in which a user can enter a query. A query can include one or more query parameters (e.g., a query command, such as "from," "stats," "lookup," etc. that instructs the data intake and query system 108 to perform an action when the query is parsed (e.g., extract information from a location, process a set of data in a certain manner, etc.), a function, an identified field, etc.). In the illustrated embodiment, the user has entered the query "from dataset1|stats count( ) by verb," which includes query commands (e.g., "from" and "stats"), a function (e.g., "count( )"), and a field (e.g., "verb"), and is a query for counts of the number of each verb present in the dataset1. When the user enters the query in the text field 1706, the client browser 1604 communicates the query as part of a request to the UI data manager 1610 via the gateway 1615. The UI data manager 1610 processes the request, identifying the query included in the request. Because the UI data manager 1610 determines that the request includes a query, the UI data manager 1610 communicates the query to the data intake and query system 108. As described above, the data intake and query system 108 can execute the query and generate query results that are stored in the metadata catalog 221 in association with a query results identifier (e.g., a job ID) that identifies the query and/or a specific time at which the query is executed. Further, the data intake and query system 108 communicates the query results to the UI data manager 1610. The UI data manager 1610 can communicate the query results to the client browser 1604 via the gateway 1615, optionally storing the query results in the UI data manager 1612 cache for a temporary time period. Once the query results are received, the client browser 1604 can process and render the corresponding data for display in an expanded area of the panel view that includes the query that produced the query results, where the original, unexpanded area of the panel view may include a depiction of the query. For example, the workbook view 1700 depicts the panel view 1701 with the query in the original, unexpanded area of the panel view 1701 (e.g., text field 1706). The workbook view 1700 further depicts an expanded area of the panel view 1701 (e.g., table 1707) that includes the query results produced using the query depicted in the text field 1706. In some implementations, the workbook view 1700 can initially display the original, unexpanded area of the panel view 1701, even if the query results have been obtained. Thus, the workbook view 1700 may initially display only the query in an editable text field 1706 and the query results may remain hidden. The user can then select an option to view the expanded area of the panel view 1701 such that the query results are visible. In other implementations, the workbook view 1700 can automatically display the expanded area of the panel view 1701 once the query results are obtained. Note that the text field 1706 is editable before and/or after the query in the text field 1706 has been executed at least once. In some embodiments, the client browser 1604 further renders and displays in the panel view 1701 a user-selectable time range associated with the query (e.g., "15 minutes"), a module or dataset association record on which the query is run (e.g., "default"), and/or a time at which the query is run (e.g., "12:13 pm"). The user-selectable time range may, in some implementations, be presented as a drop-down menu, with ranges that can be customized to a particular user, standardized for that tenant or system, or some combination thereof. In some implementations, the selectable time range may include "all time." It is noted that time range may also be specified in the text field 1706, and the time range render shown above the text field 1706 is merely for the user's convenience in bounding queries to a time range, without being required to type in the time range.

In some embodiments, the UI data manager 1610 generates one or more additional queries in response to receiving the query entered in the text field 1706 and/or in response to receiving a query selected by a user, such as a query selected in the investigation assistant view 1703 (described in greater detail below). As described herein, the data intake and query system 108 can extract one or more fields from raw data. Upon receiving a query entered or selected by a user, the UI data manager 1610 can generate an additional query or query parameter requesting the data intake and query system 108 to return additional information. For example, the additional query parameter may be a "fieldsummary" command or other command that causes the data intake and query system 108 to return, in addition to the query results, some or all of the fields that can be extracted from the raw data referenced in the received query. This query parameter can be included in or be associated with the query entered by the user and communicated to the data intake and query system 108. In response, the data intake and query system 108 identifies some or all of the known fields from the raw data referenced in the received query. As a non-limiting example, the data intake and query system 108 can parse the raw data and identify text or phrases that appear to be a field, through various field extraction techniques described elsewhere in this application. The data intake and query system 108 can use patterns learned from raw data in which one or more fields have been identified to identify fields present in the raw data referenced in the received query and/or use regular expression rules. In some implementations, those regular expression rules may be determined or retrieved from the metadata catalog 221 of the data intake and query system 108. As an illustrative example, the data intake and query system 108 may learn that a field is generally followed by an "=" character. Thus, the data intake and query system 108 can parse the raw data referenced in the received query for text followed by an "=" character, and extract such text as a possible field. As another illustrative example, the data intake and query system 108 may apply a regular expression configured to recognize IP addresses, such as "\b\d{1,3}\.\d{1,3}\.\d{1,3}\.\d{1,3}\b, which will recognize when machine data that resembles an IP address is found in the raw machine data. The data intake and query system 108 can then communicate to the UI data manager 1610 a list of extracted fields, including the type of each extracted field (e.g., text, number, etc.) and/or the number of times the respective extracted field appears in the raw data. The UI data manager 1610 can communicate the list of extracted fields to the client browser 1604 via the gateway 1615, which causes the client browser 1604 to render and display a list of the extracted fields, the type of each field (e.g., where the character "a" identifies a field as being text, the character "#" identifies a field as being a number, etc.), and/or the number of times each field appears in the raw data in the investigation assistant view 1703. In the illustrated embodiment, based on the UI data manager 1610 appending a query parameter to the query in 1706 to extract the fields from the data (non-limiting example: "|fieldsummary"), the data intake and query system 108 extracts the fields from the data and the investigation assistant view 1703 depicts the following fields, including the type and occurrence count: "decision," "reason," "apiVersion," "auditID," "browser_res_h," and "datasetl_cluster."

Further, the UI data manager 1610 can generate one or more queries for each extracted field. Such queries can be associated with suggestions to "find top values," "find rare values," and/or "find unique values" of the data. For extracted fields that are of a number type, the UI data manager 1610 can also generate a statistics query, such as a query for the minimum value of the number field, the maximum value of the number field, the mean value of the number field, the standard deviation value of the number field, etc. As a non-limiting example, the UI data manager 1610 can receive the list of extracted fields from the data intake and query system 108. Prior to, during, or after communicating the list of extracted fields to the client browser 1604, the UI data manager 1610 can, for some or all of the extracted fields, generate one or more queries based on a selected suggestion and communicate such query(ies) to the data intake and query system 108 for execution. In response, the data intake and query system 108 can execute the query(ies) and provide the query results to the UI data manager 1610, which then communicates the query results to the client browser 1604 via the gateway 1615. Receipt of the query results causes the client browser 1604 to render the query results such that the query results of an extracted field can be displayed in the investigation assistant view 1703 automatically or once the extracted field is selected.

The queries generated for a particular extracted field can be independent queries and/or dependent queries. For example, the UI data manager 1610 can generate a first query and a second query for a particular extracted field, where the two queries are independent of each other (e.g., the query results of one query do not affect the query results of another query). As another example, the UI data manager 1610 can generate two or more related queries (e.g., a parent query and a child query; a parent query and two child queries; a parent query, a child query, and a grandchild query; etc.) for a particular extracted field, where the query results of one related query are used in determining the query results of another related query.

It will be understood that additional information other than field information can be extracted from the data and used to populate the investigation assistant. For example, the UI data manager 1610 can generate one or more query parameters to identify tokens in the data or determine statistical information about the data, such as general timing information, etc.

In the illustrated embodiment, fields "decision" and "browser_res_h" are both selected. Here, the UI data manager 1610 causes client browser 1604 to render and display additional information for the "decision" and "browser_res_h," which may be the result of the query parameter referenced above or the result of additional query parameters. For example, one query parameter (non-limiting example: "fieldsummary") may return a list of fields identified from the data and one or more statistics about those fields, whereas additional query parameters may return additional information about specific fields, (non-limiting example: "top field_name"). In the illustrated embodiment, the UI data manager 1610 generated an additional query associated with "find top value" for the "decision" field (non-limiting example: "|top decision") and for the "browser_res_h" field (non-limiting example: "|top browser_res_h"). In addition, the UI data manager 1610 causes client browser 1604 to display statistical information about the "browser_res_h" field based on information from obtained from the initial query parameter (non-limiting example: "fieldsummary") or based on additional query parameters (non-limiting example: "|stats min(browser_res_h), max(browser_res_h), avg(browser_res_h), stdev(browser_res_h)"). In some cases, the statistics can be generated for the "browser_res_h" field because the "browser_res_h" field is a number type of field. Thus, expanded view 1713 of the "decision" field depicts query results associated with the "find top value" suggestion and expanded view 1723 of the "browser_res_h" field depicts query results of the "find top value" suggestion and additional statistics. The other fields listed in the investigation assistant view 1703, however, are unselected. Thus, while the UI data manager 1610 may have received query results for some or all of these unselected fields, the query results remain hidden, at least until a user selects one of the unselected fields. In other implementations, the query results may default to expanded (unhidden) after a query is run. In some implementations, it may depend on the type of query that is run, the type of results that are returned, the preferences of the user, the preferences of a role to which the user belongs, or some combination thereof.

The one or more additional queries generated by the UI data manager 1610 in response to receiving a query entered or selected by a user can be generated automatically without any user interaction. For example, receipt of a user-entered or user-selected query can trigger the UI data manager 1610 to generate additional query parameters, such as a query parameter to request a list of fields present in the data referenced by the user-entered or user-selected query and to generate one or more additional queries for some or all of the fields that are present. However, in some embodiments, the additional queries are not entered or selected by a user, nor are the additional queries generated in response to a request from the user. Rather, in certain embodiments, generation of the query and submission of the query to the data intake and query system 108 is hidden to the user, at least until the user selects a field listed in the investigation assistant view 1703.

Further, the investigation assistant view 1703 can include suggestions that, when selected, cause the client browser 1604 to communicate a query corresponding to the suggestion to the query interface system 1608. As a non-limiting example, one or more suggestions (and corresponding queries) can be associated with a field listed in the investigation assistant view 1703, and the suggestion(s) associated with a field may not be displayed in the investigation window 1703 until the field is selected. In the illustrated embodiment, the fields "decision" and "browser_res_h" are selected, and therefore suggestions associated with each field are displayed in the investigation assistant view 1703. In particular, the expanded view 1713 and the expanded view 1723 both depict the suggestions "find top values," "find rare values," and "find unique values." As described in greater detail below, selection of any one of the suggestions can cause the client browser 1604 to communicate a query corresponding to the suggestion to the query interface system 1608, receive query results of the query, and render and display the query results in the workbook view 1700, such as in a new panel view (associated with a different panel) separate from the panel view 1701. The expanded views 1713 and 1723 can further include a selectable option to view events within the respective field. Selection of this option can cause the workbook view 1700 to display the corresponding events. For example, selecting the suggestion "find top values" in the expanded view 213 may result in the query parameters "|top limit=20 decision" being added to the query 1706 and the results being displayed and/or the generation of a new panel with the query parameters "|top limit=20 decision" shown in a field associated with the second panel. As another example, selecting the suggestion "find rare values" in the expanded view 223 may result in the query parameters "|rare browser_res_h limit=20" being added to the query 1706 and the results being displayed and/or the generation of a new panel with the query parameters|rare browser_res_h limit=20" shown in a field associated with the second panel. The pipe character "|" included in a query separates consecutive query commands. The pipe character, when a query is parsed, instructs the data intake and query system 108 that one or more characters following the pipe character form a query command In some embodiments, the character, when a query is parsed, instructs the data intake and query system 108 to use the output or result of a query command preceding the pipe character as an input to a query command that follows the pipe character. In some embodiments, the expanded views 1713 and/or 1723 can depict other characteristics of the dataset referenced by the associated query, such as keywords associated with one or more fields present in the dataset or keywords that are otherwise included in the dataset.

As described herein, the UI data manager 1610 can generate two or more related queries for a particular extracted field. Some or all of the related queries can be displayed in the investigation assistant view 1703 as suggested queries for the user to run. If the user selects a child query (or grandchild query, great-grandchild query, etc.), the client browser 1604 can communicate the selected query and some or all of the ancestral queries (e.g., the parent query, the grandparent query, etc.) to the query interface system 1608, receive query results for each of the communicated queries, and render and display the query results in the workbook view 1700. In some embodiments, the workbook view 1700 can display some or all of the query results in a single new panel view separate from the panel view 1701. In other embodiments, the workbook view 1700 can display some or all of the query results in multiple new panel views that are each separate from the panel view 1701, where each new panel view displays the query results of the selected query, of one of the ancestral queries, or of a combination of the selected query and/or one or more ancestral queries. The panel views can be ordered in the workbook view 1701 such that the parent query results are depicted first, the child query results are depicted second, the grandchild query results are depicted third, and so on. Thus, selection of one of the suggestions displayed in the investigation assistant view 1703 can result in the generation of multiple panels associated with a workbook and the display of multiple panel views within a single workbook view.

In certain embodiments, an investigation assistant view is associated with a particular panel and/or panel view. The investigation assistant view may or may not overlap the panel view of the associated panel. In the illustrated embodiment, the investigation assistant view 1703 is associated with the panel and the panel view 1701. If the workbook includes a second panel, the second panel and corresponding panel view may be associated with another investigation assistant view different than the investigation assistant view 1703. Thus, if the panel associated with the panel view 1701 is selected, the workbook view 1700 may display the investigation assistant view 1703. If another panel is selected (not shown), the workbook view 1700 may not display the investigation assistant view 1703. Rather, the workbook view 1700 may display the investigation assistant view associated with the selected panel and panel view.

In some embodiments, the workbook view 1700 allows a user to add a new panel to the workbook (e.g., via button 1708), to add text to an existing panel and/or to a new panel (e.g., in a text box displayed in a panel view, adjacent to a panel view, or otherwise in the workbook view 1700, where the text box can be displayed separate from or inside a comment text box), to add image an image to an existing panel and/or to a new panel (e.g., via button 1709), and to add a dashboard to, or generate a dashboard from, an existing panel and/or to a new panel.

The workbook view 1700 may also allow a user to clone or duplicate an existing panel (e.g., via button 1708 or another button not shown). The user can clone or duplicate an existing panel to the same workbook or to a different workbook. In some embodiments, if a user selects an option to clone or duplicate an existing panel to another workbook, the client browser 1604 can communicate the panel data corresponding to the panel to be cloned to the UI data manager 1610 via the gateway 1615. The UI data manager 1610 can then add the panel data to the workbook data corresponding to the workbook to which the panel is to be cloned or duplicated for storage in the workbook data store 1614. Alternatively, the UI data manager 1610 can store the panel data in the workbook data store 1614 in association with the workbook data corresponding to the workbook to which the panel is to be cloned or duplicated. If a user selects an option to clone or duplicate an existing panel to the same workbook, the client browser 1604 can communicate the selection of this option to the UI data manager 1610 via the gateway 1615. The UI data manager 1610 can then modify the workbook data of the workbook stored in the workbook data store 1614 to include a duplicate copy of the panel data corresponding to the cloned or duplicated panel. Alternatively, the UI data manager 1610 can obtain the panel data from the client browser 1604, modify the panel data to indicate that the panel data corresponds to a cloned or duplicated version of the corresponding panel, and modify the workbook data stored in the workbook data store 1614 to include the modified panel data or associate the modified panel data with the workbook data stored in the workbook data store 1614. In some embodiments, such as the request of a user or automatically if the amount of time elapsed since a query corresponding to the cloned panel was last run exceeds a threshold, the client browser 1604 can request execution of the query associated with the cloned or duplicated panel such that the cloned or duplicated panel is associated with a more-recent execution of the query than the panel that was cloned (and the panel view corresponding to the cloned or duplicated panel can then display updated query results). In some embodiments, if the user requests that a panel associated with a child query be cloned, some or all of the panels associated with ancestral queries may also be cloned and/or some or all of the panels associated with descendant queries may also be cloned. In other embodiments, only the panel selected by the user to be cloned is cloned.

The workbook view 1700 can further allow a user to share the workbook or one or more panels within a workbook with one or more other users via share button 1710. As a non-limiting example, selection of the share button 1710 can cause the workbook view 1700 to display a window prompting the user to identify whether the entire workbook is to be shared or whether individual panels are to be shared and, if panels are to be shared, which panels are to be shared. The window can further prompt the user to identify which other user(s) are to be granted access to the workbook or panel(s) and/or the permissions of each user granted access (e.g., read-only, write-only, read and write, etc.). User(s) with which a workbook is to be shared can receive an invitation sent by the user via selection of the share button 1710, where acceptance of the invitation causes the user(s) to be granted access to the workbook. Users that share a workbook or panel can access the workbook view or panel view according to the granted permissions individually and concurrently. As a non-limiting example, a first user can have permission to access and edit a first query, such as the query depicted in text field 1706. A second user can be granted permission to read the first query and edit a second query, but may not be granted permission to edit the first query. Both users can access and view the panel view that depicts the first query individually or concurrently. However, only the first user may be allowed to edit the first query. Any updates to a workbook or panel (e.g., updates to the workbook data or panel data) made by one user may be saved in the workbook data store 1614 (as described in greater detail below) and cause the client browsers 1604 of other users that have access to the workbook or panel to render and display the updates. For example, the client browser 1604 of one user can communicate to the UI data manager 1610 via the gateway 1615 that a workbook or panel has been changed and provide information detailing the change. The UI data manager 1610 can store the change in the workbook data store 1614 in association with the workbook or panel. The UI data manager 1610 can also communicate to other client browsers 1604 of other users that have access to the workbook or panel via the gateway 1615 the information detailing the change. The client browsers 1604 can then render and display the change using the information provided by the UI data manager 1610. In other implementations, the first user (or another user) may "lock" the panel, indicating that the panel cannot be modified until it is unlocked. This may be done when the first user wants to prevent modification of the query associated with that panel. The panel may be locked by interacting with the user interface in workbook view 1700, such as part of a dropdown menu 1712 or an additional button next to buttons 1708 and 1709 (button not shown).

The query interface system 1608 can further store audit trail data that details which user was the last to modify a workbook or panel, which user modified a workbook or panel, when the modification occurred, what was modified, and/or the like. As a non-limiting example, the client browser 1604 of one user can communicate to the UI data manager 1610 via the gateway 1615 that a workbook or panel has been changed and provide audit trail data detailing the change. The audit trail data can include not only what in the workbook or panel was modified, but the user that made the modification, and the time that the modification occurred. The UI data manager 1610 can store the audit trail data in the workbook data store 1614 in association with the workbook or panel or in a separate data store, such as in an audit trail data store (not shown) included in the query interface system 1608. Each time a workbook or panel is opened, or upon user request, the UI data manager 1610 can retrieve the audit trail data and communicate the audit trail data to the client browser 1604 via the gateway 1615 so that the audit trail data can be rendered and optionally displayed.

In some embodiments, the workbook view 1700 allows a user to add a comment in association with a panel and/or panel view. As a non-limiting example, a user can select comment button 1711 to add a comment in association with the panel associated with the panel view 1701. Selection of the comment button 1711 can cause the workbook view 1700 to display a window adjacent to or partially overlapping the panel view 1701 that includes a text field allowing the user to enter a comment. The user can later reply to the comment, mark the comment as being resolved (e.g., if the comment identifies an issue), delete the comment, and/or the like, which causes modification to the displayed comment. If the panel associated with the panel view 1701 is shared with one or more other users, the other user(s) that have access to the panel associated with the panel view 1701 may be able to view the comment. The other user(s) can then reply to the comment, mark the comment as being resolved (e.g., if the comment identifies an issue), delete the comment, and/or the like, which causes modification to the displayed comment. The other user(s) can optionally use the same client device or a different client device than the user that added the comment to reply to the comment, mark the comment as being resolved, delete the comment, and/or the like.

Figure 17B:
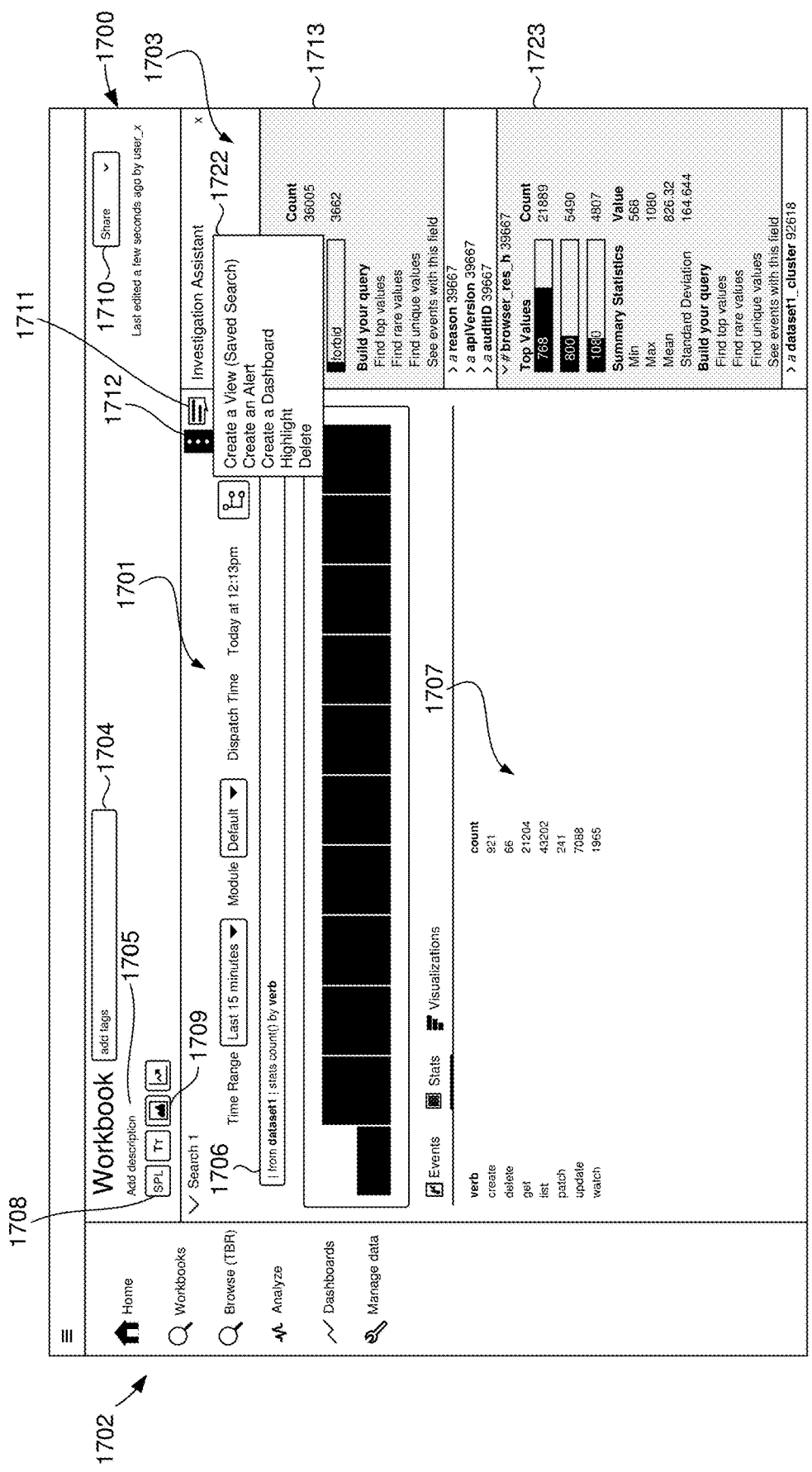

The workbook view 1700 also includes a panel button associated with each panel and/or panel view that, when selected, allows a user to create a view (e.g., a saved search or query) associated with the respective panel, to create an alert associated with the respective panel, to create a dashboard associated with the respective panel, to highlight the respective panel, and to delete the respective panel. In the illustrated embodiment, the workbook view 1700 includes a panel button 1712 associated with the panel corresponding to the panel view 1701. When selected, the workbook view 1700 can display a new window that allows the user to perform one of the above-listed actions. For example, FIG. 17B illustrates the workbook view 1700 in which the button 1712 is selected. As a result, window 1722 appears, providing a list of selectable menu items corresponding to the above-listed actions.

Figure 17C:
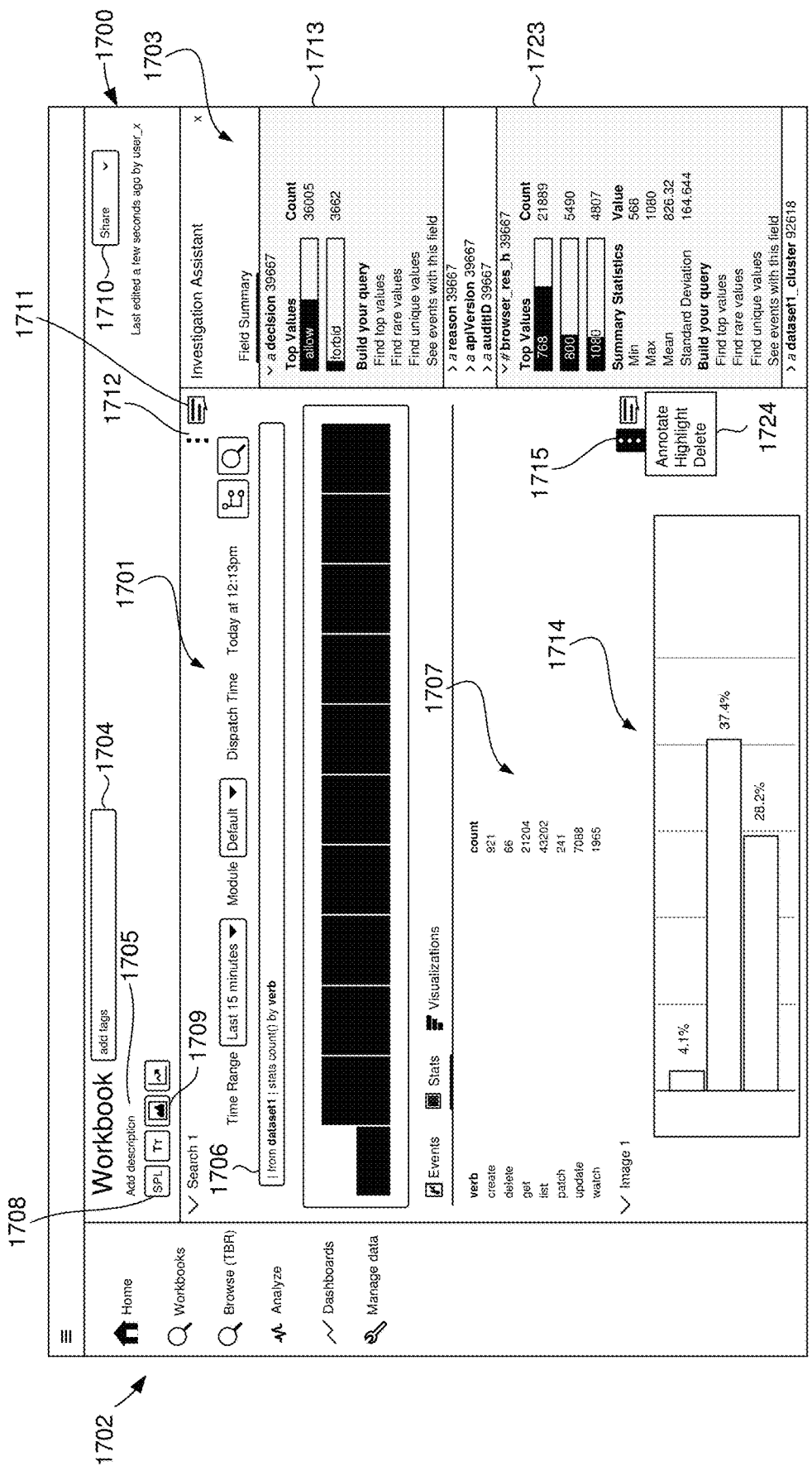

As described above, the workbook view 1700 allows a user to add an image via the selection of button 1709. For example, FIG. 17C illustrates the workbook view 1700 in which the button 1709 is selected and an image 1714 is added to the workbook view and/or panel view (and/or the image 1714 is logically associated with the corresponding panel). In some embodiments, the image 1714 is associated with and included within the panel view 1701 (and/or logically associated with the panel associated with the panel view 1701). In other embodiments, the image 1714 is separate from the panel view 1701 (and/or is not logically associated with the panel associated with the panel view 1701).

The workbook view 1700 allows a user to annotate, highlight, or delete an image included in the workbook and/or panel via button 1715. In the illustrated embodiment, the button 1715 is selected, causing the workbook view 1700 to depict a window 1724 providing the user with the option to annotate the image 1714, highlight the image 1714, or delete the image 1714. In another implementation, the highlight feature may cause the entirety of panel view 1701 to be highlighted. This may be useful in complex workbooks which may have twenty or more panels, and the creator of the workbook wishes to allow future users of the workbook to know which panels are more important, or which ones contain critical information, and the like.

Selection of the option to annotate the image 1714 can allow a user to modify the image 1714, with the client browser 1604 communicating the modification (e.g., the modified image 1714) to the UI data manager 1610 via the gateway 1615 such that the UI data manager 1610 can store the modification in the image data store 1616. Thus, the modification to the image 1714 can be available to other client browsers 1604. Further, if the workbook depicted in the workbook view 1700 is closed and re-opened, the UI data manager 1610 can retrieve the modification from the image data store 1616 and communicate the modification to the client browser 1604 via the gateway 1615 such that the client browser 1604 can render and display the modified image 1714. Accordingly, a user may not have to remodify an image depicted in a workbook each time the workbook is closed and re-opened. Depending on the implementation, the modification to the image may be stored as part of the image itself, such that the modified image takes the place of the original image, or separately from the original image, such that the original image is retained, and the modification is retained separately and applied to the original image.

Figure 17D:
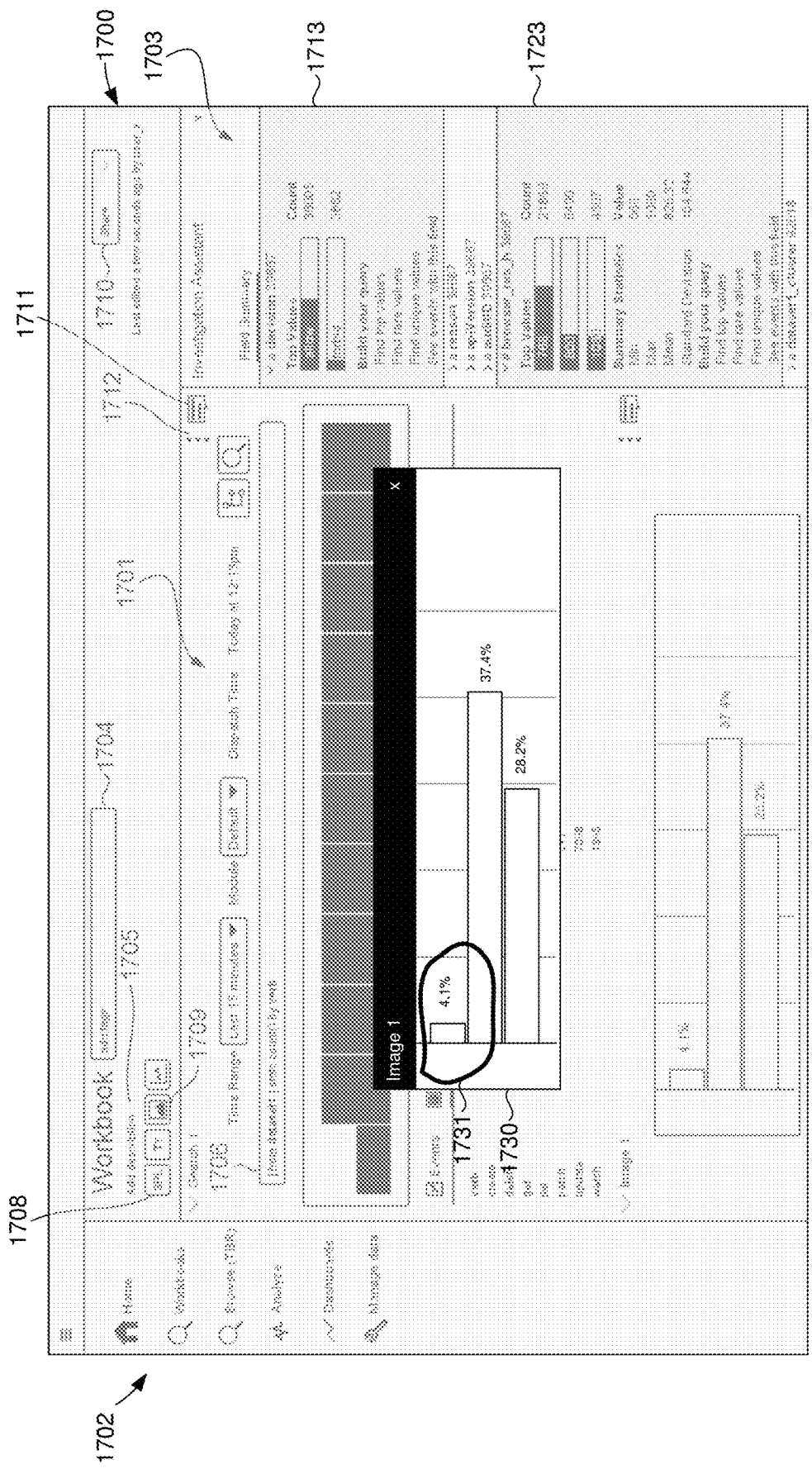

For example, FIG. 17D illustrates the workbook view 1700 in which the option to annotate the image 1714 has been selected. As a result, the workbook is greyed out and the image 1714 is depicted in a new window 1730. The user is able to draw, highlight, or otherwise annotate the image 1714 in the window 1730. In the illustrated embodiment, the user has drawn a shape 1731 over a portion of the image 1714. Once the user is finished annotating the image 1714, the user can close the window 1730, which causes the image 1714 originally depicted in the workbook view 1700 to be replaced with the annotated image. In addition, closing the window 1730 can cause the client browser 1604 to transmit the modified or annotated image to the UI data manager 1610 via the gateway 1615 for storage in the image data store 1616.

5.2. Viewing Multiple, Unrelated Queries

In some embodiments, a user can attempt to run multiple, unrelated queries. Conventional client browsers, however, do not allow a user to run multiple queries and view the query results in the same window. Rather, the user may be required to open a first tab to run a first query and view the first query results, to open a second tab to run a second query and view the second query results, and so on. By separating queries into different tabs, conventional client browsers make it difficult for users to view multiple query results simultaneously. In particular, a user may have to take additional navigational steps to view multiple query results (e.g., click on a first tab to see the first query results, click on a second tab to see the second query results, etc.).

Accordingly, the client browser 1604 can be configured to generate a workbook view 1800 in which multiple queries can be entered in and multiple query results can be viewed on the same page. By displaying multiple queries and multiple query results on the same page, the client browser 1604 can reduce the number of navigational steps performed by a user to view desired data, thereby providing an improved user interface. For example, FIG. 18 illustrates the workbook view 1800 rendered and displayed by the client browser 1604 depicting a workbook that includes two panels, where a first panel is associated with the panel view 1701 and a second panel is associated with panel view 1801. As depicted in the text field 1706, the panel associated with the panel view 1701 is also associated with a query that references the dataset1. Text field 1806, however, includes a query that references the dataset2 and that is associated with the panel associated with the panel view 1801. While the two queries are unrelated given that each query references a different dataset, the panels corresponding to the panel views 1701 and 1801 may each be associated with the workbook depicted in the workbook view 1800.

In some embodiments, the user can add a panel within the panel view 1801 by selecting the button 1708. As a non-limiting example, selection of the button 1708 can cause the client browser 1604 to render and display the panel view 1801 below the panel view 1701. Once a user enters a query in the text field 1806, the client browser 1604 can communicate to the UI data manager 1610 via the gateway 1615 a request to execute the query entered into the text field 1806 and associated with panel view 1801, and the UI data manager 1610 can proceed as described herein. As another non-limiting example, selection of the button 1708 can cause the client browser 1604 to render and display a window prompting a user to enter a query. Once entered, the client browser 1604 can communicate the query to the UI data manager 1610 via the gateway 1615. The UI data manager 1610 can return the query results to the client browser 1604 via the gateway 1615 in response, and the client browser 1604 can then render and display the panel view 1801 as depicted in FIG. 18.

Further, the UI data manager 1610 can communicate to the data intake and query system 108 the query entered in the text field 1706 and the query entered in the text field 1806 at the same or different times. The data intake and query system 108, however, can execute the queries in sequence (e.g., in an order received), concurrently, or partially concurrently. As a non-limiting example, the data intake and query system 108 can execute each query in the same processing thread (e.g., if executing the queries in sequence) or in different processing threads (e.g., if executing the queries concurrently or partially concurrently).

In some embodiments, the same user adds the panel view 1701 and the panel view 1801 and/or enters the query associated with the panel corresponding to panel view 1701 and the query associated with the panel corresponding to panel view 1801. The user can use the same client device 204 or different client devices 204 to make the addition and/or to enter the queries. In other embodiments, a first user adds the panel view 1701 and/or enters the query associated with the panel corresponding to panel view 1701, and a second user adds the panel view 1801 and/or enters the query associated with the panel corresponding to panel view 1801. The first and second users can use the same client device 204 or different client devices 204 to make the addition and/or to enter the queries. The first and second users can view a workbook view and/or a panel view at different times or concurrently regardless of whether the first and second users are using the same client device 204 or different client devices 204.

While the default operation may be to add a panel and display its corresponding panel view 1801 below the panel view 1701 in the workbook view 1800 given that the panel associated with panel view 1701 existed first, the user may be able to reorder the panel views 1701 and 1801. As a non-limiting example, the user can select a panel reorder option and drag the panel view 1801 above the panel view 1701 such that the panel view 1801 appears in the workbook view 1800 first. Reordering the panel views 1701 and 1801 may not cause the client browser 1604 to submit a new request to execute either query associated with the panel views 1701 and 1801 given that the two queries are unrelated (e.g., execution of one query does not rely on the query results of another query) and therefore the order in which the panel views 1701 and 1801 are displayed does not affect the query results of either query.

As described above, the client browser 1604 can render and display an investigation assistant view automatically in response to a user entering or selecting a query. Thus, after the user selects the button 1708 to add a panel and provides a query or after the user adds a query to the text field 1806, the UI data manager 1610 can create a query parameter to extract some or all of the fields present in the dataset2, generate one or more additional queries for some or all of the extracted fields, generate other query parameters to determine other characteristics of the data, and provide the corresponding query results to the client browser 1604 via the gateway 1615. In the illustrated embodiment, the investigation assistant view 1703 is depicted in the workbook view 1800 because the panel associated with the panel view 1701 is selected. However, if the panel associated with panel view 1801 is selected, the workbook view 1800 may be updated to display a different investigation assistant view that is associated with the panel view 1801 and that includes some or all of the query results provided by the UI data manager 1610 in response to the panel associated with panel view 1801 being added and/or a query being entered or selected. In other implementations, the investigation assistant view 1703 associated with the panel view 1701 and the investigation assistant view associated with the panel view 1801 may be displayed simultaneously, and may partially or completely overlap. In still other implementations, the investigation assistant may be visually decoupled from the panel to which it is associated, and may be displayed in a different window or may be moved about the workbook view 1800 independently of panel view 1701 or panel view 1801.

In some embodiments, the query entered in the text field 1706 is executed less frequently than the query entered in the text field 1806, or vice-versa. As a non-limiting example, the query entered in the text field 1706 (or the query entered in the text field 1806) can be scheduled to run less often than the query entered in the text field 1806 (or the query entered in the text field 1706). In other embodiments, the query entered in the text field 1706 is executed at the same frequency as the query entered in the text field 1806.

5.3. Viewing Multiple, Related Queries

In some cases, a user can enter a long query (e.g., tens of lines long). While the long query enables a user to view a more-refined set of query results, entering a long query can make it difficult for a user to debug any errors or identify mistakes in the query itself. In addition, entering a long query causes the user interface to display a single set of query results. It can be difficult for the user, therefore, to understand how intermediate query results affect the final query results or how a dataset is being filtered as successive query commands are being applied.

Thus, not only can the client browser 1604 generate a workbook view in which multiple, unrelated queries can be entered in and multiple, unrelated query results can be viewed on the same page, but also the client browser 1604 can generate a workbook view 1900 in which multiple, related queries can be entered in to various panels and multiple, related query results can be viewed on the same page. As a non-limiting example, rather than displaying a single panel with a long query, the workbook view generated by the client browser 1604 can display multiple panels, with each panel being associated with a smaller query (where the smaller queries, when aggregated, are equivalent to the longer query). The queries associated with the panels may be related such that query results of a first panel are used by the query of a second panel to produce second query results, the second query results of the second panel are used by the query of a third panel to produce third query results, and so on. In this way, the client browser 1604 can improve user debugging and user understanding of the longer query by allowing the user to view intermediate query results (e.g., query results generated by different portions of a longer query) rather than one final query result. By displaying multiple queries and multiple query results on the same page, the client browser 1604 can reduce the number of navigational steps performed by a user to view desired data, thereby providing an improved user interface. In addition, the complexity of each query can be reduced, which can reduce the number of errors in the queries and reduce the amount of processing done by the data intake and query system 108 as fewer queries will be executed.

Figure 19:
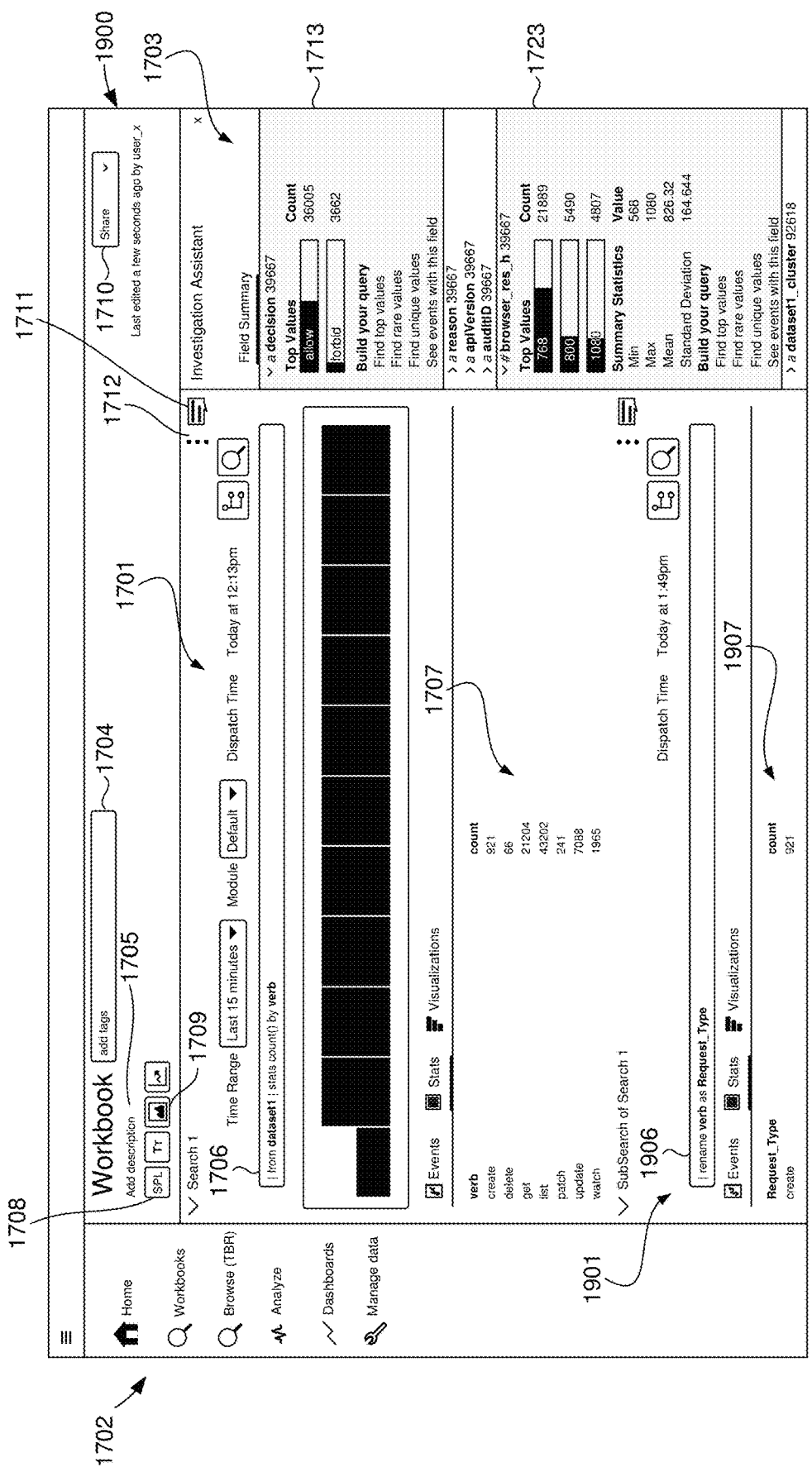

For example, FIG. 19 illustrates the workbook view 1900 rendered and displayed by the client browser 1604 depicting a workbook that includes two panels corresponding to the panel view 1701 and the panel view 1901. The panel view 1701 is associated with a base or parent query (e.g., "|from dataset1|stats count( ) by verb") entered in the text field 1706, and the panel view 1901 is associated with an additional or child query (e.g., "|rename verb as Request_Type") entered in text field 1906. The query entered in the text field 1906 is considered a child query of the query entered in the text field 1706 because the query entered in the text field 1906 is a query that is applied to the query results (as shown in table 1707) generated as a result of executing the query entered in the text field 1706. In other words, the query entered in the text field 1906 is not executed until the query results generated from executing the query entered in the text field 1706 are available. Thus, the query entered in the text field 1906 is, in some implementations, dependent on the query entered in the text field 1706. The query entered in the text field 1906 may, in some implementations, not directly reference any dataset. Rather, as described herein, a query results identifier can be appended to the front of the query entered in the text field 1906 (or any other child query), where the query results identifier references query results generated from a dataset. In some embodiments, the query results generated as a result of executing the query entered in the text field 1706 include at least a portion of the dataset referenced by the query entered in the text field 1706 (e.g., "dataset1").

In further embodiments, an additional query can be entered into a text field associated with a third panel that is dependent on the query results generated as a result of executing the query entered in the text field 1906. Thus, the query associated with this third panel may be a grandchild query of the query entered in the text field 1706. The workbook can further include a panel associated with a query that is a great-grandchild of the query entered in the text field 1706, a panel associated with a query that is a great great-grandchild of the query entered in the text field 1706, and so on. A workbook can include any number of parent queries, child queries, grandchild queries, great-grandchild queries, and/or other descendant queries.

In some embodiments, the workbook view 1900 indicates when the query associated with a panel is related or dependent on the query associated with another panel. In the illustrated embodiment, the first panel and/or its panel view 1701 is titled "Search 1" and the second panel and/or its panel view 1901 is titled "SubSearch of Search 1" to indicate the relationship between the two panels associated with panel views 1701 and 1901. In an implementation, related panels that are created may default to a name that indicates their relation, e.g., "SubSearch of [Panel Name]."

To add the second panel and its panel view 1901, a user can select the button 1708. Upon selecting the button 1708, the user may be prompted to indicate whether a query associated with the new panel will be a child query of any other query existing in the workbook or whether the query to be entered and associated with the new panel will be independent of other queries existing in the workbook. If the user indicates that the query associated with the new panel will be a child query of another query existing in the workbook, the user may be prompted to identify the parent query. Once the parent query is identified and the child query is entered or selected (and the user optionally selects a query command button), the client browser 1604 can request query results for the child query and render and display the panel view 1901. As a non-limiting example, the client browser 1604 can request query results for the child query by prepending, to the child query, a query command (e.g., "from") and/or the parent query or the query results identifier (e.g., job ID) of the parent query to form a modified child query. In the illustrated embodiment, the client browser 1604 can prepend to "|rename verb as Request_Type" the query command "from" and the query results identifier (e.g., job ID) of the parent query "|from dataset1|stats count( ) by verb." The client browser 1604 can then communicate the modified child query to the UI data manager 1610 via the gateway 1615. The workbook view 1900 may include a visual indication (not depicted for clarity purposes) that panel 1701 and 1901 are linked, such as a colored line running from the name "Search 1" to the name "SubSearch of Search 1." In an implementation, the colored line may be a thin line running along the left side of workbook view 1900.

The UI data manager 1610 can communicate the modified child query to the data intake and query system 108 for execution. Instead of referencing the dataset identified by the parent query, the modified child query references a filtered or processed dataset (e.g., the query results referenced by the job ID). Thus, the data intake and query system 108 can execute the portion of the modified child query following the job ID (or other query results identifier) (e.g., the original child query) on the query results referenced by the job ID (or other query results identifier) to form the child query results. The data intake and query system 108 can communicate the child query results to the UI data manager 1610, and the UI data manager 1610 can communicate the child query results to the client browser 1604 via the gateway 1615. Once received, the client browser 1604 can render and display the child query results within the panel view 1901, such as in table 1907.

Alternatively, the UI data manager 1610 can perform the prepend operation in place of the client browser 1604. As a non-limiting example, the client browser 1604 can communicate the child query and an indication of the parent query to the UI data manager 1610 via the gateway 1615. The UI data manager 1610 can then identify the query results identifier (e.g., job ID) corresponding to the query results generated as a result of the parent query being executed at the time indicated in the panel view 1701 and perform the prepend operation described above.

In some embodiments, the same user adds the panel view 1701 and the panel view 1901 and/or enters the query associated with the panel corresponding to panel view 1701 and the query associated with the panel corresponding to panel view 1901. The user can use the same client device 204 or different client devices 204 to make the addition and/or to enter the queries. In other embodiments, a first user adds the panel view 1701 and/or enters the query associated with the panel corresponding to panel view 1701, and a second user adds the panel view 1901 and/or enters the query associated with the panel corresponding to panel view 1901. The first and second users can use the same client device 204 or different client devices 204 to make the addition and/or to enter the queries. The first and second users can view a workbook view and/or a panel view at different times or concurrently regardless of whether the first and second users are using the same client device 204 or different client devices 204.

As described above, executing a query, such as the parent query, can take minutes to hours to complete. Use of the query results identifiers (e.g., job IDs), however, can reduce the amount of time taken to execute the child query. For example, the child query may depend on the parent query being executed first. One method for executing the child query could be to prepend the parent query to the child query to form a single query to be executed. Doing so, however, would require the parent query to be re-run before the child query is executed. Because the parent query has already been run once and the parent query results are stored in the metadata catalog 221, the client browser 1604 or the UI data manager 1610 can take advantage of the fact that the parent query results are already stored to modify the child query to reference the parent query results instead of the parent query itself. Thus, the data intake and query system 108 can be instructed to perform one query (e.g., the child query) instead of two or more queries (e.g., a parent query and the child query; a parent query and one or more ancestral queries (e.g., grandparent queries, great grandparent queries, etc.); a parent query, the child query, and one or more descendant queries; etc.). However, it will be understood that in some embodiments, the parent query can be prepended to and executed with the child query. For example, in some cases, it may be beneficial to obtain updated query results corresponding to the parent query. As a non-limiting example, the UI data manager 1610 can determine whether to re-execute the parent query or to use the previous parent query results based on an amount of time that has elapsed since the parent query was executed. If the most recent parent query execution time satisfies a timing threshold (e.g., the parent query was last run more than a threshold time ago), the UI data manager 1610 can have the parent query re-executed. If not, the UI data manager 1610 can use the previous parent query results. In some such embodiments, the data intake and query system 108 can generate and store a query results identifier (e.g., job ID) corresponding to the re-run parent query and a query results identifier (e.g., job ID) corresponding to the child query. In addition, as mentioned, the data intake and query system 108 can also store the query results corresponding to the query results identifiers (e.g., job IDs).

In some embodiments, the parent query is executed less frequently than queries that are children of the parent query. As a non-limiting example, a parent query can be scheduled to run less often than the child query(ies). As another non-limiting example, a parent query can run less often because one or more child queries may be edited more often than the parent query (and the parent query may not need to be re-run when a child query is modified in some embodiments, as described above). In other embodiments, the parent query is executed at the same frequency as one or more child queries. In some embodiments, the parent query is locked by a user and cannot be modified except by that user or another user with the correct permissions. In other embodiments, the parent query is frozen and will not be re-run unless explicitly commanded to do so by someone with the proper permissions, e.g., the author of the parent query.

In some embodiments, if a parent query is modified after a child query is executed and the child query results are obtained, the child query is re-run given that the query results on which the child query depends may change as a result of the parent query being modified. As a non-limiting example, if a parent query is modified after a child query is executed and the child query results are obtained, the client browser 1604 can communicate to the UI data manager 1610 a request for the modified parent query to be executed and a request for a modified child query (e.g., a query command and/or the job ID of the modified parent query results prepended to the child query, where the job ID follows the query command if both the query command and the job ID are prepended to the child query) to be executed once the modified parent query results are obtained.

Further, the client browser 1604 can organize the workbook such that a panel view corresponding to a panel associated with a child query is depicted below a panel view corresponding to a panel associated with a parent of the child query. In some embodiments, the order of panel views indicates the hierarchical relationship between the panels. For example, a panel view higher in the workbook view than a panel view lower in the workbook view may correspond to a panel that is a parent to another panel. Alternatively, a panel view higher in the workbook view may correspond to a child panel of a panel whose panel view is lower in the workbook view. A user can reorder the panels of a workbook in some cases by reordering the panel views. Reordering panels, however, may result in one or more queries being re-run. As a non-limiting example, a workbook can include a first panel that includes a parent query, a second panel that includes a first query that is a child of the parent query, and a third panel that includes a second query that is a child of the first query. In some such cases, the third panel view can be depicted below the second panel view and the second panel view can be depicted below the first panel view. Thus, execution of the second query may rely on query results of the first query, and execution of the third query may rely on query results of the second query. If the user reorders the second and third panels (e.g., using the corresponding panel views) such that the third panel view is depicted below the first panel view and the second panel view is depicted below the third panel view, then execution of the third query may rely on query results of the first query, and execution of the second query may rely on query results of the third query.

Thus, the client browser 1604 or the UI data manager 1610 can form a modified third query by prepending a query command and/or the query results identifier (e.g., job ID) of the first query results to the third query and request the modified third query to be executed. Once query results of the modified third query are obtained, the client browser 1604 or the UI data manager 1610 can form a second modified query by prepending a query command and/or the query results identifier (e.g., job ID) of the third query results to the second query and request the modified second query to be executed.

In some embodiments, a workbook can include any number of panels associated with a parent query and any number of panels associated with a child query. Further, a parent query can be a parent to any number of descendant queries (e.g., child queries, grandchild queries, great-grandchild queries, etc.), and a parent or child query can function both as an ancestral query (e.g., parent query, grandparent query, great-grandparent query, etc.) to one query and as a descendant query (e.g., child query, grandchild query, great-grandchild query, etc.) to another query. As a non-limiting example, a workbook view can include a cascading set of panel views in which a first panel view (e.g., the panel view depicted first) is associated with a first query, a second panel whose panel view is depicted below the first panel view includes a second query that is a child of the first query and that is a parent of a third query of a third panel whose panel view is depicted below the second panel view (where the third query is a grandchild of the first query). The workbook can also include a fourth panel that includes a fourth query that is a child of the first query and corresponds to a fourth panel view depicted below the third panel view, and a fifth panel with a fifth panel view depicted below the fourth panel view and that includes a fifth query that is independent of the prior four queries (e.g., the fifth query references data that is different than the data referenced by the first query). The first, second, third, and fourth panels can be linked or associated with each other given that these panels are associated with related queries. The fifth panel, however, may not be linked or associated with the other four panels given that the fifth panel is associated with a query that is independent of the queries associated with the first four panels.

Further, the workbook view 1900 allows a user to combine a panel associated with a child query with a panel associated with a parent of the child query. As a non-limiting example, a user can select an option to combine the panels associated with the panel view 1901 and the panel view 1701. As a result of selecting this option to combine panels, the client browser 1604 can render and display an updated version of the workbook view 1900 such that the child search depicted in the text field 1906 is appended to the parent search depicted in the text field 1706. In addition, the client browser 1604 can render and display the updated version of the workbook view 1900 such that the query results depicted in the table 1707 are replaced with the query results depicted in the table 1907. If the workbook includes any other queries that were child queries of the query depicted in the text field 1706, such queries may be re-run given that the parent of these queries has been modified to include one of the child queries. If the workbook includes any other queries that were child queries of the query depicted in the text field 1906, however, such queries may not be re-run given that the parent of these queries is still a combination of the text field 1706 query and the text field 1906 query. In general, the client browser 1604 may request a query to be re-run if a parent of the query is modified in any way.

Similarly, the workbook view 1900 allows a user to separate a panel into two or more panels by separating a query associated with the panel into two or more queries. The beginning portion of the query may form the parent query, and any subsequent portions of the query that have been separated may form child queries. Because the query is separated, the client browser 1604 may request the parent query and the child query(ies) to be executed in sequence once the separation occurs. Visually, the workbook view 1900 may then display two panel views rather than a single panel view.

By allowing a user to add panels to a workbook that are associated with related queries, the client browser 1604 can reduce the number of queries sent to the data intake and query system 108, thereby reducing the processing load on the data intake and query system 108. In particular, users often enter long queries (e.g., tens of lines long) to arrive at a desired set of query results. However, if a user makes a mistake, such as a typo, a reference to the wrong function or dataset, etc., the entire query must be re-run. This can result in duplicative efforts by the data intake and query system 108 in situations in which the mistake occurs near the end of the query, and intermediate query results that could be generated as a result of running a beginning portion of the query would remain the same after the mistake is corrected and therefore the beginning portion of the query does not need to be re-run. Allowing a user to add panels to a workbook that are associated with related queries allows the user to break up a long query into one or more smaller queries. If a mistake is detected, the user can correct the child query that includes the mistake. As a result, the client browser 1604 may request the data intake and query system 108, via the UI data manager 1610, to re-run just the child queries that depend from the corrected query instead of the parent query and all of the child queries. In other words, any queries that are parents of the corrected query can remain unchanged because their query has not changed, and thus their query results have not changed, and the panels associated with these parent queries can remain static and unchanged, and only the corrected query and any child queries of the corrected query can be re-run. As a non-limiting example, if the workbook includes panels associated with a parent query, a first query that is a child of the parent query, a second query that is a child of the first query, and a third query that is a child of the second query, and the user identifies a mistake in the second query, the data intake and query system 108 may be instructed to re-run the corrected second query and the third query (rather than the parent query, the first query, the corrected second query, and the third query if such queries were combined into a single query).

5.4. Panels Derived from the Investigation Assistant

Given the amount of data ingested by the data intake and query system 108 and the myriad of ways in which the data can be identified, searched, and processed, it can be difficult for a user to know where to begin. In addition, some users of the data intake and query system 108 may be unfamiliar with the architecture of the data intake and query system 108 or the query language used to query the data. These obstacles can make it difficult for a user to obtain meaningful insights from the data.

To aid users in understanding and querying the data accessible by the data intake and query system 108, the investigation assistant view 1703 can provide recommendations or suggestions of possible queries that may be of interest to the user. As described above, a user can create a new panel by selecting an option in the investigation assistant view 1703. For example, the investigation assistant view 1703 can suggest or recommend queries associated with various extracted fields to a user. The recommended queries can be derived by the UI data manager 1610 based on queries entered or selected by the user and/or other users in the past. As a non-limiting example, the UI data manager 1610 can track the queries requested by various client browsers 1604, identifying the queries that are requested most often for various fields. The UI data manager 1610 can then instruct the client browser 1604 via the gateway 1615 to include one or more of the most-requested queries as suggestions in the investigation assistant view 1703.

Figure 20:
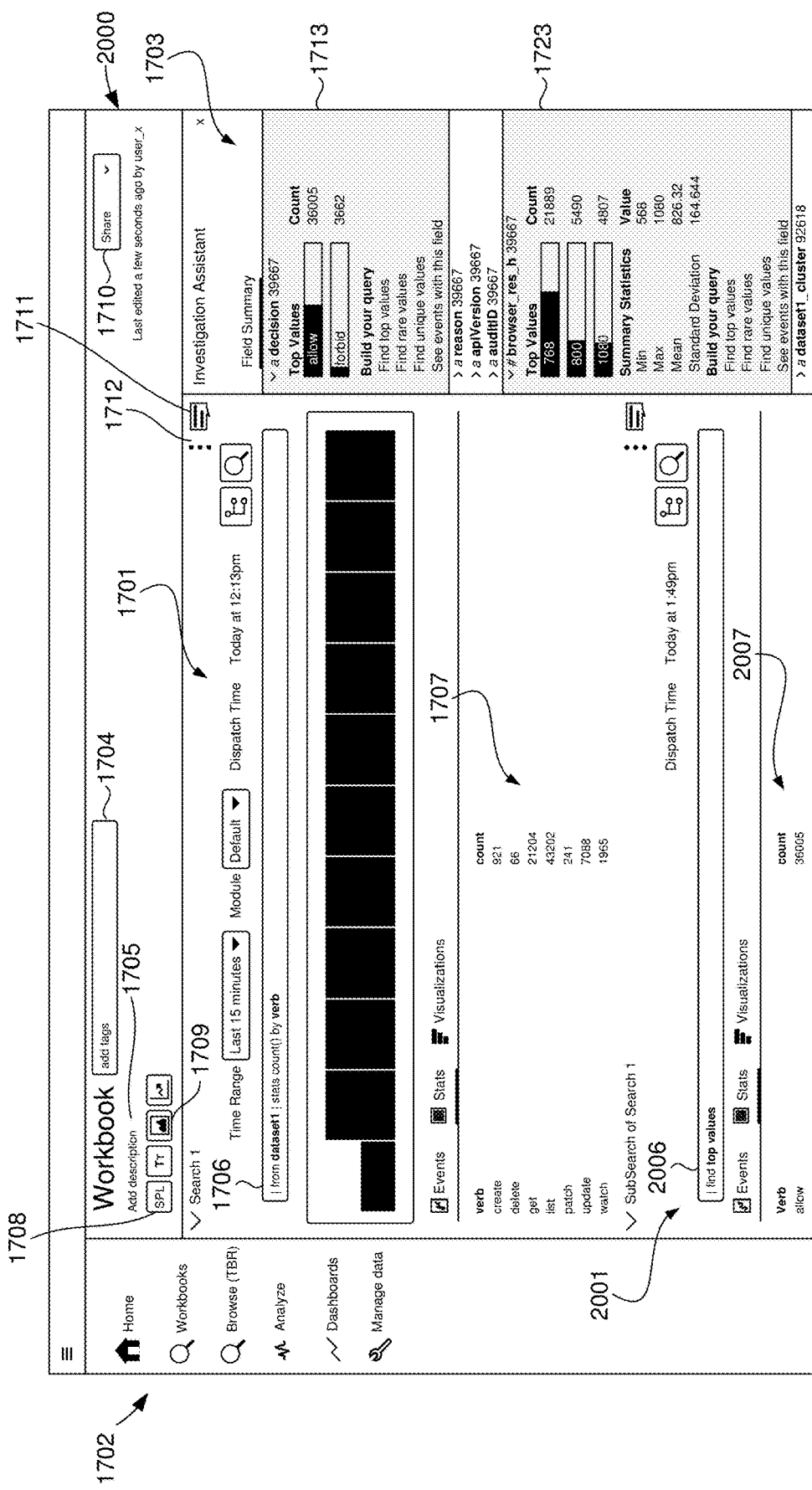

For example, FIG. 20 illustrates an example workbook view 2000 rendered and displayed by the client browser 1604 in which the investigation assistant view 1703 provides various suggestions under the "Build your query" heading (e.g., "find top values," "find rare values," and "find unique values") that are associated with different queries. In some embodiments, the UI data manager 1610 also requests the data intake and query system 108 to run one of the most-requested queries. In the illustrated embodiment, the UI data manager 1610 requested the data intake and query system 108 to run a query associated with "find top values" in the "decision" field and another query associated with "find top values" in the "browser_res_h" field, communicating the query results to the client browser 1604. The client browser 1604 then rendered and displayed the query results. The client browser 1604 can render and display graphs to display the query results, such as bar graphs, histograms, pie charts, line graphs, etc. For example, the expanded view 1713 includes a bar graph or histogram indicating that "allow" and "forbid" are the top two values associated with the "decision" field that was determined to be a field located in at least some events in dataset1, and the expanded view 1723 includes a bar graph or histogram indicating that "768," "800," and "1080" are the top three values associated with the "browser_res_h" field.

In some embodiments, selection of one of the suggestions depicted in the investigation assistant view 1703 causes the client browser 1604 to create a new panel corresponding to panel view 2001 to be included in the workbook. The query associated with the selected suggestion may be a child query of the query depicted in the text field 1706. Thus, the client browser 1604 can also generate a query by prepending a query command and/or the query results identifier (e.g., job ID) corresponding to the query results depicted in the panel view 1701 associated with the investigation assistant view 1703 to the selected recommended query, and requesting the UI data manager 1610 via the gateway 1615 to execute the generated query, and in some implementations, the data intake and query system 108 leverages the results of the parent query through the job ID as previously described, so as not to re-run the entire query. The UI data manager 1610 can instruct the data intake and query system 108 to execute the generated query and receive query results in response. The UI data manager 1610 can communicate the query results to the client browser 1604 via the gateway 1615, which causes the client browser 1604 to display the query results in the newly created panel view 2001 (corresponding to the newly created panel), such as in table 2007.

In other embodiments, selection of one of the suggestions depicted in the investigation assistant view 1703 causes the client browser 1604 to obtain query results for the selected recommended query and display these query results in the panel view of the associated panel in place of the query results originally displayed therein. As a non-limiting example, selection of one of the suggestions depicted in the investigation assistant view 1703 causes the client browser 1604 to obtain query results for the selected recommended query and display these query results in the table 1707 (e.g., in an area of the panel view 1701 because the panel associated with the panel view 1701 has a logical association to the investigation assistant view 1703) in place of the query results currently depicted therein.

In some embodiments, the same user adds the panel view 1701, enters the query associated with the panel corresponding to panel view 1701, and/or selects one of the suggestions depicted in the investigation assistant view 1703. The user can use the same client device 204 or different client devices 204 to make the addition, to enter the query, and/or to make the selection. In other embodiments, a first user adds the panel view 1701 and/or enters the query associated with the panel corresponding to panel view 1701, and a second user selects one of the suggestions depicted in the investigation assistant view 1703. The first and second users can use the same client device 204 or different client devices 204 to make the addition, to enter the query, and/or to make the selection. The first and second users can view a workbook view and/or a panel view at different times or concurrently regardless of whether the first and second users are using the same client device 204 or different client devices 204.

As described above, the client browser 1604 can order the panel views 1701 and 2001 such that the panel view 2001 follows the panel view 1701 given that the selected recommended query is a child query of the query entered in the text field 1706. The workbook view 2000 can include the selected recommended query in text field 2006.

5.5. Workbook Tree View

In some cases, it may be difficult for a user to visualize or otherwise understand the relationship between various panels and/or the relationship between multiple queries associated with different panels. For example, while panel views may be displayed in a workbook view in a certain order, two consecutive panel views may be associated with independent queries, two panel views associated with a parent query and a child query may be separated by another panel view associated with a child query, two panel views associated with a panel view and a child query may be separated by a panel view associated with an independent query, and so on. A user may have to review depicted queries and/or panel titles to understand such relationships.

Figure 21:
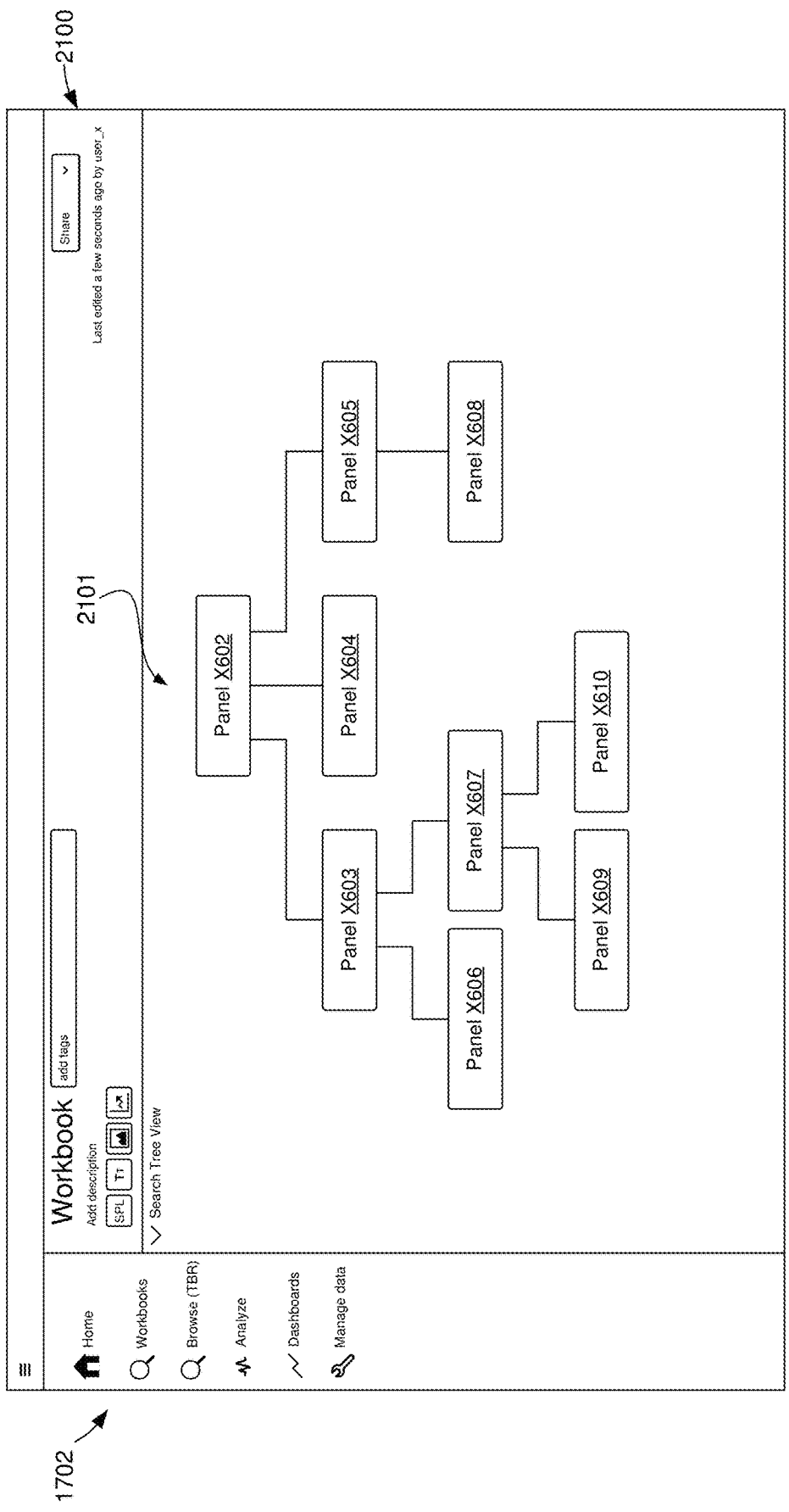

Thus, the client browser 1604 can render and display a workbook tree view to help the user visualize the relationship. For example, FIG. 21 illustrates an example workbook view 2100 rendered and displayed by the client browser 1604 in which an area or portion 2101 of the workbook view 2100 depicts a tree structure identifying the relationship between various panels. In the illustrated embodiment, a workbook includes nine inter-related panels. The area 2101 depicts panel display objects 2102-2110 corresponding to each of the nine panels in a tree structure to depict the relationship between the nine panels. For example, panel display object 2102 and its corresponding panel is associated with a parent query. Panel display objects 2103-2105 and their corresponding panels are each associated with a query that is a child of the parent query. Panel display objects 2106 and 2107 and their corresponding panels are each associated with a query that is a child of the query associated with the panel display object 2103. Panel display object 2108 and its panel are associated with a query that is a child of the query associated with the panel display object 2105. Panel display objects 2109 and 2110 and their panels are each associated with a query that is a child of the query associated with the panel display object 2107.

Each of the panel display objects 2102-2110 depicted in the area 2101 can be selected by a user. Selection of a panel display object 2102-2110 may cause the client browser 1604 to update the workbook view 2100 to depict the selected panel 2102-2110. In some embodiments, a user can interact with area 2101 to rearrange the panel display objects 2102-2110 to change the hierarchical relationships between the corresponding panels. In certain embodiments, based on a changed hierarchical relationship, the panels (and associated queries) can be displayed in a different order and some of the queries associated with the rearranged panels can be re-run. For example, if panel display object 2110 is moved to be directly below panel display object 2102 (with no child panels), the associated query may be re-run as its dependency has changed. Similarly, if panel display object 2110 is moved to be directly below panel display object 2102 and above panel display object 2105, then the queries associated with panels 2110, 2105, 2108 may be re-run (in that order) as their dependencies changed.

5.6. Automatically Saving a Workbook

In some embodiments, every time a workbook is modified (e.g., a panel is added or deleted, a comment is entered, a query is entered, etc.), the client browser 1604 can communicate to the UI data manager 1610 via the gateway 1615 information detailing the modification. The UI data manager 1610 can then store data describing the modification in the workbook data store 1614 in association with the workbook data of the modified workbook. Alternatively, the UI data manager 1610 can retrieve the workbook data of the modified workbook from the workbook data store 1614, modify the workbook data to incorporate the modification, and store the modified workbook data in the workbook data store 1614. Thus, a workbook can be saved even if a user does not explicitly save the workbook via a save button present in the workbook view 1700, via a keyboard shortcut, etc. A user therefore may not have to recreate a panel, re-run a query, or perform other time-intensive operations if the user forgets to save a workbook or is unable to save a workbook due to a software or hardware failure. Workbooks which have not been named by the user may be given a default name so that they also may be automatically saved, even prior to naming 5.7. Panels Derived from Interactions with a Display Object As described herein, some users may be unfamiliar with the data that they are attempting to access or review. Similarly, users may be unfamiliar with search processing languages. In some such cases, it may be difficult for a user to generate queries that will return relevant results. To address this issue, the query interface system can generate and execute queries based on a user's interaction with a graphical user interface (and/or without the user typing a query). In some embodiments, as the user interacts with a graphical user interface, the query interface system 1608 can generate one or more panels based on the generated queries and display the results of the queries in one or more panel views or workbook views. In some cases, a panel view can enable a user to edit a generated query, view query results associated with the query, generate additional queries, associate additional data artefacts with the query as part of the panel, such as, but not limited to, comments, figures, dashboards, annotations, etc.

In addition, as the user interacts with display objects in the panel views and workbook views, additional queries can be generated and results displayed. In this way, the query interface system 1608 can aid a user in parsing the data.

Further, by generating queries and panels in this way, the query interface system 1608 can reduce the compute resources used by the data intake and query system 108. For example, the query interface system 1608 can reduce the number of queries executed that would not return useful results, thereby decreasing the demands on the data intake and query system 108.

FIG. 22 is an interface diagram illustrating an embodiment of a user interface 2200 that includes display objects 2202A-2202N (generically referred to as data object(s) 2202) associated with different datasets of a tenant. In some embodiments, based on an interaction with one or more of the display objects 2202, the UI data manager 1610 can generate a query and/or a panel.

The display objects 2202 can be associated with different types of datasets, such as, but not limited to index datasets, metrics datasets, view datasets, etc. In the illustrated embodiment of FIG. 22, the display objects 2202A-2202J are associated with index datasets, the display object 2202K and 2202L are associated with metrics datasets, and the display objects 2202M and 2202N are associated with view datasets.

The display objects 102 can include information about the datasets with which they are associated. In the illustrated embodiment of FIG. 22, display objects 2202A-2202J include a dataset type identifier ("LOG" or "METRICS") and a dataset name of the dataset (e.g., "k8s_stage," "main," "_test," "k8s_prime," etc.). The display objects 2202M, 2202N include the query associated with the dataset, the creation time of the dataset and the last modified time of the dataset. It will be understood that the display object 2202 can include fewer or more information about the datasets as desired. For example, the display objects 2202 can indicate that last time the dataset was used, number of time used, user that created the dataset, etc.

It will be understood that the interface 2200 can include fewer or more datasets. In some cases, the interface 2200 can include display objects 2202 for some or all of the datasets associated with a particular tenant, some or all of the datasets for which a user or group of users is authorized to access, some or all of the datasets for which queries can be generated or are associated, etc.

In some cases, the UI data manager 1610 can obtain the datasets that are to be displayed based on a query to a metadata catalog 221 of the data intake and query system 108 or another catalog or database that identifies datasets associated with a tenant or a particular user. For example, based on the login information of the user, the UI data manager 1610 can request a list of datasets from the metadata catalog 221 to which the user has access. In addition, the UI data manager 1610 can request a list of most frequently used datasets from the metadata catalog 221 or a data store that includes that information. This request may be based on a role of the user, or on similar users' preferences. In certain embodiments, the UI data manager 1610 requests datasets of a particular type. For example, the UI data manager 1610 may only request datasets that are index datasets, metrics datasets, and view datasets and/or may not request KV datasets or lookup datasets, etc. However, it will be understood that the UI data manager 1610 can retrieve the names and details of any datasets as desired and cause those datasets to be rendered by client browser 1604.

In some embodiments, the interface 2200 can group the display objects 2202 into categories. In the illustrated embodiments, the interface has grouped the display objects 2202 into a "MY DATASETS" category and a "FAVORITE VIEWS" category. However, it will be understood that the display objects can be grouped in a variety of ways as desired. In some cases, the interface 2200 can group display objects based on the type of dataset with which the display object is associated, based on whether a display object will result in the generation of a new query or the use of an already-existing query, etc., In certain cases, the "MY DATASETS" category can include datasets to which the user has access for a specified tenant. In some cases, to generate the "FAVORITE VIEWS" category, the UI data manager 1610 may request the metadata catalog 221 (or another catalog or data store) to return a list of the view datasets that are most frequently used by the current user, users associated with the tenant, or any users, etc. In some cases, the datasets in the "FAVORITE VIEWS" category or another category can include to generic or personalized query templates, as described herein.

In certain embodiments, as a user interacts with the display objects 2202, the UI data manager 1610 can generate a query and/or a panel. For example, if a user clicks on a display object 2202A-2202N, the UI data manager 1610 can generate a query.

In some cases, the UI data manager 1610 can generate multiple queries, which may or may not be related. In certain cases, a second query can further process the results of a first query, providing a parent-child relationship as described herein. For example, the UI data manager 1610 can generate a first query to obtain data from a dataset and a second query to parse the data from the dataset, identify characteristics of the dataset, such as fields, keywords, statistics, etc. As another example, the UI data manager 1610 may generate a query by removing parts of a query associated with the display object or breaking up a query associated with the display object 102 into multiple queries, etc.

The query (or queries) generated can depend on the display object. For example, if the user interacts with a display object 2202A-2202J associated with an index dataset, the UI data manager 1610 can generate a query that requests a certain number of events from the index dataset (and additional queries that parse the events, obtains statistics about the events, and/or obtains statistics about the fields in the dataset, etc.). As another example, if the user interacts with a display object 2202K, 2202L, the UI data manager 1610 can generate one or more queries that request a certain number of metrics and/or a particular statistic from the metrics dataset.

As yet another example, if the user interacts with a view dataset display object 2202M, 2202N, the UI data manager 1610 can generate one or more queries that correspond to the query of the view dataset. In some such embodiments, generating the query may include accessing the query of the view dataset, breaking up the query of the view dataset into multiple queries, removing part of the query, etc. For example, from the query "|from k8s_control|stats count( ) by verb" associated with the display object 2202M, the UI data manager 1610 can generate two queries "|from k8s_control" and "|stats count( ) by verb." Further, UI data manager 1610 could generate additional queries to identify additional information, similar to the queries generated and executed to provide additional information, as described herein. With continued reference to the aforementioned example, the UI data manager 1610 could generate a third query "|fieldsummary," which could be appended to the first generated query "|from k8s_control" to determine information about the fields of the dataset, or another query to determine statistics about the field values of the "verb" field, etc.

In addition, based on a determined interaction with a display object 2202, the UI data manager 1610 can execute or cause to be executed, the query or queries. In certain embodiments, the UI data manager 1610 can execute the query(ies) itself. In some embodiments, the UI data manager 1610 communicates the query(ies) to the data intake and query system 108 for execution.

The UI data manager 1610 can also generate one or more panels and associate the query(ies) with the panel(s). In some cases, the UI data manager 1610 can generate a panel for each generated query. In certain embodiments, each generated panel can be associated with each other as part of the same workbook. In some cases, depending on the relationship of the queries, the panels can be associated as parent/child panels, as sibling panels, and/or as independent panels.

In some cases, the UI data manager 1610 can associate the generated query(ies) with one or more already existing panels. For example, the UI data manager 1610 can compare the generated query(ies) with query(ies) from other panels. Based on a determined match, the UI data manager 1610 can access the already generated query(ies) rather than generating new panels. In some such embodiments, the UI data manager 1610 may not have the generated queries executed. Rather, the UI data manager 1610 can access the query results of the already-existing panels. In certain embodiments, the UI data manager 1610 can execute the generated queries that are associated with already-existing panels based on an amount of time that has passed since the query was previously executed. If the amount of time satisfies a timing threshold, the UI data manager 1610 can have the query executed. If not, the UI data manager 1610 can use the previously generated query results.

With the query(ies) associated with panel(s), the UI data manager 1610 can cause display of panel view(s) associated with the panel(s) or a workbook view as the case may be. As described herein, FIGS. 17A-17D and 18-21 are interface diagrams showing example embodiments of workbook views and panel views that can be displayed. As described herein, the panel view and workbook views can enable the user to interact with the panel and/or workbook as described herein, generate additional queries, view panel relationships, etc. In addition, as described herein, the UI data manager 1610 can provide query suggestions if/when the user edits the query(ies) displayed in the panel view(s), etc.

It will be understood that other interactions with different interfaces can be used to generate queries and/or panels. For example, interactions with a dashboard and/or an alert can result in the generation/execution of one or more queries, panels, etc.

With reference to FIG. 15 based on a user interaction with one or more of the display objects associated with 1501, 1502, 1503, 1504 or other display objects of the dashboard, the UI data manager 1610 can generate one or more queries and/or panels, execute the one or more queries and display the results in a panel view or workbook view.

As described herein, a dashboard can include various display objects which can be associated with different query results and/or queries that have already be executed or that are executed on a regular basis. In some embodiments, if a user interacts with one of the display objects of the dashboard, the UI data manager 1610 can generate and execute one or more queries, generate one or more panels, and/or display one or more panel views or workbook views. The generated and executed query(ies) can correspond to the query(ies) that provided the results that are displayed in the dashboard. For example, with reference to FIG. 15, if the display object associated with the histogram 1504 is selected, the UI data manager 1610 can generate a query based on the query that resulted in the histogram 1504 or the query results used to populate the histogram 1504. Such a query may include accessing a dataset over a particular time range and sorting the results by a particular field (e.g., an urgency field), etc. Similarly, the UI data manager 1610 can generate a different query based on the selection of the display object associated with the value 1501. Accordingly, the UI data manager 1610 can generate one or more queries and panels based on the display objects of the dashboard with which a user interacts.

In some embodiments, based on one or more alerts, information can be provided to a user. For example, if certain metrics satisfy a threshold or if a certain number of events satisfy a threshold, etc., an alert can be generated. In some such embodiments, an interface or display object can appear indicating that an alert has been generated. In certain embodiments, if the user interacts with a display object of the alert, the UI data manager 1610 can generate and execute one or more queries associated with the alert. In addition, the UI data manager 1610 can generate one or more panels associated with the one or more queries and display the query(ies) and/or its results in a corresponding panel view(s). In some embodiments, the generated query(ies) can be based on the alert. For example, some alerts may result in one query being generated while other alerts may result in multiple queries being generated.

5.8. Query Interface System Routines

Figure 23A:
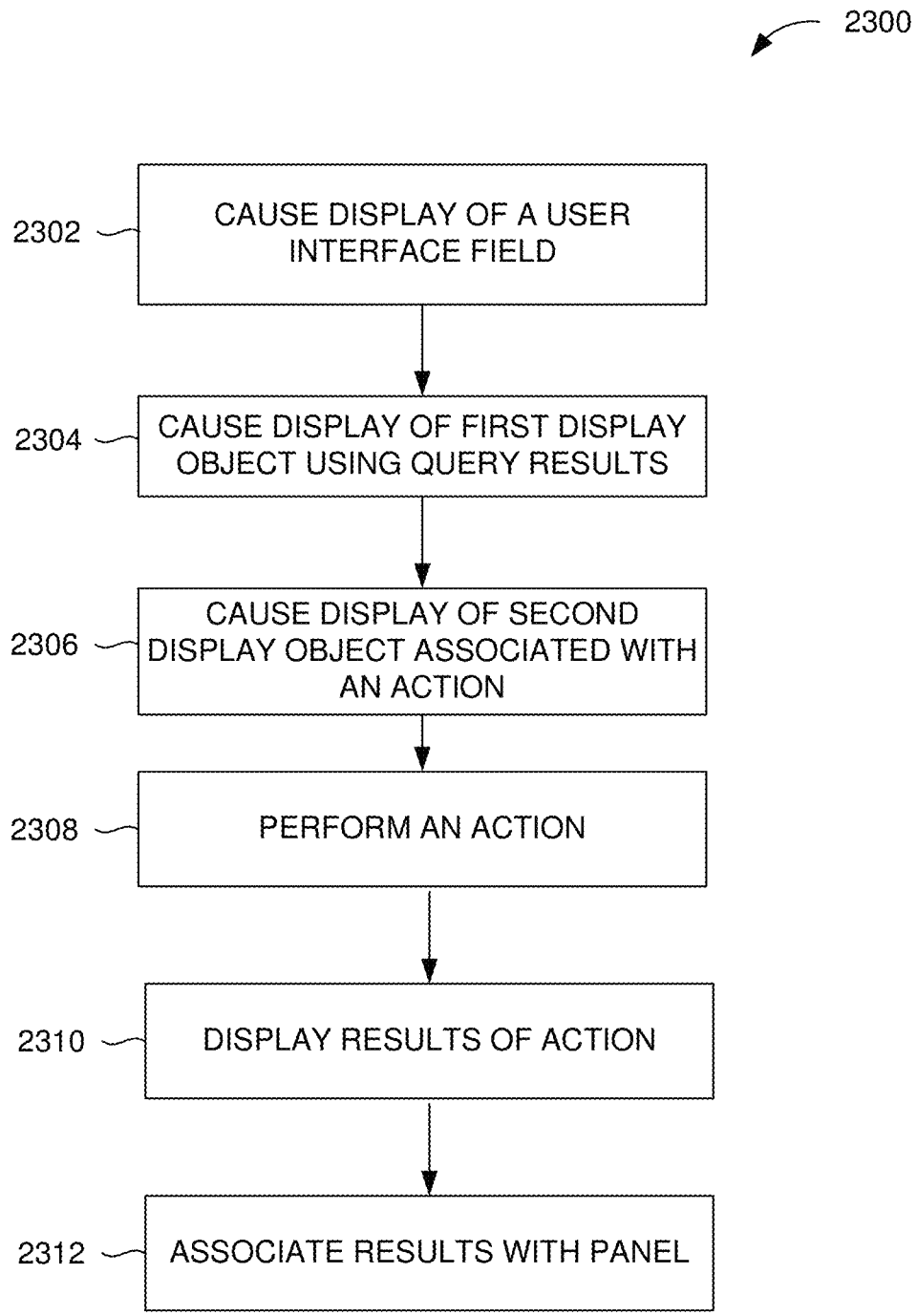
FIGS. 23A and 23B are flow diagrams illustrative of embodiments of routines to perform an action on a panel of a workbook.
Figure 23B:
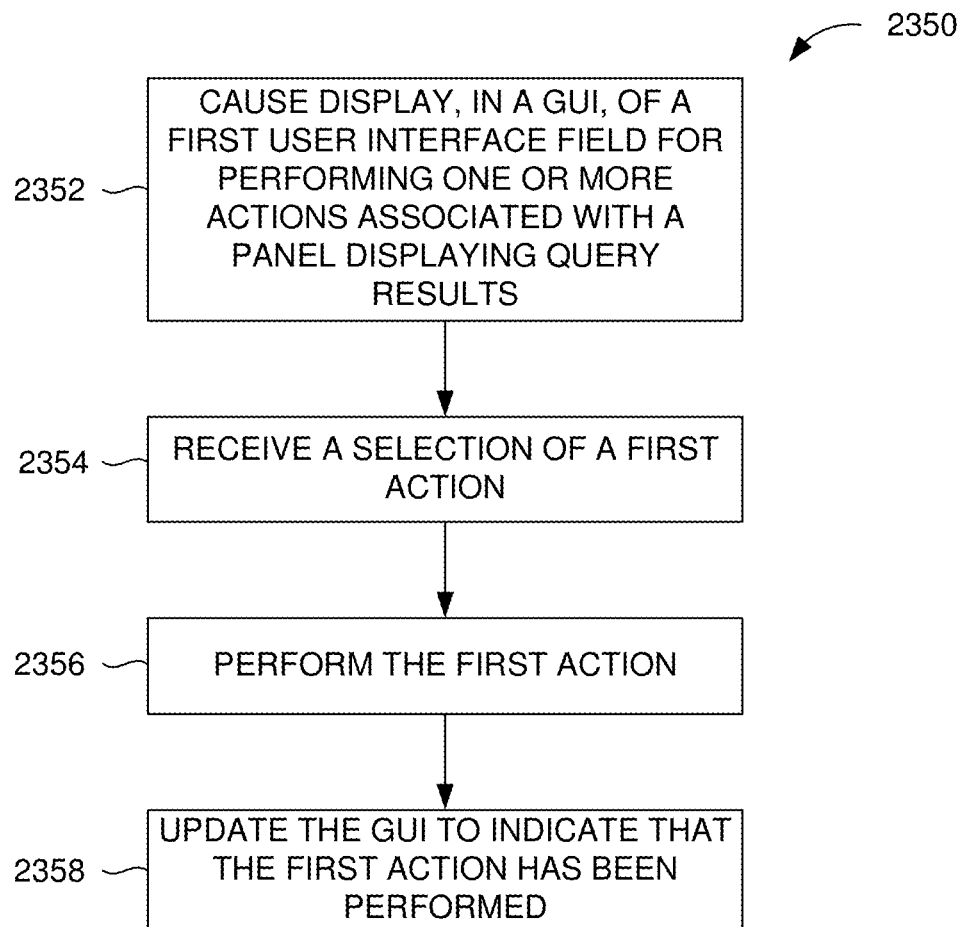

FIGS. 23A-23B are flow diagrams illustrative of embodiments of routines associated with the query interface system 1608, the client browser 1604, and/or the data intake and query system 108. It will be understood that some or portions of the routines described herein can be performed by various combinations of the components of the query interface system 1608, the client browser 1604, and/or the data intake and query system 108.

5.8.1. Performing an Action on a Panel

FIG. 23A is a flow diagram illustrative of an embodiment of a routine 2300 implemented by the UI data manager 1610 to perform an action on a panel of a workbook. Although described as being implemented by the client browser 1604, it will be understood that the elements outlined for routine 2300 can be implemented by one or more computing devices/components that are associated with the data intake and query system 108 or the query interface system 1608, such as, but not limited to, the client browser 1604. Thus, the following illustrative embodiment should not be construed as limiting.

At block 2302, the UI data manager 1610 causes display of a user interface field for editing a query. The user interface field can be a text field, such as the text field 1706, in which a user can edit (e.g., add or modify) a query depicted therein. As described herein, the user interface field can be displayed in an area of a GUI associated with a panel that provides a logical association between a query and one or more data artifacts, such as, but not limited to, query results, a query results identifier, display objects, comments, files, figures, dashboards, etc. In some embodiments, the query can identify a set of data to be processed and/or a manner of processing a set of data. In some cases, the set of data can include raw machine data, metrics, query results, etc.

At block 2304, the UI data manager 1610 causes the display of a first display object using query results corresponding to the query. In some cases, the display object can include a bar graph, pie chart, scatterplot, table, or a list displaying the results of the query. In certain embodiments, the display object can be displayed in the area with the user interface field and/or in an expanded area. For example before the query is executed, the area of the GUI associated with the panel may be a first size and the query is executed, the area of the GUI associated with the panel may increase (or decrease) as desired to display the display object. In other implementations, the area of the GUI may remain the same and the client browser 1604 may handle the ability to size, scroll, etc., the GUI.

At block 2306, the UI data manager 1610 causes the display of a second display object associated with an action. In some cases, the second display object is displayed in the area or expanded area associated with the panel. In certain embodiments, the second display object is displayed outside the area associated with the panel or may be associated with a workbook or multiple panels, etc. The type of second display object may be determined based at least partially on information included in a panel (e.g., the query, the query results, the first display object, etc.).

As described herein, the GUI can enable a variety of actions associated with a workbook or panel. For example, the GUI can include one or more menu items. Each menu item can correspond to an action. In some embodiments, the actions can include creating a view (e.g., a saved search or query) associated with the panel, creating an alert associated with the panel, creating a dashboard associated with the panel, highlighting the query results, modifying (highlighting annotating, etc.) the display object associated with the query results, deleting the panel, adding a comment to the panel, resolving a comment of the panel, deleting a comment of the panel, adding an image to the panel, annotating an image of the panel, highlighting an image of the panel, highlighting the panel itself, sharing the panel with another user, adding or removing permissions associated with the panel, modifying a query associated with the panel, etc.

At block 2308, the UI data manager 1610 performs an action. In some cases, the UI data manager 1610 performs an action based on a selection of a corresponding display object by the user. For example, if the user selects a display object associated with annotating query results, the UI data manager 1610 can enable the user to annotate query results. Similarly, depending on the selected action and/or display object, the UI data manager 1610 can create a view, create an alert, create a dashboard, highlight the query results, modify the display object associated with the query results, delete a panel, add a comment, resolve a comment, delete a comment, add an image or file, annotate an image or file, highlight an image or file, highlight the panel, share the panel with another user, lock the panel, make the panel public, make the panel public to the users that have access to the tenant, add/remove permissions for a user, modify a query, etc.

At block 2310, the UI data manager 1610 causes display of the result of the action. For example, if the action is to create a dashboard, the UI data manager 1610 can cause display of the dashboard. As another example, if the action is to add a panel, the UI data manager 1610 can cause display of a panel view associated with the panel, etc. Similarly, the UI data manager 1610 can cause display of annotations, cause display of query results, cause display of added files, cause removal of a panel view from the GUI, cause display of highlights, annotations, or comments or cause removal of highlights, annotations, or comments from display, etc.

At block 2312, the UI data manager 1610 associates the result with the panel. As the user interacts with the GUI, the changes can be associated with the panel that corresponds to the display objects with which the user interacts. For example, if the user selects to create a dashboard, the UI data manager 1610 can cause creation of the dashboard and associate the dashboard with the panel. As another example, if the user selects to create a panel that includes a child query of another panel, the UI data manager 1610 can associate the panel corresponding to the child query with the panel corresponding to the parent query. In this way, the UI data manager 1610 can maintain relationships between panels.

Fewer, more, or different blocks can be used as part of the routine 2300. Furthermore, it will be understood that the various blocks described herein with reference to FIG. 23A can be implemented in a variety of orders, or can be performed concurrently. For example, the UI data manager 1610 can concurrently perform the action, display the results of the action, and associate the results with the panel.

FIG. 23B is a flow diagram illustrative of an embodiment of a routine 2350 implemented by the client browser 1604 to perform an action on a panel of a workbook. Although described as being implemented by the client browser 1604, it will be understood that the elements outlined for routine 2350 can be implemented by one or more computing devices/components that are associated with the data intake and query system 108 or the query interface system 1608, such as, but not limited to, the UI data manager 1610. Thus, the following illustrative embodiment should not be construed as limiting.

At block 2352, the client browser 1604 causes the display of, in a first area of a GUI, a first user interface field for performing one or more actions associated with a panel. For example, the first user interface field may be window that includes a list of selectable menu items. Each menu item can correspond to an action. In some embodiments, the actions can include creating a view (e.g., a saved search or query) associated with the panel, creating an alert associated with the panel, creating a dashboard associated with the panel, deleting the panel, adding a comment to the panel, resolving a comment of the panel, deleting a comment of the panel, adding an image to the panel, annotating an image of the panel, highlighting an image of the panel, sharing the panel with another user, adding or removing permissions associated with the panel, highlighting the panel, locking the panel, making the panel public, making the panel public to the users that have access to the tenant, modifying a query associated with the panel, etc.

At block 2354, the client browser 1604 receives the selection of a first action in the one or more actions. For example, the client browser 1604 can receive an indication that an image associated with the panel and depicted in the panel view is to be annotated. As another example, the client browser 1604 can receive an indication that the query associated with the panel is to be modified.

At block 2356, the client browser 1604 performs the first action. At block 2358, the client browser 1604 updates the GUI to indicate that the first action has been performed.

In some embodiments, if the received first action involves modifying a query associated with the panel, such an action, when performed, may cause the client browser 1604 to request the UI data manager 1610 to obtain query results for the modified query. Once the query results are received, the client browser 1604 can render and display an updated GUI that depicts, in the panel view, new query results corresponding to the modified query.

Fewer, more, or different blocks can be used as part of the routine 2350. For example, the client browser 1604 can wait for the user to perform an additional action (e.g., annotating an image) prior to updating the GUI to indicate that the first action has been performed. In some cases, one or more blocks can be omitted. Furthermore, it will be understood that the various blocks described herein with reference to FIG. 23B can be implemented in a variety of orders, or can be performed concurrently.

5.8.2. Displaying Query Results Associated with a Previous Query

Figure 24A:
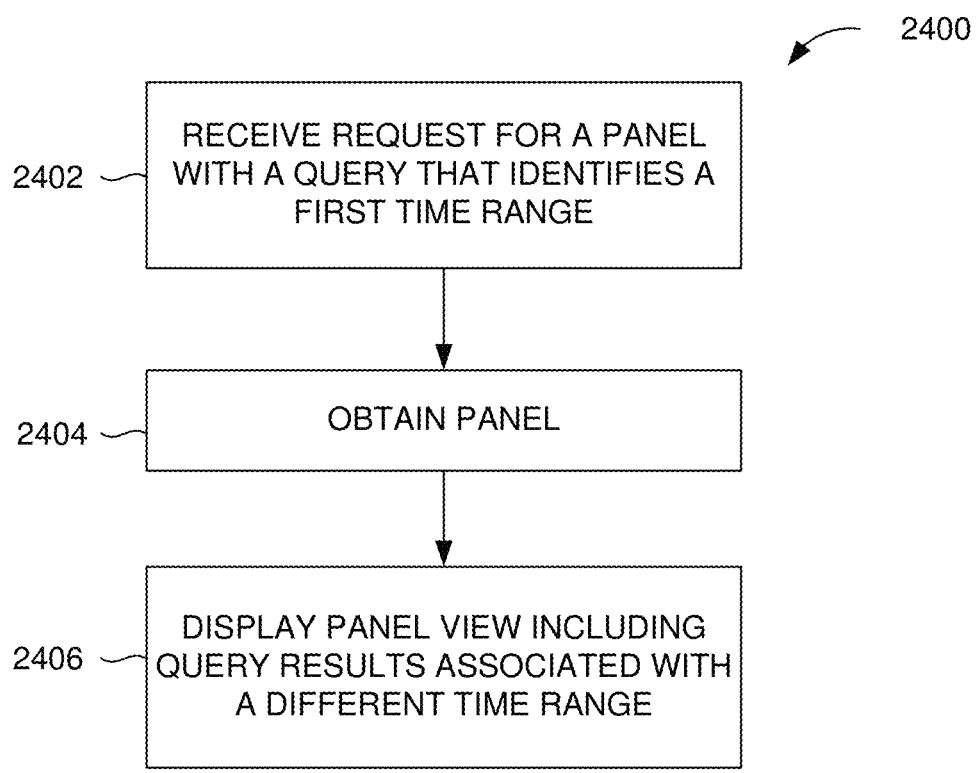
FIG. 24A is a flow diagram illustrative of an embodiment of a routine to display query results associated with a time range that is different from a time range indicated by a query.

FIG. 24A is a flow diagram illustrative of an embodiment of a routine 2400 implemented by the client browser 1604 to display query results associated with a time range that is different from a time range indicated by a query. Although described as being implemented by the UI data manager 1610, it will be understood that the elements outlined for routine 2400 can be implemented by one or more computing devices/components that are associated with the data intake and query system 108 or the query interface system 1608, such as, but not limited to, the client browser 1604. Thus, the following illustrative embodiment should not be construed as limiting.

At block 2402, the UI data manager 1610 receives a request for a panel of a workbook. As described herein, the panel can provide a logical association between a query and one or more data artifacts, such as, but not limited to, query results, query result identifiers, display objects, dashboards, files, comments, annotations, etc., and the workbook can provide a logical association between one or more panels. In certain embodiments, a panel can indicate its relationship to other panels (e.g., parent, child, etc.) and/or the workbook can indicate the relationship between panels.

At block 2404, the UI data manager 1610 obtains the panel, including the query, query results and one or more display objects associated with the panel. In certain embodiments, the UI data manager 1610 obtains the panel from a workbook data store 1614.

At block 2406, the UI data manager 1610 causes display of a panel view. As described herein, the panel view can include one or more display objects of the panel. In some cases, the panel view can show the query in a user interface field. As described herein, the user interface field can enable a user to edit the query. Furthermore, the panel view can also include a display object based on query results associated with the query. However, the displayed query results may not correspond to the same time range as the time range indicated by the query. For example, as mentioned above, if the time is 3:15 pm and the query indicates that the set of data is to include data received in a time period corresponding to "last fifteen minutes," then the query by itself would indicate that the set of data would include data received from 3:00 pm to 3:15 pm. However, the query results obtained by the UI data manager 1610 may correspond to a different time range, such as 2:00 pm to 2:15 pm. The earlier time range that is different from what the literal text or representation of the query describes can correspond to the last time the query was run and the query results were saved/associated with the panel, because in some embodiments, those results are "frozen" with the panel when the query is run. This freezing allows incident postmortems to be conducted. For example, a security incident may have taken place at 2:07 pm, and the query was run at 2:15 pm to try to understand the status of the system when the incident took place. Later, when another user, or the same user, comes back to the workbook to continue analysis of the incident, it is still the 2:00 pm to 2:15 pm time period that is relevant. By freezing the panel, the panel maintains its relevance to the incident. Similar procedures may be carried out for IT operations incidents, other types of incidents, or any time there is a time range in which an event occurred, or is suspected to have occurred, and for which additional analysis is desired by the user. Moreover, freezing the panels in this manner allows the user who created the panels to share the panel with other persons, who may not know the details of the incident or which time periods the creating user was targeting. Accordingly, the query results displayed in the panel view may correspond to a set of data that is different from the set of data facially identified solely by the query that is shown in the panel view. In other embodiments, the query is automatically updated, and, where appropriate, relative time queries, e.g., a query that specifies "last 15 minutes" are changed to absolute time queries, e.g., "2:07 pm, Sunday, Jul. 14, 2019, to 2:22 pm, Sunday, Jul. 14, 2019." In some implementations, this changing of the query is shown by a visual indicator, e.g., a box pop-up over the query, or an expandable exclamation point.

In some cases, by showing query results of a set of data that is different from the set of data indicated by the query shown in the panel view can reduce the amount of processing done by the data intake and query system. For example, each query can require significant time and compute resources to complete. As such, if a query is executed each time a panel is accessed, the data intake and query system may execute a significant number of queries thereby slowing other queries and/or using compute resources. By accessing and displaying query results from a different time range, the amount of compute resources used to execute queries can be significantly reduced. Furthermore, the query results can be shown in the panel view in much less time.

Fewer, more, or different blocks can be used as part of the routine 2400. In some embodiments, the UI data manager 1610 obtain other query results corresponding to other time ranges. For example, a particular query may have been executed three times. In some such cases, the UI data manager 1610 can access and display the query results for each time the query was executed. As such, query results corresponding to different time ranges than the time range indicated by a query can be displayed. In some embodiments, any one or any combination of the blocks described herein with reference to FIG. 24B can be combined or used in combination with any one or any combination of the blocks described herein with reference to FIG. 24A. Furthermore, it will be understood that the various blocks described herein with reference to FIG. 24A can be implemented in a variety of orders, or can be performed concurrently.

Figure 24B:
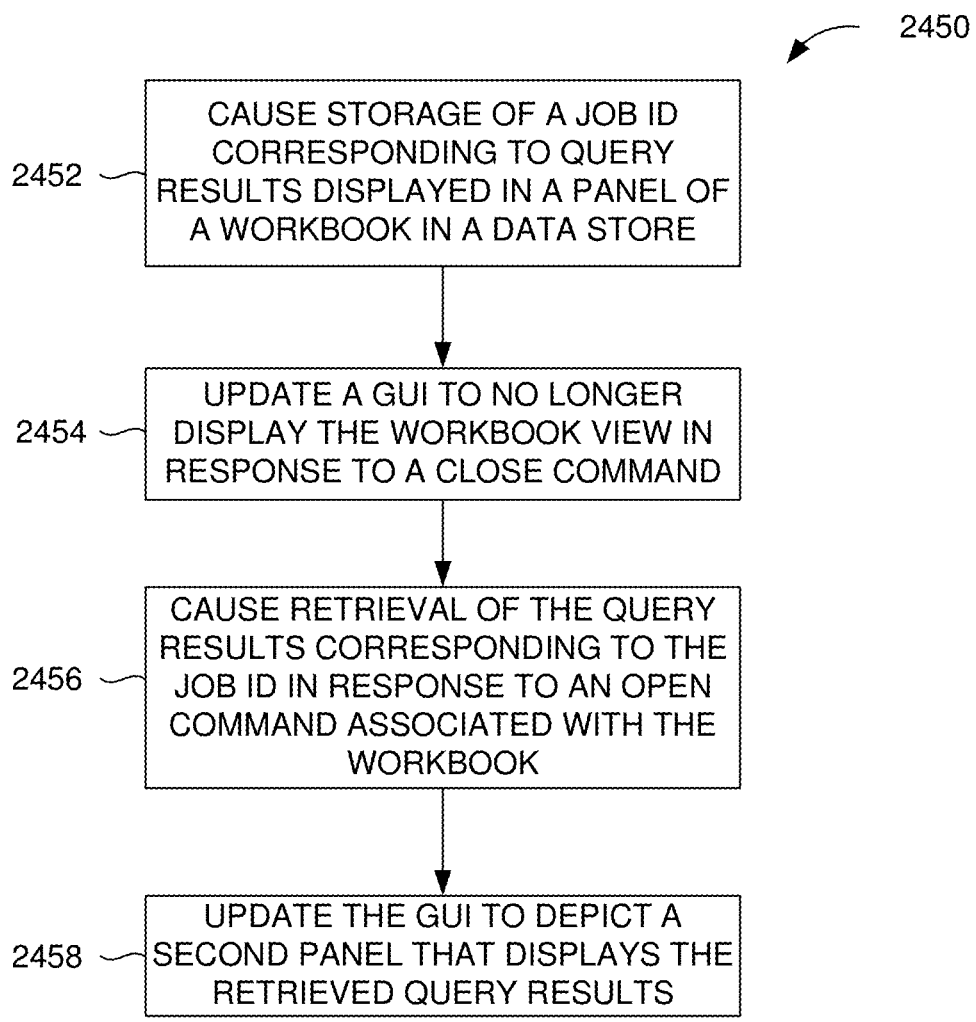
FIG. 24B is a flow diagram illustrative of an embodiment of a routine to open a previously-closed workbook in a manner such that the now-opened workbook depicts query results as depicted prior to the workbook being closed.

FIG. 24B is a flow diagram illustrative of an embodiment of a routine 2450 implemented by the client browser 1604 to open a previously-closed workbook in a manner such that the now-opened workbook depicts query results as depicted prior to the workbook being closed. Although described as being implemented by the client browser 1604, it will be understood that the elements outlined for routine 2450 can be implemented by one or more computing devices/components that are associated with the data intake and query system 108 or the query interface system 1608, such as, but not limited to, the UI data manager 1610. Thus, the following illustrative embodiment should not be construed as limiting.

At block 2452, the client browser 1604 causes the storage of a job ID corresponding to query results displayed in a panel view of a workbook view in a data store. For example, every time the panel and/or workbook corresponding to the panel and/or workbook views is modified or changes, the client browser 1604 can generate new or updated panel data and/or workbook data. In particular, if a new panel is added to the workbook and query results are received for the panel, the client browser 1604 can obtain the job ID corresponding to the query results and store the job ID in the workbook data associated with the workbook (e.g., in panel data associated with the workbook). The client browser 1604 can then communicate with the UI data manager 1610 via the gateway 1615, indicating that the workbook has been updated and providing the updated workbook data. The UI data manager 1610 can then store the updated workbook data in the workbook data store 1614.

Alternatively, the client browser 1604 can simply provide the job ID and an indication of the panel associated with the job ID to the UI data manager 1610. The UI data manager 1610 can then store the job ID in the workbook data store 1614 in association with the workbook and panel or can retrieve the workbook data from the workbook data store 1614, update the workbook data to include the job ID, and store the updated workbook data in the workbook data store 1614. In other implementations, client browser 1604 may have cached some or all of the various elements of the workbook, and may only need to fetch updated data, or updated assets.

At block 2454, the client browser 1604 updates the GUI to no longer display the workbook view in response to a close command. For example, the user may have provided a command to close the workbook, the user may have closed the client browser 1604, the client browser 1604 may have crashed and restarted, etc.

At block 2456, the client browser 1604 causes retrieval of the query results corresponding to the job ID in response to an open command associated with the workbook. For example, the user may have provided a command to open the workbook. In response, the client browser 1604 can instruct the UI data manager 1610 via the gateway 1615 to retrieve the workbook data associated with the workbook from the workbook data store 1614. The workbook data may indicate that the query results displayed in a panel view are referenced by the job ID. Thus, the UI data manager 1610 can request the data intake and query system 108 to provide query results corresponding to the job ID. The UI data manager 1610 can then communicate the workbook data and/or the query results received from the data intake and query system 108 to the client browser 1604 via the gateway 1615.

In some embodiments, the client browser 1604 includes a cache in which query results and/or associated data (e.g., query results identifiers) are stored when received from the UI data manager 1610 via the gateway 1615. If a workbook is closed and then re-opened without the client browser 1604 also being closed, the query results and/or associated data may still be stored in the client browser 1604 cache. Thus, the client browser 1604 can simply retrieve the query results corresponding to the job ID from the cache rather than via the UI data manager 1610.

At block 2458, the client browser 1604 updates the GUI to depict a second panel view that displays a query of the panel and the obtained query results. For example, the second panel view may be the same as the panel view that was present before the workbook was closed. Both the panel view (before the workbook was closed) and the second panel view (when the workbook was reopened) may depict the same query results. However, the query shown in the panel view may indicate a set of data that is different from the set of data used to generate the query results. For example, the query may indicate that the query results are to be based on data within the past thirty minutes, but the query results may be based on data from the day before or from five or eight hours before.

In some embodiments, the user can provide an instruction to re-run the query shown in the panel view after the workbook is reopened. Thus, the client browser 1604 can perform the operations described herein to request that the query be executed, obtain updated query results, and render and display the updated query results.

Fewer, more, or different blocks can be used as part of the routine 2450. For example, the client browser 1604 can cause the retrieval of other query results corresponding to other job IDs for inclusion in other panels of the workbook. In some cases, one or more blocks can be omitted. Furthermore, it will be understood that the various blocks described herein with reference to FIG. 24B can be implemented in a variety of orders, or can be performed concurrently.

5.8.3. Concurrently Displaying Query Results from Different Queries

FIG. 25 is a flow diagram illustrative of an embodiment of a routine 2500 implemented by the client browser 1604 to concurrently display query results from two different queries in the same page. Although described as being implemented by the client browser 1604, it will be understood that the elements outlined for routine 2500 can be implemented by one or more computing devices/components that are associated with the data intake and query system 108 or the query interface system 1608, such as, but not limited to, the UI data manager 1610. Thus, the following illustrative embodiment should not be construed as limiting.

At block 2502, the client browser 1604 causes display of, in a first area of a GUI, a first user interface field for editing a first query that identifies a first set of data. For example, the first query can reference a particular set of data. The first user interface field can be a text field, such as the text field 1706, in which a user can edit or modify a query depicted therein. In some embodiments, the first area of the GUI can be a panel view associated with a panel.

At block 2504, the client browser 1604 causes display of first query results in the first area in response to execution of the first query. For example, the client browser 1604 can communicate a request to the UI data manager 1610 via the gateway 1615 to execute the first query. As a result, the UI data manager 1610 can instruct the data intake and query system 108 to execute the first query, returning the query results to the UI data manager 1610. The UI data manager 1610 can then forward the query results to the client browser 1604 via the gateway 1615. Alternatively, the client browser 1604 can communicate the request directly to the data intake and query system 108 via the network 208, and the data intake and query system 108 can return the query results to the client browser 1604.

In some embodiments, the client browser 1604 renders and displays the query results once received. The first query results can be displayed in the first area because the first query results are generated as a result of the first query, which is associated with the first area. For a non-limiting example provided for illustrative purposes only, referring to FIG. 18, the first query results, e.g., shown in table 1707, may be shown in panel view 1707 of workbook view 1800.

At block 2506, the client browser 1604 causes display of, in a second area of a GUI, a second user interface field for editing a second query that identifies a second set of data. For example, the second query can reference a particular set of data that is different than the set of data referenced by the first query. Thus, the first and second queries can be independent, unrelated queries. The second user interface field can be a text field, such as the text field 1906, in which a user can edit or modify a query depicted therein. In some embodiments, the second area of the GUI can be located above or below the first area and can be a panel view associated with a second panel. For a non-limiting example provided for illustrative purposes only, referring to FIG. 18, the second panel may correspond to panel 1801 of workbook view 1800.

At block 2508, the client browser 1604 causes display of second query results in the second area in response to execution of the second query. For example, the client browser 1604 can communicate a request to the UI data manager 1610 via the gateway 1615 to execute the second query. As a result, the UI data manager 1610 can instruct the data intake and query system 108 to execute the second query, returning the query results to the UI data manager 1610. The UI data manager 1610 can then forward the query results to the client browser 1604 via the gateway 1615. Alternatively, the client browser 1604 can communicate the request directly to the data intake and query system 108 via the network 208, and the data intake and query system 108 can return the query results to the client browser 1604.

In some embodiments, the client browser 1604 renders and displays the query results once received. The second query results can be displayed in the second area and not the first area because the second query results are generated as a result of the second query, which is associated with the second area. While the first area and the second area may be different areas, both areas may be included within the same workbook view, as shown in a non-limiting, illustrative example in FIG. 18. Thus, a user can open one workbook to view both areas. The two areas can also be displayed on the same page rather than in different tabs. Additionally, the two areas can share efficiencies on the back-end, such as fewer communications back to the query interface system 1608 and/or the data intake and query system 108, which would not be possible if they were running in different tabs or different instances (or both) of client browser 1604.

Fewer, more, or different blocks can be used as part of the routine 2500. For example, the client browser 1604 can reorder the display of the first area and the second area in response to a user command In some cases, one or more blocks can be omitted. Furthermore, it will be understood that the various blocks described herein with reference to FIG. 25 can be implemented in a variety of orders, or can be performed concurrently.

5.8.4. Generating Query Results for an Investigation Assistant View

Figure 26:
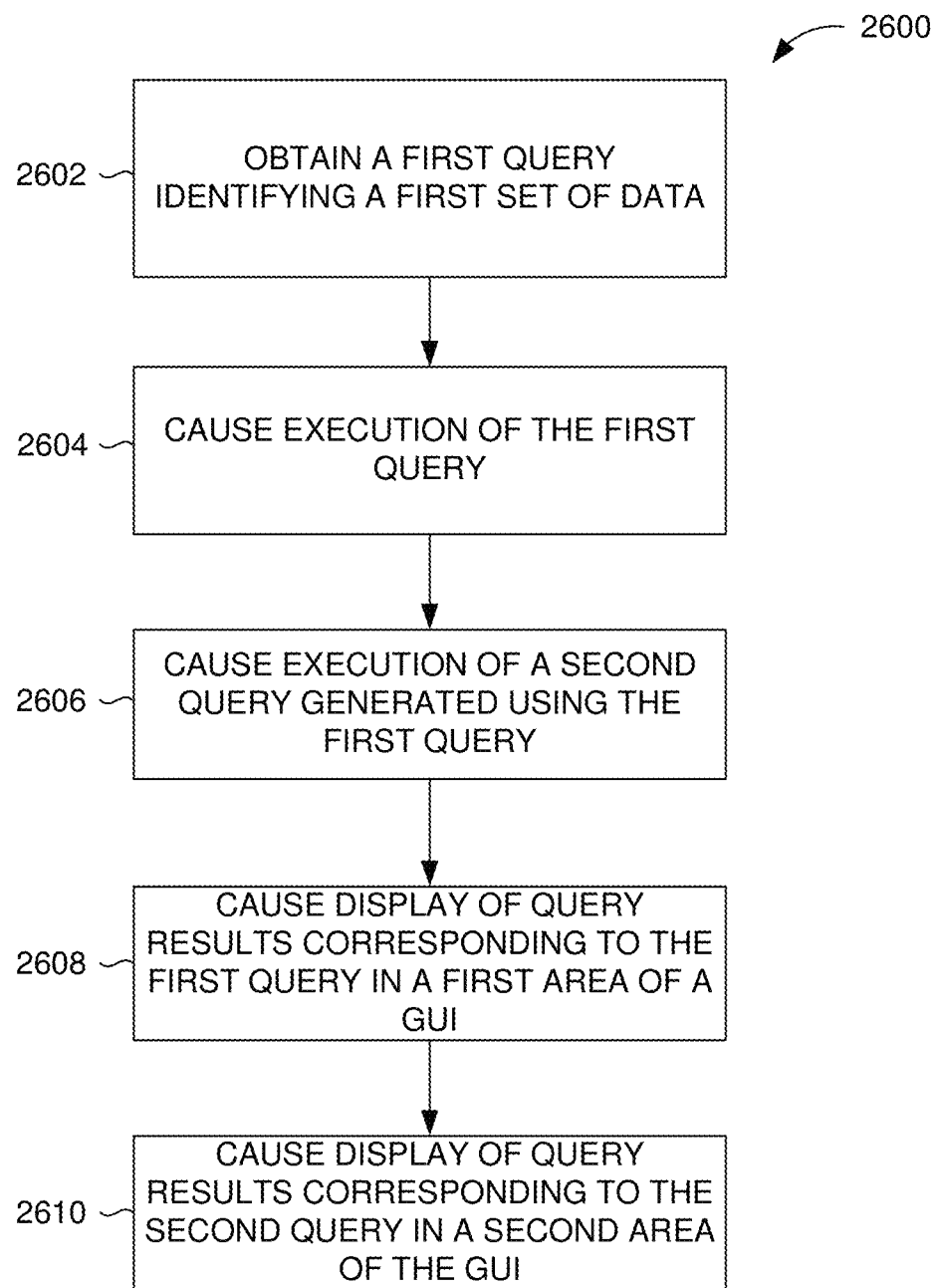
FIG. 26 is a flow diagram illustrative of an embodiment of a routine to generate an investigation assistant view for display.

FIG. 26 is a flow diagram illustrative of an embodiment of a routine 2600 implemented by the UI data manager 1610 to generate an investigation assistant view for display. Although described as being implemented by the UI data manager 1610, it will be understood that the elements outlined for routine 2600 can be implemented by one or more computing devices/components that are associated with the data intake and query system 108 or the client browser 1604. Thus, the following illustrative embodiment should not be construed as limiting.

At block 2602, the UI data manager 1610 obtains a first query identifying a first set of data. The first query may be entered or selected by a user and be associated with a panel of a workbook. The first query may be considered a parent query. In some embodiments, the UI data manager 1610 obtains the first query in response to a request communicated by the client browser 1604 via the gateway 1615.

At block 2604, the UI data manager 1610 causes execution of the first query. For example, the UI data manager 1610 can instruct the data intake and query system 108 to execute the first query. In response, the data intake and query system 108 can execute the first query and return to the UI data manager 1610 the first query results and a job ID corresponding to the first query results.

At block 2606, the UI data manager 1610 causes execution of a second query generated using the first query. For example, the UI data manager 1610 can generate a query parameter requesting an extraction of one or more fields present in the first set of data identified by the first query, communicating the query parameter to the data intake and query system 108. In response, the data intake and query system 108 can extract one or more fields and provide the extracted fields to the UI data manager 1610. The UI data manager 1610 can select a query for one of the extracted fields, such as the query most often requested for the extracted field, and prepend a query command and/or the query results identifier (e.g., job ID) corresponding to the first query results to the selected query to form the second query. The UI data manager 1610 can then instruct the data intake and query system 108 to execute the second query. In response, the data intake and query system 108 can execute the second query and return to the UI data manager 1610 the second query results.

In some embodiments, the second query is generated without any user interactions. For example, while the user may enter or select the first query, the user may not enter or select the second query. Rather, the UI data manager 1610 can automatically generate and cause execution of the second query once the user enters or selects the first query.

At block 2608, the UI data manager 1610 causes display of query results corresponding to the first query in a first area of a GUI. For example, the UI data manager 1610 can forward the query results corresponding to the first query to the client browser 1604, which causes the client browser 1604 to render and display the query results in the first area. In some embodiments, the first area can be a panel view associated with a panel of a workbook. For a non-limiting example with reference to FIG. 19, the first area can be panel view 1701 associated with a panel of a workbook associated with workbook view 1901.

At block 2610, the UI data manager 1610 causes display of query results corresponding to the second query in a second area of the GUI. For example, the UI data manager 1610 can forward the query results corresponding to the second query to the client browser 1604, which causes the client browser 1604 to render and display the query results in the second area. In some embodiments, the second area can be a portion of an investigation assistant view associated with a particular extracted field, where the investigation assistant view is associated with the first area (e.g., associated with the panel in the workbook and/or the panel view associated with the panel in the workbook). In certain embodiments, the first area and the second area are positioned in the GUI such that both areas can be displayed concurrently, for a non-limiting example with reference to FIG. 19, the panel assistant view 1703 may be shown concurrently with panel view 1701 corresponding to the first area and panel view 1901 corresponding to the second area.

Fewer, more, or different blocks can be used as part of the routine 2600. For example, the UI data manager 1610 can cause the display of a list of extracted fields in the GUI (e.g., in the investigation assistant view). In some cases, one or more blocks can be omitted. Furthermore, it will be understood that the various blocks described herein with reference to FIG. 26 can be implemented in a variety of orders, or can be performed concurrently.

5.8.5. Executing a Child Query

FIG. 27 is a flow diagram illustrative of an embodiment of a routine 2700 implemented by the UI data manager 1610 to cause display of query results generated from multiple, related queries. Although described as being implemented by the UI data manager 1610, it will be understood that the elements outlined for routine 2700 can be implemented by one or more computing devices/components that are associated with the data intake and query system 108 or the client browser 1604. Thus, the following illustrative embodiment should not be construed as limiting.

At block 2702, the UI data manager 1610 obtains a child query. The child query can be selected or entered by a user and may be a child of a parent query associated with a panel that currently exists in a workbook. In some embodiments, the UI data manager 1610 obtains the child query in response to a request communicated by the client browser 1604 via the gateway 1615.

At block 2704, the UI data manager 1610 associates an identifier corresponding to query results of a parent query with the child query. For example, the identifier can be a job ID. The UI data manager 1610 can associate the job ID and the child query by prepending the job ID to the child query. In some embodiments, the UI data manager 1610 also prepends a query command to the job ID and the child query.

In some embodiments, the UI data manager 1610 can associate the identifier with the child query in place of associating the parent query with the child query. For example, instead of prepending the parent query to the child query—which would result in the data intake and query system 108 executing both the parent query and the child query—the UI data manager 1610 can prepend the identifier to the child query, which would result in the data intake and query system 108 only executing the child query.

At block 2706, the UI data manager 1610 communicates the child query and the identifier to a data intake and query system for execution. For example, the UI data manager 1610 can communicate the child query and the identifier to the data intake and query system 108 as a single query in which the child query is appended to the identifier.

At block 2708, the UI data manager 1610 causes display of query results of the child query generated using the child query and the identifier. For example, the data intake and query system 108 can execute the query formed from prepending a query command and/or the identifier to the child query, and return query results to the client browser 1604. The client browser 1604 can then render and display the query results in a second panel view in the workbook view, where the second panel view is depicted below the panel view associated with the parent query. For a non-limiting example with reference to FIG. 20, panel view associated with the parent query may be panel view 1701 of workbook view 2000, and the second panel view in the workbook view may be panel view 2001 of workbook view 2000.

Fewer, more, or different blocks can be used as part of the routine 2700. For example, the UI data manager 1610 can obtain the identifier from the client browser 1604 and/or the workbook data store 1614. In some cases, one or more blocks can be omitted. Furthermore, it will be understood that the various blocks described herein with reference to FIG. 27 can be implemented in a variety of orders, or can be performed concurrently.

5.8.6. Generating Panels Based on Interactions with a Display Object

Figure 28:
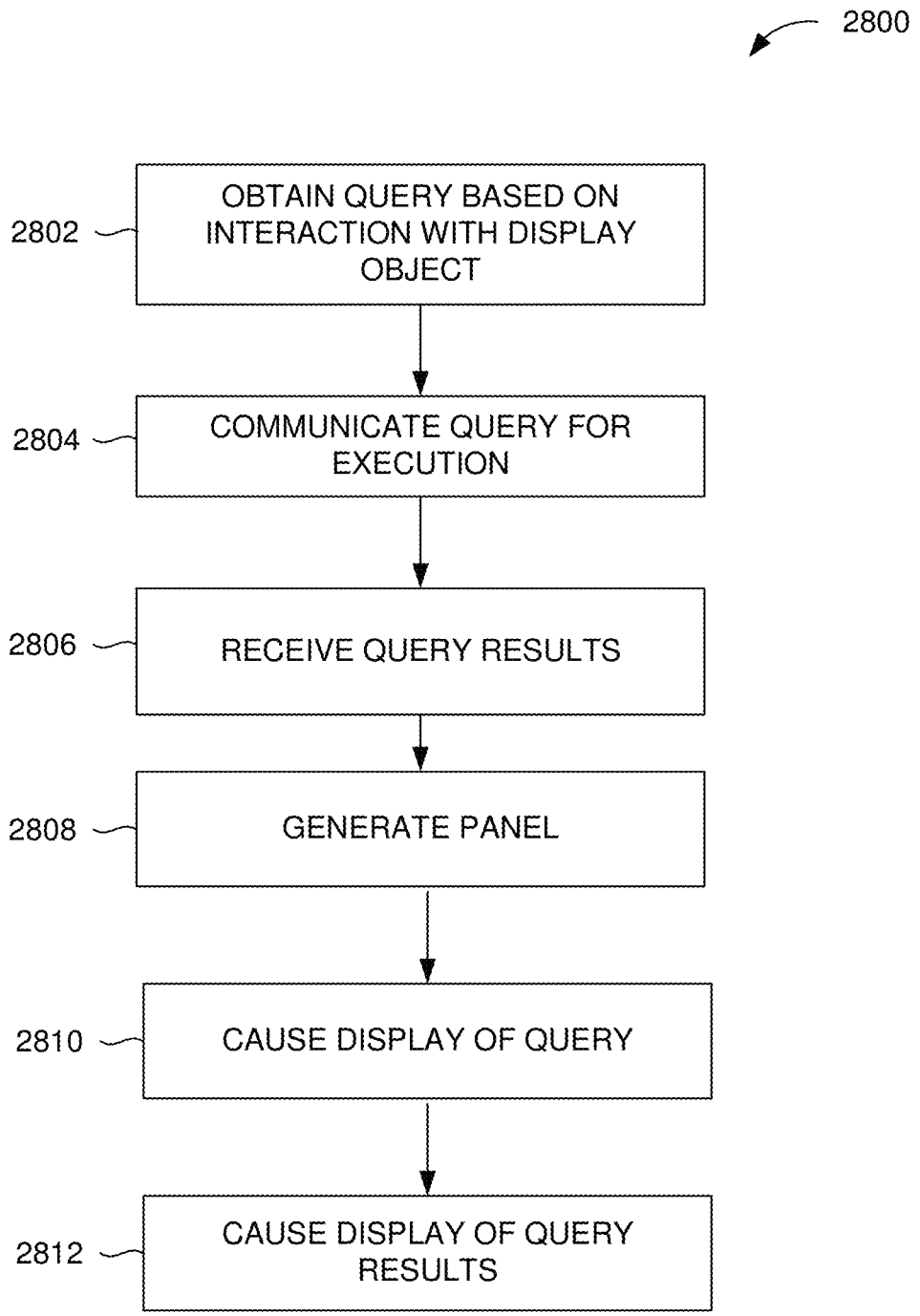
FIG. 28 is a flow diagram illustrative of an embodiment of a routine to generate a panel of a workbook based on one or more interactions with a graphical user interface.

FIG. 28 is a flow diagram illustrative of an embodiment of a routine 2800 implemented by the UI data manager 1610 to generate a panel of a workbook based on one or more interactions with a graphical user interface. Although described as being implemented by the UI data manager

1610, it will be understood that the elements outlined for routine 2300 can be implemented by one or more computing devices/components that are associated with the data intake and query system 108 or the query interface system 1608, such as, but not limited to, the client browser 1604. Thus, the following illustrative embodiment should not be construed as limiting.

At block 2802, the UI data manager 1610 obtains a query. In some cases, the UI data manager 1610 obtains a query based on an interaction with a display object of a graphical user interface. The interaction can correspond to a user clicking on, hovering over, pointing to, or otherwise selecting the display object of the graphical user interface.

In some embodiments, UI data manager 1610 obtains the query by generating a query. For example, based on the selected display object, the UI data manager 1610 may use information associated with the display object, such as the name or identifier of a dataset associated with a display object 2202 as shown in FIG. 22, to generate the query. In some such embodiments, the generated query may include the information associated with the display object. For example, if the display object is associated with a dataset, the generated query may include a query command to obtain data from the dataset.

In some cases, the UI data manager 1610 can generate multiple queries. In some cases, the generated queries can be related to each other, such as in a parent-child relationship as described herein. In some such embodiments, a second query can process the results of the first query to identify additional information about a set of data identified by the first query. For example, a first query can obtain a certain number of events from a dataset and a second query can perform one or more statistical functions on the events. As another example, an additional query may identify fields or keywords in the events or determine averages, standard deviations, etc. of the events. In certain embodiments, an additional query can identify a minimum or maximum of the events that result from the first query, etc. Additional queries can be generated as desired.

In certain embodiments, the UI data manager 1610 obtains the query by retrieving or accessing an already existing query. For example, based on the selected display object, the UI data manager 1610 may use information associated with the display object, to identify a query that is to be executed, such as a query associated with the display object 2202M, 2202N as shown in FIG. 22. In some such embodiments, the UI data manager 1610 can execute the identified query, a portion of the identified query, or generate one or more queries from the identified query. For example, the UI data manager 1610 may execute different portions of the query separately and display the results of each portion separately. In some such cases, each portion of the query can be associated with a different panel, which can be related in a parent-child relationship, as described herein.

In some cases, the UI data manager 1610 obtains the query based on a type of dataset associated with the display object. For example, the display object can be associated with a dataset. As described herein, there can be different types of datasets, such as, but not limited to, index (or partition), view/saved search, lookup, collections, metrics interactions, action service, interactions, four hexagonal coordinate systems, etc. As such, the data manager 1610 can obtain the query differently depending on the dataset type. For example, if the dataset associated with the display object is an index or metrics type, the data manager 1610 may generate the query. As another example, if the dataset associated with the display object is a view dataset type, the data manager 1610 may use the query that is associated with the dataset. Similarly, for some of the dataset types, the UI data manager 1610 can generate a query and for others, the UI data manager 1610 can obtain a pre-existing query.

In cases where the UI data manager 1610 generates a query, it can generate the query based on the dataset type. For example, for some dataset types, the generated query may include a query command to retrieve a particular number of events or data within a particular time range. For other dataset types, the generated query may include a query command to provide certain statistics, about the dataset or about certain events from the dataset, etc. Accordingly, it will be understood that the UI data manager 1610 can obtain the query in a variety of ways.

At block 2804, the UI data manager 1610 communicates the query for execution. In some cases, the UI data manager 1610 communicates the query to a data intake and query system 108 for execution. As described herein, the data intake and query system 108 can process and execute queries for different types of data stored in different locations. In some embodiments, the UI data manager 1610 can be implemented in a system that is separate from the data intake and query system 108. In certain embodiments, the UI data manager 1610 can form part of the data intake and query system 108. In either case, the UI data manager 1610 can communicate the query to a component of the data intake and query system 108 that can process and/or execute the query. In some embodiments, the UI data manager 1610 can execute the query itself.

At block 2806, the UI data manager 1610 receives query results. For example, the UI data manager 1610 can receive the query results from the data intake and query system 108. As described herein, based on a query, the data intake and query system 108 can generate results. The results can include data from a dataset and/or results of processing data from a dataset. Moreover, based on a search processing language, the query can indicate the amount and type of results to be returned.

At block 2808, the UI data manager 1610 generates a panel of a workbook. As described herein, a panel can provide a logical association between a query and one or more data artefacts. The panel can be stored in a data store and include the query and/or other data artefacts, such as, but not limited to query results, display objects, files, annotations, images, query result identifiers, an identification of a workbook with which the panel is associated, a panel identifier, and/or an identification of one or more panels associated with the panel (or its corresponding workbook). In certain embodiments, the panel can include JSON formatted text to identify the query and/or data artefacts associated with the query. In some embodiments, generating the panel can include saving the panel in a data store with the generated query.

In embodiments where multiple queries are generated, the UI data manager 1610 may generate a separate panel for each query and/or associate the different queries as part of the same workbook. In certain embodiments, selection of a display object may result in a panel being added to an already-existing workbook that includes one or more other panels and queries associated with the one or more other panels, etc.

At block 2810, the UI data manager 1610 causes the client browser 1604 to display the query. In some cases, the UI data manager 1610 can cause display of the query in a user interface field of a graphical user interface. In certain embodiments, the UI data manager 1610 can cause display of the query in an area of the graphical user interface that is associated with the generated panel, for a non-limiting example with reference to FIG. 17A, the query may be shown in user interface field 1706.

The graphical user interface can be the same or different from the graphical user interface described herein with reference to block 2802. For example, based on the selection of the display object, the UI data manager 1610 can cause the query to be displayed on the same graphical user interface as the display object described in block 2802. In some such cases, the query can be displayed in a different area of the graphical user interface than the display object and/or replace the display object. As another example, based on the selection of the display object, the UI data manager 1610 can cause the display of a second graphical user interface, such as a different webpage, etc.

In certain embodiments, the query can be displayed in a user interface field that enables a user to edit the query. For example, a user may want to add query parameters, such as system or user query parameters to obtain additional query results, etc.

In some cases, the query can be displayed in a graphical user interface that includes one or more additional queries. For example, in some cases, the generated panel (and query) can be associated with other panels of a workbook and displayed with the queries associated with the different panels. As another example, based on the selection of the display object, the UI data manager 1610 may generate multiple queries associated with the same or different panels and display the different queries on the graphical user interface or as part of the same workbook. In some cases, the multiple queries (and their corresponding panels) can be related to each other. For example, one query may process the results of another query, thereby forming a parent-child relationship as described herein.

At block 2812, the UI data manager 1610 causes the client browser 1604 to display the results of the query. In some cases, the UI data manager 1610 causes the client browser 1604 to use a display object to display the results. For example, the client browser 1604 can use a table, pie chart, bar chart, scatter plot, etc. to display the results. In certain embodiments, the UI data manager 1610 causes the client browser 1604 to display the results as text. In certain embodiments, the UI data manager 1610 displays the query results in an area associated with the generated panel. Further, in embodiments, where multiple queries and/or panels are generated, the UI data manager 1610 can cause display of the results of each of the generated queries.

As described herein, in certain embodiments, where the UI data manager 1610 obtains an already created query, the UI data manager 1610 may break up the query into different parts and may execute the different parts separately. For example, the UI data manager 1610 may generate a panel for each portion of the query and display the results of the corresponding query in a panel view. In this way, the UI data manager 1610 can cause display of the results of the queries at different locations, thereby enabling a user to see the results generated by the different portions of the query. Accordingly, it will be understood that the query or queries can be displayed in a variety of ways.

Fewer, more, or different blocks can be used as part of the routine 2800. In some cases, one or more blocks can be omitted. In certain embodiments, the UI data manager 1610 can generate multiple queries and/or multiple panels and display the multiple queries, results of the queries, and/or panels in the user interface. In some cases, block 2808 may be omitted. For example, the UI data manager 1610 may determine that the obtained query is similar to or the same as a query that is already associated with a panel. In some such embodiments, rather than generating a panel, the UI data manager 1610 can access the already-existing panel.

In some cases, by accessing an already-existing panel, the UI data manager 1610 can cause the query to be re-executed. In certain embodiments, as described herein, rather than re-executing the query, the UI data manager 1610 (or data intake and query system 108) can retrieve previous results of the query and display the previous results in the panel. In this way, by using previous results instead of re-executing the query, the UI data manager 1610 can conserver compute resources. In some cases, the UI data manager 1610 can determine whether to re-execute the query or to use the previous results based on an amount of time that has elapsed since the query was executed. If the most recent query execution time satisfies a timing threshold, the UI data manager 1610 can have the query re-executed. If not, the UI data manager 1610 can use the previous results. In some such cases, the UI data manager 1610 may omit blocks 2806 and/or 2810. In certain cases, the data intake and query system 108 can determine whether to re-execute the query based on the timing threshold. For example, the data intake and query system 108. In some such cases, the UI data manager 1610 may communicate the query to the data intake and query system 108 for execution and receive results, but the results may correspond to a previous execution of the query.

In certain embodiments where multiple queries are generated, some results of some of the queries can be displayed to aid the user in exploring the data and/or generating additional queries, as described herein at least with reference to FIGS. 17A-17C. In addition, as a user edits the query, the UI data manager 1610 can provide query suggestions as described herein at least with reference to FIGS. 29A-29C and 30-35, etc. Moreover, as the user modifies the query or other data artefacts associated with the query, the changes to the panel can be saved. In certain embodiments, the UI data manager 1610 saves the changes without user interaction. Furthermore, it will be understood that the various blocks described herein with reference to FIG. 28 can be implemented in a variety of orders, or can be performed concurrently.

6.0. Query Recommendations

Given the amount of data ingested by the data intake and query system and the myriad of ways in which the data can be identified, searched, and processed, it can be difficult for a user to know where to begin. In addition, some users of the data intake and query system may be unfamiliar with the architecture of the data intake and query system or the query language used to query the data. These obstacles can make it difficult for a user to obtain meaningful insights from the data.

To aid users in understanding and querying the data accessible by the data intake and query system 108, a recommendation system 1617 can provide recommendations to a user regarding query parameters that can be included in the query. In some embodiments, the recommendation system 1617 can form part of the data intake and query system 108, part of the application system 1617, and or be instantiated separately. Further, the recommendation system 1617 can be implemented on a computing device, server, or in an isolated execution environment, etc. In the illustrated embodiment of FIG. 16, the recommendation system 1617 is shown as a part of the application system 1608. However, it will be understood that the recommendation system 1617 can be part of the data intake and query system 108 or separate from the application system 1608 and the data intake and query system 108.

The recommendations can include datasets identifiers, data field identifiers (or field-value pairs), keywords, query commands, grammatical or syntactical corrections, and/or query templates that include at least one query parameter and one or more query parameter placeholders (non-limiting examples: placeholder for a dataset identifier, field identifier, or keyword, etc. By providing recommendations to a user, the system 108 can improve the accessibility of the data and reduce the number of queries being executed, thereby reducing the processing demands on the data intake and query system 108. In this way, the recommendation system 1617 can improve the functioning of a distributed processing system.

The query recommendations can be determined in a variety of ways. In some cases, the recommendations can be determined based on the query parameters of a current query (e.g., the query being typed) or one or more previous queries by the user or other users (from the same or a different tenant). In certain cases, the recommendations can be based on queries generated and executed by the data intake and query system 108 or the results of those queries. In some embodiments, the recommendations can be based on information obtained from the metadata catalog 221, data store catalog 220 or acceleration data store 222. In certain cases, the query recommendations can be based on a personalized vocabulary of the user or tenant. The personalized vocabulary can be based on previous searches by the user, datasets to which the user has access, and/or query parameters that are already included in the query, etc.

6.1. Personalized Recommendations

Figure 29A:
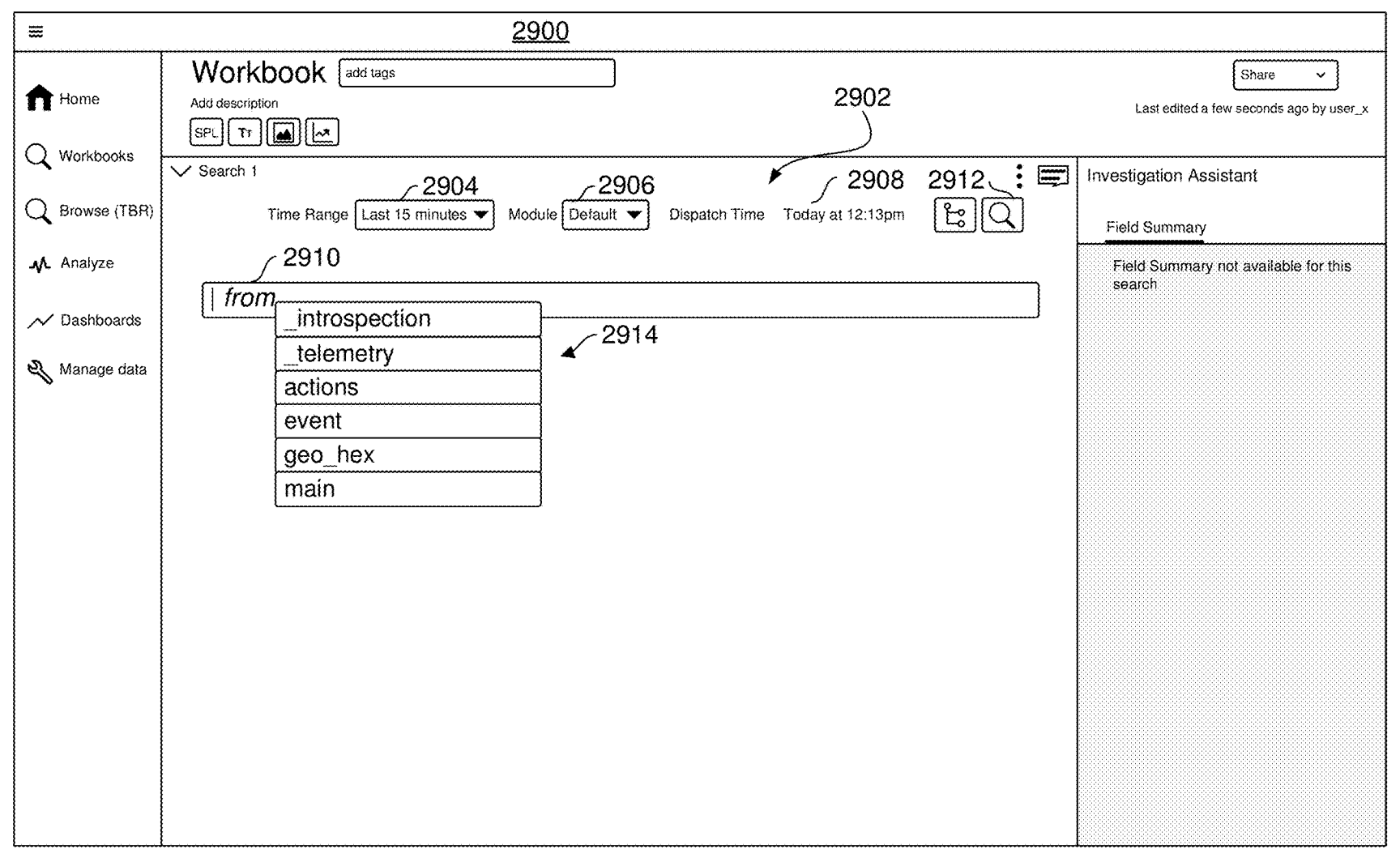
Figure 29B:
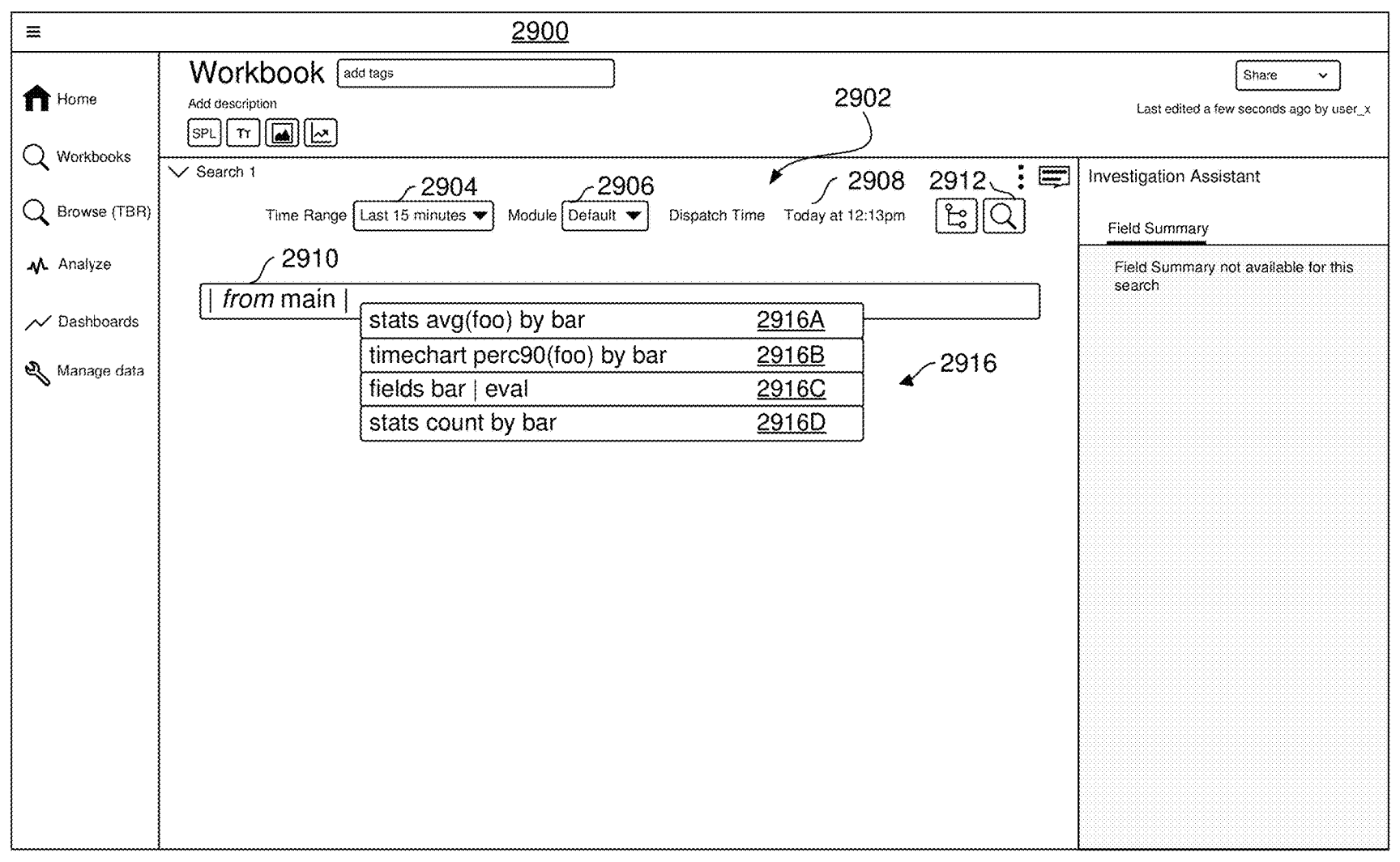
Figure 29C:
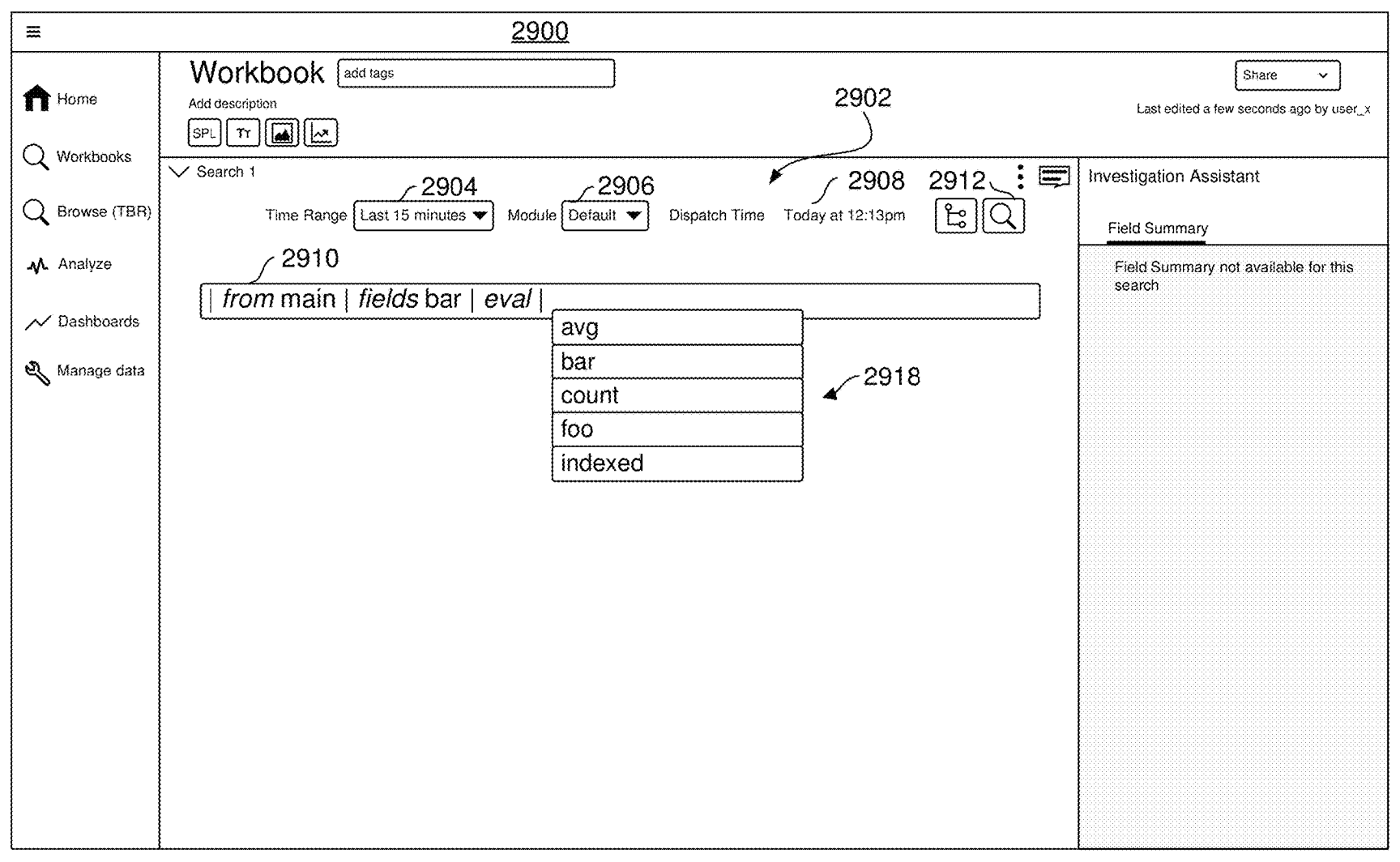

FIGS. 29A-29C are interface diagrams illustrating embodiments of a graphical user interface ("GUI") 2900 for providing query recommendations.

In the illustrated embodiments, the graphical user interface 2900 includes various display objects for analyzing data, including an area 2902 associated with a panel. Within the area 2902 associated with the panel, the GUI 2900 includes one or more display objects for editing filter criteria and query control information. For example, the GUI 2900 includes a time range display object 2904 to indicate a range of time to be searched, a module display object 2906 to indicate a dataset association record associated with the query and a dispatch time display object 2908 to indicate when the query is to be executed. In addition, the GUI 2900 includes a user interface field 2910 for editing a query, such as adding query parameters to the user interface field or modifying query parameters that are already displayed. Using the user interface field 2910, a user can enter query parameters, modify query parameters, and/or delete query parameters. When a user is ready to execute the query, the user can interact with the query execution display object 2912. Following execution, the query results can be displayed within the area 2902 or an expanded area. In addition, in some cases, query results associated with additional query commands can be displayed in a second area.

As desired, a user can interact with the GUI 2900 to generate another panel and the GUI 2900 can be updated to include another area associated with the second panel. The user can use the second panel to edit additional queries. The additional queries can be related to the first query (e.g., parent-child such that the child query adds one or more query commands to the parent query) or be independent of the first query (non-limiting example: identifies different data to be searched and processed).

With continued reference to FIGS. 29A-29C, as a user edits a query, a recommendation system 1617 can provide one or more recommendations to the user for the query. In some cases, the recommendation system 1617 can recommend one or more query parameters for inclusion in the query. For example, the recommendation system 1617 can recommend one or more datasets, query commands, fields, keywords, or query templates for inclusion in the query. As mentioned the recommendations can be based on what query parameters have been entered, historical information of the user, queries executed by other users, queries generated/executed as the query is being formed, etc., query parameter syntax and semantics, etc.

In some cases, as part of providing recommendations, the recommendation system 1617 can identify one or more query parameters to use to identify and provide recommendations (also referred herein as a token query parameter). For example, if an entered query includes ten query parameters, the recommendation system 1617 can select one or more of the query parameters as the token query parameter and provide recommendations based on the token query parameter. In certain embodiments, the token query parameter can be the last query parameter entered by the user, the last query parameter in a sequence of query parameters, a query parameter that the user is actively typing, or any other query parameter in the query. Furthermore, the token query parameter can be a system query parameter, which can be defined by the data intake and query system 108 and/or maintain its meaning across some or all tenants and users, or a user query parameter, which may be defined by the user or the tenant data as described in greater detail below.

In some cases, as part of providing recommendations, the recommendation system 1617 can determine what type of query parameter to recommend. For example, depending on the semantics or syntax associated with a token query parameter or the semantics or syntax of the query, the recommendation system 1617 can determine whether to recommend a dataset, query command, field, query template, or a combination thereof, etc. The recommendation system 1617 can determine the relevant semantics and syntax based on previous queries, based on a known syntax of the token query parameter, other information entered by the user, or a combination thereof. For example, the syntax of one query command (non-limiting example: "from") may dictate that a dataset identifier is the proximate query parameter. Based on the determined syntax, the recommendation system 1617 may only recommend datasets. In some implementations, the recommendation system 1617 may filter the list of datasets to only those to which the user has access. Similarly, the syntax of other query commands can indicate that particular types of query parameters are to follow it. For example, in some cases, the syntax of a "by" command, may indicate that only fields or keywords are to follow it. Based on the determined syntax, the recommendation system 1617 can only recommend fields and keywords. Similarly, based on the syntax or structure of previous queries, the recommendation system 1617 can determine that a query command typically follows the query parameter "|," (pipe, or vertical bar, which in some embodiments may be used as an inter-process communication mechanism) and make appropriate recommendations of query commands In some cases, the recommendation system 1617 can use the type of the query parameter to be suggested to filter the possible recommendations. For example, if the recommendation system 1617 determines that a dataset is to be recommended, it can filter out query parameters that are not datasets (e.g., filter out query commands, fields, keywords, etc.) from a list of possible recommendations. Accordingly, the recommendation system 1617 can use query language syntax and semantics to determine recommendations for a user.

In addition to using the type of query parameter and/or the query parameter syntax, the query system can identify query parameters to be recommended based on a variety of factors, including but not limited to, data set association records, access control or authorization information, current query parameters, historical information, generated queries, previous queries, etc.

Dataset Association Records

As described herein, dataset association records can identify associated datasets, rules, etc. Accordingly, if the user identifies a particular dataset association record for the query, then the recommendation system 1617 can use the dataset association record to identify query parameters to be recommended. For example, the recommendation system 1617 can obtain and parse the dataset association record to identify datasets, rules, fields, or other parameters that are associated via the dataset association record.

Authorization Information

As described herein, different users have access to different datasets associated with various tenants, etc. Specifically, in some implementations, a user may have access to a particular tenant, but may not have access to all datasets associated with that tenant. Accordingly, the recommendation system 1617 can use the authorizations for a particular user to identify which query parameters can be recommended to the user. For example, if a user is not authorized to access an index "confidential," the recommendation system 1617 can omit that dataset despite its frequency of use by other users from the same tenant, etc.

Current Query Parameters

As a user enters query parameters, the recommendation system 1617 can use those query parameters to recommend additional parameters. For example, with reference to FIG. 29B, the entered query has a query command "fields" followed by the query parameter "bar." Based on the query language syntax, the recommendation system 1617 determines that "bar" is a field in the dataset "main" Based on that information, the recommendation system 1617 can recommend "bar" as a query parameter at a later point in the query, as illustrated by FIG. 29C. Similarly, the recommendation system 1617 can monitor query parameters in a query to then recommend query parameters later on in the query.

Historical Information

As the user executes searches, the recommendation system 1617 can track various pieces of information including, but not limited to: the system query parameters and user query parameters used, the order of the query parameters, the structure of the queries, datasets accessed, fields used, query commands used, functions used, keywords used, etc. The recommendation system 1617 can use the historical information to determine which query parameters to recommend to the user. For example, if a user typically searches the dataset "main," then when the user enters a query command that is to be followed by a dataset identifier, the recommendation system 1617 can recommend the dataset "main" Similarly, historical information about the user can be used to provide recommendations for fields, query commands, functions, functions, keywords, etc. In addition, the historical information about the user can be used to rank or order the recommendations. For example, query parameters that are used more frequently or more recently can be ranked higher and/or displayed more prominently.

Similar to historical information about the user, the recommendation system 1617 can track information about users that are part of a group that includes the particular user, or track information about other users associated with a particular tenant to which the user is associated. In some cases, the recommendation system 1617 may implement an ordering policy, which uses a collective frequency of use of the query parameters, or recency of use of the query parameters, or some combination thereof, to identify and/or rank query parameters for recommendation to the user. In some cases, the ordering policy may consider the relationship of the other users to the user when ranking the various query parameters. As a non-limiting example, the ordering policy may assign weight to the various relationships of the other users to the user in the following order: commonality of frequency of use of various query parameters, other users that are members of a same group as the user, users that have access to and/or have used the same tenant, and users of the system that do not have access to the tenant have access to different tenant, etc. The recommendation system 1617 can use a similar ordering policy based on recency of use to provide recommendations to a user.

Generated Queries

As the user enters query parameters, the recommendation system 1617 can generate additional related queries, and have the data intake and query system 108 execute the generated additional related queries. These additional related queries can provide additional information about the datasets to be searched. For example, the generated additional related queries can be used to discover datasets available to the user, fields or keywords available in datasets, etc. This information then can be used to populate recommendations to the user as the user is entering in query parameters. In the previous description, the queries are transferred to the data intake and query system 108 for execution and the query results are stored by the data intake and query system 108, but in other implementations, the query results may be stored locally, e.g., in a browser cache of a browser used by the user, and these cached results may be used to execute/resolve the additional related queries, In certain embodiments, the recommendation system 1617 can generate one or more queries for execution by the data intake and query system 108 to determine how to personalize the query templates. For example, the recommendation system 1617 can generate a query to discover datasets associated with the user, fields of a dataset, keywords of a dataset, etc.

In some cases, the recommendation system 1617 can generate a query that returns a group of events associated with a particular dataset, and parse the events to identify one or more fields, values, key-value pairs, or keywords, that can be used to personalize the query templates. In certain embodiments, the recommendation system 1617 can generate a query that parses one or more inverted indexes or data models associated with a dataset to identifier one or more fields, keywords, etc., that can be used to personalize the query templates. In certain cases, the recommendation system 1617 can retrieve information about the user that is entering the query, or a dataset that has been entered into the query from the metadata catalog 221.

In certain embodiments, the recommendation system 1617 can generate one or more queries by appending one or more query commands to a displayed query (non-limiting example: add a query command to obtain a list of all detectable/detected field names from events of a particular dataset or index). In some embodiments, the recommendation system 1617 can generate one or more queries by using a token query parameter selected from the query parameters of the displayed query (non-limiting example: using a dataset identifier from the displayed query to generate a request to obtain data from the metadata catalog 221 or a query to an inverted index, etc.)

Previous Queries and Query Templates

In addition to using previous queries to generate historical information about users and tenants, the recommendation system 1617 can use previous queries by the users to generate query templates, which can then be recommended to users for inclusion in a query. In generating the query templates, the recommendation system 1617 can determine the structure of the templates based on previous queries by the user and/or other users. As described herein, as users enter queries, the recommendation system 1617 can parse the queries to determine their structure (e.g., identify system query parameters and user query parameters). The recommendation system 1617 can then remove one or more user query parameters and/or one or more system query parameters from the queries or replace them with placeholders to generate query templates. In certain embodiments, the recommendation system 1617 can generate query templates without using queries executed by the data intake and query system. For example, the recommendation system 1617 can enable a user to enter query templates or obtain query templates in some other way.

The recommendation system 1617 can determine which templates to include as a recommendation in a variety of ways. In some cases, the recommendation system 1617 can associate query templates with the user based on previous use of the query templates or based on the structure of previous queries by the user. In certain cases, the recommendation system 1617 can identify an origin of a query template, such as the tenant or user from which the query template was generated. If the current user matches the origin or if the user is working on data from the same tenant, the recommendation system 1617 can increase the weighting of the query template thereby increasing the likelihood that the query template will be recommended.

In certain cases, the recommendation system 1617 can determine which templates to include based on the similarity between the structure of the current query and the structure of the query templates. The recommendation system 1617 can increase the weighting of query templates that more closely match the current query. In certain embodiments, the recommendation system 1617 can weight query templates based on their frequency of use (e.g., frequency of use across all tenants, frequency of use across all users, frequency of use across a group of users, frequency by users of the tenant, frequency of the current user, etc.) or time of use. For example, query templates used more frequently by the user can receive a heavier weighting than query templates used by other users of the same tenant. Similarly, query templates used by users of the same tenant may receive a heavier weighting than query templates used by users of other tenants. As another example, queries used more recently in time can be weighted more heavily than query templates that were not used as recently.

The recommendation system 1617 iteratively provides recommendations to the user as the user enters a query. As mentioned, the type of query parameter to recommend can be based on the query syntax or query language semantics. For example, following the "from" query command, the recommendation system 1617 can determine that a dataset is to be recommended and provide a recommendation of different datasets that could be included in the query.

As described herein, the datasets recommended (and their order) can be based on an ordering policy that can use any one or any combination of: previous queries by the user or other users, historical information, query templates, queries generated by the recommendation system 1617 (e.g., to search the metadata catalog 221 and/or one or more dataset association records, etc.), etc.

Other Recommendations

In addition to recommending query parameters for inclusion in a query, the recommendation system 1617 can provide error correction and/or spelling corrections. In some cases, the recommendation system 1617 can compare a token query parameter with a table of query parameters, to determine whether the token query parameter is misspelled. For example, if the query includes the word "frmo," the recommendation system 1617 may recommend that it be replaced with the query command "from." The table of query parameters can, in some embodiments, include user query parameters that are that are part of the query being entered, but may have not been in previous queries. For example, based on the presence of a field identifier "userID" in a first portion of the query, it can be included or added to the table of query parameters (or stored elsewhere). As the user continues to enter additional query parameters, and types "usreID," the recommendation system 1617 can recommend that it be changed to "userID" based on the presence of "userID" in the earlier portion of the query.

Non-Limiting Examples

As a non-limiting example, consider the recommendations illustrated in FIGS. 29A-29C. In the illustrated embodiment of FIG. 29A, the recommendation system 1617 identifies the token query parameter as "from" based on its presence in the user interface field 2910. Based on the determined syntax of the query parameter "from," the recommendation system 1617 provides a list of dataset identifiers 2914 for inclusion in the query. In an implementation, the list of dataset identifiers 2914 is a list of the datasets to which the user has access and which are associated with the current tenant. In some implementations, however, fewer datasets will be displayed, and/or the datasets will be ordered using various methods. Specifically, this recommendation provided by the recommendation system 1617 can be done based on previous queries of the user or users associated with the same tenant, historical information of the user, access control and/or authorization information of the user or tenant, query parameters associated with a particular dataset association record, one or more queries generated by the recommendation system 1617 to identify potential datasets to be recommended, etc. Further, the order of the recommended datasets can be based on an ordering policy, as previously described. In the illustrated embodiment, the dataset identifiers correspond to one or more datasets to which the user has access.

With reference to FIG. 29B, following the selection or entry of the dataset identifier "main," and the query command "I," the recommendation system 1617 again displays one or more recommendations. In the illustrated embodiment of FIG. 29B, based on the syntax or structure of the query, the recommendation system 1617 provides a list of recommended query templates 2916 for inclusion in the query. In the illustrated embodiment, each query template includes multiple system query parameters and at least one user query parameter that has replaced a query parameter placeholder. For example, the first query template 2916A includes the system query parameters "stats," "avg," and "by," and the user query parameters "foo" and "bar;" the second query template 2916B includes the system query parameters "timechart," "perc90," and "by," and the user query parameters "foo" and "bar;" the third query template 2916C includes the system query parameters "fields," "|," and "eval," and the user query parameter "bar;" and the fourth query template 2916D includes the system query parameters "stats," "count," and "by," and the user query parameter "bar." However, it will be understood that a recommended query template 2916 may include fewer or more query parameters. For example, the recommended query templates 2916 can include one or more system query parameters and one or more user query parameters. As another example, the recommended query system template 2916 may include one or more system query parameters and one or more query parameter placeholders indicating where one or more system query parameters or user query parameters are to be entered. In still another example, the recommended query system template 2916 may include only one or more system query parameters, which after a system query parameter is entered, then a new set of system query parameters and/or user query parameters may be displayed, so that the user can build a query one element at a time.

As described herein, the recommendation system 1617 can select the query templates for inclusion based on historical information of the user or other users, previous queries by the user or other users, etc. In certain cases, the recommendation system 1617 can determine which templates to include based on the similarity between the structure of the current query and the structure of the query templates. For example, the recommendation system 1617 can increase the weighting of query templates that more closely match the current query. In addition, as described herein, the recommendation system 1617 can weight query templates based on their frequency of use (e.g., frequency of use across all tenants, frequency of use across all users, frequency of use across a group of users, frequency by users of the tenant, frequency of the current user, etc.) or time of use. For example, query templates used more frequently by the user can receive a heavier weighting than query templates used by other users of the same tenant. Similarly, query templates used by users of the same tenant may receive a heavier weighting than query templates used by users of other tenants. As another example, queries used more recently in time can be weighted more heavily than query templates that were not used as recently.

In the illustrated embodiment, the recommendation system 1617 has recommended personalized query templates with query parameter placeholders being replaced with query parameters. However, it will be understood that in some embodiments, the recommendation system 1617 can recommend generic query templates and then based on a selection of a generic query template provide recommendations to personalize the query template. For example, rather than the personalized query template "stats avg(foo) by bar," the recommendation system 1617 can recommend a generic query template like "stats func(field:func) by field:by" with placeholders that indicate where a system query parameter (e.g., function) and two user query parameters (e.g., the fields) are to be entered. Based on the selection of a generic query template, the recommendation system 1617 can determine how to personalize it. In some embodiments, the recommendation system 1617 can personalize a generic query template in a similar manner in which it recommends query parameters. For example, the recommendation system 1617 can determine how to personalize the query templates based on previous queries of the user, historical information of the user, information about the datasets to be searched, and/or queries generated/executed by the recommendation system 1617.

As described herein, the recommendation system 1617 can order the recommended templates in a variety of ways. In some cases, the recommendation system 1617 can order the recommended templates based on an ordering policy. The ordering policy can order the recommended templates based on frequency of use, time of use, etc. For example, the ordering policy can indicate that query templates that are more frequently used are to be more prominently displayed than query templates that are less frequently used. In doing so, the recommendation system 1617 can consider the frequency of use by the particular user, the frequency of use by users associated with the user (e.g., other users in the same group as the user, supervisor users that represent supervisors of the user, subordinate users that represent subordinates to the user, etc.), the frequency of use by users associated with the same tenant, and the frequency of use by users in different tenants. As a non-limiting example, the ordering policy may assign weight to the various relationships of the other users to the user in the following order: commonality of frequency of use of various query templates, other users that are members of a same group as the user, users that have access to and/or have used the same tenant, and users of the system that do not have access to the tenant have access to different tenant, etc. Similarly, the recommendation system 1617 can weight query templates based on time of use, weighting queries used more recently higher than queries used less recently. It will be understood that the ordering policy can weight/rank the query templates in any combination of the ways listed in this application, as well as a variety of other ways in order to produce the desired result.

It will be understood that the query templates can be as simple or as complex as desired. In certain embodiments, the query templates can include tens or hundreds of query parameters with multiple processing steps. In certain embodiments, a query template can include one system query parameter and one user query parameter (or a user query parameter placeholder), etc.

In the illustrated embodiment of FIG. 29C, in response to a user selecting the personalized query template "fields bar|eval," and entering "|," the recommendation system 1617 again provides recommendations 2918 to the user. In the illustrated embodiment, based on the syntax of the token query command "|," and/or the query language semantics, the recommendation system 1617 determines that multiple query parameter types can follow the "|" command, including query commands, fields, etc. Accordingly, the recommendations 2918 include different types of query parameters. Further, the recommendation system 1617 includes a field recommendation "bar" based on the presence of the field "bar" earlier in the query. As mentioned, in some embodiments, the recommendation system 1617 can include recommendations 2918 based on query parameters in the query in addition to or separately from recommendations based on historical information, previous queries, or generated queries. Accordingly, in some embodiments, the recommendation system 1617 can use a user-specific vocabulary set to provide recommendations 2918. The user-specific vocabulary can be based on the authorizations of the user, previous queries of the user, query parameters in the present query, etc. In some embodiments, all or a portion of the user-specific vocabulary may be loaded into a memory, e.g., a cache, of the interface by which the user is accessing the system, e.g., client browser 1604.

Accordingly, as a user enters a query into a user interface field 2910, the recommendation system 1617 can iteratively provide recommendations based on the syntax of different query parameters or the syntax and semantics of the query, as well as historical information about the user and other users, query templates, queries generated by the recommendation system 1617, authorization information, etc. In this way, the recommendation system 1617 can reduce the time to enter a query, increase the accuracy of the query parameters, decrease the errors in the query, and decrease the number of queries executed, thereby reducing the time to execute queries or the number of queries to execute.

6.2. Building Personalized Recommendations

Figure 30:
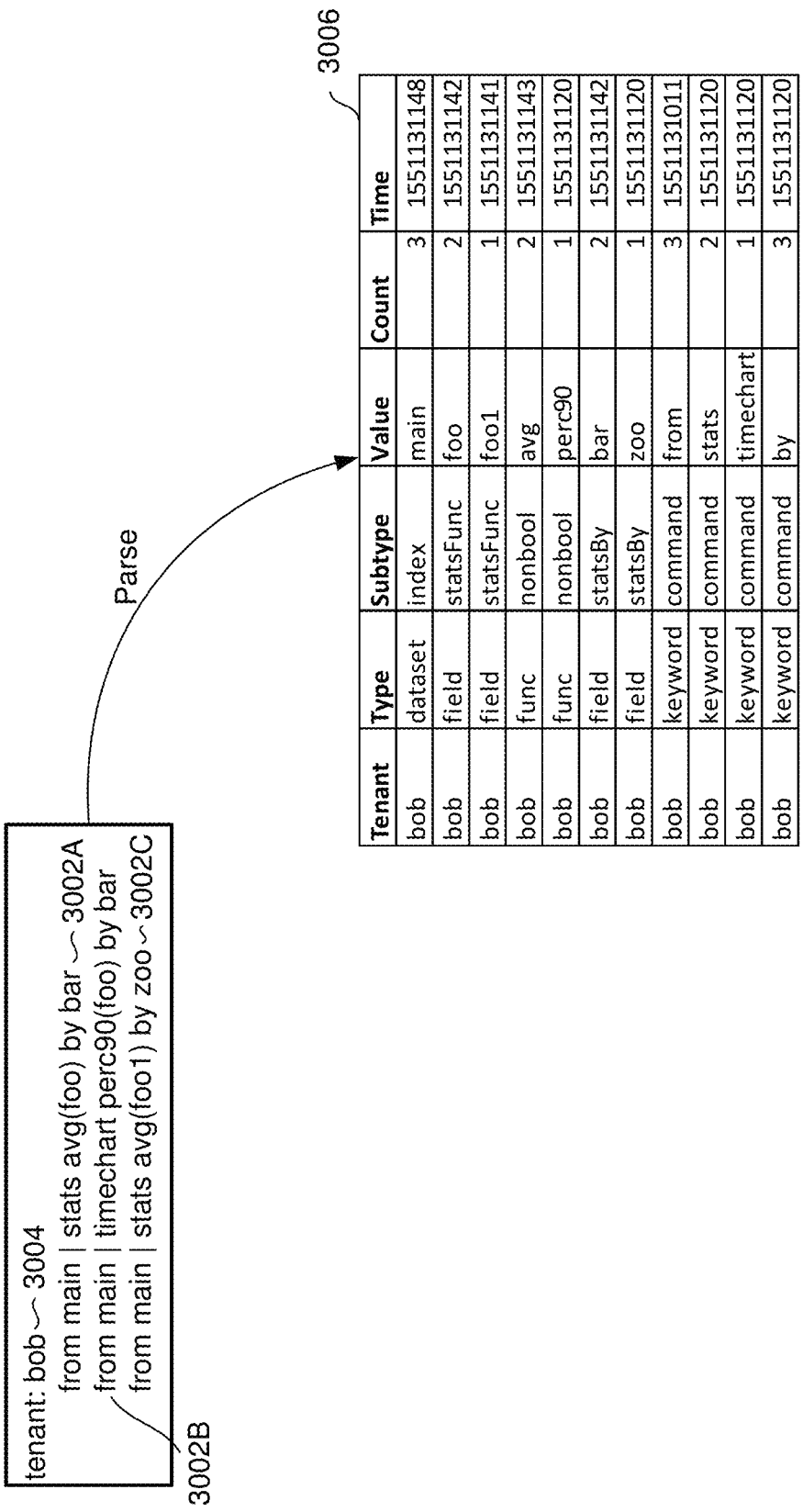
FIG. 30 is a diagram illustrating an embodiment of the recommendation system building a query parameter table from multiple queries.

FIG. 30 is a diagram illustrating an embodiment of the recommendation system 1617 that builds a query parameter table from multiple queries. In the illustrated embodiment, the recommendation system 1617 parses three queries 3002A, 3002B, 3002C (individually or collectively referred to as queries 3002 or query 3002), each of which is associated with tenant bob 3004. It will be understood that the recommendation system 1617 can parse fewer or more queries from the tenant bob and/or queries from other tenants.

As the recommendation system 1617 parses the queries 3002 it can identify and categorize the various query parameters. In some embodiments, the recommendation system 1617 can categorize the query parameters as user query parameters and system query parameters.

The system query parameters can refer to query parameters that are defined by the data intake and query system 108, such as query commands or functions, like "from," "|," "count," "avg," or "by," and/or maintain their meaning across tenants. For example, the manner in which the data intake and query system 108 interprets "from," "|," "stats," "avg," and "by," is determined by the data intake and query system 108 and maintains its meaning across different users and tenants.

The user query parameters can refer to query parameters that are defined by the user or the user's data, such as the name of search terms in the query, the time range of the query, field names, keywords, dataset identifiers, etc. In some embodiments, the user query parameters are user or tenant specific such that a user query parameter for one user and tenant may have a different meaning (or no meaning at all) or apply to different data for another user or tenant. For example, even if two tenants have a "main" dataset, the data associated with the "main" dataset for one tenant is different from the data associated with the "main" dataset from the other tenant. Similarly, the data to which "foo" and "bar" from queries 3002A and 3002B correspond to can be based on the tenant bob's data, such as the data in a particular index and/or based on one or more regular expression rules for a particular sourcetype. As such, "foo" and "bar" may refer to different data for different datasets or for different tenant data. Accordingly, the meaning or what is referenced by the user query parameters can be user or data specific and may not be universally applicable to users of different tenants.

In addition to identifying user query parameters and system query parameters, the recommendation system 1617 can categorize query parameters based on type and subtypes. In some cases, the user query parameters can include query parameters of the types dataset, field, and keyword tokens, and the system query parameters can include query parameters of type functions, keyword commands (including clauses), etc. In the illustrated embodiment, of FIG. 30, the recommendation system 1617 identifies query parameters of the following type-subtype: dataset-index, field-stats function, function-non-Boolean, field-stats by, keyword command. However, it will be understood that a variety of types and subtypes can be used to categorize the query parameters.

As the recommendation system 1617 identifies the various query parameters, it can store them in a query parameter table 3006. In the illustrated embodiment, the query parameter table 3006 includes the tenant, type, subtype, value, count, and time for each query parameter of the queries 3002. The tenant can refer to the tenant associated with the query or the tenant data that was used as part of the query. As described herein, the type and subtype can refer to different categories of query parameters. The value can correspond to the identifier for the query parameter. The count can correspond to the number of times in which the particular query parameter has been identified. The time can correspond to a time at which the query parameter is identified. The time can correspond to the first or most recent time the query parameter is identified. In certain embodiments, the table can be updated as queries are parsed. It will be understood that different amounts of information for each query parameter can be included in the query parameter table 3006 or stored by the recommendation system 1617. For example, the recommendation system 1617 can store information about users that referenced the query parameters, etc.

In certain embodiments, the query parameters that have not be used in longer than a particular amount of time can be discarded. In some such cases, the query parameter tale 3006 can reflect query parameters that have been used within a threshold time period such as one hour, one day, one week, etc.

With continued reference to FIG. 30, as the recommendation system 1617 parses query 3002A, it can identify the following system query parameters: "from," "|," "stats," "avg," and "by," and the following user query parameters: "main," "foo," and "bar." In addition, the recommendation system 1617 can determine the type and subtypes of the different query parameters as shown. For example, the recommendation system 1617 determines that "from" "stats" and "by" are query parameters of type keyword and subtype command (also referred to herein as query commands), "main" is a "dataset" "index," foo is a "field" "statsFunc," and bar is a "field" "statsBy" query parameter. Similarly, as the recommendation system 1617 parses the queries 3002B and 3002C it can update the query parameter table 3006, as shown. After parsing the queries 3002, the recommendation system 1617 determines that the dataset index "main," keyword command "from," and keyword command "by" have been used three times, the fields "foo" and "bar," keyword command "stats," and function "avg" have been used twice, and the fields "foo1" and "zoo," function "perc90," and keyword command "timechart," have each been used once.

As a user enters a query, the recommendation system 1617 can use the query parameter table 3006 to provide query parameter recommendations. For example, given that the dataset index "main" has been used in all three queries if a user begins entering another query, the recommendation system 1617 can recommend that the user search the dataset "main." Similarly, based on the semantics of the query being typed or the syntax of a token query parameter, if the recommendation system 1617 determines that a user query parameter of type 'field' is to be recommend, the recommendation system 1617 can cause the fields "foo," "foo1," "bar," and "zoo," to be displayed. The recommendation system 1617 can order the recommendations using an ordering policy. The ordering policy can take into account one or more of the query structure or semantics, the count, time of use, etc. For example, if the recommendation system 1617 determines that the user query parameter of type 'field' is to be recommended, it can order the fields from the query parameter table 3006 in order of the counts (e.g., "foo," "bar," "fool," "zoo"). Similarly, if the field suggestion is for a stats function, the recommendation system 1617 can order the fields by subtype and then by count (e.g., "foo," "fool," "bar," "zoo"). It will be understood that the ordering policy can use a variety of factors to order the query parameters, such as alphabetical order, most recent time of use, count, type and/or sub-type, etc.

In some embodiments, the query parameter table 3006 can be stored in the metadata catalog 221. In certain embodiments, the query parameter table 3006 can be stored in a data store separate from the metadata catalog 221. For example, in embodiments in which the recommendation system 1617 is separate from the data intake and query system, the query parameter table 3006 can be stored in a data store associated with the recommendation system 1617. In some embodiments, all or a portion of the query parameter table 3006 is loaded into the cache of the client browser 1604, to allow for faster retrieval.

It will be understood that more or less information can be stored in the query parameter table 3006. For example, the query parameter table 3006 can include information about the user that entered the query, etc. In some cases, this information can be used to determine whether to recommend a particular query parameter and/or its order in the displayed query parameters. For example, query parameters that were previously entered by the same user may be weighted more heavily than query parameters that were previously entered by other users of the same tenant.

In some cases, the query parameter table 3006 can include information about query parameters used in association with other tenants. In certain embodiments, the query parameter table 3006 can collate information from different tenants, thereby showing counts of particular user query parameters and system query parameters across multiple tenants. Thus, it will be understood that the recommendation system 1617 can collect and use various pieces of information to build and maintain the query parameter table 3006, and in turn, use that information to provide query parameter recommendations to a user.

Figure 31:
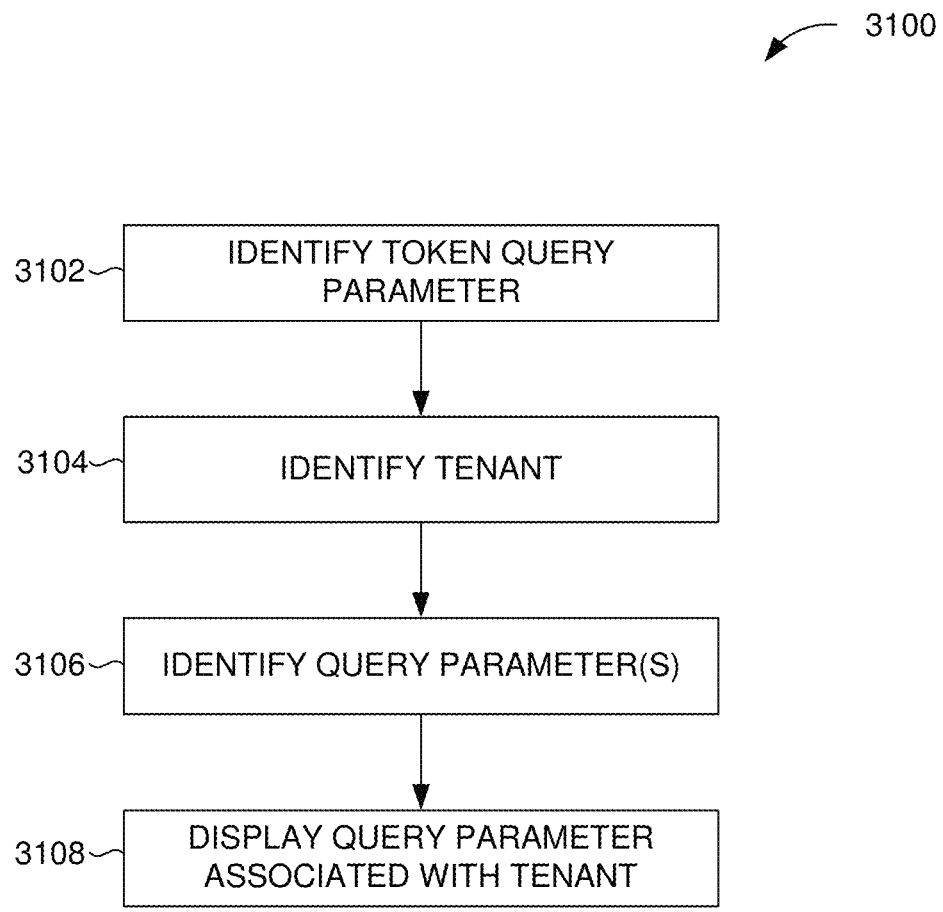
FIG. 31 is a flow diagram illustrative of an embodiment of a routine implemented by the recommendation system to recommend query parameters.

FIG. 31 is a flow diagram illustrative of an embodiment of a routine 3100 implemented by the recommendation system 1617 to recommend query parameters. Although described as being implemented by the recommendation system 1617, it will be understood that the elements outlined for routine 3100 can be implemented by one or more computing devices/components that are associated with the recommendation system 1617, such as, but not limited to, the UI data manager 1610, another component of the application system 1608, a component of the data intake and query system 108, etc. Thus, the following illustrative embodiment should not be construed as limiting.

At block 3102, the recommendation system 1617 identifies a token query parameter. In some embodiments, the token query parameter can be a user query parameter or a system query parameter and can be used by the recommendation system 1617 to recommend query parameters for inclusion in a query. For example, the token query parameter can refer to the query parameter (or group of query parameters) that is analyzed by the recommendation system 1617 to determine one or more query parameter recommendations.

As described herein, system query parameters can correspond to query parameters that are defined by the data intake and query system 108 and/or whose meaning is consistent across tenants. Examples of system query parameters can include query commands and functions. In certain embodiments, a query command is associated with a particular action to be taken by the data intake and query system 108 as it processes a query for execution or executes the query. For example, some query commands can indicate that data from a particular dataset is to be retrieved (non-limiting example: "from"), other query commends can indicate how results of processing a set of data are to be categorized (non-limiting example: "by"), other query commands can indicate how results of processing certain data are to be displayed (non-limiting examples: "timechart," "table," "chart," etc.), other query commands can indicate that a function is to be performed on or statistical information is to be determined from data (non-limiting example: "stats"), and yet other query commands can delineate between processing steps of the query and/or indicate when the output of one processing step is to be used as the input to a proximate processing step (non-limiting example: "|") etc. In certain cases, a function query system parameter can indicate how certain data is to be processed (non-limiting examples: average, count, max, median, minimum, mode, percentage, range, standard deviation, sum, earliest, latest, rate, etc.). In some embodiments, functions may return Boolean or non-Boolean responses.

In some cases, the recommendation system 1617 identifies the token query parameter based on its presence in a user interface field 2910. For example, a user may enter the token query parameter into a user interface field 2910 of a graphical user interface, as described herein at least with reference to FIGS. 29A-29C. As the user enters text into the user interface field 2910, the recommendation system 1617 can compare the text with a list of system query parameters and/or user query parameters. Based on a match, the recommendation system 1617 can determine that the token query parameter has been identified. In some cases, the recommendation system 1617 can determine a match even if the text entered by the user is not identical to a known system query parameter or user query parameter. For example, some of the letters in the entered text may be transposed or different due to a typographical error. The recommendation system 1617 can use fuzzy logic to identify potentially matches for the token query parameter.

In certain cases, the recommendation system 1617 identifies the token query parameter based on a selection by a user. For example, a user may click on a display object of a graphical user interface that is associated with a system query parameter or user query parameter, or otherwise select a token query parameter. In some embodiments, the recommendation system 1617 identifies the token query parameter by parsing a query. For example, the recommendation system 1617 can parse each word of a query and compare the words with a list of known query parameters. Based on a match, the recommendation system 1617 can select one of the query parameters as the token query parameter of the query. Thus, it will be understood that the recommendation system 1617 can identify the token query parameter using a variety of techniques.

At block 3104, the recommendation system 1617 identifies a tenant associated with the query. As described herein, with the advent of "cloud computing" and virtualization, it is possible for completely separate and unrelated entities to share compute resources of a host computing system. For example, isolated execution environments of company A may be executed on the same processing devices as isolated execution environments of company B. Similarly, the data intake and query system 108 may use the same compute resources to process data from different entities, which may also be referred to herein as tenants. Each tenant can correspond to a different entity whose data is mutually exclusive and has separate access controls from the data of another tenant. For example, one tenant can correspond to company A and another can correspond to company B. In some cases, tenants can be associated with the same legal entity (non-limiting example: different departments of the same company), but even in such cases, the data of the different tenants can be mutually exclusive and have separate access controls. For example, users associated with tenant A may not have access to tenant B data. Similarly, different credentials may be required to access data associated with tenant A and tenant B. In addition, each tenant can have different configurations. For example, one tenant may be allocated significantly more compute resources than another tenant or be enabled to perform more searches than another tenant, etc.

In some cases, the recommendation system 1617 can identify the tenant associated with the query based on current login information of the user associated with the query and/or based on a selection by a user. For example, when a user logs in, the user can have access to certain tenant data or select a tenant to access. Accordingly, based on the identity of the user entering the query, the recommendation system 1617 can determine the tenant associated with the query. In certain embodiments, such as in the case where a user may have access to multiple tenants, the recommendation system 1617 can require the user to specify to which tenant the query is to be associated. In some embodiments, the recommendation system 1617 can use a tenant identifier to identify the tenant. For example, each tenant associated with the data intake and query system 108 can be associated with an identifier. Accordingly, as queries are obtained, the recommendation system 1617 can identify the tenant associated with the query.

At block 3106, the recommendation system 1617 identifies one or more query parameters associated with the tenant. As described herein, the recommendation system 1617 can track query parameters associated with the tenant. In some cases, the query parameters associated with the tenant can include user query parameters associated with the tenant or system query parameters associated with the tenant. For example, the user query parameters associated with the tenant can include dataset identifiers of datasets of the tenant, fields associated with datasets of the tenant, keywords in datasets of the tenant, fields identified in the query, etc.

The system query parameters associated with the tenant can include system query parameters that have been used by users associated with the tenant, such as query commands or functions that users of the tenant have used to build queries. In certain embodiments, all query commands and/or functions can be associated with each tenant. In some embodiments, a subset of query commands and/or functions can be associated with a tenant, such as, but not limited to, the query commands and/or functions that have been used in a previous query associated with the tenant and/or query commands and/or functions that are found in a query parameter table associated with the tenant.

As described herein, in some embodiments, the recommendation system 1617 can store the query parameters associated with the tenant. For example, the recommendation system 1617 can generate a query parameter table 3006 to track the query parameters associated with the tenant. In some cases, the query parameter table 3006 can include information based on previous queries executed by users associated with the tenant, such as query commands, functions, datasets, and/or fields used in previous queries. In some cases, information about the query parameters associated with the tenant, such as the query parameter table, can be stored and accessed via the metadata catalog 221.

As described herein, in some cases, the recommendation system 1617 can identify query parameters associated with the tenant by generating and executing one or more queries. For example, the recommendation system 1617 can execute a query to identify the datasets associated with the tenant, identify fields or keywords of the datasets to be searched, etc.

In certain embodiments, the recommendation system 1617 can use the query parameters of the query itself to identify query parameters associated with the tenant. For example, if the query includes a particular user query parameter, such as a field identifier, then at a later point in the query, the recommendation system 1617 can include the user query parameter as a recommendation for inclusion in the query again. For example, if the query includes a field identifier "IP_addr" and the syntax of a subsequent system query parameter indicates that it is to be followed by a field, then the recommendation system 1617 can recommend the field "IP_addr" for inclusion in the query.

In some cases, the recommendation system 1617 can identify any/all query parameters associated with the tenant. In certain embodiments, the recommendation system 1617 can identify a subset of the query parameters associated with the tenant. For example, based on the semantics or syntax of the identified token query parameter, the recommendation system 1617 can identify certain types of query parameters associated with the tenant. For example, if the syntax of the token query parameter indicates that it is to be followed by a dataset identifier, the recommendation system 1617 can identify the datasets associated with the tenant. Similarly, if the syntax of the token query parameter indicates that it is to be followed by a function or a field identifier, the recommendation system 1617 can identify the functions or fields associated with the tenant. Accordingly, the recommendation system 1617 can use the syntax or semantics of the token query parameter to identify query parameters associated with the tenant.

At block 3108, the recommendation system 1617 displays at least one query parameter associated with the tenant for inclusion in the query. As described herein, the recommendation system 1617 can cause the display of one or more query parameters for inclusion in the query. In some cases, the query parameters displayed can correspond to the identified query parameters. In certain cases, the query parameters displayed can correspond to a subset of the identified query parameters. For example, the query parameters associated with the tenant can be ranked and the top five may be displayed.

In some cases, the recommendation system 1617 can determine which query parameters to display based on the syntax of the token query parameter. As described herein with reference to identifying query parameters, the recommendation system 1617 can use the syntax to reduce the number of query parameters for display. For example, based on a determination that a field identifier is to follow the token query parameter, the recommendation system 1617 may only display field identifiers of fields associated with the tenant. In certain cases, the query parameters can be ordered according to an ordering policy. As described herein, the ordering policy can take into a variety of factors in determining the order the query parameters. For example, the ordering policy can use alphabetization, randomness, use frequency, use time, query or token query parameter syntax, query parameter type/subtype, data from metadata catalog 221, preference data that has been tracked in client browser 1604, etc. to order the query parameters.

Fewer, more, or different blocks can be used as part of the routine 3100. In some cases, one or more blocks can be omitted. For example, in some embodiments, based on a selection of a query parameter, the displayed query can be updated to include the selection.

Furthermore, it will be understood that the various blocks described herein with reference to FIG. 31 can be implemented in a variety of orders, or can be performed concurrently. For example, the recommendation system 1617 can concurrently identify the tenant before, after, or concurrently with identifying the query command In some cases, if the user selects a recommended query parameter, the recommendation system 1617 can update the displayed query to include the recommended query parameter. In some implementations in which the user selects the recommended query parameter, once the recommended query is selected, the recommendation system 1617 can identify additional query parameters for inclusion in the query. In certain embodiments, the recommendation system 1617 can identify a series of query parameters, such as a query template, for inclusion in the query. In some embodiments, the system tracks how often a recommended query parameter was selected, and, if the recommended query parameter was not selected, which query parameter was selected. This data may be stored in the system, aggregated, and analyzed, either automatically or through manual analysis, to generate feedback about how the recommended query parameter system is functioning, and to tune the recommendation and ordering features appropriately in response to the collected data.

As described herein, the recommendation system 1617 can iteratively perform blocks 3102 and 3106 to identify and recommend query parameters until the user has indicated that the query is complete or is to be executed. Accordingly, the recommendation system 1617 can identify and recommend query parameters before the query is executed. For example, the recommendation system 1617 can repeatedly use the last query parameter of a displayed query as the token query parameter, and identify query parameters associated with the tenant for display. As additional query parameters are entered, the recommendation system 1617 can continue to use the last query parameter as the token query parameter.

In certain embodiments, as the user types a word, the recommended query parameters can change. For example, with each letter, the recommendation system 1617 may be able to eliminate one or more query parameters. As query parameters are eliminated, the recommendation system 1617 can update which query parameters are displayed and recommended.

6.3. Query Templates

Figure 32:
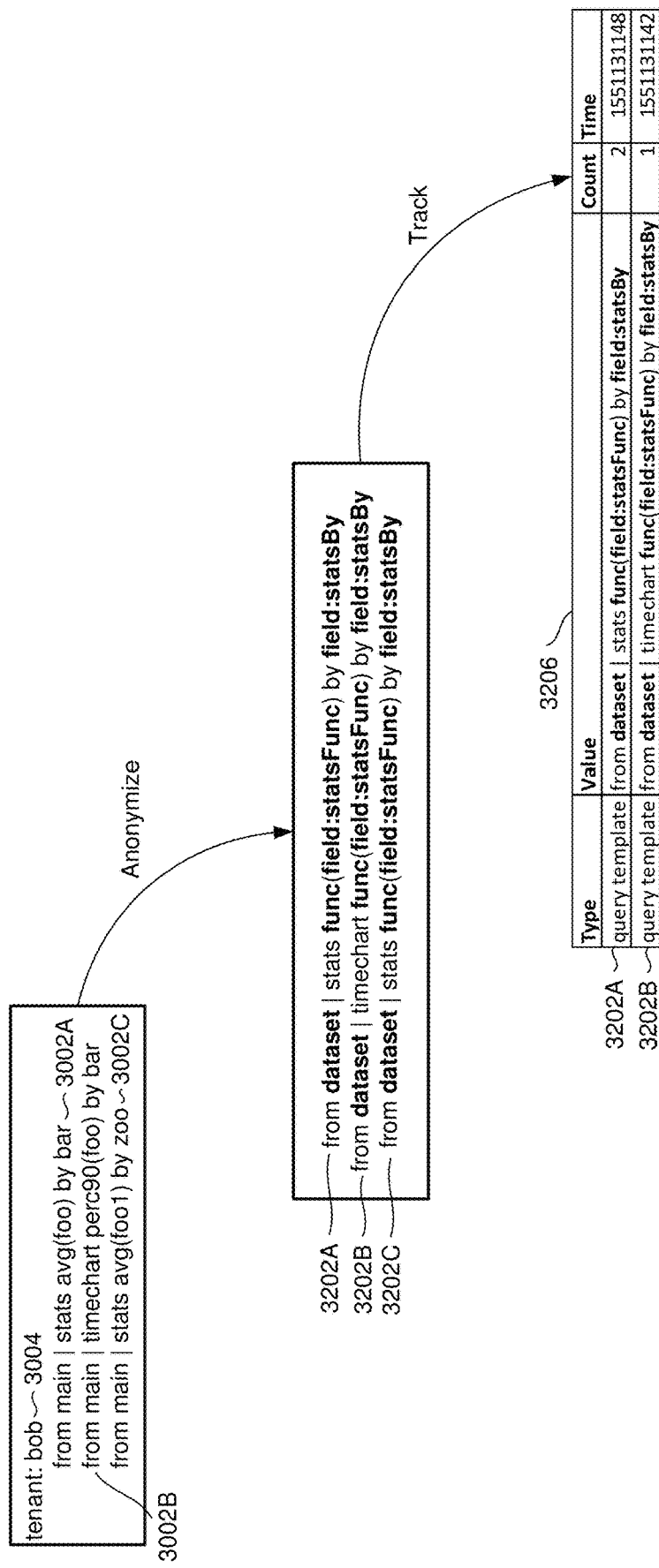
FIG. 32 is a diagram illustrating an embodiment of the recommendation system generating query templates from different queries.

FIG. 32 is a diagram illustrating an embodiment of the recommendation system 1617 generating query templates 3202A, 3202B, 3202C (individually or collectively referred to as query template(s) 3202) from different queries 3002. In the illustrated embodiment of FIG. 32, the same queries 3002 used to generate the query parameter table 3006 are used to generate the query templates 3202. However, it will be understood that the recommendation system 1617 can use fewer or more queries as desired. In some cases, the recommendation system 1617 uses queries from one tenant to build a query parameter table 3002 for that tenant and/or uses queries from multiple tenants to build query templates for multiple (or all) tenants. However, it will be understood that the query system can use data from one or multiple tenants to build the query parameter table 3002 and/or the query templates 3202. Because the tenant-specific data is anonymized, as described herein, data can be used across multiple or all tenants without concerns for revealing data of one tenant to another tenant.

In some cases, the recommendation system 1617 can generate query templates separately from queries executed by the data intake and query system 108. For example, the recommendation system 1617 can enable a user to enter a query template. In some cases, the recommendation system 1617 can generate query templates based on self-generated queries. For example, as the recommendation system 1617 generates queries as described herein, it can use the generated queries to generate query templates.

In some cases, each query template can correspond to one or more queries executed by the data intake and query system 108. For example, each query template can be generated from a query executed by the data intake and query system 108. In certain cases, as additional queries are entered, the recommendation system 1617 may associate them with an already existing query template and/or generate a new query template. In addition, the recommendation system 1617 can track statistics about the different query templates, including, but not limited to, creation time, last use time, number of times used, number of associated queries (e.g., number of queries that follow the structure of the query template), etc. In certain embodiments, the query templates can be stored by the data intake and query system and/or the recommendation system 1617. For example, the query templates 3202 can be stored in the data intake and query system 108, e.g., as part of the metadata catalog 221, or separately in another part of the system. In other implementations, all or a portion of the query templates 3202 may be transmitted to the client browser 1604 or application system 1608 to reduce the number of calls made to various systems. Further, as described herein, the query templates can be made available to multiple tenants, including in some implementations, all tenants, of the data intake and query system 108. By generating query templates and leverage usage data of the query templates across multiple tenants, the recommendation system 1617 can improve the functioning of the data intake and query system 108. For example, as queries are executed, the recommendation system 1617 can provide suggestions to other users for queries to use. By providing recommendations, the recommendation system 1617 can reduce the number of queries that do not provide meaningful results to a user, thereby reducing the total number of queries executed by the data intake and query system 108 and the amount of processing used to execute those queries.

In some embodiments, as part of generating the query templates, the recommendation system 1617 can parse a query to identify different query parameters of the query. For example, the recommendation system 1617 may determine that each word or string in a query is a distinct query parameter. As the recommendation system 1617 identifies the different query parameters of the query it can determine whether the query parameters are system query parameters or user query parameters. In some embodiments, the recommendation system 1617 can determine the type of system query parameters. For example, the recommendation system 1617 can determine whether a system query parameter is a query command or a function. In some cases, the recommendation system 1617 can determine the type based on the identification of the system query parameter. For example, the recommendation system 1617 can use a lookup table that indicates the different types of system query parameters. The table can also include syntax and/or semantic information for each of the system query parameters.

The recommendation system 1617 can also determine the parameter type for each user query parameter. For example, the recommendation system 1617 can determine whether a user query parameter is a dataset identifier, field identifier, keyword, etc. In some cases, to determine the parameter type for user query parameters, the recommendation system 1617 can use the metadata catalog 221 or other database that identifies the type of different user query parameters. For example, if the user types user query parameters "main," "foo," or "user_ID," the recommendation system 1617 can determine the parameter type of those user query parameters. In some cases, the recommendation system 1617 can determine that a query parameter is a user query parameter and the parameter type for the different user query parameters based on the system query parameters in the query. For example, based on a known syntax of the system query parameters, the recommendation system 1617 can determine whether a dataset identifier, field identifier, keyword, or other user query parameter is to follow a particular system query parameter. Using the syntax information and the location of the query parameter, the recommendation system 1617 can identify the query parameter as a user query parameter and/or the parameter type for the different user query parameters.

As previously described, the recommendation system 1617 can use queries from different tenants, and may otherwise want to anonymize the information from the queries. Thus, in some implementations, the recommendation system 1617 can remove the user query parameters from the query and replace them with placeholders. In addition, in some embodiments, the recommendation system 1617 can remove one or more system query parameters. For example, the recommendation system 1617 can remove functions from the query and replace them with function placeholders. However, in certain embodiments, the recommendation system 1617 may only remove user query parameters or a subset of user query parameters while retaining some or all of the system query parameters. To determine which query parameters to remove, the recommendation system 1617 can use a query anonymization policy. The query anonymization policy can indicate which types of query parameter to remove and/or which particular query parameters to leave in a query template. For example, a query anonymization policy can indicate that all user query parameters are to be removed, or in some cases, that only some user query parameters (non-limiting examples: dataset identifiers and/or field identifiers) are to be removed, etc. The query anonymization policy, can be set globally, by tenant, by user, or some combination thereof, as desired. As another example, the query anonymization policy can indicate that all functions are to be removed, only certain functions, and/or certain query commands, etc.

Based on the query anonymization policy, the recommendation system 1617 can remove one or more parameters from the query and replace them with placeholder query parameters. In some cases, the placeholder query parameters can indicate the type of the query parameter removed. For example, if a dataset identifier is removed from a query, it can be replaced with a placeholder indicating that a dataset should be included in that location of the query template. Similarly, the recommendation system 1617 can insert placeholders for fields, functions, query commands, keywords, etc. In certain embodiments, the placeholder can indicate relationships between removed query parameters. For example, the placeholder query parameter can indicate that a function was removed and a field associated with that function, etc.

In the illustrated embodiment of FIG. 32, the recommendation system 1617 can identify the query 3002A as "from main|stats avg(foo) by bar." Upon parsing the query 3002A, the recommendation system 1617 can determine that the query 3002A includes the system query parameters "from," "|," "stats," "avg," and "by," and the user query parameters "main," "foo," "and" "bar." In addition, the recommendation system 1617 can determine that the "from," "|," "stats," and "by," system query parameters are query commands and that the "avg" system query parameter is a function. Similarly, the recommendation system 1617 can determine that "main" is a dataset index, "foo," is a field associated with a function, and "bar" is a field associated with the "by" query command Based on the query anonymization policy, the recommendation system 1617 can determine that all user query parameters and function query parameters are to be removed and replaced with placeholder query parameters that indicate the type of query parameter that was removed. Accordingly, based on the query anonymization policy, the recommendation system 1617 can generate the query template 3202A as "from dataset|stats func(field:statsFunc) by field:statsBy." The recommendation can store the query template in the query template table 3206 for use in providing recommendations to users.

In a similar way, the recommendation system 1617 can generate the query template 3202B based on the query 3002B and store the query template 3202B in the query template table 3206. However, in generating the query template 3202C based on the query 3002C, the recommendation system 1617 can determine that the query template 3202C matches the query template 3202A. As such, the recommendation system 1617 may not store the query template 3202C in the query template table 3206. Instead, the recommendation system 1617 can increase a count for the query template 3202A in the query template table 3206. In the illustrated embodiment, the recommendation system 1617 increases the count for the entry associated with the query template 3202A to reflect that two queries that have been processed include a structure that is similar to the query template 3202A.

In the illustrated embodiment of FIG. 32, the query template table 3206 includes various pieces of information including a parameter type indicating that the entries are query templates, a value, which includes a generic query template with the query parameters and query parameter placeholders, a count indicating the number of queries that share the same structure as the query template, and a time, which can correspond to the most recent time a query similar to the query template was processed.

Fewer, more or different information can be included in the query template table 3206. For example, the query template table 3206 can identify users or tenants associated with the different query templates. For example, for each query template, the query template table 3206 can identify which tenants (or users of those tenants) have executed queries with the same structure as the respective query template.

In some cases, the recommendation system 1617 can update the query template table 3206 each time a query is entered by a user. In certain embodiments, the recommendation system 1617 can update the query template table 3206 using batches of queries. The batches can include queries that were executed within a particular time range. For example, the recommendation system 1617 can update the query template table 3206 at regular or irregular intervals, for example, every hour or day using queries that were executed during that hour or day. These intervals may be set at global, tenant, role, or user levels, or some combination thereof.

FIG. 33 is a flow diagram illustrative of an embodiment of a routine 3300 implemented by the recommendation system 1617 to recommend query parameters. Although described as being implemented by the recommendation system 1617, it will be understood that the elements outlined for routine 3300 can be implemented by one or more computing devices/components that are associated with the recommendation system 1617, such as, but not limited to, the UI data manager 1610, another component of the application system 1608, a component of the data intake and query system 108, etc. Thus, the following illustrative embodiment should not be construed as limiting.

At block 3302, the recommendation system 1617 obtains a query. As described herein, the recommendation system 1617 can obtain a query in a variety of ways. In some cases, the recommendation system 1617 obtains the query based on information entered by a user, such as via a graphical user interface. In certain embodiments, the recommendation system 1617 obtains the query from the data intake and query system. For example, the recommendation system 1617 can obtain the query from the metadata catalog 221 or other data store of the data intake and query system, or a data store of the recommendation system 1617. In certain embodiments, the recommendation system 1617 obtains a query from a group of queries that it is to process. In some implementations, all or a portion of the query is pre-populated by one or more user actions taken previously, e.g., clicking on a graphical user interface element of a dashboard, a dataset, or an alert, as described elsewhere in this application. For example, as described herein, based on a schedule, the recommendation system 1617 can receive a group of queries that have been executed by the data intake and query system.

As described herein, each query can be associated with a tenant. In certain cases, the recommendation system 1617 can identify the tenant based on the login credentials of the user that entered or requested the query to be executed. In some embodiments, a tenant identifier can be associated with the query as metadata, etc. In some implementations, the system may ask the user to identify the tenant to be associated with the query, at query time, at the time the user logs into the system, at the time the user performs a specific action, or some other time.

At block 3304, the recommendation system 1617 parses the query. As described herein, the recommendation system 1617 can parse the query to identify the different query parameters. In certain embodiments, the recommendation system 1617 can parse each word or string of the query to identify the query parameters. As part of identifying the query parameters, the recommendation system 1617 can identify user query parameters and system query parameters.

The user query parameters can correspond to data associated with the identified tenant. As described herein, the user query parameters can be specific to the user, the tenant associated with the query, or the data of the tenant. In certain embodiments, the user query parameters can indicate the data that is to be searched and/or characteristics of the data. For example, one user query parameter can identify the dataset from which the data intake and query system is to retrieve the data, another user query parameter can identify a range of the data to be retrieved, such as a time range of the data, and another user query parameter can identify characteristics of the data, such as one or more fields, one or more field values, and/or one or more keywords in the data.

The system query parameters can be defined by the data intake and query system and indicate what is to be done with the data identifies using the user query parameters. For example, the system query parameters can be used to indicate that the data identified using a user query parameter is to be retrieved and/or how to process and/or display the retrieved data. In some cases, the system query parameters can include query commands indicating what and how to process the data and/or functions, some of which may indicate particular statistical processes to be performed on the data.

At block 3306, the recommendation system 1617 generates a query template. As described herein, in some cases, the recommendation system 1617 can generate a query template by removing some or all of the user query parameters and/or one or more system query parameters. In certain cases, the recommendation system 1617 generates the query template by removing all user query parameters and function system query parameters. In certain embodiments, the recommendation system 1617 generates query templates by removing all query parameters except query commands. However, it will be understood that the recommendation system 1617 can generate query templates in a variety of ways. For example, the query system can remove a subset of the user query parameters, such as the dataset identifiers, while retaining others, such as the fields or keywords and/or may retain all system query parameters.

In addition, as part of generating the query template, the recommendation system 1617 can replace some or all removed query parameters with query parameter placeholders. In some cases, the placeholders can indicate the type of query parameter that was removed. For example, the placeholder can indicate that a user query parameter or system query parameter was removed. In certain cases, the placeholder can provide additional detail, such as the type of user query parameter removed (e.g., dataset, field, field value, keyword, etc.) or the type of system query parameter removed (e.g., function, etc.).

Accordingly, each query template can include one or more system query parameters and one or more placeholders' indicative of removed query parameters, which may be in a particular sequence. In some embodiments, a query template includes a particular sequence of query commands and placeholders for one or more user query parameters and/or one or more function system query parameters.

At block 3308, the recommendation system 1617 stores the query template. As described herein, the recommendation system 1617 can store the query templates in a variety of ways. In some cases, the recommendation system 1617 stores the query templates in a data store along with certain metadata, such as the number of queries associated with the query template, the time the query template was generated or the most recent time a query was received that included a structure similar to the query template, the tenant or user associated with the query from which the query template was generated, etc. In certain embodiments, the recommendation system 1617 stores the query templates in a query template table.

In some embodiments, the recommendation system 1617 can store query templates corresponding to queries of different tenants. For example, the recommendation system 1617 can generate query templates from queries executed on the data of different tenants and store the query templates together.

The recommendation system 1617 can use the query templates to provide recommendations to a user. For example, as a user enters a query, the recommendation system 1617 can recommend one or more query templates for the user to use. Furthermore, when the recommendation system 1617 makes recommendations, it can provide recommendations based on queries executed by users on different tenants, thereby increasing the potential insights available to a user. For example, if a user has never run a query on data, the recommendation system 1617 can still provide recommendations based on query templates generated by queries executed by other users or on other tenant's data. In addition, the recommendation system 1617 can track the usage of the different query templates to provide improved recommendations.

Fewer, more, or different blocks can be used as part of the routine 3300. In some cases, one or more blocks can be omitted. For example, in some embodiments, block 3302 may be omitted. Furthermore, it will be understood that the various blocks described herein with reference to FIG. 33 can be implemented in a variety of orders, or can be performed concurrently. For example, the recommendation system 1617 can concurrently generate multiple query templates.

Figure 34:
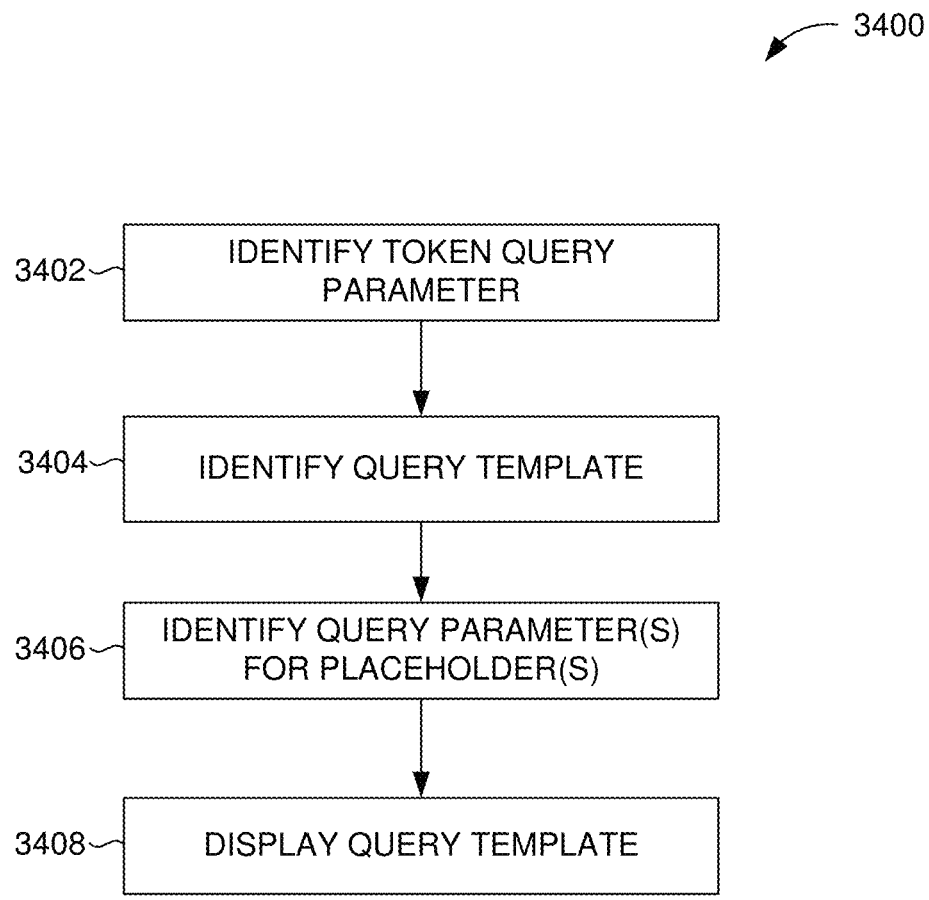
FIG. 34 is a flow diagram illustrative of an embodiment of a routine to recommend query templates.

FIG. 34 is a flow diagram illustrative of an embodiment of a routine 3400 implemented by the recommendation system 1617 to recommend query templates. Although described as being implemented by the recommendation system 1617, it will be understood that the elements outlined for routine 3400 can be implemented by one or more computing devices/components that are associated with the recommendation system 1617, such as, but not limited to, the UI data manager 1610, another component of the application system 1608, a component of the data intake and query system 108, etc. Thus, the following illustrative embodiment should not be construed as limiting.

At block 3402, the recommendation system 1617 identifies a token query parameter. As described herein, at least with reference to block 3102, the token query parameter can correspond to one or more system query parameters and/or user query parameters. In certain embodiments, the token query parameter can correspond to a query command and/or a function. The token query parameter can be associated with a tenant of the data intake and query system. For example, based on the identity or login credentials of the user, data from a particular tenant can be accessed and/or searched. As a user enters a query or interacts with the tenant data, the recommendation system 1617 can identify the tenant associated with the query. As described herein, the recommendation system 1617 can identify the token query parameter as a user types it into a graphical user interface, by parsing a query or part of a query etc.

At block 3404, the recommendation system 1617 identifies a query template. As described herein, the recommendation system 1617 can store multiple query templates associated with one or more tenants. In some embodiments, the query templates that are accessible for recommending to a user correspond to the tenant associated with the user. In certain embodiments, the query templates that are used for recommending to a user correspond to multiple tenants, some or all of which may be unrelated or inaccessible to the user.

In some cases, some or all of the query templates can correspond to at least one query that was executed by the data intake and query system. For example, as described herein, as queries are executed by the data intake and query system, the recommendation system 1617 can parse the queries and replace one or more query parameters (non-limiting examples: user query parameters, functions, etc.) with query parameter placeholders to generate a query template. As mentioned, the recommendation system 1617 can generate query templates from queries executed on tenant data from one or more tenants. In certain embodiments, the query templates can be entered directly by the recommendation system 1617 without parsing queries. For example, the query templates can be loaded into a data store directly and may not be generated by the recommendation system 1617.

In some embodiments, each query template can include at least one system query parameter and one or more query parameter placeholders (also referred to as generic query templates). In certain embodiments, the placeholders can indicate a type of query parameter that is to be used in that location of the query template. For example, the placeholder can indicate whether a dataset identifier, field identifier, field value, keyword, function, or other query parameter is to be entered in a particular location of a generic query template. In certain embodiments, a generic query template can include a series of query commands and query parameter placeholders.

In addition to storing the query templates, the recommendation system 1617 can store metadata associated with the query templates to indicate an origin of the query (e.g., the user or tenant from which the query template was generated), timing information (e.g., when the query template was generated/stored, last used, first used, etc.), and usage information (e.g., frequency of use, identity of user/tenant, use count, etc.). In some embodiments, the recommendation system 1617 can use an ordering policy to identify query templates. The ordering policy can take into account any one or more characteristics of the query templates to identify them for recommending to a user. For example, the recommendation system 1617 can use the origin of the query template (e.g., give more weight to query templates that originated from the same tenant as the user), timing information (e.g., give more weight to query templates use more recently/frequently), etc.

At block 3406, the recommendation system 1617 identifies one or more query parameters for the placeholders. In some embodiments, the recommendation system 1617 uses the identity of the tenant to identify query parameters for the placeholders. For example, as described herein at least with reference to FIGS. 30 and 31, the recommendation system 1617 can track the query parameters that have been used to search the tenant's data. The recommendation system 1617 can use that information to identify query parameters for the placeholders and/or query parameter recommendations for the placeholders. Accordingly, in some embodiments, the recommendation system 1617 can automatically replace the placeholders with query parameters to provide a personalized query template. In certain embodiments, the recommendation system 1617 can provide recommendations for query parameters to replace the placeholders.

In some embodiments, the recommendation system 1617 can identify query parameters based on the placeholders. For example, as mentioned, the placeholders can indicate a type of query parameter that is to be inserted. Based on the identified type, the recommendation system 1617 can identify query parameters associated with the tenant that match the specified type. In this way, the recommendation system 1617 can reduce the number of identified query parameters.

In certain embodiments, the recommendation system 1617 can identify query parameters based on the syntax or semantics of the query parameters in the query template. For example, as described herein, the syntax of different query parameters can indicate that they are to be followed by a query parameter of a particular type. The recommendation system 1617 can use this information to filter the identified query parameters. For example, if the syntax of a query command indicates that it is to be followed by a function, the recommendation system 1617 can identify functions associated with the tenant for inclusion in the query template. This may include functions that have been previously used in a query and/or all or a subset of functions made available to tenants by the data intake and query system. 108.

At block 3408, the recommendation system 1617 causes a UI to display a query template. In some embodiments, the query template is displayed as a generic query template with its placeholders. For example, the query template may be displayed with the placeholders and one or more recommended query parameters to replace the placeholders. In certain embodiments, the query template is displayed without the placeholders, or as a personalized query template. For example, the recommendation system 1617 can automatically replace the placeholders with query parameters associated with the tenant. In some cases, the recommendation system 1617 can order the recommended query templates based on an ordering policy similar to the ordering policy described herein with reference to FIGS. 30 and 31.

Fewer, more, or different blocks can be used as part of the routine 3400. In some cases, one or more blocks can be omitted. For example, in some embodiments, based on a selection of a query template, the displayed query can be updated to include the selection. Furthermore, it will be understood that the various blocks described herein with reference to FIG. 34 can be implemented in a variety of orders, or can be performed concurrently.

6.4. Data Discovery During Query Formation

As described herein, in some embodiments, the content of data managed by the data intake and query system may be unknown to a user that desires to search it. As such, that user may find it difficult to quickly build queries that query the data in a meaningful way. To address this issue, the recommendation system 1617 can generate and execute one or more queries to discover content or characteristics of the data to be searched by a user, such as fields, keywords, etc. In some cases, the recommendation system 1617 can generate and execute the queries as a user is typing or entering a query. The results of the generated queries can be used to provide recommendations to the user, such as query parameters to be included in the query. In some cases, the recommendation system 1617 can generate and execute queries before a user enters a query. For example, the recommendation system 1617 can generate and execute queries based on a schedule in order to obtain information about the data. The recommendation system 1617 can store this information and use it to provide recommendations to the user. For example, the recommendation system 1617 can use the results of the generated queries to populate a query parameter table 3006. In an implementation, all or a portion of query parameter table 3006 may be transmitted to and/or stored by client browser 1604.

The recommendation system 1617 can generate and execute queries (e.g., send the query to the data intake and query system 108 for execution) based on various user interactions. For example, with reference to FIG. 29A, if a user selects a module from the drop down menu, the recommendation system 1617 can execute a query to determine datasets of the dataset association record associated with the selected module and use the results to provide a recommendation to the user as the user enters a query. Similarly, the recommendation system 1617 can generate and execute other queries based on interactions with one or more display objects of the graphical user interface.

In addition, as a query is entered via the graphical user interface, the recommendation system 1617 can execute various queries based on the entered query parameters. In some cases, the recommendation system 1617 generates the query based on the syntax of a query parameter. For example, if the syntax of a system query parameter indicates that it is to be followed by a dataset identifier, the recommendation system 1617 can generate and execute a query to determine the datasets associated with the user. In some cases, this can include a search to identify all datasets associated with the user. In certain embodiments, this can include a search to identify datasets associated with the dataset association record with which the user is working. Accordingly, the recommendation system 1617 can use a combination of query parameters and selections from display objects to generate queries.

As another example, if the syntax of the system query parameter indicates that it is to be followed by a field identifier, the recommendation system 1617 can generate and execute a query to identify fields of a dataset that could be recommended. In some embodiments, the generated query can include a request to return the fields from one or more inverted indexes. In certain embodiments, the generated query can include instructions to obtain a set of events, parse the set of events to identify fields within the events, and return the identified fields. In some cases, the data intake and query system 108 can identify fields within events based on the syntax of the data of an event. For example, the data intake and query system can determine that the word before an '=' sign denotes a field identifier and the word following the '=' sign denotes a field value. As such, as part of parsing the events, the data intake and query system can identify field identifiers for the different events and provide those to the recommendation system 1617 for potential recommendation to a user.

In some embodiments, the recommendation system 1617 can generate the queries by appending one or more query commands or system query parameters to the query that is already entered. For example, if the user has already types "from main I," the recommendation system 1617 can generate and execute a query "from main|head|fieldsummary" or "from main|head|fieldsummary fields field" to identify fields from a subset of events of the main index. Similarly, the recommendation system 1617 can append query parameters to a query to identify potential keywords or other user query parameters for the query.

In certain embodiments, the recommendation system 1617 generates a separate query based on the token query parameter. For example, if the user has already types "from main I," the recommendation system 1617 can use "main" as the token query parameter to generate and execute a query "tstats fieldsummary where index=main AND_time>=1460865600 AND_time<=1460952000" to identify fields in an inverted index associated with the main index within a particular time range. Accordingly, whether the recommendation system 1617 generates a separate query or appends query commands to the token query parameter can depend on the query parameters to be identified and/or the method in which the query parameters are to be identified.

In certain embodiments, the recommendation system 1617 can generate and execute multiple queries. For example, the recommendation system 1617 can generate and execute one query to identify fields from one or more events and a separate query to identify keywords of the events. Similarly, the recommendation system 1617 can generate one query to obtain data from inverted indexes and another query to obtain and parse events. In any case, the recommendation system 1617 can use the results of the queries to provide query parameter recommendations.

In some cases, based on the results of the query, the recommendation system 1617 can order the query parameters for recommendation. For example, the results may indicate a count number for different fields and the recommendation system 1617 can order the field identifiers based on the count (e.g., order from highest count to lowest count).

Figure 35:
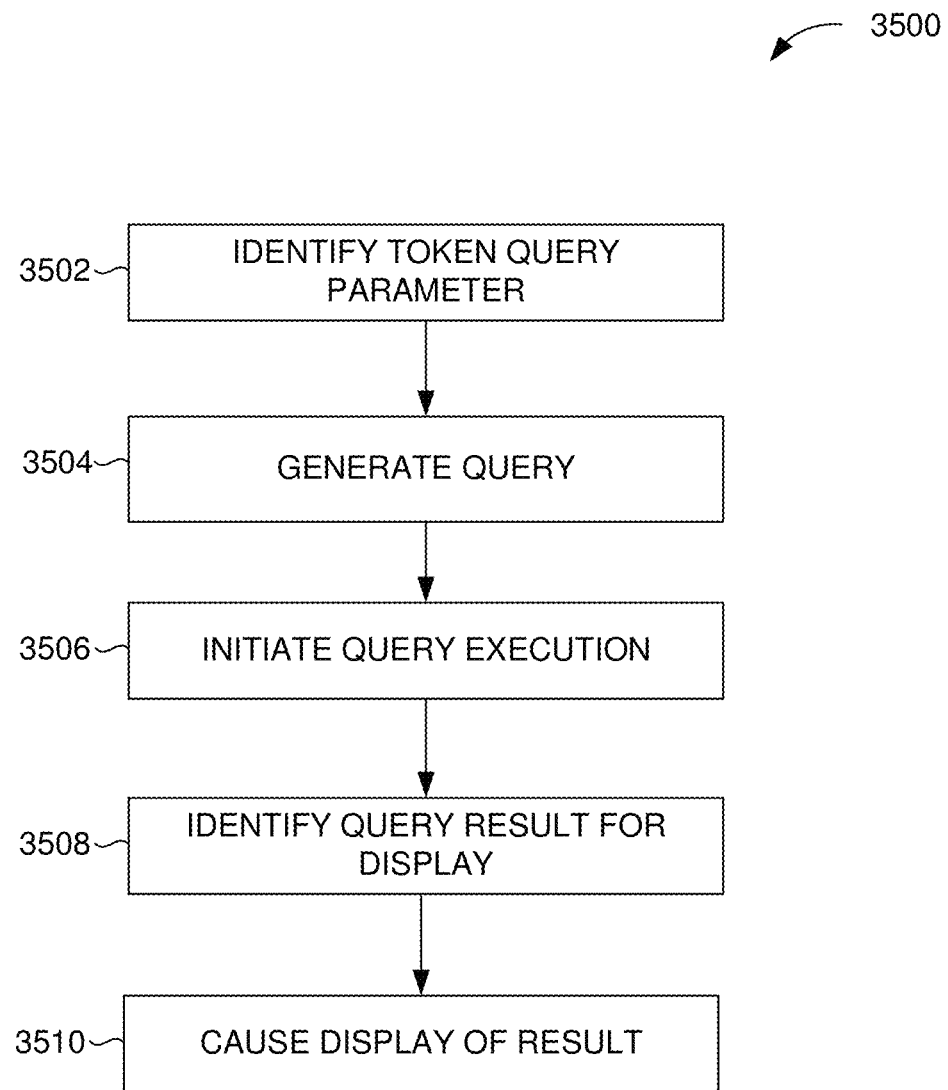
FIG. 35 is a flow diagram illustrative of an embodiment of a routine to recommend query parameters.

FIG. 35 is a flow diagram illustrative of an embodiment of a routine 3500 implemented by the recommendation system 1617 to recommend query parameters. Although described as being implemented by the recommendation system 1617, it will be understood that the elements outlined for routine 3500 can be implemented by one or more computing devices/components that are associated with the recommendation system 1617, such as, but not limited to, the UI data manager 1610, another component of the application system 1608, a component of the data intake and query system 108, etc. Thus, the following illustrative embodiment should not be construed as limiting.

At block 3502, the recommendation system 1617 identifies a token query parameter. As described herein at least with reference to blocks 3102 of FIG. 31 and 3402 of FIG. 34, the recommendation system 1617 can identify the token query parameter in a variety of ways, such as by parsing a query, parsing query parameters, or parsing text entered by a user, etc.

At block 3504, the recommendation system 1617 generates a query. As described herein, the recommendation system 1617 can generate the query based on one or more factors, such as, but not limited to, the identification of the token query parameter, the syntax or type of the token query parameter, the data to be retrieved, etc. In some cases, the recommendation system 1617 can generate the query by appending query parameters to the token query parameter and/or the query (or partial query) displayed on a graphical user interface. In certain embodiments, the recommendation system 1617 can generate a separate query that includes the token query parameter and/or one or more query parameters of the query (or partial query) displayed on a graphical user interface.

At block 3506, the recommendation system 1617 initiates execution of the query. As described herein, the recommendation system 1617 can initiate execution of the query by sending it to the data intake and query system 108 for execution. In some cases, if the execution of the query is slow or takes longer than a threshold time to complete, the recommendation system 1617 can instruct the data intake and query system 108 to terminate the query and/or return whatever results that it has.

At block 3508, the recommendation system 1617 identifies one or more results of the query for display on the graphical user interface. In some cases, the recommendation system 1617 identifies the one or more results for display based on an ordering policy. In certain embodiments, the recommendation system 1617 identifies one or more results based on the identification of the token query parameter and/or the syntax of the token query parameter, etc. For example, in some cases, the recommendation system 1617 can run one or more queries to obtain various characteristics of the data being searched (e.g., fields, keywords, etc.). The recommendation system 1617 can then identify which of the results to display as query parameter recommendations based on the particular syntax of the token query parameter. For example, if the token query parameter indicates that it should be followed by a keyword, the recommendation system 1617 can identify the query results that include keywords for display on the GUI 2900 and omit query results that include field identifiers, etc.

At block 3510, the recommendation system 1617 causes the graphical user interface to display the identified results as query parameter recommendations. In some cases, the recommendation system 1617 can order the recommendations. As described herein, in some cases, the results can include count information, such as the number of events that include a particular field or keyword. In some such embodiments, the recommendation system 1617 can order the results based on the count (e.g., rank query parameters with higher counts than query parameters with lower counts).

Fewer, more, or different blocks can be used as part of the routine 3500. In some cases, one or more blocks can be omitted. For example, in some embodiments, based on a selection of a query parameter, the displayed query can be updated to include the selection. Further, in some cases, the recommendation system 1617 can iteratively generate and execute queries as a query is modified and use the results of the generated queries to provide query parameter recommendations.

Furthermore, it will be understood that the various blocks described herein with reference to FIG. 35 can be implemented in a variety of orders, or can be performed concurrently. For example, the recommendation system 1617 can concurrently generate and execute multiple queries, and select recommendations for the user.

7.0 Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   determining that that a first user interface field in a graphical user interface that includes a first query has a first position in the graphical user interface and that a second user interface field in the graphical user interface that includes a second query has a second position in the graphical user interface;
   based at least in part on a hierarchical relationship between the first position in the graphical user interface and the second position in the graphical user interface, associating an identifier corresponding to query results resulting from execution of the second query with the first query;
   communicating the first query and the identifier to a data intake and query system for execution of the first query using the identifier;
   causing display of query results resulting from execution of the first query using the identifier in the graphical user interface;
   in response to a change in the hierarchical relationship between the first position in the graphical user interface and the second position in the graphical user interface, associating a second identifier corresponding to query results resulting from execution of the first query with the second query; and
   causing display of second query results resulting from execution of the second query using the second identifier in the graphical user interface.

2. The method of claim 1, wherein the first query is editable within the first user interface field.

3. The method of claim 1, wherein the first query does not reference any set of data.

4. The method of claim 1, wherein the first query does not comprise a command that identifies any set of data.

5. The method of claim 1, wherein the first position in the graphical user interface comprises a panel.

6. The method of claim 1, wherein the first user interface field in the graphical user interface is positioned below the second user interface field in the graphical user interface prior to the change in the hierarchical relationship.

7. The method of claim 1, further comprising receiving a request to initiate execution of the first query via a query command button.

8. The method of claim 1, wherein the data intake and query system obtains the query results resulting from execution of the second query from a metadata catalog using the identifier.

9. The method of claim 1, wherein associating an identifier corresponding to query results resulting from execution of the second query with the first query further comprises prepending a query command and the identifier to the first query.

10. The method of claim 1, further comprising:
    obtaining a third query, wherein the third query is displayed in a third user interface field that has a third position in the graphical user interface;
    based at least in part on a hierarchical relationship between the first position and the third position, associating the second identifier corresponding to the query results resulting from execution of the first query with the third query;
    communicating the third query and the second identifier to the data intake and query system for execution of the third query using the second identifier; and
    causing display of query results resulting from execution of the third query in the graphical user interface.

11. The method of claim 1, further comprising:
    obtaining a third query, wherein the third query is displayed in a third user interface field that has a third position in the graphical user interface;
    based at least in part on a hierarchical relationship between the first position and the third position, associating the second identifier corresponding to the query results resulting from execution of the first query with the third query;
    communicating the third query and the second identifier to the data intake and query system for execution of the third query using the second identifier; and
    causing display of query results resulting from execution of the third query in the graphical user interface,
    wherein the third position is positioned above the first position.

12. The method of claim 1, further comprising
    obtaining a third query, wherein the third query is displayed in a third user interface field that has a third position in the graphical user interface;
    based at least in part on a hierarchical relationship between the first position and the third position, associating the second identifier corresponding to the query results resulting from execution of the first query with the third query;
    communicating the third query and the second identifier to the data intake and query system for execution of the third query using the second identifier; and
    causing display of query results resulting from execution of the third query in the graphical user interface,
    wherein the third position is positioned above the first position; and
    receiving an indication that the third position is repositioned below the first position.

13. The method of claim 1, further comprising:
    obtaining a third query, wherein the third query is displayed in a third user interface field that has a third position in the graphical user interface;

based at least in part on a hierarchical relationship between the first position and the third position, associating the second identifier corresponding to the query results resulting from execution of the first query with the third query;

communicating the third query and the second identifier to the data intake and query system for execution of the third query using the second identifier; and causing display of query results resulting from execution of the third query in the graphical user interface, wherein the third position is positioned above the first position;

receiving an indication that the third position is repositioned below the first position;

obtaining the third query;

associating a third identifier corresponding to the second query results with the third query;

communicating the third query and the third identifier to the data intake and query system for execution of the third query using the third identifier; and causing display of modified child query resulting from execution of the third query using the third identifier in the graphical user interface.

14. The method of claim 1, wherein the first user interface field and the second user interface field are associated with a workbook.

15. The method of claim 1, further comprising, in response to selection of a button in the graphical user interface, associating at least one of an image, a file, or a comment with the first user interface field.

16. The method of claim 1, further comprising:

prior to the change in the hierarchical relationship, receiving an indication that the second query is modified;

communicating the modified second query to the data intake and query system for execution;

associating a third identifier corresponding to modified query results resulting from execution of the modified second query with the first query;

communicating the first query and the third identifier to the data intake and query system for execution of the first query using the third identifier; and causing display of modified query results resulting from execution of the first query using the third identifier in the graphical user interface.

17. A system, comprising:

one or more data stores including computer-executable instructions; and one or more processors configured to execute the computer-executable instructions, wherein execution of the computer-executable instructions causes the system to:

determine that that a first user interface field in a graphical user interface that includes a first query has a first position in the graphical user interface and that a second user interface field in the graphical user interface that includes a second query has a second position in the graphical user interface;

based at least in part on a hierarchical relationship between the first position in the graphical user interface and the second position in the graphical user interface, associate an identifier corresponding to query results resulting from execution of the second query with the first query;

communicate the first query and the identifier to a data intake and query system for execution of the first query using the identifier;

cause display of query results resulting from execution of the first query using the identifier in the graphical user interface:, in response to a change in the hierarchical relationship between the first position in the graphical user interface and the second position in the graphical user interface, associate a second identifier corresponding to query results resulting from execution of the first query with the second query; and cause display of second query results resulting from execution of the second query using the second identifier in the graphical user interface.

18. The system of claim 17, wherein execution of the computer-executable instructions further causes the system to:

obtain a third query, wherein the third query is displayed in a third user interface field that has a third position in the graphical user interface;

based at least in part on a hierarchical relationship between the first position and the third position, associate the second identifier corresponding to the query results resulting from execution of the first query with the third query;

communicate the third query and the second identifier to the data intake and query system for execution of the third query using the second identifier; and cause display of query results resulting from execution of the third query in the graphical user interface.

19. The system of claim 17, wherein execution of the computer-executable instructions further causes the system to:

obtain a third query, wherein the third query is displayed in a third user interface field that has a third position in the graphical user interface;

based at least in part on a hierarchical relationship between the first position and the third position, associate the second identifier corresponding to the query results resulting from execution of the first query with the third query;

communicate the third query and the second identifier to the data intake and query system for execution of the third query using the second identifier; and cause display of query results resulting from execution of the third query in the graphical user interface, wherein the third position is positioned above the first position.

20. Non-transitory computer-readable media comprising instructions executable by a computing system to:

determine that that a first user interface field in a graphical user interface that includes a first query has a first position in the graphical user interface and that a second user interface field in the graphical user interface that includes a second query has a second position in the graphical user interface;

based at least in part on a hierarchical relationship between the first position in the graphical user interface and the second position in the graphical user interface, associate an identifier corresponding to query results resulting from execution of the second query with the first query;

communicate the first query and the identifier to a data intake and query system for execution of the first query using the identifier;

cause display of query results resulting from execution of the first query using the identifier in the graphical user interface;

in response to a change in the hierarchical relationship between the first position in the graphical user interface and the second position in the graphical user interface, associate a second identifier corresponding to query results resulting from execution of the first query with the second query; and cause display of second query results resulting from execution of the second query using the second identifier in the graphical user interface.

* * * * *